United States Patent [19]
Soderberg et al.

[11] Patent Number: 4,636,975
[45] Date of Patent: Jan. 13, 1987

[54] CONTROLLING FIRMWARE BRANCH POINTS IN AN ELECTRONIC POSTAGE METER

[75] Inventors: John H. Soderberg, Stratford; Edward C. Duwel, Trumbull, both of Conn.

[73] Assignee: Pitney Bowes Inc., Stamford, Conn.

[21] Appl. No.: 447,925

[22] Filed: Dec. 8, 1982

[51] Int. Cl.[4] .............................................. G06F 15/21
[52] U.S. Cl. ...................................................... 364/900
[58] Field of Search ... 364/200 MS File, 900 MS File

[56] References Cited

U.S. PATENT DOCUMENTS

| | | | |
|---|---|---|---|
| 4,286,325 | 8/1981 | Dlugos et al. | 364/900 |
| 4,301,507 | 11/1981 | Soderberg et al. | 364/900 |
| 4,466,079 | 8/1984 | Daniels et al. | 364/900 |

OTHER PUBLICATIONS

Torrance et al., European patent application EP0019515A2, "Electronic Postage Meter Having Improved Security and Fault Tolerance Features".

*Primary Examiner*—Thomas M. Heckler
*Attorney, Agent, or Firm*—Michael J. DeSha; David E. Pitchenik; Melvin J. Scolnick

[57] ABSTRACT

A method and associated apparatus for controlling firmware branch points in an electronic postage meter, comprising the steps of storing a program for operation of the electronic postage meter, providing at least one data bit external to the stored program, each such data bit corresponding to a particular branch point in the program, and selecting a branch of the program for use in operation of the meter in accordance with the data bit so that the program may be readily reconfigured based on the presence of a data bit.

9 Claims, 5 Drawing Figures

ADDRESS BUS
94
DATA BUS
108
CONTROL BUS
96
90
OPTO
SERIAL I/O CHANNEL
92
SYSTEM CLOCK
V2
V5
72
POWER ON RESET
V2
V1
88
LOW VOLTAGE SENSOR
NVM READY
CPU WAIT
TP
CPU
10a
DEVICE SELECT
98
16a
RAM I/O TIMER
TP
SELECT LINES
99
NVM V5 SW
V4
V5
82
V5 SWITCH
76
AC LINE
HOT SW MDV
50
58
FUSE
56
TRANSFORMER
70
V4 REG.
74
V5 REG.
OPTO
TRIAC
54
60
COLD SWITCH
62
SWITCHER
66
V2 FILTER
AC DRIVE MOTOR
36a
48
V2 DISPLAY
V2 LOGIC
59
PREREGULATOR
V1
52
RFI FILTER

CONTROLLING FIRMWARE BRANCH POINTS IN AN ELECTRONIC POSTAGE METER

CROSS REFERENCE TO RELATED APPLICATIONS

The present application is related to copending application Ser. No. 447,815, filed on Dec. 8, 1982 in the name of Danilo Buan, entitled STAND-ALONE ELECTRONIC MAILING MACHINE, now U.S. Pat. No. 4,579,054, which describes a postage meter within which the present invention may be utilized, and copending application Ser. No. 447,912, filed on Dec. 8, 1982 in the names of John H. Soderberg and Edward C. Duwel, entitled, MODIFYING A FIRMWARE VARIABLE IN AN ELECTRONIC POSTAGE METER, abandoned.

PROGRAM APPENDIX

A program listing for an electronic postage meter such as disclosed in the aforementioned related patent application of Danilo Buan is set forth as part of the specification at the end of the detailed description and before the claims.

BACKGROUND OF THE INVENTION

The present invention relates to electronic postage meters and more particularly, to electronic postage meters operating under control of a program and including non-volatile memories (NVMs), such as the type disclosed in the aforementioned related patent application.

Known electronic postage meter employing firmware such as disclosed in U.S. Pat. No. 4,301,507, issued on Nov. 17, 1981, and assigned to Pitney Bowes, Inc. of Stamford, Conn. are programmed via ROMs to undergo a certain sequence of operations. Such arrangement is adequate for use with a particular postal system such as that presently employed in the United States. However, for an electronic postage meter to be capable of international usage, where the requirements of the postal systems of the various countries vary widely, a number of individual programs or software packages tailored to the requirements of each country to accommodate such variations would increase the programming costs significantly. Further, even in the United States, it may be desirable to provide for external tripping of the meter for testing.

SUMMARY OF THE INVENTION

It is an object of the present invention to provide a program for an electronic postage meter which may be reconfigured for a particular application by information stored in the meter.

It is a further object of the present invention to provide a programmed electronic postage meter having a program which may be readily configured to satisfy a variety of postal systems.

It is a still further object of the present invention to provide an electronic postage meter having the same firmware for use in different postal systems.

It is a still further object of the present invention to provide a firmware controlled electronic postage meter for different applications in which programming costs are minimized.

Briefly, in accordance with the present invention, a method and apparatus for controlling firmware branch points in an electronic postage meter is provided comprising the steps of storing a program for operation of the electronic postage meter, providing at least one data bit external to the stored program, each such data bit corresponding to a particular branch point in the program, and selecting a branch of the program for use in operation of the meter in accordance with the data bit so that the program may be readily reconfigured based on the presence of a data bit.

Other objects, aspects and advantages of the present invention will be apparent from the detailed description considered in conjunction with the preferred embodiment of the invention illustrated in the drawings, as follows:

DETAILED DESCRIPTION

Figure 1:
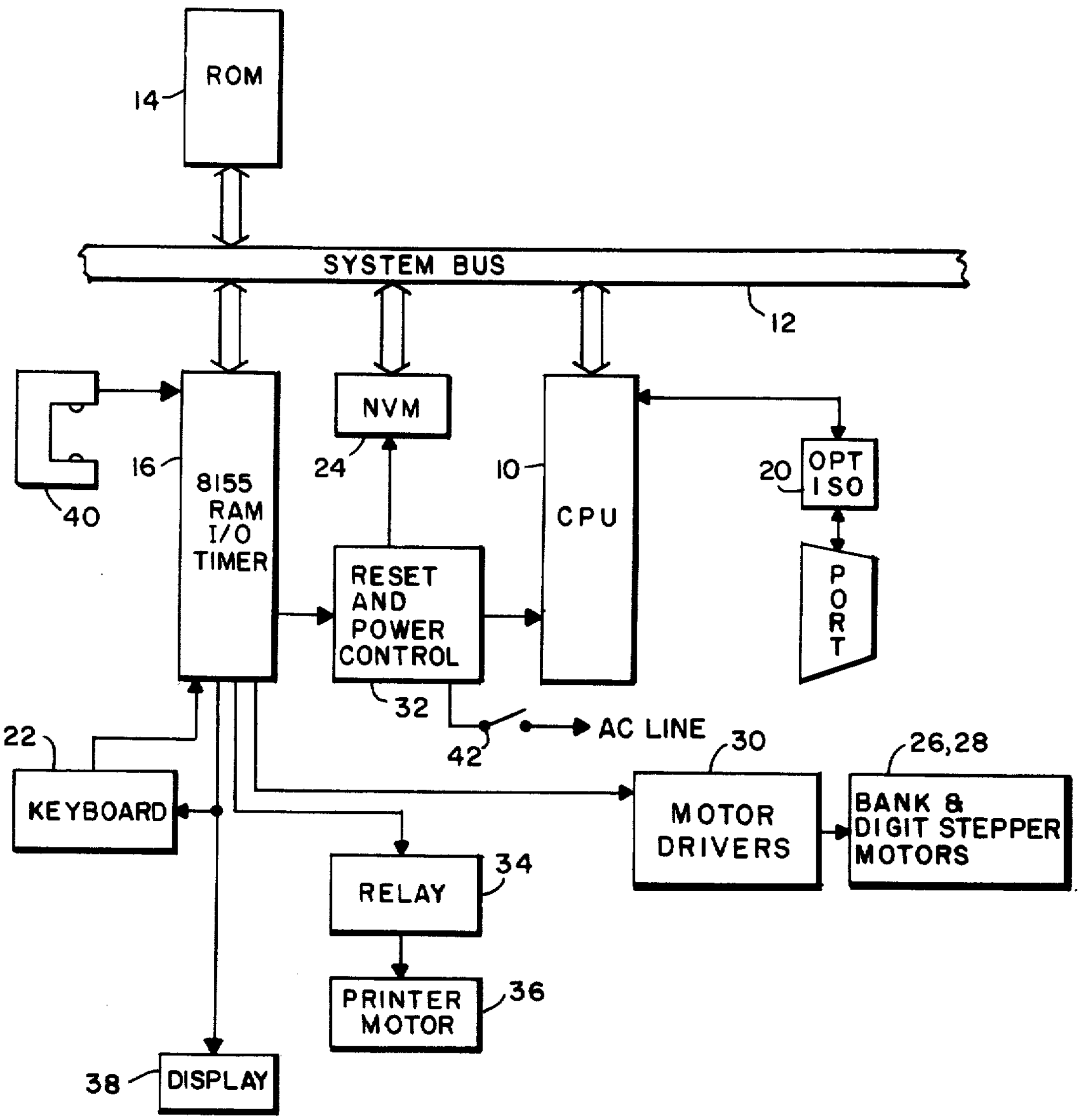
FIG. 1 is a block diagram of the generalized electronic curcuit for a stand-alone electronic postage meter.

Referring to FIG. 1, the electronic postage meter includes an 8-bit microprocessor 10 (CPU), such as an Intel Model 8085A microprocessor which is connected to various components through a system bus 12. ROM 14 is connected to the microprocessor 10 through the system bus 12. The ROM 14 stores the programs for controlling the postage meter. It should be understood that the term ROM as used herein includes permanently programmed and reprogrammable devices. An integrated circuit 16, which may be Intel Model 8155, is connected to the system bus 12 and includes RAM, input and output lines and a timer. The RAM portion of the intergrated circuit 16 has memory space allocated for transient storage of the data for the ascending register and descending register. An external data communication port 18 is connected to the microprocessor 10 through optical isolator 20. The external data communication port 18 allows connection with devices such as an electronic scale, an external computer, servicing equipment and the like. Also electrically connected to the microprocessor 10 through the system bus 12 is the keyboard 22 of the postage meter and a non-volatile memory (NVM) 24. Stepper motors 26, 28 are also in electrical connection with the microprocessor 10 via motor drivers 30 and the integrated circuit 16. A reset and power control 32 is electrically connected between the integrated circuit 16, the NVM 24 and the microprocessor 10. A relay 34 connects the AC printer motor 36 to the integrated circuit 16. A display 38 is also electrically connected to the integrated circuit 16. Trip photosensor 40 is connected to the microprocessor 10 through integrated circuit 16 to indicate the presence of an envelope to be stamped, as described more fully in the aforementioned patent application entitled, STAND-ALONE ELECTRONIC MAILING MACHINE.

The electronic postage meter is controlled by the microprocessor 10 operating under control of the programs stored in the ROM 14. The microprocessor 10 accepts information entered via the keyboard 22 or via the external communication port 18 from external message generators. Critical accounting data and other important information is stored in the non-volatile memory 24. The non-volatile memory 24 may be an MNOS semiconductor type memory, a battery augmented CMOS memory, core memory, or other suitable non-volatile memory component. The non-volatile memory 24 stores critical postage meter data during periods when power is not applied to the postage meter. This data includes in addition to the serial number of the mailing machine or postage meter information as to the value in the descending register (the amount of postage available for printing), the value in the ascending register (the total amount of postage printed by the meter), and the value in the piece count register (the total number of cycles the meter has performed), as well as other types of data, such as trip status, initialization and service information, which are desired to be retained in the memory even though no power is applied to the meter.

When an on/off power switch 42 is turned on (closed) a power supply internal to the mailing machine energizes the microprocessor 10 and the balance of the electronic components. The information stored in the non-volatile memory 24 is transferred via the microprocessor 10 to the RAM of the integrated circuit 16. After power up the RAM contains an image or copy of the information stored in the non-volatile memory 24 prior to energization. During operation of the postage meter, certain of the data in the RAM is modified. Accordingly, when postage is printed, the descending register will be reduced by the value of the printed postage, the ascending register increased by the value of the printed postage and the piece counter register incremented. When the power switch 42 is turned off (opened), the updated data in the RAM is transferred via the microprocessor 10 back into a suitably prepared area of the non-volatile memory 24. A like transfer of information between the non-volatile memory 24 and the RAM takes place during power failure.

Figure 2A:
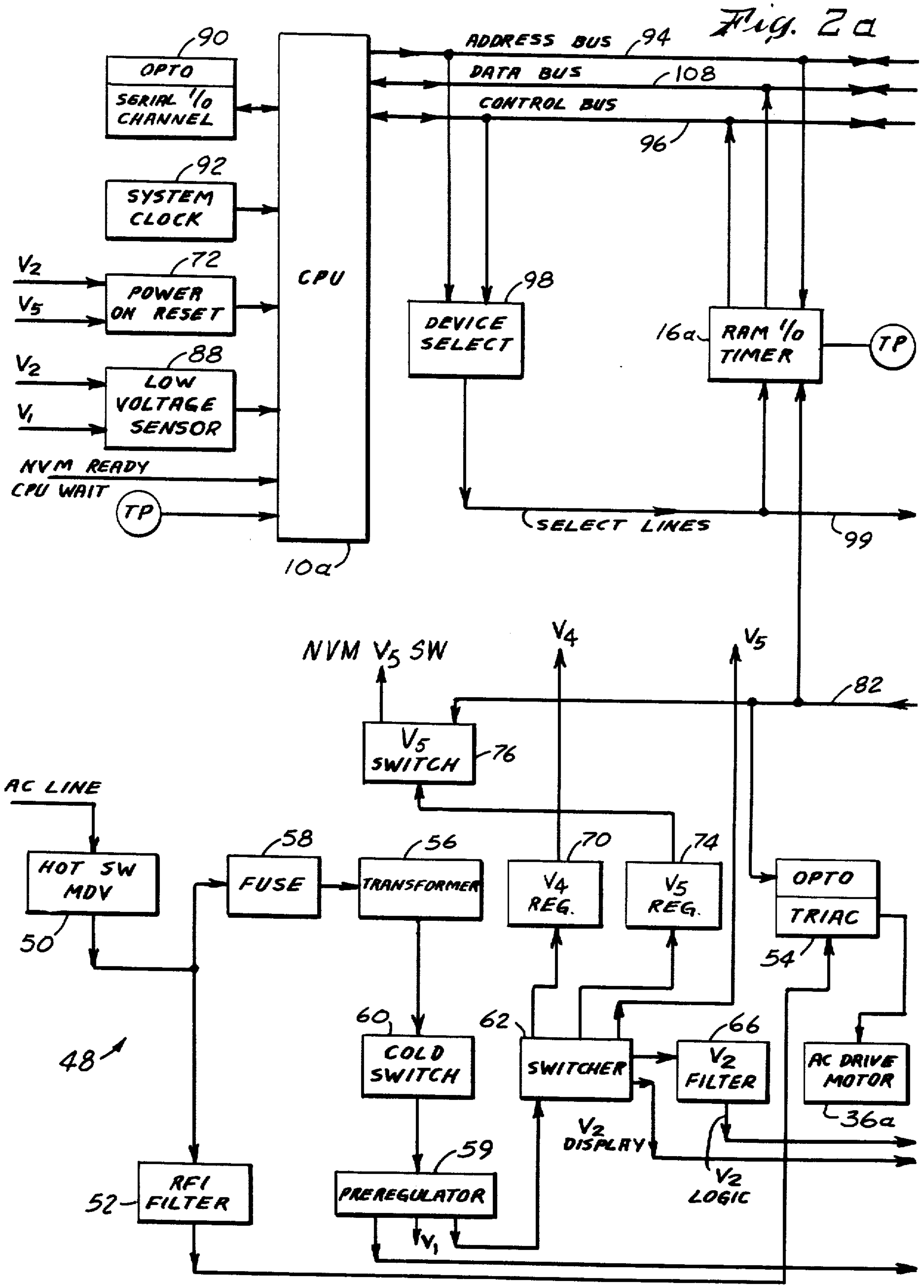
FIGS. 2A and 2B is a detailed block diagram of the electronic circuitry for a stand-along electronic postage meter.
Figure 2B:
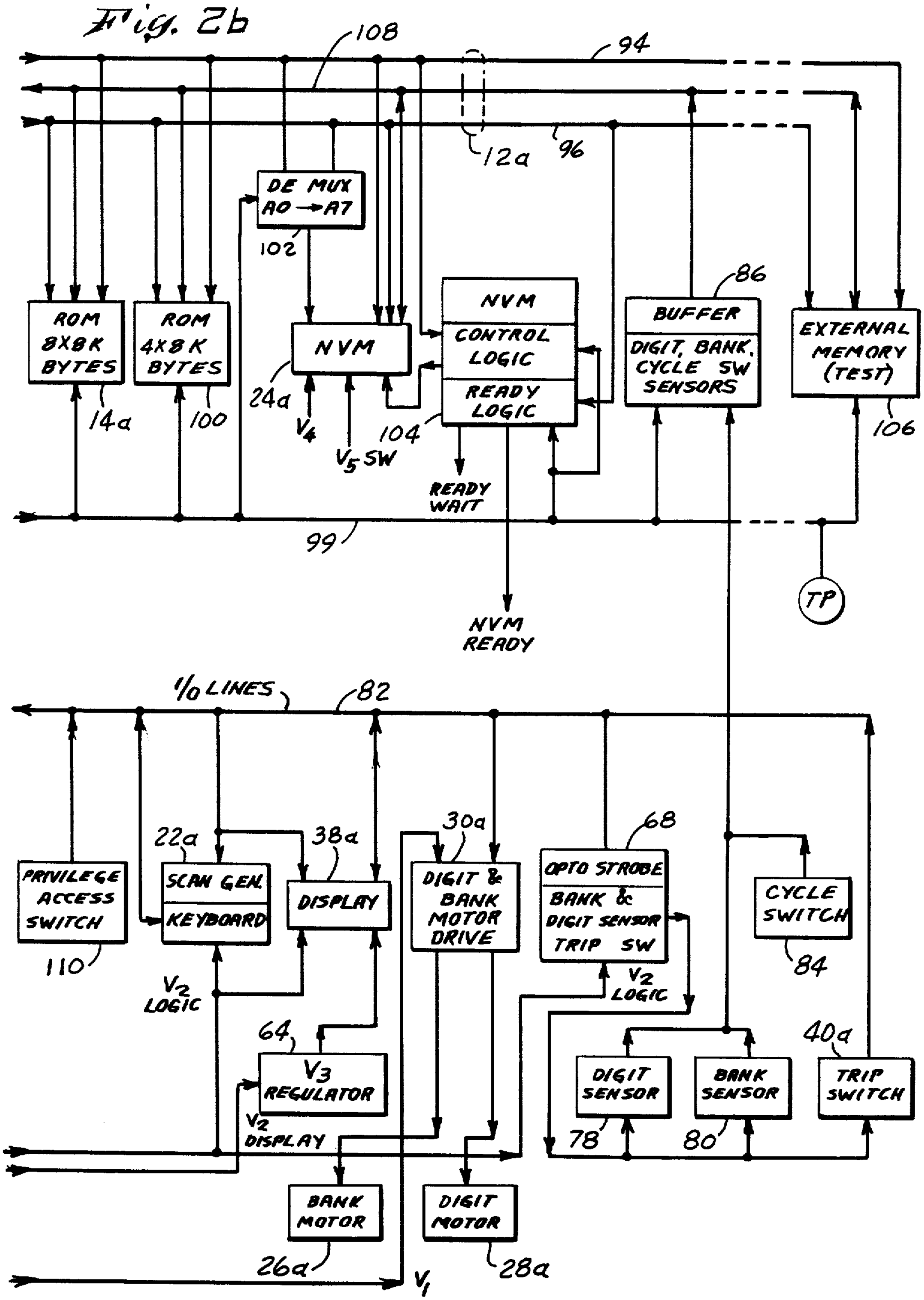

Referring to FIG. 2, a more detailed block diagram of the arrangement of the electrical components for the postage meter is illustrated generally as 48. Power is supplied to the postage meter from the AC line voltage, typically 115 volts. This line voltage is applied to the meter through a hot switch 50 which cuts off power to the postage meter to protect the electrical components thereof if the temperature rises above a preset limit, nominally 70° C. The hot switch 50 is connected to the AC drive motor 36A through an RF filter 52 and an opto-triac 54 which provides isolation between the line voltage and the control logic for the meter. The hot switch 50 is also connected to a transformer 56 protected by a fuse 58. The output of the transformer 56 is coupled to a pre-regulator 59 through a cold switch 60. The cold switch 60 cuts off power to the pre-regulator 59 if the temperature drops below a preset limit, nominally 0° C. The pre-regulator 59 provides an output voltage of a predetermined range to a switcher 62 which generates the output voltage +5 V; and the voltages for generating −12 V and −30 V.

The +5 V is applied to a +3 volt regulator 64 and then to the display 38A. The +5 V from the switcher 62 is also applied to a +5 V filter 66 which provides +5 V for logic circuits. Specifically, the +5 V is applied to the keyboard 22A, the display 38A, and bank, digit and trip sensor logic 68 and to the integrated circuits. The −12 V is applied to a −12 V regulator 70 and then to the non-volatile memory 24A.

The −30 V output from the switcher 62 is also applied to a −30 V regulator 74 and then to a −30 V switch 76 which switches its output voltage on and off in response to the requirements of writing in NVM as dictated by the program. The output of the −30 V switch is applied to the non-volatile memory 24A. The −30 V supply is connected to the power on reset 72 of the microprocessor 10A.

+5 V from the switcher 62 is also supplied to one input of the power on reset 72; the other input receives −30 V from the regulator 74 as previously described. A low voltage sensor 88 also receives one input +5 V from the switcher 62 and its other input from the pre-regulator 59; its output is applied to the microprocessor 10A. The low voltage sensor 88 detects power failure and communicates this to the microprocessor 10A which in turn addresses the RAM through system bus 12A to transfer all security data present in the RAM to the non-volatile memory 24A.

Another output from the pre-regulator 59 in the form of +24 V is applied to the digit and bank motor drive 30A for the bank motor 26A and digit motor 28A, which selects the particular printing wheel (bank) which is to be activated and the particular digit of the selected printing wheel which is to be set.

An output strobe from the integrated circuit 16A is buffered through buffer drive 68 and applied to digit sensor (encoder) 78, bank sensor (encoder) 80, and trip sensor 40A. The opto strobe applies power to the digit sensor 78, bank sensor 80 and trip sensor 40A when needed. The output from the trip sensor 40A is applied to the input/output lines 82 which are coupled to the integrated circuit 16A. The outputs from the digit sensor 78 and bank sensor 80 and cycle switch 84 are applied to a storage buffer 86.

During power up, the key switch 42, see FIG. 1, is closed, and the AC line voltage energizes the electrical components previously described and an Initialization process will occur. Such initialization may include a hard and/soft initialization process as disclosed in the aforementioned U.S. Pat. No. 4,301,507. Preferably the Initialization process is that described in copending application Ser. No. 695,027, filed on Jan. 28, 1985 in the names of Alton B. Eckert and Easwaran C. N. Nambudiri entitled, Stand Alone Electronic Mailing Machine, now U.S. Pat No. 4,559,443, and assigned to the same assignee as the present invention.

In operation, the microprocessor 10A under control of the ROM 14A and possibly the auxiliary ROM 100 communicates over the address bus 94 and control bus 98 with the device select 98. The output of the device select 98 communicates with the particular module to be addressed over select lines 99. The modules to be addressed are the RAM, the ROM 14A, an auxiliary ROM 100, a demultiplexer 102, NVM logic 104 and the buffer 86 and optionally for testing external memory 106. The RAM of intergated circuit 16A provides the working memory for the postage meter and the microprocessor 10A. The ROM 14A stores the program; the auxiliary ROM 100 may be used to provide additional program storage space. The non-volatile memory 24A provides storage of all security information for the meter and retains such information during power down or power failure. The demultiplexer 102 latches the lower eight (8) bit of address information that defines a particular location which is used immediately thereafter. The NVM logic 104 controls the data applied to the NVM 24A and also provides ready wait and NVM ready signals to the micro-processor 10A to advise it to wait for the NVM 24A or that the NVM 24A is ready to receive data over the data bus 108.

As previously mentioned, the digital sensor 78 (optical encoder) and bank sensor 80, (optical encoder) and cycle switch 84 whose current state is read, i.e., "Home" or "In Cycle", apply input signals to the storage latch 86 which sends output signals over data bus 108 to the microprocessor 10A for storage in the proper RAM location.

The RAM is also electrically coupled to I/O lines to transmit or receive data from the trip sensor 40A, the display 38A, keyboard 22A, and privilege access switch 110, if present. The privilege access switch 110 may be used in applications which require manual resetting of meter postage via a switch which is kept under seal.

A program listing for a postage meter of the type described in the aforementioned related patent application of Danilo Baun is set forth in the Program Appendix. The flow charts discussed below indicate how one or more external data bits preferably stored in non-volatile memory can be used to reconfigure those portions of the active software (firmware) stored in one or more ROMs. The program listing includes the code for the flow chart in FIG. 3, but only a portion of the code for the flow chart in FIG. 4.

Figure 3:
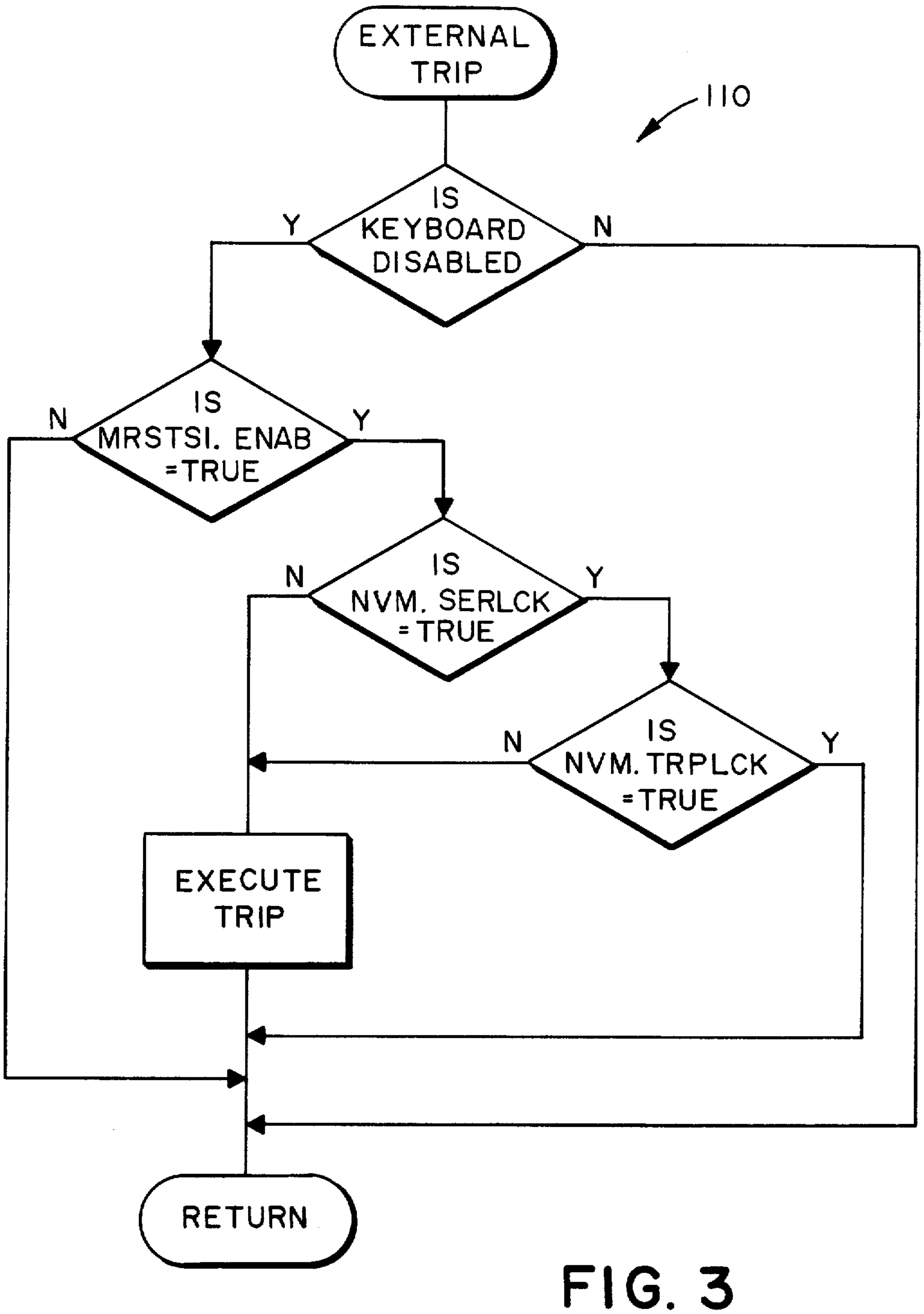
FIG. 3 is a flowchart for reconfiguring the firmware to provide for a remote trip.

Referring to FIG. 3, the flow chart for effecting an external trip via an external communication channel, e.g., the external test point (TP) shown in FIG. 2, is illustrated as 110. A special bit for providing an EXTERNAL TRIP is stored (written) into the non-volatile memory during manufacture. In performing the EXTERNAL TRIP, the meter status is checked to determine if the KEYBOARD is disabled. If it is not disabled, this subroutine returns error status to the superordinate process and no trip occurs. If the KEYBOARD is disabled, the meter status is again checked to see if it is enabled. If not, error status is returned to the superordinate process. If meter status indicates enabled (MRSTS1.ENAB) is TRUE, we access certain addresses in the non-volatile memory (NVM) to see if the serial number lock (NVM.SERLCK) is TRUE. That is, a specific bit is accessed in the non-volatile memory to determine whether the serial number of the postage meter has been locked in non-volatile memory. If it has not, the trip is executed and normal status is returned to the superordinate process. However, if the serial number has been locked in the non-volatile memory, another address in the non-volatile memory is accessed to determine whether a bit is present to disable the external trip. If so, error status is returned to the superordinate process. However, if a trip lock (NVM.TRPLCK) bit has not been set in a non-volatile memory, a trip is executed. Thereafter, control is returned to the superordinate process with normal status.

Figure 4:
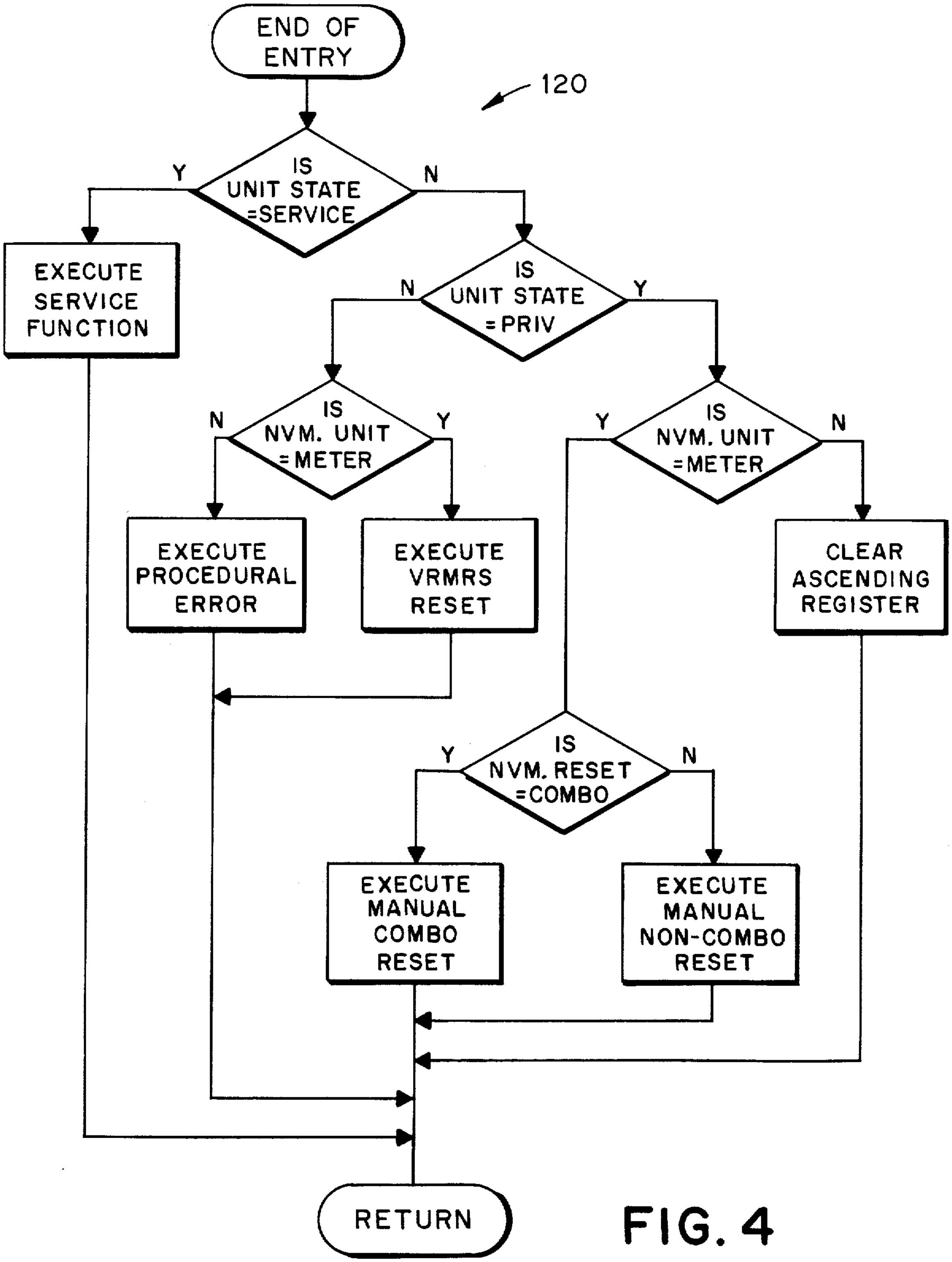
FIG. 4 is a flowchart for reconfiguring the firmware to reset the meter in accordance with its reset condition.

Referring to FIG. 4, at the end of entry, the Reset Routine illustrated as 120 occurs after the meter has been primed for reset by entry of combination and amount messages. Initially, it is determined whether the meter is in a service state. If so, the service function is executed and control is returned to the superordinate process. If the meter is not in a service state, the meter status is checked to determine if it is in the privileged state, i.e., the privilege switch for manual postage resetting is operable. Reset in this case is accomplished with a privileged access switch under either wire/metal seal, paper seal, or keylock (same for all meters). With this method "monies" are entered directly into the descending register when the privileged access switch is in the "on" position, i.e., in the privileged state. If it is in the privileged state, a non-volatile memory address NVM.UNIT is accessed to determine if the unit is a meter that has single or double register. If a single register, it is cleared to zero and control is returned to the superordinate process. If the unit is a double register, a further address in a non-volatile memory is accessed to determine if the double register meter is reset via a manual combination NVM.RESET or a non-combination reset. After the reset, control is returned to the superordinate process. If NVM.RESET is set, a manual combination reset is executed and if NVM.RESET is not set a non-combination manual reset is executed. Control is then returned to the superordinate process.

Upon reading the state of the meter, if it is determined that it is not in a privilege state, an address in the non-volatile memory is accessed to determine if the value in NVM.UNIT is set to indicate the unit is a double register meter. If it is not set, a procedural error is declared and control is returned to the superordinate process. If it is set to indicate a double register meter, the values are equal and a variable remote meter resetting (VRMRS) is executed and control is returned to the superordinate process.

Thus, it is apparent that the branching resulting from the EXTERNAL TRIP and RESET routines is dependent upon the presence or absence of certain bits in non-volatile memory.

More details regarding the privilege switch, VRMRS and manual reset (combinational or non-combinational) and the routines therefore can be obtained from U.S. Pat. No. 4,301,507, issued on Nov. 17, 1981, and assigned to Pitney Bowes, Inc. of Stamford, Conn.

The functions illustrated in FIGS. 3 and 4 are illustrative of the present invention. It should be understood that the present invention may be utilized to control firmware branch points in an electronic postage meter to accomplish other functions such as, presetting of the registers and ascending register lockout. Preferably, as disclosed in the copending patent applications Ser. No. 355,437, filed on Mar. 8, 1982, in the names of Edward C. Duwel and John H. Soderberg, entitled, NON-VOLATILE MEMORY SERIAL NUMBER LOCK FOR ELECTRONIC POSTAGE METER, and Ser. No. 347,398, filed on July 12, 1982, in the names of Raymond R. Crowley and John H. Soderberg, entitled, ELECTRONIC POSTAGE METER HAVING A ONE TIME ACTUABLE OPERATING PROGRAM TO ENABLE SETTING OF CRITICAL ACCOUNTING REGISTERS TO PREDETERMINED VALUES, after the serial number is set in the meter a "one time" program locks up the meter to preclude further changes therein.

It is known and understood for the purpose of the present application that the term postage meter refers to the general class of device for the imprinting of a defined unit value for governmental or private carrier delivery of parcels, envelopes or other like application for unit value printing. Thus, although the term postage meter is utilized, it is both known and employed in the trade as a general term for devices utilized in conjunction with services other than those exclusively employed by governmental postage and tax services. For example, private, parcel and freight services purchase and employ such meters as a means to provide unit value printing and accounting for individual parcels.

It should be apparent to those skilled in the art that various modifications may be made in the present invention without departing from the spirit and scope thereof as described in the specification and defined in the appended claims.

PROGRAM APPENDIX

PATENT APPLICATION

OF: JOHN H. SODERBERG and EDWARD C. DUWEL

FOR: CONTROLLING FIRMWARE BRANCH POINTS IN AN ELECTRONIC POSTAGE METER

<<< ASSEMBLY COMMAND STRING >>>

```
/LIST=_DRA1:[OPT1.DEBUG]PATENT.LIS
/OBJECT=_DRA1:[OPT1.DEBUG]PATENT.OBJ
+       LINES 60
+       LIST    A,E,G,O,S,X
+       NLIST   M
_DRA1:[OPT1.DEBUG]SYMBOL.SRC
;       I N T E R R U P T   V E C T O R   T A B L E
_DRA1:[OPT1.DEBUG]VECTBL.SRC
;       I N T E R R U P T   P R O C E S S I N G
+       ORG     40H
_DRA1:[OPT1.NEWINT]CLKDEC
_DRA1:[OPT1.NEWINT]DBOUNC
_DRA1:[OPT1.NEWINT]DISPLY
_DRA1:[OPT1.NEWINT]INT75
_DRA1:[OPT1.NEWINT]KDIO
_DRA1:[OPT1.NEWINT]MVDDAT
_DRA1:[OPT1.NEWINT]RDROW
_DRA1:[OPT1.NEWINT]STPTMR
_DRA1:[OPT1.NEWINT]STRTMR
_DRA1:[OPT1.NEWINT]TIMINT
;       P O W E R   U P   &   D O W N
;_DRA1:[OPT1.DEBUG]PWRUP
_DRA1:[OPT1.NEWCTL]PWRABN
_DRA1:[OPT1.NEWCTL]PWRDN
_DRA1:[OPT1.NEWCTL]PWRNOR
_DRA1:[OPT1.NEWCTL]PWRUNG
_DRA1:[OPT1.NEWCTL]PWRUOK
;       K E Y B O A R D   &   D I S P L A Y
_DRA1:[OPT1.NEWKEY]CDBUF
_DRA1:[OPT1.NEWKEY]FILDIM
_DRA1:[OPT1.NEWKEY]KEYBRD
_DRA1:[OPT1.NEWKEY]MODDSP
_DRA1:[OPT1.NEWKEY]PAUTHK
_DRA1:[OPT1.NEWKEY]PCLRK
_DRA1:[OPT1.NEWKEY]PDCMK
_DRA1:[OPT1.NEWKEY]PERDSP
_DRA1:[OPT1.NEWKEY]PNUMK
_DRA1:[OPT1.NEWKEY]PROKEY
_DRA1:[OPT1.NEWKEY]PSETK
_DRA1:[OPT1.NEWKEY]SEGCOD
_DRA1:[OPT1.NEWKEY]VALDSP
;       C O N T R O L   &   P R O C E S S I N G
;+      ORG     400H
_DRA1:[OPT1.NEWCTL]CMDDSB
_DRA1:[OPT1.NEWCTL]CMDENB
_DRA1:[OPT1.NEWCTL]CONFIG
_DRA1:[OPT1.NEWCTL]CONSUM
_DRA1:[OPT1.NEWCTL]CTLSUM
_DRA1:[OPT1.NEWCTL]DBLHDR
```

```
_DRA1:[OPT1.NEWCTL]DECADD
_DRA1:[OPT1.NEWCTL]DECCOM
_DRA1:[OPT1.NEWCTL]DECERR
_DRA1:[OPT1.NEWCTL]DECSUB
_DRA1:[OPT1.NEWCTL]DOACCT
_DRA1:[OPT1.NEWCTL]DOSTAT
_DRA1:[OPT1.NEWCTL]DOTRIP
_DRA1:[OPT1.NEWCTL]ENDENT
_DRA1:[OPT1.NEWCTL]ENTAMT
_DRA1:[OPT1.NEWCTL]ENTSER
_DRA1:[OPT1.NEWCTL]EXTSER
_DRA1:[OPT1.NEWCTL]EXTTRP
_DRA1:[OPT1.NEWCTL]FATERR
_DRA1:[OPT1.NEWCTL]FINTRP
_DRA1:[OPT1.NEWCTL]HDRONY
_DRA1:[OPT1.NEWCTL]HDRPLS
_DRA1:[OPT1.NEWCTL]IDLE
_DRA1:[OPT1.NEWCTL]MANRST
_DRA1:[OPT1.NEWCTL]MESAGE
_DRA1:[OPT1.NEWCTL]MSERNO
_DRA1:[OPT1.NEWCTL]MSG2MU
_DRA1:[OPT1.NEWCTL]MTRSTS
_DRA1:[OPT1.NEWCTL]NPAUSE
_DRA1:[OPT1.NEWCTL]POSUPD
_DRA1:[OPT1.NEWCTL]PROERR
_DRA1:[OPT1.NEWCTL]RDCYC
_DRA1:[OPT1.NEWIO]RECEVE
_DRA1:[OPT1.NEWCTL]REDSTS
_DRA1:[OPT1.NEWCTL]SELVAL
_DRA1:[OPT1.NEWCTL]SEREDE
_DRA1:[OPT1.NEWCTL]SETPOS
_DRA1:[OPT1.NEWCTL]SRVCNV
_DRA1:[OPT1.NEWCTL]SRVREQ
_DRA1:[OPT1.NEWCTL]VALREQ
_DRA1:[OPT1.NEWCTL]XEQHDR
_DRA1:[OPT1.NEWIO]XMIT
;      U T I L I T I E S
_DRA1:[OPT1.NEWUTL]CLRBLK
_DRA1:[OPT1.NEWUTL]CMPARE
_DRA1:[OPT1.NEWUTL]CRC
_DRA1:[OPT1.NEWUTL]CRCNIB
_DRA1:[OPT1.NEWUTL]DBLANK
_DRA1:[OPT1.NEWUTL]DFLUSH
_DRA1:[OPT1.NEWUTL]DSBKBD
_DRA1:[OPT1.NEWUTL]ENAKBD
_DRA1:[OPT1.NEWUTL]FILNIB
_DRA1:[OPT1.NEWUTL]GETNIB
_DRA1:[OPT1.NEWUTL]LSTATE
_DRA1:[OPT1.NEWUTL]MOVBIT
_DRA1:[OPT1.NEWUTL]MVLNIB
_DRA1:[OPT1.NEWUTL]MVRNIB
_DRA1:[OPT1.NEWUTL]PUTNIB
_DRA1:[OPT1.NEWUTL]RSCAN
_DRA1:[OPT1.NEWUTL]TDBITM
_DRA1:[OPT1.NEWUTL]VCALL
_DRA1:[OPT1.NEWUTL]VCALLS
;      N O N   V O L A T I L E   M E M O R Y
_DRA1:[OPT1.NEWNVM]NVM30F
_DRA1:[OPT1.NEWNVM]NVM30T
_DRA1:[OPT1.NEWNVM]NVMBYT
_DRA1:[OPT1.NEWNVM]NVMCHG
_DRA1:[OPT1.NEWNVM]NVMDED
_DRA1:[OPT1.NEWNVM]NVMDXB
_DRA1:[OPT1.NEWNVM]NVMER
_DRA1:[OPT1.NEWNVM]NVMFND
_DRA1:[OPT1.NEWNVM]NVMLOD
_DRA1:[OPT1.NEWNVM]NVMMAP
_DRA1:[OPT1.NEWNVM]NVMNBK
_DRA1:[OPT1.NEWNVM]NVMNXT
_DRA1:[OPT1.NEWNVM]NVMOPN
_DRA1:[OPT1.NEWNVM]NVMPRP
_DRA1:[OPT1.NEWNVM]NVMRD
_DRA1:[OPT1.NEWNVM]NVMSTO
_DRA1:[OPT1.NEWNVM]NVMWN
_DRA1:[OPT1.NEWNVM]NVMWR
;      V R M R S
_DRA1:[OPT1.VRMRS]ACCODE
_DRA1:[OPT1.VRMRS]BINOCT
_DRA1:[OPT1.VRMRS]VRCDR
_DRA1:[OPT1.VRMRS]VRCLR
_DRA1:[OPT1.VRMRS]VRCREC
_DRA1:[OPT1.VRMRS]VRMRS
_DRA1:[OPT1.VRMRS]VRSET
_DRA1:[OPT1.DEBUG]PATENT
;       M O T O R   S U B S Y S T E M
;_DRA1:[OPT1.DEBUG]STUB
_DRA1:[EASWARAN.CONTROL]DMOVE
_DRA1:[EASWARAN.CONTROL]ENCMOV
_DRA1:[EASWARAN.CONTROL]ENDMOV
_DRA1:[EASWARAN.CONTROL]MDSEEK
_DRA1:[EASWARAN.CONTROL]MOPEN
_DRA1:[EASWARAN.CONTROL]MOTMOV
_DRA1:[EASWARAN.CONTROL]POHOME
_DRA1:[EASWARAN.CONTROL]RENC
_DRA1:[EASWARAN.CONTROL]SETCLS
    <<< end of assembly command string >>>
```

SYMBOL TABLES

```
   1              LINES 60
   3              NLIST    M
   5          ;  ********************************
   6          ;  ***   RAM LABEL DEFINATIONS   ***
   7          ;  ********************************
  21  0000                  +FIXSED  EQU   PTR
  26  0008                  +VARSED  EQU   PTR
  31  0010                  +CTLCRC  EQU   PTR
  36  0012                  +RSTCNT  EQU   PTR
  41  0013                  +ERRST   EQU   PTR
  46  0014                  +ERRCOD  EQU   PTR
  51  0016                  +ERRCNT  EQU   PTR
  56  0018                  +UNLOCK  EQU   PTR
  61  001C                  +LOWWRN  EQU   PTR
  66  001E                  +SETLIM  EQU   PTR
  71  0020                  +SERFLG  EQU   PTR
  76  0021                  +SERNUM  EQU   PTR
  81  0028                  +PCEREG  EQU   PTR
  86  002F                  +DSCREG  EQU   PTR
  91  0036                  +DSCCRC  EQU   PTR
  96  0038                  +ASCREG  EQU   PTR
 101  0040                  +ASCCRC  EQU   PTR
 106  0042                  +POSREG  EQU   PTR
 111  0046                  +MTRCHR  EQU   PTR
 116  0048                  +MRSTS1  EQU   PTR
 121  004A                  +MRSTS2  EQU   PTR
 126  004C                  +NORFLG  EQU   PTR
 131  004E                  +KDCTRL  EQU   PTR
 136  0050                  +BLKTMR  EQU   PTR
 141  0052                  +DSPTMR  EQU   PTR
 146  0054                  +KEYBKT  EQU   PTR
 151  0056                  +CTLBKT  EQU   PTR
 156  0058                  +CHRBKT  EQU   PTR
 161  005A                  +CURBKT  EQU   PTR
 166  005C                  +DBCTR   EQU   PTR
```

```
005E            +SKPVAL  EQU   PTR
0060            +SKPCNT  EQU   PTR
0062            +TIMVEC  EQU   PTR
0066            +NVMCTL  EQU   PTR
0068            +OLDSWT  EQU   PTR
006A            +DIEDCM  EQU   PTR
006C            +DEFDCM  EQU   PTR
006E            +PORTBI  EQU   PTR
0070            +SPARE  EQU   PTR
0080            +DBUF  EQU   PTR
008C            +SPARE1  EQU   PTR
0090            +RECBUF  EQU   PTR
00A0            +XMTBUF  EQU   PTR
00B0            +SPARE2  EQU   PTR
00C0            +WORK1  EQU   PTR
00D0            +WORK2  EQU   PTR
00E0            +AMTBUF  EQU   PTR
00F0            +CMBBUF  EQU   PTR
0000            +DIMAGE  EQU   PTR
          NLIST M
        ;                       FLAG ASSIGNMENTS

        ; RAM              BIT
        ; LABEL     BIT    LABEL    DESCRIPTION

        ; Serflg    0      Dead     Unrecoverable Fatal Error
        ;            1
        ;             2    Weknvm   Retention qualities of NVM poor
        ;              3   Snolck   Sernum can no longer be changed
        ;
        ; Mrsts1    0      Unksel   Unknown selection value
        ;            1     Datdor   Check date warning
        ;             2    Insfnd   Insufficient funds
        ;              3   Lowpos   Low postage warning
        ;               4  Sermod   In service mode
        ;                5 Enabld   Meter enabled
        ;                6 Incyc    Trip mechanism in cycle
        ;                 7 Quereq  Trip request being processed
        ;
        ; Mrsts2    0      Fatmod   Detected fatal error condition
        ;            1
        ;             2
        ;              3
        ;               4  Trpsw    Trip switch status
        ;                5
        ;                6
        ;                 7 Prvmod  Privileged mode set
        ;
        ; Norflg    0      Quests   Status is to be transmitted
        ;            1     Quepos   Current selection is to be transmitted
        ;             2    Cmbin    Combination entered
        ;              3   Amtin    Amount entered
        ;               4  Trpreq   Trip waiting to be processed
        ;                5 Comdsb   External communications disabled
        ;                6 Unvsel   Selected postage not verified
        ;                 7 Latdsb  Commanded disable (latched)
        ;
        ; Kdctrl    0      Stgdsp   Setting is on display
        ;            1     Flsdsp   Flashing display
        ;             2    Timed    Display is timed
        ;              3
        ;               4
        ;                5 Flsdcm   Flashing decimal
        ;                6
        ;                 7 Kbddsb  Keyboard disabled
```

```
        ; ************************************
        ; ***   HARDWARE ADDRESS POINTERS   ***
        ; ************************************

7400    X        EQU   7400H  BASE ADDRESS OF RAM
7480    Y   EQU   7480H  BASE ADDRESS OF RAM UPPER HALF
7000    CTLREG   EQU   7000H  8155 CONTROL REGISTER
6800    DATA1    EQU   6800H  SWITCH DATA ADDRESS
02BE    KILCOD   EQU    2BEH  ADDRESS OF KILCODES IN NVM
4800    NVMWRT   EQU   4800H  WRITE ADDRESS FOR NON VOLATILE MEMORY
4400    NVMRED   EQU   4400H  READ ADDRESS FOR NON VOLATILE MEMORY
4000    NVMERS   EQU   4000H  ERASE ADDRESS FOR NON VOLATILE MEMORY
6800    PORT2A   EQU   DATA1
7001    PORTA    EQU   7001H  8155 PORT A ADDRESS
7002    PORTB    EQU   7002H  8155 PORT B ADDRESS
7003    PORTC    EQU   7003H  8155 PORT C ADDRESS
00FE    RETAIN   EQU    0FEH  ADDRESS OF NVM RETENTION LOCATION
8000    TEST     EQU   8000H  ADDRESS OF EXTERNAL TEST SOFTWARE
7004    TIMER    EQU   7004H  8155 TIMER DATA ADDRESS



        ; ******************************
        ; ***   P A R A M E T E R S   ***
        ; ******************************

0002    DBVAL    EQU   2       DEBOUNCE COUNT
0007    DSPVAL   EQU   7.      COUNT FOR 5.5 SEC TIMED DISPLAY
0002    KDSKIP   EQU   2       TIMER INT SKIP COUNT
4C96    KEYINT   EQU   (18.*179.).OR.4000H   VALUE FOR 1.8 MILLI SEC INT RATE
7FA1    MAXINT   EQU   (91.*179.).OR.4000H  MAX TIMER INTERVAL , 9.1 MILLI SEC
0080    MULKEY   EQU   80H    VALUE ASSIGNED TO MULTI KEY DEPRESSION
0002    NDISP    EQU   2      NO. OF DISPLAY PACKS
0008    DSPCHR   EQU   (NDISP*4) MAX NO. OF CHAR DISPLAYABLE
        ;  NON-VOLATILE MEMORY PARAMETERS
0000    SRVSTR    EQU   FIXSED  NIBB OFFSET FOR START OF SERVICE BLOCK IN RAM
0028    NORSTR    EQU   PCEREG  NIBB OFFSET FOR START OF NORMAL BLOCK IN RAM
0028    SRVSIZ    EQU   NORSTR-SRVSTR
0022    NORSIZ    EQU   MRSTS2-NORSTR
        ; ******************************************
        ; ***   VALUE SIZE IN NIBBLES ( DIGITS )   ***
        ; ******************************************

0008    ASCSIZ   EQU   8     ASCENDING REGISTER
0007    DSCSIZ   EQU   7     DESCENDING REGISTER
0004    NBANKS   EQU   4     BANKS FOR POSTAGE PRINTING
0007    PCESIZ   EQU   7     PIECE REGISTER



        ; ***********************************
        ; ***   V A L U E   F O R M A T S   ***
        ; ***********************************

        ;  FORMAT OF DATA  2 DIGITS
        ;     LEFT DIGIT = NO. OF DIGITS
        ;     RIGHT DIGIT = NO. OF DECIMAL PLACES EXCEPT
        ;                   = F HEX  NOT DECIMAL NO ( COUNT )
        ;                   = 0 USE NO. OF DECIMALS INDICATED BY DIEDCM

008F    ACCFMT   EQU   8FH    ACCESS CODE
0080    ASCFMT   EQU   80H    ASCENDING REG
0080    CSMFMT   EQU   80H    CONTROL SUM
005F    DIAFMT   EQU   5FH    DIAGNOSTIC STATUS
0070    DSCFMT   EQU   70H    DESCENDING REG
0040    LOKFMT   EQU   40H    UNLOCK
```

```
007F        MSNFMT  EQU  7FH    METER SERIAL NO
007F        PCEFMT  EQU  7FH    PEICE COUNT
0040        POSFMT  EQU  NBANKS*10H SELECTION
            ; ***********************************
            ; ***   MISSING ENTRY POINT TRAPS   ***
            ; ***********************************

            ; ****************************
            ; ***   FATAL ERROR CODES   ***
            ; ****************************

0002        SFTWRE   EQU   02H   DETECTED INCONSISTANT SET OF ARGUMENTS ON CALL
0008        TRPTIM   EQU   08H   TRIP FAILED TO COMPLETE WITHIN ALLOWED TIME
0009        RSTTRY   EQU   09H   EXCEEDED ALLOWED NO OF UNSUCESSFUL RESET ATTEMPTS
0011        BADSW    EQU   11H   DETECTED ILLOGICAL SWITCH CONDITION
0012        BUFOVR   EQU   12H   INFORMATION WAS OVER WRITTEN IN TRANSMIT BUF
0017        BARF     EQU   17H   UNEXPECTED INTERRUPT
0018        NINCYC   EQU   18H   CYCLE SWITCH FAILED TO INDICATE NOT HOME

            ; *********************
            ; ***   KILL CODES   ***
            ; *********************

            ; CODES 0 - 9 WILL RESULT IN THE METER BEING
            ;                 PERMINITELY INOPERATIVE
            ; CODES A - E WILL RESULT IN CPU BEING HALTED.
            ; CODE F  IS NORMAL OPERATION
0000        BADCRC   EQU    0H   DETECTED BAD CRC
0001        NVMBAD   EQU    1H   ERRASE OR WRITE TO NVM UNSUCESSFUL
0002        NVMRET   EQU    2H   READ BEFORE ERASE FAILED,  IE UNACCEPTABLE RETENTIO
0003        FATRST   EQU    3H   DESCENDING REG CLEARED WHILE FATAL MODE
0004        BADCYC   EQU    4H   UNACCEPTABLE RESPONSE FROM CYCLE SWITCH
            ;        EQU    5H   SPARE
            ;        EQU    6H   SPARE
            ;        EQU    7H   SPARE
            ;        EQU    8H   SPARE
            ;        EQU    9H   SPARE
            ;  WILL RESULT IN CPU HALTING ON POWER UP
000A        BADRAM   EQU   0AH   DETECTED BAD RAM ON POWERUP
            ;        EQU   0BH   SPARE
            ;        EQU   0CH   SPARE
            ;        EQU   0DH   SPARE
            ;        EQU   0EH   SPARE
            ; **************************
            ; ***   MESSAGE HEADERS   ***
            ; **************************

            ; COMMANDS
0041        HENABL  EQU   41H    ENABLE METER
0042        HDISAB  EQU   42H    DISABLE METER
0043        HENDEN  EQU   43H    END OF ENTRY
0046        HSETSV  EQU   46H    SET SERVICE MODE
0047        HCLRSV  EQU   47H    CLEAR SERVICE MODE
004E        HEXTRP  EQU   4EH    EXTERNAL TRIP
0062        HENAKB  EQU   62H    ENABLE KEYBOARD
0063        HDISKB  EQU   63H    DISABLE KEYBOARD

00C0        HSETMN  EQU   0C0H   ENTER METER SERIAL NUMBER
00C1        HSETPO  EQU   0C1H   SET POSTAGE
```

```
00C4         HSETDA  EQU   0C4H   CLEAR CHECK DATE
00C5         HENTAM  EQU   0C5H   ENTER AMOUNT
00C6         HENTCO  EQU   0C6H   ENTER COMBINATION
             ;  SERVICE
             ;  NAME             COMBO    AMT FMT MAX
             ;  UNLOCK VALUE       0          42
             ;  LOW POSTAGE WARN   1          2F
             ;  SETTABLE LIMIT     2          2F

             ;REQUESTS - NORMAL MODE
0040         HREQAC  EQU   40H    ACCESSCODE REQUEST
0050         HREQST  EQU   50H    STATUS REQUEST
0051         HREQPO  EQU   51H    CURRENT SELECTION VALUE
0052         HREQAR  EQU   52H    ASCENDING REGISTER VALUE
0053         HREQDR  EQU   53H    DESCENDING REGISTER VALUE
0054         HREQCS  EQU   54H    CONTROL SUM VALUE
0055         HREQPC  EQU   55H    PEICE COUNT VALUE
005B         HREQCF  EQU   5BH    CONFIGURATION REQUEST
005C         HREQSN  EQU   5CH    SERIAL NUMBER VALUE

             ;REQUESTS - SERVICE MODE

             ;             50H    STATUS REQUEST
             ;             51H    CURRENT SELECTION VALUE
0052         HREQDL  EQU   52H    LOCK VALUE
0053         HREQLP  EQU   53H    LOW POSTAGE WARNING
0054         HREQMN  EQU   54H    METER SERIAL NO.
0055         HREQDS  EQU   55H    DIAGNOSTIC STATUS
0056         HREQSL  EQU   56H    SETTABLE LIMIT
             ;             5CH    SERIAL NUMBER VALUE
0000         EJEC
             ;VALUE HEADERS
0080         HSTAT   EQU   80H    METER STATUS
0081         HPSET   EQU   81H    POSTAGE VALUE
0082         HAREG   EQU   82H    ASCENDING REGISTER
0083         HDREG   EQU   83H    DESCENDING REGISTER
0084         HCSUM   EQU   84H    CONTROL SUM
0085         HPCNT   EQU   85H    PIECE COUNT
008A         HDLOCK  EQU   8AH    UNLOCK VALUE
008B         HLOPOS  EQU   8BH    LOW POSTAGE WARNING
008C         HMTRNO  EQU   8CH    METER SERIAL NUMBER
008D         HDIAGS  EQU   8DH    DIAGNOSTIC STATUS
008E         HHSLIM  EQU   8EH    SETTABLE LIMIT
0090         HACODE  EQU   90H    ACCESS CODE
00AB         HCONFG  EQU   0ABH   METER CONFIGURATION
             ;   INTERRUPT JUMP TABLE TO VECTOR INTERRUPTS TO CORRECT ENTRY POINT
              ORG   0
0000 C3 C5 01 JMP   PWRUP     RST 0  POWER ON RESET
              ORG   8H        RST1
0008 C3 A1 0B JMP   PROERR
              ORG   10H       RST2
0010 C3 A1 0B JMP   PROERR
              ORG   18H       RST3
0018 C3 A1 0B JMP   PROERR
              ORG   20H       RST4
0020 C3 A1 0B JMP   PROERR
              ORG   24H       TRAP  ( WATCH DOG TIMER )
0024 C3 7E 08 JMP   FATINT
              ORG   28H       RST5
0028 C3 A1 0B JMP   PROERR
              ORG   2CH       5.5  ( POWER FAIL )
002C C3 7E 08 JMP   FATINT
              ORG   30H       RST6
0030 C3 A1 0B JMP   PROERR
              ORG   34H       6.5
0034 C3 B6 01 JMP   PWRIN
              ORG   38H       RST7
```

```
0038 C3 A1 0B  JMP   PROERR
               ORG   3CH        7.5  ( TIMER )
003C C3 9D 00  JMP   INT75
                 ORG     40H
              ;CLKDEC/CLKDGT(KDCTRL,BLKMSK,PORTA )
              ;             (BITSTR,BYTE  ,BITSTR)
              ;             ( I    , I    , I/O  )
              ;             ( PSW  , B    , @HL  )
              ;             ( C    , NC   , C    )
              ;
              ;REGISTER A DESTROYED
              ;PSW DESTROYED
              ;
              ;CLOCK DECIMAL/DIGIT BITS FROM PORTA INTO DISPLAYS.
              ;MODIFIES BITS TO CAUSE BLINKING.
              ;
              CLKDEC;               ****ENTRY FROM DSPLY ONLY
0040 EA 46 00   JPE  CLKD01         IF(KDCTRL.FLSDCM .OR. KDCTRL.FLSDSP)
              ;                       .EQ. TRUE
              ;                       MODIFY BITS WITH BLINK CONTROL MASK
              ;                     ENDIF
              ;                     PULSE CLOCK BITS
              ;                     RETURN
              CLKDGT;               ****ENTRY FROM DSPLY ONLY
0043 C2 49 00   JNZ  CLKD02         IF KDCTRL.FLSDSP .EQ. TRUE
              CLKD01;                 MODIFY BITS WITH BLINK CONTROL MASK
0046 7E         MOV  A,M              PORTA = PORTA .OR. BLKMSK
0047 B0         ORA  B
0048 77         MOV  M,A
              CLKD02;               ENDIF
0049 35         DCR  M              PULSE CLOCK BIT
004A 34         INR  M
004B C9         RET                 RETURN
              ;DBOUNC()(KEYBKT,CTLBKT,CHRBKT)(DBCTR)
              ;         (BYTE  ,BYTE  ,BYTE  )(UBYTE)
              ;         ( I    , O    , O    )( I/O )
              ;         ( RAM  , RAM  , RAM  )( RAM )
              ;         ( NC   , C    , C    )( C   )
              ;
              ;REGISTERS DESTROYED
              ;PSW DESTROYED
              ;
              ;DEFINES DEBOUNCED KEYCODES CTLBKT AND CHRBKT FOR USE OF
              ;MAINLINE KEYBOARD ROUTINE.  CHRBKT DIFFERS FROM CTLBKT
              ;IN THAT THE MAINLINE ROUTINE MAY SET CHRBKT = 0.
              ;
              DBOUNC;               ****ENTRY FROM KDIO ONLY
004C 3A 2A 74   LDA  KEYBKT/2+X     A = KEYBKT
              ;                     DECREMENT DBOUNCE COUNTER
004F 21 2E 74   LXI  H,DBCTR/2+X    HL = ADDRESS, DBCTR
0052 35         DCR  M              DBCTR = DBCTR - 1
              ;                     CHECK WHETHER COUNTER WAS STOPPED AT 1
0053 C2 5D 00   JNZ  DBOUN1         IF DBCTR .EQ. 0
              ;                       KEEP COUNTER AT 1
0056 34         INR  M                DBCTR = 1
              ;                       KEYBOARD IS DEBOUNCED
              ;                       DEFINE NEW KEYCODE OUTPUT BUCKETS
0057 32 2C 74   STA  CHRBKT/2+X       CHRBKT = KEYBKT
005A 32 2B 74   STA  CTLBKT/2+X       CTLBKT = KEYBKT
              DBOUN1;               ENDIF
              ;                     CHECK WHETHER KEY IS  PRESSED
005D B7         ORA  A              IF KEYBKT .NE. HEX00
005E C8         RZ
              ;                       SET DEBOUNCE PERIOD
005F 36 02      MVI  M,DBVAL          DBCTR = DBVAL
              ;                     ENDIF
0061 C9         RET                 RETURN
```

```
                  ;DISPLY()(KDCTRL,BLKTMR,PORTA )
                  ;        (BITSTR,BYTE  ,BITSTR)
                  ;        ( I    , I    , I/O  )
                  ;        ( RAM  , RAM  , 7001 )
                  ;        ( NC   , NC   , C    )
                  ;
                  ;REGISTERS DESTROYED
                  ;PSW DESTROYED
                  ;
                  ;DISPLAY ROUTINE
                  ;
                  DISPLY;                  ****ENTRY FROM KDIO ONLY
                  ;                        FETCH DISPLAY CONTROL BYTE
0062 2A 27 74       LHLD KDCTRL/2+X
                  ;                        L = KDCTRL
                  ;                        H = BLKTMR
0065 5D             MOV  E,L               E = KDCTRL
                  ;                        DEFINE DISPLAY BLINK CONTROL MASK
0066 06 01          MVI  B,01H             B = BLKMSK = HEX01, FOR DISPLAY ON
0068 24             INR  H                 IF (BLKTMR+1) .GE. 0
0069 FA 72 00       JM   DISP02
006C 2C             INR  L                   IF KDCTRL.STGDSP .EQ. TRUE
006D F2 72 00       JP   DISP01
0070 06 0F          MVI  B,0FH                 B = BLKMSK = HEX0F, FOR DISPLAY OFF
                  DISP01;                    ENDIF
                  DISP02;                  ENDIF
                  ;                        OUTPUT START BITS FOR DISPLAY LOAD
0072 21 01 70       LXI  H,PORTA           HL = ADDRESS, PORTA
0075 7E             MOV  A,M               PORTA = PORTA.AND.HEXF1, 3 START BITS
0076 E6 F1          ANI  0F1H
0078 77             MOV  M,A
0079 35             DCR  M                 PULSE CLOCK BIT
007A 34             INR  M
                  ;                        SET TO LOAD 4 DIGITS INTO EACH DISPLAY
007B 0E 04          MVI  C,4               C = CHRCNT = 4
                  DISP03;                  DO UNTIL CHRCNT .EQ. 0
                  ;                          DEFINE BIT SELECTION MASK
007D 16 80          MVI  D,80H               D = BITMSK = HEX80
                  DISP04;                    DO UNTIL BITMSK .EQ. HEX01
                  ;                            MOVE DIGIT BITS FROM DIMAGE TO
                  ;                            PORTA
007F CD DE 00       CALL MVDDAT                MVDDAT(CHRCNT,BITMSK,KDCTRL,PORTA,
                  ;                                  ( C    , D    , E    , @HL ,
                  ;                                  ( I    , I    , I    , I/O ,
                  ;
                  ;                                  KDCTRL)
                  ;                                   PSW  )
                  ;                                   O    )
                  ;                            CLOCK OUT DIGIT BITS
0082 CD 43 00       CALL CLKDGT                CLKDGT(KDCTRL,BLKMSK,PORTA )
                  ;                                  ( PSW  , B    , @HL  )
                  ;                                  ( I    , I    , I/O  )
                  ;                            SHIFT BIT SELECTION MASK TO RIGHT
0085 7A             MOV  A,D                   D = BITMSK = BITMSK/2
0086 0F             RRC
0087 57             MOV  D,A
0088 1F             RAR                        TEST BITMSK
0089 D2 7F 00       JNC  DISP04
                  ;                          ENDDO
                  ;                          MOVE DECIMAL BITS FROM DIMAGE TO
                  ;                          PORTA
008C CD DE 00       CALL MVDDAT              MVDDAT(CHRCNT,BITMSK,KDCTRL,PORTA,
                  ;                                ( C    , D    , E    , @HL ,
                  ;                                ( I    , I    , I    , I/O ,
                  ;
                  ;                                KDCTRL)
                  ;                                 PSW  )
```

```
                  ;                        0     )
                  ;                     CLOCK OUT DECIMAL BITS
0O8F CD 40 00      CALL CLKDEC          CLKDEC(KDCTRL,BLKMSK,PORTA)
                  ;                        ( PSW  , B    , @HL )
                  ;                        ( I    , I    , I/O )
0092 0D            DCR  C               C = CHRCNT = CHRCNT-1
0093 C2 7D 00      JNZ DISP03
                  ;                    ENDDO
0096 35            DCR  M              3 CLOCK CYCLES TO FINISH LOAD
0097 34            INR  M
0098 35            DCR  M
0099 34            INR  M
009A 35            DCR  M
009B 34            INR  M
009C C9            RET                 RETURN
                  ;INT75
                  ;
                  ;SERVICE INTERRUPT 7.5
                  ;
                  INT75;              ****INTERRUPT ENTRY 7.5
009D E5            PUSH H             SAVE HL
009E 21 7C 01      LXI  H,TIMINT      HL = ADRESS = ADDRESS, TIMINT
00A1 CD 25 10      CALL VCALLS        VCALLS(ADRESS)
                  ;                        ( HL    )
                  ;                        ( I     )
00A4 E1            POP  H             RESTORE HL
00A5 FB            EI                 ENABLE INTERRUPTS
00A6 C9            RET                RETURN
                  ;KDIO()(KDCTRL,PORTBI,PORTB ,BLKTMR,DSPTMR,KEYBKT)
                  ;      (BITSTR,BITSTR,BITSTR,BYTE  ,UBYTE ,BITSTR)
                  ;      ( I    , I    , I/O  , I/O  , I/O  , O     )
                  ;      ( RAM  , RAM  , 7002 , RAM  , RAM  , RAM   )
                  ;      ( NC   , NC   , C    , C    , C    , C     )
                  ;
                  ;REGISTERS DESTROYED
                  ;PSW DESTROYED
                  ;
                  ;KEYBOARD/DISPLAY I/O ROUTINE MAKES REAL TIME ASPECTS OF
                  ;KEYBOARD/DISPLAY PROCESSING INVISIBLE TO APPLICATION
                  ;LEVEL ROUTINES.
                  ;
                  KDIO;                 ****ENTRY FROM TIMINT ONLY
                  ;                     INCREMENT CONTINUOUS RUN BLINK TIMER
00A7 21 28 74      LXI  H,BLKTMR/2+X    HL = ADDRESS, BLKTMR
00AA 34            INR  M               BLKTMR = BLKTMR+1
00AB 5E            MOV  E,M             E = BLKTMR
00AC C2 B7 00      JNZ  KDIO02          IF BLKTMR .EQ. 0
                  ;                       DECREMENT TIMED DISPLAY TIMER. 1=STOP
00AF 21 29 74      LXI  H,DSPTMR/2+X      HL = ADDRESS, DSPTMR
00B2 35            DCR  M                 DSPTMR = DSPTMR-1
00B3 C2 B7 00      JNZ  KDIO01            IF DSPTMR .EQ. 0
00B6 34            INR  M                   DSPTMR = 1
                  KDIO01;                 ENDIF
                  KDIO02;               ENDIF
                  ;                     TOGGLE MOTOR FOR HALF POWER HOLD
00B7 3A 37 74      LDA  PORTBI/2+X      A = PORTBI
00BA 21 02 70      LXI  H,PORTB         HL = ADDRESS, PORTB
00BD AE            XRA  M               PORTB = PORTB .XOR. PORTBI
00BE 77            MOV  M,A
                  ;                     DEFINE PROGRAM CONTROL COUNTER
00BF 7B            MOV  A,E             E = IOCTR = BLKTMR .AND. HEX07
00C0 E6 07         ANI  07H
00C2 5F            MOV  E,A
                  ;                     CASE (IOCTR)
00C3 FE 05         CPI  5
00C5 D2 D0 00      JNC  KDIO03
                  ;                       **0,1,2,3,4: READ KEYROWS
```

```
00C8 3A 27 74   LDA  KDCTRL/2+X         IF KDCTRL.KBDDSB .EQ. FALSE
00CB 1F         RAR
              ;                          KEYBOARD IS NOT DISABLED
00CC D2 0A 01   JNC  RDROW               RDROW(IOCTR)
              ;                                ( E   )
              ;                                ( I   )
              ;                         ENDIF
00CF C9         RET
              KDI003;
00D0 C0         RNZ                  **5: START KEYBOARD/DISPLAY OUTPUT
00D1 CD 4C 00   CALL DBOUNC             DEBOUNCE KEYBOARD
              ;                         INITIALIZE FOR NEXT KEYBOARD SCAN
00D4 AF         XRA  A                  KEYBKT = 0
00D5 32 2A 74   STA  KEYBKT/2+X
00D8 CD F6 0E   CALL DFLUSH             FLUSH NOISE FROM DISPLAY SHIFT REG
00DB C3 62 00   JMP  DISPLY             OUTPUT TO DISPLAY
              ;                      **ELSE:
              ;                         COMPLETE PROCESSING INITIATED
              ;                         IN CASE **5:. THIS INTERRUPT LEVEL
              ;                         ROUTINE IS ITSELF INTERRUPTED.
              ;                      ENDCASE
              ;                      RETURN
              ;MVDDAT(CHRCNT,BITMSK,KDCTRL,PORTA ,KDCTRL)(DIMAGE)
              ;      (BYTE  ,BYTE  ,BITSTR,BITSTR,BITSTR)(BYTSTR)
              ;      ( I    , I    , I    , I/O  , O    )( I    )
              ;      ( C    , D    , E    , @HL  , PSW  )( RAM  )
              ;      ( NC   , NC   , NC   , C    , C    )( NC   )
              ;
              ;REGISTER A DESTROYED
              ;PSW DESTROYED
              ;
              ;FETCH SELECTED BITS FROM DIMAGE, INVERT THEM,
              ;AND MOVE THEM TO PORTA.
              ;COPY KDCTRL INTO PSW FOR LATER USE
              ;
              MVDDAT;                ****ENTRY FROM DSPLY ONLY
00DE C5         PUSH B               SAVE REGISTERS
00DF E5         PUSH H
              ;                      SET DATA AND CLOCK BITS
00E0 7E         MOV  A,M             PORTA = PORTA .OR. HEXOF
00E1 F6 0F      ORI  0FH
00E3 77         MOV  M,A
              ;                      DEFINE INVERTED OUTPUT BIT FOR PORTA
00E4 06 FD      MVI  B,0FDH          B = OUTBIT = HEXFD
              ;                      CALCULATE INDEX
00E6 3E 04      MVI  A,4             A = INDEX = 4-CHRCNT
00E8 91         SUB  C
              ;                      SET TO MOVE 1 BIT INTO EACH DISPLAY
00E9 0E 02      MVI  C,NDISP         C = BITCTR = NDISP
              ;                      HL = ADDRESS,
              ;                      DIMAGE[INDEX+(NDISP-BITCTR)*4]
00EB 21 80 74   LXI  H,DIMAGE/2+Y
00EE 85         ADD  L
00EF 6F         MOV  L,A
              MVDD01;                DO UNTIL BITCTR .EQ. 0
00F0 7E         MOV  A,M               IF(DIMAGE[INDEX+(NDISP-BITCTR)*4]
              ;                          .AND. BITMSK) .NE. 0
00F1 A2         ANA  D
00F2 CA FA 00   JZ   MVDD02
              ;                          PUT OUTBIT INTO PORTA
00F5 E3         XTHL                     HL = ADDRESS, PORTA
00F6 7E         MOV  A,M                 PORTA = PORTA .AND. OUTBIT
00F7 A0         ANA  B
00F8 77         MOV  M,A
00F9 E3         XTHL                     HL = ADDRESS,
              ;                          DIMAGE[INDEX+(NDISP-BITCTR)*4]
              MVDD02;                  ENDIF
```

```
                ;               SHIFT OUTBIT TO LEFT
0OFA 78          MOV  A,B        B = OUTBIT = OUTBIT*2+1
0OFB 07          RLC
0OFC 47          MOV  B,A
0OFD 0D          DCR  C          C = BITCTR = BITCTR-1
                ;               HL = ADDRESS,
                ;               DIMAGE[INDEX+(NDISP-BITCTR)*4]
0OFE 23          INX  H
0OFF 23          INX  H
0100 23          INX  H
0101 23          INX  H
0102 C2 F0 00    JNZ  MVDD01     TEST BITCTR
                ;              ENDDO
0105 E1          POP  H        RESTORE REGISTERS
0106 C1          POP  B
                ;              SET PSW FOR CALL TO CLKDEC/CLKDAT
0107 D5          PUSH D        PSW = KDCTRL
0108 F1          POP  PSW
0109 C9          RET           RETURN
                ;RDROW(IOCTR )(PORTA ,PORTC ,KEYBKT)
                ;     ( MOD8 )(BITSTR,BITSTR,NIBSTR)
                ;     ( I    )( I/O  , I    , I/O  )
                ;     ( E    )( 7001 , 7002 , RAM  )
                ;     ( C    )( C    , NC   , C    )
                ;
                ;REGISTERS DESTROYED
                ;STATUS DESTROYED
                ;
                ;READS THE KEYROWS DESIGNATED BY IOCTR.  CONSOLIDATES
                ;DATA AS THE SCAN OF 5 KEYROWS PROGRESSES.  OUTPUTS
                ;CODES TO KEYBKT INDICATING WHICH KEY, OR WHETHER NO
                ;SINGLE KEY IS DOWN.
                ;
                RDROW;         ****ENTRY FROM KDIO ONLY
                ;              FORM STROBE MASK
010A 7B          MOV  A,E      B = STRMSK = (2*IOCTR) .XOR. HEXFF
010B 07          RLC
010C 2F          CMA
010D 47          MOV  B,A
                ;              FORM ROW CODE
010E 2F          CMA           C = ROWCOD = IOCTR*HEX10
010F 07          RLC
0110 07          RLC
0111 07          RLC
0112 4F          MOV  C,A
                ;              STROBE KEYROW
0113 21 01 70    LXI  H,PORTA  HL = ADDRESS, PORTA
0116 7E          MOV  A,M      PORTA =
                ;              PORTA .OR. HEXOF .AND. STRMSK
0117 F6 OF       ORI  OFH
0119 A0          ANA  B
011A 77          MOV  M,A
                ;              READ POSITIVE LOGIC IMAGE OF KEYROW
011B 3A 03 70    LDA  PORTC    A = COLCOD = PORTC .AND. HEXOF
011E E6 OF       ANI  OFH
0120 C8          RZ            IF COLCOD .NE. 0
                ;                A KEY IN CURRENT ROW IS DOWN
0121 21 2A 74    LXI  H,KEYBKT/2+X  HL = ADDRESS, KEYBKT
0124 34          INR  M          PSW:Z = NOPREV = KEYBKT .EQ. 0
0125 35          DCR  M
                ;                ASSUME MULTIPLE KEYS DOWN
0126 36 80       MVI  M,MULKEY   KEYBKT = MULKEY
0128 C0          RNZ             IF NOPREV .EQ. TRUE
                ;                  NO KEY SEEN IN PREVIOUS ROW
0129 FE 09       CPI  9            IF COLCOD .LT. 9
012B D0          RNC
                ;                    COL CODE VALUES 1 THRU 8 REMAIN
```

```
0120 B7          ORA  A                     PSW:P = PARITY, COLCOD
012D E8          RPE                        IF PARITY .EQ. ODD
                ;                             COL CODES 1,2,4,7,8 REMAIN
012E FE 07       CPI  7                       IF COLCOD .NE. 7
0130 C8          RZ
                ;                               A SINGLE KEY IN ROW IS DOWN
0131 B1          ORA  C                         KEYBKT = ROWCOD .OR. COLCOD
0132 77          MOV  M,A
                ;                             ENDIF
                ;                           ENDIF
                ;                         ENDIF
                ;                       ENDIF
                ;                     ENDIF
0133 C9          RET                  RETURN
                ;STPTMR(WASOFF)(PORTBI,PORTB ,SKPCNT,CTLREG)
                ;      (BIT   )(BITSTR,BITSTR,UBYTE ,TIMCTL)
                ;      ( O    )( I    , O    , O    , O    )
                ;      (PSW:Z )(RAM   ,7002  ,RAM   ,7000  )
                ;      ( C    )( NC   , C    , C    , C    )
                ;
                ;PSW:CY = NO CHANGE
                ;PSW:S, Z, P CHANGED; CORRESPOND TO SKPCNT AT ENTRY
                ;
                ;STOP INTERRUPT TIMER
                ;
                STPTMR;              ****ENTRY POINT
0134 E5          PUSH H              SAVE HL
                ;                    INDICATE TIMER STATUS AT ENTRY
0135 2A 30 74    LHLD SKPCNT/2+X     L = SKPCNT
0138 2C          INR  L              PSW:Z = WASOFF = SKPCNT .EQ. 0
0139 2D          DCR  L
013A E1          POP  H              RESTORE HL
013B F5          PUSH PSW            SAVE A, PSW:CY, WASOFF
                ;                    CHECK FOR RUNNING TIMER
013C CA 51 01    JZ   STPTM1         IF WASOFF .EQ. FALSE
013F 3E 43       MVI  A,43H            STOP TIMER
0141 32 00 70    STA  CTLREG
                ;                      DISABLE TIMER INTERRUPT
0144 3E 0D       MVI  A,0DH            A = HEX0D
0146 30          SIM
                ;                      INDICATE THAT TIMER IS STOPPED
0147 AF          XRA  A                SKPCNT = 0
0148 32 30 74    STA  SKPCNT/2+X
                ;                      HOLD DIGIT MOTOR IN POSITION
014B 3A 37 74    LDA  PORTBI/2+X       PORTB = PORTBI
014E 32 02 70    STA  PORTB
                STPTM1;              ENDIF
0151 F1          POP  PSW            RESTORE A, PSW:CY
                ;                    PSW:Z = WASOFF
0152 C9          RET                 RETURN
                ;STRTMR(ISADR,SKIPCT,PERIOD,WASOFF)(TIMER ,SKPCNT,SKPVAL,
                ;      (ADDR ,UBYTE ,TMODCT,BIT   )(TMODCT,UBYTE ,UBYTE ,
                ;      ( I   , I    , I    , O    )( O    , O    , O    ,
                ;      ( HL  , A    , DE   , PSW:Z)(7004  , RAM  , RAM  ,
                ;      ( NC  , NC   , NC   , C    )( C    , C    , C    ,
                ;
                ;      TIMVEC,CTLREG,PORTB ,PORTBI)
                ;      ADDR  ,TIMCTL,BYTE  ,BYTE  )
                ;       O    , O    , I    , O    )
                ;      RAM   ,7000  ,7002  , RAM  )
                ;       C    , C    , NC   , C    )
                ;
                ;PSW:CY = NO CHANGE
                ;PSW:S, Z, P CHANGED; CORRESPOND TO SKPCNT AT ENTRY
                ;
                ;STARTS TIMER INTERRUPTS AFTER DEFINING INFORMATION NEEDED
                ;BY TIMINT.  ISADR IS ADDRESS OF INTERRUPT SERVICE RTN
```

```
                 ;WHICH WILL BE ENTERED EVERY SKIPCT(TH) OCCURRENCE OF
                 ;INTERRUPT.
                 ;PERIOD WILL CONTAIN THE PARAMETER VALUE KEYINT.
                 ;
                 STRTMR;               ****ENTRY POINT
0153 E5            PUSH H              SAVE HL
                 ;                     INDICATE TIMER STATUS AT ENTRY
0154 2A 30 74      LHLD SKPCNT/2+X     L = SKPCNT
0157 2C            INR  L              PSW:Z = WASOFF = SKPCNT .EQ. 0
0158 2D            DCR  L
0159 E1            POP  H              RESTORE HL
015A F5            PUSH PSW            SAVE A, PSW:CY, WASOFF
                 ;                     CHECK FOR STOPPED TIMER
015B C2 7A 01      JNZ  STRTM1         IF WASOFF .EQ. TRUE
                 ;                       SET TIMER MODE AND COUNT
015E EB            XCHG                  HL = PERIOD
                 ;                       DE = ISADR
015F 22 04 70      SHLD TIMER            TIMER = PERIOD
0162 EB            XCHG                  HL = ISADR
                 ;                       DE = PERIOD
                 ;                       INITIALIZE SKIP COUNTER
0163 32 30 74      STA  SKPCNT/2+X       SKPCNT = SKIPCT
                 ;                       SET REINITIALIZATION VALUE
0166 32 2F 74      STA  SKPVAL/2+X       SKPVAL = SKIPCT
                 ;                       SET INTERRUPT SERVICE ROUTINE ADDR
0169 22 31 74      SHLD TIMVEC/2+X       TIMVEC = ISADR
016C 3E 19         MVI  A,19H            RESET AND ENABLE TIMER INTERRUPT
016E 30            SIM
016F 3E C3         MVI  A,0C3H           START TIMER
0171 32 00 70      STA  CTLREG
                 ;                       UPDATE IMAGE OF PORTB
0174 3A 02 70      LDA  PORTB            PORTBI = PORTB
0177 32 37 74      STA  PORTBI/2+X
                 STRTM1;               ENDIF
017A F1            POP  PSW            RESTORE A, PSW:CY
                 ;                     PSW:Z = WASOFF
017B C9            RET                 RETURN
                 ;TIMINT()(SKPCNT,SKPVAL,TIMVEC)
                 ;        (UBYTE ,UBYTE ,ADDR  )
                 ;        ( I/O  , I    , I    )
                 ;        ( RAM  , RAM  , RAM  )
                 ;        ( C    , NC   , NC   )
                 ;
                 ;PSW:S, Z, P, CY CHANGED
                 ;
                 ;DETERMINE WHETHER IT IS TIME TO TRANSFER CONTROL
                 ;TO CURRENTLY ACTIVE INTERRUPT SERVICE ROUTINE.
                 ;
                 TIMINT;               ****ENTRY FROM INT75 ONLY
017C CD C7 0B      CALL RECEVE         TRY TO RECEIVE MESSAGE
                 ;                     DECREMENT SKIP COUNTER
017F 21 30 74      LXI  H,SKPCNT/2+X HL = ADDRESS, SKPCNT
0182 35            DCR  M              SKPCNT = SKPCNT-1
                 ;                     CHECK FOR COMPLETED COUNTDOWN
0183 C0            RNZ                 IF SKPCNT .EQ. 0
                 ;                       REINITIALIZE SKIP COUNTER
0184 3A 2F 74      LDA  SKPVAL/2+X       A = SKPVAL
0187 77            MOV  M,A              SKPCNT = SKPVAL
0188 FB            EI                    ENABLE INTERRUPT
                 ;                       PERFORM CURRENT INTRPT SERVICE RTN
0189 2A 31 74      LHLD TIMVEC/2+X       HL = ADRESS = TIMVEC
018C E9            PCHL
                 ;                     ENDIF
                 ;                     RETURN
                 ;PWRABN
                 ;
                 ;A,PSW DESTROYED
```

```
                   ;REGISTERS DESTROYED
                   ;
                   ;ABNORMAL POWER-UP OF METER WHICH POWERED DOWN DURING
                   ;SETTING OR TRIP CYCLE
                   ;
                   PWRABN;                  ****ENTRY POINT
0180 3A 24 74        LDA  MRSTS1/2+X        IF MRSTS1.QUEREG .EQ. TRUE
0190 1F              RAR
0191 D2 AA 01        JNC  PWRAB2
                   ;                          POWERED DOWN DURING TRIP
0194 1F              RAR                      IF MRSTS1.INCYC .EQ. FALSE
0195 DA A7 01        JC   PWRAB1
                   ;                            ACCOUNTING NOT COMPLETED
0198 CD 71 18        CALL SEKTRP                PREPARE TO TRIP
019B F3              DI                         DISABLE INTERRUPTS
019C CD 44 07        CALL DOACCT                DO ACCOUNTING
                   ;                            INDICATE ACCOUNTING COMPLETE
019F 21 24 74        LXI  H,MRSTS1/2+X          HL = ADDRESS, MRSTS1
01A2 7E              MOV  A,M                   MRSTS1.INCYC = TRUE
01A3 F6 02           ORI  2
01A5 77              MOV  M,A
01A6 FB              EI                         ENABLE INTERRUPTS
                   PWRAB1;                    ENDIF
01A7 C3 A0 08        JMP  FINTRP              COMPLETE TRIP CYCLE
                   PWRAB2;                  ENDIF
                   ;                        TRIP CYCLE COMPLETE
                   ;                        PREPARE TO ZERO SET METER
01AA CD 4E 0F        CALL LSTATE            LSTATE(FATMOD,NORMOD,SERMOD,PRVMOD)
                   ;                              (PSW:S ,PSW:Z ,PSW:P ,PSW:CY)
                   ;                              ( 0    , 0    , 0    , 0     )
01AD F8              RM                     IF FATMOD .NE. TRUE
                   ;                          METER IS HOME AND NOT DEAD
                   ;                          DRIVE METER TO ZERO SETTING
01AE CD 25 16        CALL SEKPOS              SEKPOS(ERROR)
                   ;                                 ( A    )
                   ;                                 ( 0    )
01B1 B7              ORA  A                   IF ERROR .NE. 0
                   ;                            DECLARE FATAL ERROR
01B2 C2 80 08        JNZ  FATERR                FATERR(ERROR,ERRFLG)
                   ;                                   ( A    ,PSW:Z )
                   ;                                   ( I    , 0    )
                   ;                          ENDIF
                   ;                        ENDIF
01B5 C9              RET                    RETURN
                   ;PWRDN/PWRUP
                   ;
                   ;A,PSW DESTROYED
                   ;REGISTERS DESTROYED
                   ;
                   ;ENFORCE ORDERLY POWER-UP AND POWER-DOWN
                   ;
                   PWRDN;                   ****ENTRY POINT
01B6 F3              DI                     DISABLE INTERRUPTS
                   ;                        TURN OFF DEVICES ON PORTA AND PORTB
01B7 AF              XRA  A                 PORTB = HEX00
01B8 32 02 70        STA  PORTB
01BB 3D              DCR  A                 PORTA = HEXFF
01BC 32 01 70        STA  PORTA
01BF CD DE 0E        CALL DBLANK            CLEAR DISPLAY
                   ;                        WRITE AND CLOSE ANY OPEN BLOCK
01C2 CD 9E 12        CALL NVMWR             NVMWR(ERRFLG)
                   ;                              (PSW:Z )
                   ;                              ( 0    )
                   PWRUP;                   ****ENTRY POINT
                   PWRU01;                  DO UNTIL INT6.5 .EQ. 0
01C5 20              RIM
01C6 07              RLC
```

```
01C7 07          RLC
01C8 07          RLC                PSW:CY = INT6.5
                ;                   A.0  = INT5.5
01C9 DA C5 01    JC    PWRU01
                ;                 ENDDO
                ;                 POWER IS NOW FULLY ON
01CC B7          ORA   A          PSW:S = INT5.5
                ;                 IF INT5.5 .EQ. TRUE
01CD FA 00 80    JM    TEST         GO TO SPECIAL SERVICE ROUTINE
                ;                 ENDIF
                ; >>OMITTED<<     PULSE DEAD STICK TIMER
                ;                 INITIALIZE STACK POINTER
01D0 31 00 75    LXI   SP,7500H   SP = HEX7500
                ;                 INITIALIZE 8155 TIMER AND PORTS
01D3 3E 43       MVI   A,043H     CTLREG = HEX43
01D5 32 00 70    STA   CTLREG
                ;                 TIMER SET FOR REPETITIVE SQUARE WAVE
                ;                 PORTA = PORTB = 0; OUTPUT MODE SET
                ;                 PORTC; INPUT MODE SET
01D8 3E FF       MVI   A,0FFH     PORTA = HEXFF
01DA 32 01 70    STA   PORTA
                                  TEST AND CLEAR ALL OF RAM
                ;                 FILL 256 BYTES OF RAM WITH HEXAA
01DD 06 AA       MVI   B,0AAH     B = HEXAA
01DF 21 00 74    LXI   H,X        HL = ADDRESS, X(I=0)
               PWRU02;            DO UNTIL (ADDR,X(I)) .EQ. (ADDR,X(0))
01E2 70          MOV   M,B          X(I) = HEXAA
01E3 2C          INR   L            HL = ADDRESS, X(I=I+1)
01E4 C2 E2 01    JNZ   PWRU02
                ;                 ENDDO
                ;                 XOR 256 BYTES OF RAM WITH HEX55
01E7 06 55       MVI   B,55H      B = HEX55
               PWRU03;            DO UNTIL (ADDR,X(I)) .EQ. (ADDR,X(0))
01E9 7E          MOV   A,M          X(I) = X(I) .XOR. HEX55
01EA A8          XRA   B
01EB 77          MOV   M,A
01EC 2C          INR   L            HL = ADDRESS, X(I=I+1)
01ED C2 E9 01    JNZ   PWRU03
                ;                 ENDDO
01F0 3E 0A       MVI   A,BADRAM   A = BADRAM
                ;                 INCREMENT AND TEST 256 BYTES OF RAM
               PWRU04;            DO UNTIL (ADDR,X(I)) .EQ. (ADDR,X(0))
01F2 34          INR   M            X(I) = X(I)+1
01F3 CA FC 01    JZ    PWRU05       IF X(I) .NE. 0
                ;                     DECLARE DEAD METER. BAD RAM
01F6 CD 85 10    CALL  NVMDED         NVMDED(BADRAM,ERRFLG)
                ;                            ( A    ,PSW:Z )
                ;                            ( I    , 0    )
01F9 C3 00 02    JMP   PWRU06         BREAK
               PWRU05;              ENDIF
01FC 2C          INR   L            HL = ADDRESS, X(I=I+1)
01FD C2 F2 01    JNZ   PWRU04
               PWRU06;            ENDDO
                ;                 READ SPECIAL NVM LOCATION
0200 3A BE 46    LDA   NVMRED+KILCOD A = NVMRED[KILCOD]
0203 3C          INR   A          IF (A .GE. 10).AND.(A .LT. 15) = TRUE
0204 E6 0F       ANI   0FH
0206 FE 0B       CPI   11
0208 DA 0C 02    JC    PWRU07
                ;                   METER IS OUT OF SERVICE
020B 76          HLT                HALT
               PWRU07;            ENDIF
020C CD 6D 15    CALL  INITSM     INITIALIZE STEPPER MOTORS
                ;                 FILL NVM DATA AREA WITH HEXFF
020F 01 00 48    LXI   B,((MTRCHR+1)-(FIXSED+0)+1)*100H+(FIXSED+0)
                ;                 B = NIBCNT; NVM DATA AREA
                ;                 C = OFFSET, FIXSED[0]
```

```
0212 3E FF       MVI  A,0FFH        A = HEXFF
0214 CD 24 0F    CALL FILNIB        FILNIB(FIXSED[0],HEXFF,NIBCNT)
                ;                          ( @C       , A    , B     )
                ;                          ( 0        , I    , I     )
                ;                   CLEAR DISPLAY IMAGE
0217 AF          XRA  A             A = HEX00
0218 CD 22 03    CALL FILDIM        FILDIM(HEX00)
                ;                          ( A   )
                ;                          ( I   )
                ;                   ENABLE INTERRUPT 6.5
021B 3E 0D       MVI  A,0DH         INTMSK = HEX0D
021D 30          SIM
021E CD 6B 11    CALL NVMLOD        LOAD AND CHECK NON VOLATILE MEMORY
                ;                   CHECK METER STATUS
0221 CD 4E 0F    CALL LSTATE        LSTATE(FATMOD,NORMOD,SERMOD,PRVMOD)
                ;                          (PSW:S ,PSW:Z ,PSW:P ,PSW:CY)
                ;                          ( 0    , 0    , 0    , 0    )
0224 FA 45 02    JM   PWRU09        IF FATMOD .EQ. FALSE
                ;                     NVM LOADED OK
                ;                     DEFINE DECIMAL POSITIONS ON DIE
0227 3A 23 74    LDA  MTRCHR/2+X      A = MTRCHR
022A E6 03       ANI  3               DIEDCM = MTRCHR .AND. HEX03
022C 32 35 74    STA  DIEDCM/2+X
                ;                     DEFINE DEFAULT DECIMAL POSITION
022F E6 02       ANI  2               DEFDCM = DIEDCM .AND. HEX02
0231 32 36 74    STA  DEFDCM/2+X
                ;                     CHECK NVM STATUS
0234 21 45 02    LXI  H,PWRU08        SET TO RETURN TO ENDIF
0237 E5          PUSH H
0238 3A BE 46    LDA  NVMRED+KILCOD   A = CODE = NVMRED[KILCOD]
023B E6 0F       ANI  0FH
023D FE 0F       CPI  0FH             IF NVMRED[KILCOD] .EQ. HEX0F
023F CA 9B 02    JZ   PWRUOK            CONTINUE NORMAL INITIALIZATION
                ;                     ELSE
                ;                       CONTINUE FATAL INITIALIZATION
0242 C2 83 02    JNZ  PWRUNG            PWRUNG(CODE)
                ;                              ( A  )
                ;                              ( I  )
                PWRU08;               ENDIF
                PWRU09;             ENDIF
                ;                   RECHECK METER STATUS
0245 CD 4E 0F    CALL LSTATE        LSTATE(FATMOD,NORMOD,SERMOD,PRVMOD)
                ;                          (PSW:S ,PSW:Z ,PSW:P ,PSW:CY)
                ;                          ( 0    , 0    , 0    , 0    )
0248 F2 50 02    JP   PWRU10        IF FATMOD .EQ. TRUE
                ;                     TURN ON SENSOR LEDS FOR SERVICE CHECK
024B 3E DF       MVI  A,0DFH          PORTA = HEXDF
024D 32 01 70    STA  PORTA
                PWRU10;             ENDIF
                ;                   INITIALIZE DEBOUNCE COUNTER
0250 3E 01       MVI  A,1           DBCTR = 1
0252 32 2E 74    STA DBCTR/2+X
0255 C3 7E 09    JMP  IDLE          ENTER IDLE STATE
                ;PWRNOR
                ;
                ;A,PSW DESTROYED
                ;REGISTERS DESTROYED
                ;
                ;CONTINUE POWER-UP FOR NORMAL SITUATION THAT POWER-DOWN
                ;OCCURRED WHEN METER WAS HOME
                ;
                PWRNOR;             ****ENTRY POINT
                ;                   SET METER TO ALL NINES
0258 21 24 74    LXI  H,MRSTS1/2+X  HL = ADDRESS, MRSTS1
025B 7E          MOV  A,M           MRSTS1.UNKSEL = TRUE
025C F6 80       ORI  80H
025E 77          MOV  M,A
```

```
025F 01 CC 04   LXI  B,NBANKS*100H+(WORK1+16-NBANKS)
              ;                    B = NIBCNT = NBANKS
              ;                    C = OFFSET, WORK1[I=16-NBANKS]
0262 3E 09      MVI  A,9           A = HEX09
0264 CD 24 0F   CALL FILNIB        FILNIB(WORK1[I],HEX09,NIBCNT)
              ;                          ( @C     , A   , B    )
              ;                          ( O      , I   , I    )
0267 CD 25 1A   CALL MVPOST        MVPOST(ERROR)
              ;                          ( A    )
              ;                          ( O    )
026A B7         ORA  A             IF ERROR .NE. 0
              ;                      SETTING ERROR IS FATAL
026B C2 80 08   JNZ  FATERR          FATERR(ERROR,ERRFLG)
              ;                            ( A    ,PSW:Z )
              ;                            ( I    , O    )
              ;                    ELSE
              ;                      UPDATE BUFFER TO AGREE WITH SETTING
026E 01 42 04   LXI  B,NBANKS*100H+POSREG
              ;                      B = NIBCNT = NBANKS
              ;                      C = OFFSET, POSREG
0271 3E 09      MVI  A,9             A = HEX09
0273 CD 24 0F   CALL FILNIB          FILNIB(POSREG,HEX09,NIBCNT)
              ;                            ( @C   , A   , B    )
              ;                            ( O    , I   , I    )
              ;                      SET METER TO ALL ZEROES
0276 3E C0      MVI  A,WORK1         A = OFFSET, WORK1
0278 CD 85 0E   CALL CLRBLK          CLRBLK(WORK1)
              ;                            ( @A  )
              ;                            ( O   )
027B CD 25 1A   CALL MVPOST          MVPOST(ERROR)
              ;                            ( A   )
              ;                            ( O   )
027E B7         ORA  A               IF ERROR .NE. 0
              ;                        SETTING ERROR IS FATAL
027F C2 80 08   JNZ  FATERR            FATERR(ERROR,ERRFLG)
              ;                              ( A    ,PSW:Z )
              ;                              ( I    , O    )
              ;                      ENDIF
              ;                    ENDIF
0282 C9         RET                RETURN
              ;PWRUNG(CODE  )
              ;      (NIBBLE)
              ;      ( I    )
              ;      ( A    )
              ;      ( C    )
              ;
              ;A,PSW DESTROYED
              ;REGISTERS CHANGED
              ;
              ;HANDLE POWER-UP OF METER PREVIOUSLY DECLARED DEAD
              ;
              PWRUNG;              ****ENTRY POINT
0283 F5         PUSH PSW           SAVE A,PSW
              ;                    DECLARE FATAL ERROR
              ;                    FLAG METER DEAD
0284 47         MOV  B,A           B = CODE
0285 CD 99 10   CALL NVMDE1        NVMDE1(CODE,ERRFLG)
              ;                          ( B  ,PSW:Z )
              ;                          ( I  , O    )
0288 F1         POP  PSW           RESTORE A,PSW
0289 FE 03      CPI  FATRST        IF CODE .EQ. FATRST
028B C0         RNZ
              ;                      FAILED WHILE CLEARING DESC REGISTER
              ;                      CLEAR DESCENDING REGISTER
028C 01 2F 07   LXI  B,DSCSIZ*100H+DSCREG
              ;                      B = NIBCNT = DSCSIZ
              ;                      C = OFFSET, DSCREG
```

```
028F AF          XRA  A              A = HEX00
0290 CD 24 0F    CALL FILNIB         FILNIB(DSCREG,HEX00,NIBCNT)
                ;                          ( @C   , A   , B    )
                ;                          ( O    , I   , I    )
                ;                    UPDATE CRC
0293 CD B1 0E    CALL CRC            CRC(DSCREG,NIBCNT,CRCVAL)
                ;                      ( @C    , B    , D    )
                ;                      ( I     , I    , O    )
0296 7A          MOV  A,D            DSCCRC = CRCVAL
0297 32 1B 74    STA  DSCCRC/2+X
                ;                   ENDIF
029A C9          RET                RETURN
                ;PWRUOK
                ;
                ;A,PSW DESTROYED
                ;REGISTERS DESTROYED
                ;
                ;CONTINUATION OF SUCCESSFUL POWER-UP SEQUENCE
                ;
                PWRUOK;             ***ENTRY POINT
                ;                   OPEN NORMAL NVM BLOCK
029B CD C4 11    CALL NVMOPN        NVMOPN(ERRFLG)
                ;                          (PSW:Z )
                ;                          ( O    )
029E C8          RZ                 IF ERRFLG .EQ. FALSE
                ;                     NVM BLOCK IS NOW OPEN
029F 21 AD 02    LXI  H,PWRU01        SET TO RETURN TO ENDIF
02A2 E5          PUSH H
02A3 3A 24 74    LDA  MRSTS1/2+X      IF MRSTS1.UNKSEL .EQ. TRUE
02A6 B7          ORA  A
                ;                       POWERED DOWN DURING SETTING OR TRIP
02A7 FA 8D 01    JM   PWRABN            PERFORM ABNORMAL POWER-UP
                ;                     ELSE
02AA F2 58 02    JP   PWRNOR            PERFORM NORMAL POWER-UP
                PWRU01;               ENDIF
                ;                     CHECK METER STATUS
02AD CD 4E 0F    CALL LSTATE          LSTATE(FATMOD,NORMOD,SERMOD,PRVMOD)
                ;                            (PSW:S ,PSW:Z ,PSW:P ,PSW:CY)
                ;                            ( O    , O    , O    , O    )
02B0 FA C1 02    JM   PWRU02          IF FATMOD .EQ. FALSE
                ;                       POWER-UP COMPLETED
                ;                       CONTINUE WITH INITIALIZATION
                ;                       CLEAR POSTAGE REGISTER
02B3 01 42 04    LXI  B,NBANKS*100H+POSREG
                ;                       B = NIBCNT = NBANKS
                ;                       C = OFFSET, POSREG
02B6 AF          XRA  A                 A = HEX00
02B7 CD 24 0F    CALL FILNIB            FILNIB(POSREG,HEX00,NIBCNT)
                ;                              ( @C   , A   , B    )
                ;                              ( O    , I   , I    )
                ;                       REGISTER NOW MATCHES SETTING
02BA 21 24 74    LXI  H,MRSTS1/2+X      HL = ADDRESS, MRSTS1
02BD 7E          MOV  A,M               MRSTS1.UNKSEL = FALSE
02BE E6 7F       ANI  7FH
02C0 77          MOV  M,A
                PWRU02;               ENDIF
                ;                     CHECK MEMORY RETENTION OF NVM
02C1 3A FE 44    LDA  NVMRED+RETAIN   A = NVMRED[RETAIN]
02C4 E6 0F       ANI  0FH
02C6 FE 0A       CPI  0AH             IF NVMRED[RETAIN] .NE. HEX0A
02C8 CA DE 02    JZ   PWRU04
                ;                       MEMORY IS FAILING
02CB 21 10 74    LXI  H,SERFLG/2+X      HL = ADDRESS, SERFLG
02CE 7E          MOV  A,M               IF SERFLG.WEKNVM .EQ. FALSE
02CF E6 20       ANI  20H
02D1 C2 DE 02    JNZ  PWRU03
                ;                         SERFLG.WEKNVM NOT SET IN NVM
```

```
02D4 7E          MOV  A,M                  SERFLG.WEKNVM = TRUE
02D5 F6 20       ORI  20H
02D7 77          MOV  M,A
                ;                          WRITE NORMAL BLOCK
                ;                          LEAVE NO BLOCKS OPEN
02D8 CD 9E 12    CALL NVMWR                NVMWR(ERRFLG)
                ;                               (PSW:Z )
                ;                               ( 0    )
                ;                          WRITE NEW SERVICE BLOCK
                ;                          OPEN ERASED NORMAL BLOCK
02DB CD 19 12    CALL NVMSTO               NVMSTO(ERRFLG)
                ;                                (PSW:Z )
                ;                                ( 0    )
                PWRU03;                  ENDIF
                PWRU04;                ENDIF
02DE CD 47 10    CALL NVM30T           TURN ON -30V FOR NVM
                ;                      START ERASING RETENTION LOCATION
02E1 32 FE 40    STA  NVMERS+RETAIN    NVMERS[RETAIN] = A
                ;                      PAUSE FOR 10 MSEC
02E4 01 64 00    LXI  B,100            BC = LOOPCT = 100
                PWRU05;                DO UNTIL LOOPCT .EQ. 0
02E7 CD 19 0B    CALL NPAUSE             NPAUSE(LOOPCT,ZROFLG)
                ;                               ( BC    ,PSW:Z )
                ;                               ( I/0   , 0    )
02EA C2 E7 02    JNZ  PWRU05
                ;                      ENDDO
                ;                      TERMINATE ERASURE
02ED 3A FE 44    LDA  NVMRED+RETAIN    A[1] = NVMRED[RETAIN] = GARBAGE
                ;                      CHECK ERASURE
02F0 3A FE 44    LDA  NVMRED+RETAIN    A[1] = NVMRED[RETAIN]
02F3 F6 F0       ORI  0F0H             A[0] = HEXF
02F5 3C          INR  A                PSW:Z=ERASED=NVMRED[RETAIN].EQ.HEXF
02F6 3E 01       MVI  A,NVMBAD         A = NVMBAD
                ;                      IF ERASED .EQ. FALSE
                ;                        DECLARE DEAD METER. BAD NVM.
02F8 C2 85 10    JNZ  NVMDED             NVMDED(NVMBAD,ERRFLG)
                ;                               ( A     ,PSW:Z )
                ;                               ( I     , 0    )
                ;                      ENDIF
                ;                      WRITE HEX0A INTO RETENTION LOCATION
02FB 21 FE 00    LXI  H,RETAIN         HL = BASE = ADDRESS, RETAIN
02FE 3E 0A       MVI  A,0AH            A = HEX0A
0300 CD 61 12    CALL NVMWN            NVMWN(HEX0A,BASE,ERRFLG)
                ;                           ( A[1], HL ,PSW:Z )
                ;                           ( I    , I  , 0    )
0303 C3 31 10    JMP  NVM30F           TURN OFF -30 V TO NVM
                ;                    ENDIF
                ;                    RETURN
                ;CDBUF/CDBUFC/CDBUFD()(DBUF  )
                ;                     (NIBSTR)
                ;                     ( I/0  )
                ;                     ( RAM  )
                ;                     ( C    )
                ;
                ;PSW:S, Z, P, CY = NO CHANGE
                ;
                ;-------------------------------------------------------
                ;                   DISABLE METER AND CLEAR DBUF ONLY ON
                ;                   CONDITION THAT DISPLAYED VALUE WAS
                ;                   NOT ENTERED FROM KEYBOARD
                ;
                CDBUFC;             ****ENTRY POINT
0306 F5          PUSH PSW           SAVE A, PSW
                ;                   CHECK FOR KEY ENTERED DISPLAY
0307 3A 40 74    LDA  DBUF/2+X      A = DBUF[0..1]
030A B7          ORA  A             IF DBUF[0..1] .EQ. HEX00
030B CA 20 03    JZ   CDBUF1
```

```
                 ; >>JUMP AHEAD<<
                 ;                      DISPLAY WAS KEY ENTERED
                 ;                      RESTORE A, PSW
                 ;                      RETURN
                 ;                    ENDIF
030E F1            POP  PSW           RESTORE A, PSW
                 ;-----------------------------------------------------
                 ;                    DISABLE METER AND CLEAR DISPLAY BUFFER
                 ;
                 CDBUFD;              ****ENTRY POINT
030F F5            PUSH PSW           SAVE A, PSW
                 ;                    DISABLE METER
0310 3E 42         MVI  A,HDISAB      A = HDISAB
0312 CD C7 0D      CALL XEQHDR        XEQHDR(HDISAB,ERROR)
                 ;                          ( A    ,PSW:Z)
                 ;                          ( I    , O   )
0315 F1            POP  PSW           RESTORE A, PSW
                 ;-----------------------------------------------------
                 ;                    CLEAR DISPLAY BUFFER
                 ;
                 CDBUF;               ****ENTRY POINT
0316 F5            PUSH PSW           SAVE A, PSW
                 ;                    SET DBUF HEADER TO KEY ENTRY
0317 AF            XRA  A             A = HEX00
0318 32 40 74      STA  DBUF/2+X      OUTPUT DBUF[0..1] = HEX00
                 ;                    SET DBUF FORMAT FOR NUL MESSAGE
031B 3E 0F         MVI  A,0FH         DBUF[2..3] = HEX0F
031D 32 41 74      STA  DBUF/2+X+1
                 CDBUF1;              >>TARGET OF JUMP AHEAD<<
0320 F1            POP  PSW           RESTORE A, PSW
0321 C9            RET                RETURN
                 ;FILDIM(VALUE )(DIMAGE)
                 ;      (UBYTE )(BITSTR)
                 ;      ( I    )( O    )
                 ;      ( A    )( RAM  )
                 ;      ( NC   )( C    )
                 ;
                 ;PSW DESTROYED
                 ;REGISTERS DESTROYED
                 ;
                 ;FILL DISPLAY IMAGE BUFFER WITH VALUE
                 ;
                 FILDIM;              ****ENTRY POINT
                 ;                    SET TO FILL (NDISP*4) BYTES
0322 06 07         MVI  B,NDISP*4-1   B = BYTNO = NDISP*4-1
0324 21 87 74      LXI  H,DIMAGE/2+Y+NDISP*4-1
                 ;                    HL = ADDRESS, DIMAGE[BYTNO]
                 FILDI1;              DO UNTIL BYTNO .LT. 0
0327 77            MOV  M,A             DIMAGE[BYTNO] = VALUE
0328 05            DCR  B               BYTNO = BYTNO-1
0329 2B            DCX  H               HL = ADDRESS, DIMAGE[BYTNO]
032A F2 27 03      JP   FILDI1          TEST BYTNO
                 ;                    ENDDO
032D C9            RET                RETURN
                 ;KEYBRD()(NORFLG,CTLBKT,CHRBKT,KDCTRL,DSPTMR,CURBKT)
                 ;        (BITSTR,BYTE  ,BYTE  ,BITSTR,UBYTE ,BYTE  )
                 ;        ( I    , I    , I/O  , I    , I    , O    )
                 ;        ( RAM  , RAM  , RAM  , RAM  , RAM  , RAM  )
                 ;        ( NC   , NC   , C    , NC   , NC   , C    )
                 ;
                 ;PSW AND REGISTERS DESTROYED
                 ;
                 ;SAMPLES INTERRUPT LEVEL KEYCODE BUCKETS.  DEFINES A
                 ;STABLE KEYCODE BUCKET FOR APPLICATION USE.  INITIATES
                 ;PROCESSING OF KEYPRESS.  UPDATES DISPLAY TO CONFORM TO
                 ;METER STATUS.  INITIATES END OF ENTRY PROCESSING.
                 ;
```

```
                 KEYBRD;           ****ENTRY POINT
0332E 3A 27 74     LDA  KDCTRL/2+X  IF (KDCTRL.KBDDSB .EQ. FALSE) .AND.
0331 1F            RAR                ((NORFLG.CMBIN .AND. NORFLG.AMTIN).EQ.
0332 DA 4A 03      JC   KEYB01        TRUE)
0335 3A 26 74      LDA  NORFLG/2+X
0338 E6 30         ANI  30H
033A FE 30         CPI  30H
033C C2 4A 03      JNZ  KEYB01
033F CD DE 0E      CALL DBLANK        BLANK DISPLAY
                 ;                    EXECUTE END OF ENTRY
0342 3E 43         MVI  A,HENDEN      A = HENDEN
0344 CD C7 0D      CALL XEQHDR        XEQHDR(HENDEN,ERROR)
                 ;                          ( A     ,PSW:Z)
                 ;                          ( I     , 0   )
0347 C3 8C 03      JMP  KEYB09
                 KEYB01;           ELSE
                 ;                    READ INTERRUPT BUCKETS TOGETHER
034A 2A 2B 74      LHLD CTLBKT/2+X
034D EB            XCHG               E = CTLBKT
                 ;                    D = CHRBKT
034E 1C            INR  E             IF CTLBKT .EQ. HEX00
034F 1D            DCR  E
0350 C2 78 03      JNZ  KEYB06
                 ;                      NO KEY IS DOWN
0353 21 27 74      LXI  H,KDCTRL/2+X    HL = ADDRESS, KDCTRL
0356 7E            MOV  A,M             A = KDCTRL
0357 E6 20         ANI  20H             IF KDCTRL.TIMED .EQ. TRUE
0359 CA 75 03      JZ   KEYB05
                 ;                        CURRENT DISPLAY IS TIMED
035C 3A 29 74      LDA  DSPTMR/2+X        A = DSPTMR
035F 3D            DCR  A                 IF DSPTMR .EQ. 1
0360 C2 75 03      JNZ  KEYB04
                 ;                          DISPLAY TIME IS UP
                 ;                          REVERT TO POSTAGE DISPLAY
                 ;                          CHECK FOR FATAL ERROR
0363 CD 4E 0F      CALL LSTATE              LSTATE(FATAL,NORM,SERV,PRIV)
                 ;                                (PSW:S, :Z , :P , :C )
                 ;                                ( 0   , 0  , 0  , 0  )
0366 F2 70 03      JP   KEYB02              IF FATAL .EQ. TRUE
                 ;                            SET FOR FATAL SETTING DISPLY
0369 7E            MOV  A,M                   KDCTRL.STGDSP = TRUE
036A F6 80         ORI  80H
036C 77            MOV  M,A
036D C3 75 03      JMP  KEYB03
                 KEYB02;                    ELSE
                 ;                            MAKE NORMAL SETTING DISPLAY
0370 3E 51         MVI  A,HREQPO              A = HREQPO
0372 CD C7 0D      CALL XEQHDR                XEQHDR(HREQPO,ERROR)
                 ;                                  ( A     ,PSW:Z)
                 ;                                  ( I     , 0   )
                 KEYB03;                    ENDIF
                 KEYB04;                  ENDIF
                 KEYB05;                ENDIF
0375 C3 8C 03      JMP  KEYB08
                 KEYB06;              ELSE
                 ;                      KEYS ARE DOWN
                 ;                      RESTART DISPLAY TIMER
0378 3E 07         MVI  A,DSPVAL          DSPTMR = DSPVAL
037A 32 29 74      STA  DSPTMR/2+X
037D 7A            MOV  A,D             A = CHRBKT
037E B7            ORA  A               IF CHRBKT .NE. HEX00
037F CA 8C 03      JZ   KEYB07
                 ;                        A SINGLE UNPROCESSED KEY IS DOWN
                 ;                        DEFINE A STABLE KEYBUCKET
0382 32 2D 74      STA  CURBKT/2+X        CURBKT = CHRBKT
                 ;                        PREVENT REPROCESSING KEYPRESS
0385 AF            XRA  A                 CHRBKT = NOKEY
```

```
0386 32 2C 74   STA  CHRBKT/2+X
0389 CD CE 04   CALL PROKEY           PROCESS KEYPRESS
               KEYB07;                  ENDIF
               KEYB08;                ENDIF
               KEYB09;              ENDIF
038C 3A 26 74   LDA  NORFLG/2+X     IF NORFLG.QUEPOS .EQ. TRUE
038F E6 40      ANI  40H
0391 C0         RNZ                   RETURN
               ;                    ELSE
0392 CD A0 03   CALL MODDSP           MODIFY DISPLAY TO MATCH METER STATUS
               ;                      START KEYBOARD/DISPLAY INTERRUPTS
0395 21 A7 00   LXI  H,KDIO           HL = ADRESS = ADDRESS, KDIO
0398 3E 02      MVI  A,KDSKIP         A = KDSKIP
039A 11 96 4C   LXI  D,KEYINT         DE = KEYINT
039D C3 53 01   JMP  STRTMR           STRTMR(ADRESS,KDSKIP,KEYINT,WASOFF)
               ;                            ( HL    , A     , DE    ,PSW:Z )
               ;                            ( I     , I     , I     , O     )
               ;                      RETURN
               ;                    ENDIF
               ;MODDSP()(DIMAGE, MRSTS1, KDCTRL)
               ;        (BYTSTR, BITSTR, BITSTR)
               ;        (  O   ,   I   ,   O   )
               ;        ( RAM  ,  RAM  ,  RAM  )
               ;        (  C   ,  NC   ,   C   )
               ;
               ;ALL REGISTERS CHANGED
               ;PSW: S, Z, P, CY CHANGED
               ;
               ;UPDATE DISPLAY CONTROL FLAGS AND DISPLAY IMAGE
               ;TO REFLECT CURRENT METER STATUS
               ;
               MODDSP;              ****ENTRY POINT
               ;                     CHECK DISPLAY TYPE
03A0 21 27 74   LXI  H,KDCTRL/2+X    HL = ADDRESS, KDCTRL
03A3 7E         MOV  A,M             A = KDCTRL
03A4 E6 BB      ANI  0BBH            A.FLSDSP = FALSE
               ;                     A.FLSDCM = FALSE
               ;                     PSW:S = KDCTRL.STGDSP
03A6 FA AD 03   JM   MODD01          IF KDCTRL.STGDSP .EQ. FALSE
               ;                       SETTING NOT ON DISPLAY
               ;                       PREVENT FLASHING DISPLAY
03A9 77         MOV  M,A               KDCTRL.FLSDSP = FALSE
               ;                       KDCTRL.FLSDCM = FALSE
03AA C3 FF 03   JMP  MODD07
               MODD01;               ELSE
               ;                       SETTING IS ON DISPLAY
               ;                       DECIDE WHETHER TO FLASH DISPLAY
03AD 3A 24 74   LDA  MRSTS1/2+X        B = MRSTS1
03B0 47         MOV  B,A
               ;                       D.DATDOR = D.0 = MRSTS1.DATDOR
               ;                       E.FLSDSP = E.1 = MRSTS1.DATDOR .OR.
               ;                                        MRSTS1.INSFND
               ;                       E.FLSDCM = E.5 = MRSTS1.LOWPOS
03B1 E6 70      ANI  70H
03B3 57         MOV  D,A
03B4 0F         RRC
03B5 0F         RRC
03B6 B2         ORA  D
03B7 57         MOV  D,A
03B8 07         RLC
03B9 B2         ORA  D
03BA 57         MOV  D,A
03BB E6 44      ANI  44H
03BD 5F         MOV  E,A
               ;                       KDCTRL.FLSDSP = E.FLSDSP
               ;                       KDCTRL.FLSDCM = E.FLSDCM
03BE 21 27 74   LXI  H,KDCTRL/2+X
```

```
03C1 7E          MOV  A,M
03C2 E6 BB       ANI  0BBH
03C4 B3          ORA  E
03C5 77          MOV  M,A
                ;                        DETERMINE METER STATUS
03C6 CD 4E 0F    CALL LSTATE             LSTATE(FATMOD,NORMOD,SERMOD,PRVMOD)
                ;                              (PSW:S ,PSW:Z ,PSW:P ,PSW:CY)
                ;                              ( 0    , 0    , 0    , 0     )
03C9 FA F5 03    JM   MODD04             IF FATMOD .EQ. FALSE
                ;                          METER NOT FATAL
                ;                          TURN DATER DOOR LAMP ON OR OFF
03CC 21 80 74    LXI  H,DIMAGE/2+Y         HL = ADDRESS, DIMAGE
03CF 7E          MOV  A,M                  A = DIMAGE
03D0 E6 FD       ANI  0FDH                 A.DATLMP = FALSE
03D2 14          INR  D                    PSW:S = D.DATDOR
03D3 F2 D8 03    JP   MODD02               IF D.DATDOR .EQ. TRUE
03D6 F6 02       ORI  2                      A.DATLMP = TRUE
                MODD02;                    ENDIF
03D8 77          MOV  M,A                  DIMAGE = A
                ;                          SELECT WING TYPE
03D9 16 02       MVI  D,02H                D = WING, DISABLED
03DB 3E 04       MVI  A,04H                A = MRSTS1.ENABLD
03DD A0          ANA  B
03DE CA E3 03    JZ   MODD03               IF MRSTS1.ENABLD .EQ. TRUE
03E1 16 92       MVI  D,92H                  D = WING, ENABLED
                MODD03;                    ENDIF
                ;                          INSERT RIGHT HAND WING
03E3 21 87 74    LXI  H,DIMAGE/2+Y+(NDISP*4-1)
                ;                          HL = ADDRESS, DIMAGE[(NDISP*4-1)]
03E6 72          MOV  M,D                  DIMAGE[(NDISP*4-1)] = WING
                ;                          INSERT LEFT HAND WING
03E7 06 82       MVI  B,DBUF+2             B = OFFSET, DBUF[2]
03E9 CD 35 0F    CALL GETNIB               GETNIB(NCHAR,ZERO ,DBUF[2])
                ;                                ( A    ,PSW:Z, @B     )
                ;                                ( O    , O    , I      )
03EC 2F          CMA                       BC = -NCHAR-1
03ED 4F          MOV  C,A
03EE 06 FF       MVI  B,0FFH
03F0 09          DAD  B                    HL = ADDRESS,
                ;                          DIMAGE[(NDISP*4-2)-NCHAR]
03F1 72          MOV  M,D                  DIMAGE[(NDISP*4-2)-NCHAR] = WING
03F2 C3 FF 03    JMP  MODD06
                MODD04;                  ELSE
                ;                          METER IS FATAL
                ;                          SET TO DISPLAY ALL DECIMALS
03F5 3E 01       MVI  A,01H                A = DECBIT = HEX01
03F7 E2 FC 03    JPO  MODD05               IF SERMOD .EQ. TRUE
                ;                            SET TO DISPLAY DECIMALS+DASHES
03FA 3E 11       MVI  A,11H                  A = DECBIT = HEX11
                MODD05;                    ENDIF
03FC CD 22 03    CALL FILDIM               FILDIM(DECBIT)
                ;                                ( A      )
                ;                                ( I      )
                MODD06;                  ENDIF
                MODD07;                ENDIF
                ;                      BUILD SERVICE/NORMAL MODE EDIT MASK
03FF AF          XRA  A                A = MASK, BLANK
0400 CD 4E 0F    CALL LSTATE           LSTATE(FATMOD,NORMOD,SERMOD,PRVMOD)
                ;                            (PSW:S ,PSW:Z ,PSW:P ,PSW:CY)
                ;                            ( 0    , 0    , 0    , 0     )
0403 E2 08 04    JPO  MODD08           IF SERMOD .EQ. TRUE
0406 3E 10       MVI  A,10H              A = MASK, UNDERSCORE
                MODD08;                ENDIF
0408 4F          MOV  C,A              C = MASK
                ;                      EDIT MASK INTO DISPLAY
0409 06 07       MVI  B,(NDISP*4-1)    B = DISPNO = (NDISP*4-1)
```

```
040B 21 B7 74   LXI  H,DIMAGE/2+Y+(NDISP*4-1)
               ;                           HL = ADDRESS, DIMAGE[DISPNO]
               MODD09;                     FOR DISPNO = (NDISP*4-1) DOWNTO 0
040E 7E          MOV  A,M                    IF(DIMAGE[DISPNO] .AND. HEXEE).EQ.0
040F E6 EE       ANI  0EEH
0411 C2 19 04    JNZ  MODD10
               ;                               COPY MASK INTO DISPLAY
0414 7E          MOV  A,M                      A = IMAGE = DIMAGE[DISPNO]
0415 E6 EF       ANI  0EFH                     IMAGE = IMAGE, WITHOUT UNDERSCORE
0417 B1          ORA  C                        IMAGE = IMAGE, WITH EDIT MASK
0418 77          MOV  M,A                      DIMAGE[DISPNO] = IMAGE
               MODD10;                       ENDIF
0419 05          DCR  B                      B = DISPNO = DISPNO-1
041A 2B          DCX  H                      HL = ADDRESS, DIMAGE[DISPNO]
041B F2 0E 04    JP   MODD09                 TEST DISPNO
               ;                           ENDFOR
041E C9          RET                       RETURN
               ;PAUTHK()(DBUF   ,NORFLG)
               ;        (NIBSTR,BITSTR)
               ;        ( I    , I    )
               ;        ( RAM  , RAM  )
               ;
               ;PSW DESTROYED
               ;REGISTERS DESTROYED
               ;
               ;PROCESS AUTHORIZATION KEY
               ;
               PAUTHK;                     ****ENTRY POINT
               ;                           TEST DISPLAY HEADER
041F 21 40 74    LXI  H,DBUF/2+X           HL = ADDRESS, DBUF[0..1]
0422 7E          MOV  A,M                  A = DHEAD = DBUF[0..1]
0423 B7          ORA  A                    PSW:Z = KEYDAT = DHEAD .EQ. 0
               ;                           DEFINE REQUEST HEADER
0424 3E 40       MVI  A,HREQAC             A = RHEAD = HREQAC
               ;                           IF KEYDAT .EQ. FALSE
               ;                             NO KEYENTERED DATA IN DISPLAY
               ;                             REQUEST AUTHORIZATION CODE
0426 C2 C7 0D    JNZ  XEQHDR                 XEQHDR(RHEAD,ERRFLG)
               ;                                    ( A   ,PSW:Z )
               ;                                    ( I   , 0    )
               ;                           ELSE
0429 23          INX  H                    HL = ADDRESS, DBUF[2..3]
042A 7E          MOV  A,M                  A = FORMAT = DBUF[2..3]
042B FE 4F       CPI  4FH                  IF FORMAT .NE. HEX4F
               ;                             DISPLAY NOT 4 CHAR WITHOUT DECIMAL
               ;                             DECLARE PROCEDURAL ERROR
042D C2 A1 0B    JNZ  PROERR                 PROERR(ERRFLG)
               ;                                   (PSW:Z )
               ;                                   ( 0    )
               ;                           ELSE
0430 23          INX  H                    HL = ADDRESS, DBUF[4..5]
0431 7E          MOV  A,M                  A = CODE = DBUF[4..5]
0432 FE 69       CPI  69H                  IF CODE .NE. HEX69
               ;                             FIRST 2 CHARACTERS IN DISPLAY NOT 69
               ;                             DECLARE PROCEDURAL ERROR
0434 C2 A1 0B    JNZ  PROERR                 PROERR(ERRFLG)
               ;                                   (PSW:Z )
               ;                                   ( 0    )
               ;                           ELSE
               ;                             ISSUE LAST 2 CHARACTERS OF DISPLAY
               ;                             AS REQUEST HEADER
0437 23          INX  H                      HL = ADDRESS, DBUF[6..7]
0438 7E          MOV  A,M                    A = RHEAD = DBUF[6..7]
0439 CD C7 0D    CALL XEQHDR                 XEQHDR(RHEAD,ERRFLG)
               ;                                    ( A   ,PSW:Z )
               ;                                    ( I   , 0    )
               ;                             TEST THE REQUEST HEADER
```

```
043C FE 46     CPI  HSETSV          IF RHEAD .EQ. HSETSV
043E C0        RNZ
              ;                       SERVICE MODE ENTERED VIA KEYBOARD
              ;                       DISABLE COMMUNICATIONS
043F 21 26 74  LXI  H,NORFLG/2+X      HL = ADDRESS, NORFLG
0442 7E        MOV  A,M               NORFLG.COMDSB = TRUE
0443 F6 04     ORI  04H
0445 77        MOV  M,A
              ;                     ENDIF
              ;                   ENDIF
0446 C9        RET                RETURN
              ;PCLRK
              ;
              ;PSW:S, Z, P, CY = NO CHANGE
              ;
              ;PROCESS CLEAR KEY
              ;
              PCLRK;              ****ENTRY POINT
0447 CD 06 03  CALL CDBUFC        IF DISPLAY WAS NOT KEY ENTERED
              ;                     DISABLE METER
              ;                     CLEAR DISPLAY BUFFER
              ;                   ENDIF
044A CD 16 03  CALL CDBUF         CLEAR DISPLAY BUFFER
044D C3 5A 05  JMP  VALDSP        DISPLAY VALUE IN DBUF
              ;                   RETURN
              ;PDCMK()(DBUF  )
              ;       (NIBSTR)
              ;       ( I/O  )
              ;       ( RAM  )
              ;       ( C    )
              ;
              ;PSW AND REGISTERS DESTROYED
              ;
              ;PROCESS DECIMAL KEY
              ;
              PDCMK;              ****ENTRY POINT
              ;                   CHECK FOR NON KEYENTRY DISPLAY
              ;                   IF DBUF[0..1] .NE. HEX00
0450 CD 06 03  CALL CDBUFC          PUT NUL MESSAGE IN DBUF
              ;                     DISABLE METER
              ;                   ENDIF
              ;                   CHECK THAT DECIMAL NOT ALREADY ENTERED
0453 01 83 83  LXI B,(DBUF+3)*100H+DBUF+3
              ;                   B = OFFSET, DBUF[3]
              ;                   C = OFFSET, DBUF[3]
0456 CD 35 0F  CALL GETNIB        GETNIB(DECPOS,ZERO ,DBUF[3])
              ;                          ( A    ,PSW:Z, @B    )
              ;                          ( O    , O   , I     )
0459 D6 0F     SUI  0FH           IF DECPOS .EQ. HEX0F
045B C2 61 04  JNZ  PDCMK1
              ;                     A = DECPOS = 0, RIGHTMOST POSITION
              ;                     OUTPUT DECPOS
045E CD EE 0F  CALL PUTNIB          PUTNIB(DBUF[3],DECPOS)
              ;                            ( @C    , A    )
              ;                            ( O     , I    )
              PDCMK1;             ENDIF
0461 C3 5A 05  JMP  VALDSP        MAKE NEW DISPLAY
              ;                   RETURN
              ;PERDSP()(KDCTRL,DIMAGE,DSPTMR)
              ;        (BITSTR,BYTSTR,UBYTE )
              ;        ( O    , O    , O    )
              ;        ( RAM  , RAM  , RAM  )
              ;        ( C    , C    , C    )
              ;
              ;PSW:S, Z, P, CY = NO CHANGE
              ;
              ;MAKE PROCEDURAL ERROR DISPLAY
```

```
                    ;
                    PERDSP;                 ****ENTRY POINT
0464 F5               PUSH PSW              SAVE A, PSW
                    ;                       CLEAR SETTING-ON-DISPLAY FLAG
0465 3A 27 74         LDA  KDCTRL/2+X       A = KDCTRL
0468 E6 7F            ANI  7FH              KDCTRL.STGDSP = FALSE
                    ;                       SET DISPLAY-IS-TIMED FLAG
046A F6 20            ORI  20H              KDCTRL.TIMED = TRUE
046C 32 27 74         STA  KDCTRL/2+X
046F CD 16 03         CALL CDBUF            CLEAR DISPLAY BUFFER
                    ;                       CLEAR DISPLAY IMAGE BUFFER
0472 AF               XRA  A                A = BLANK
0473 CD 22 03         CALL FILDIM           FILDIM(BLANK)
                    ;                             ( A   )
                    ;                             ( I   )
                    ;                       INSERT 'ERR' IN DISPLAY IMAGE
0476 3E 9E            MVI  A,9EH            DIMAGE[0] = 'E'
0478 32 80 74         STA  DIMAGE/2+Y
047B 3E 0A            MVI  A,0AH            DIMAGE[1] = 'r'
047D 32 81 74         STA  DIMAGE/2+Y+1
0480 32 82 74         STA  DIMAGE/2+Y+2 DIMAGE[2] = 'r'
                    ;                       START DISPLAY TIMER
0483 3E 07            MVI  A,DSPVAL         DSPTMR = DSPVAL
0485 32 29 74         STA  DSPTMR/2+X
0488 F1               POP  PSW              RESTORE A, PSW
0489 C9               RET                   RETURN
                    ;PNUMK(CURKEY)(DBUF  ,WORK1 )
                    ;     (BYTE  )(NIBSTR,NIBSTR)
                    ;     ( I    )( I/O  , O    )
                    ;     ( A    )( RAM  , RAM  )
                    ;     ( C    )( C    , C    )
                    ;
                    ;PSW AND REGISTERS DESTROYED
                    ;
                    ;PROCESS NUMERIC KEY
                    ;
                    PNUMK;                  ****ENTRY POINT
048A 57               MOV  D,A              D = CURKEY
048B CD 06 03         CALL CDBUFC           IF DBUF[0..1] .NE. HEX00
                    ;                         NOT IN KEYENTRY MODE
                    ;                         DISABLE METER
                    ;                         ENTER KEYENTRY MODE
                    ;                         DBUF[0..1] = HEADER = HEX00
                    ;                         DECLARE DBUF CLEAR
                    ;                         DBUF[2..3] = FORMAT = HEX0F
                    ;                       ENDIF
                    ;                       CHECK DATA LENGTH IN DISPLAY
048E 21 41 74         LXI  H,(DBUF+2)/2+X
                    ;                       HL = ADDRESS, DBUF[2..3]
0491 7E               MOV  A,M              E = NCHAR*16 = DBUF[2]*16
0492 E6 F0            ANI  0F0H
0494 5F               MOV  E,A
0495 FE 80            CPI  DSPCHR*16        IF NCHAR .LT. DSPCHR
0497 D0               RNC
                    ;                         THERE IS ROOM IN DISPLAY FOR CHAR
                    ;                         CALCULATE NEXT DECIMAL POSITION
0498 7E               MOV  A,M                A = DECPOS = (DBUF[3]+1) .AND. HEX0F
0499 3C               INR  A
049A E6 0F            ANI  0FH
049C FE 08            CPI  DSPCHR             IF DECPOS .LT. DSPCHR
049E D0               RNC
                    ;                           THERE IS ROOM TO SHIFT DECIMAL
049F B7               ORA  A                    IF DECPOS .EQ. 0
04A0 C2 A5 04         JNZ  PNUMK1
                    ;                             DECIMAL HASN'T BEEN ENTERED
                    ;                             INDICATE NO DECIMAL
04A3 3E 0F            MVI  A,0FH                  A = DECPOS = HEX0F
```

```
                  PNUMK1;                    ENDIF
                  ;                          UPDATE FORMAT BYTE
04A5 B3             ORA  E                   DBUF[2..3] = (NCHAR+1)*16+DECPOS
04A6 C6 10          ADI  10H
04A8 77             MOV  M,A
04A9 06 82          MVI  B,DBUF+2            B = OFFSET, DBUF[2]
04AB CD 35 0F       CALL GETNIB              GETNIB(NCHAR,ZROFLG,DBUF[2])
                  ;                                ( A   ,PSW:Z , @B    )
                  ;                                ( 0   , 0    , I     )
04AE 5F             MOV  E,A                 E = NCHAR
                  ;                          COPY DBUF INTO WORK AREA
04AF 01 C0 84       LXI  B,(DBUF+4)*100H+(WORK1+0)
                  ;                          B = OFFSET, DBUF[I=4]
                  ;                          C = OFFSET, WORK1[J=0]
04B2 CD B3 0F       CALL MVLNIB              MVLNIB(WORK1[J],DBUF[I],NCHAR,
                  ;                                ( @C     , @B    , A   ,
                  ;                                ( 0      , I     , I   ,
                  ;
                  ;                                NONBCD,ZROFLG)
                  ;                                PSW:S ,PSW:Z )
                  ;                                 0    , 0    )
                  ;                          ZERO PAD DISPLAY BUFFER
04B5 23             INX  H                   HL = ADDRESS, DBUF[4..5]
04B6 36 00          MVI  M,0                 DBUF[4..5] = 0
                  ;                          INSERT NEW CHAR IN WORK AREA
04B8 81             ADD  C                   C=OFFSET, WORK1[J=NCHAR.AND.HEXFE]
04B9 E6 FE          ANI  0FEH
04BB 4F             MOV  C,A
04BC 7A             MOV  A,D                 A = CURKEY
04BD CD EE 0F       CALL PUTNIB              PUTNIB(WORK1[J],CURKEY)
                  ;                                ( @C     , A    )
                  ;                                ( 0      , I    )
                  ;                          MOVE WORK AREA TO DISPLAY BUFFER
04C0 41             MOV  B,C                 B = OFFSET, WORK1[I=J]
04C1 3E 83          MVI  A,DBUF+3            C=OFFSET,DBUF[J=(3+NCHAR).OR.HEX01]
04C3 83             ADD  E
04C4 F6 01          ORI  1
04C6 4F             MOV  C,A
04C7 7B             MOV  A,E                 A = NCHAR
04C8 CD C2 0F       CALL MVRNIB              MVRNIB(DBUF[J],WORK1[I],NCHAR,
                  ;                                ( @C    , @B     , A   ,
                  ;                                ( 0     , I      , I   ,
                  ;
                  ;                                NONBCD,ZROFLG)
                  ;                                PSW:S ,PSW:Z )
                  ;                                 0    , 0    )
04CB C3 5A 05       JMP  VALDSP              UPDATE DISPLAY IMAGE
                  ;                        ENDIF
                  ;                      ENDIF
                  ;                      RETURN
                  ;PROKEY()(CURBKT)
                  ;        ( BYTE )
                  ;        ( I    )
                  ;        ( RAM  )
                  ;        ( NC   )
                  ;
                  ;PSW AND REGISTERS DESTROYED
                  ;
                  ;INITIATE PROCESSING OF A KEYPRESS
                  ;
                  PROKEY;                ****ENTRY POINT
04CE CD DE 0E       CALL DBLANK          STOP TIMER, BLANK DISPLAY
                  ;                      BUILD INDEX FOR TABLE LOOKUP
                  ;                      CURBKT = 0RRR CCCC WHERE:
                  ;                      RRR = 0, 1, 2, 3, OR 4 = ROW CODE
                  ;                      CCCC= 1, 2, 4, OR 8 = COLUMN CODE
04D1 3A 2D 74       LDA CURBKT/2+X       A = CURBKT
```

```
04D4 57          MOV  D,A          D = CURBKT
04D5 E6 70       ANI  70H          E = INDEX = (CURBKT .AND. HEX70)/4
04D7 0F          RRC
04D8 0F          RRC
04D9 5F          MOV  E,A
04DA 7A          MOV  A,D          A = CURBKT
                PROKE1;            DO WHILE COLUMN CODE BIT NOT IN CARRY
04DB 1F          RAR
04DC DA E3 04    JC   PROKE2
04DF 1C          INR  E              E = INDEX = INDEX + 1
04E0 C3 DB 04    JMP  PROKE1
                PROKE2;            ENDDO
                ;                  DEFINE CURRENT KEYCODE OR HEADER
04E3 16 00       MVI  D,0          DE = INDEX
04E5 21 02 05    LXI  H,PROKE3     HL = ADDRESS, PROKE3
04E8 19          DAD  D            HL = ADDRESS, PROKE3[INDEX]
04E9 7E          MOV  A,M          A = CURKEY = PROKE3[INDEX]
                ;                  PROCESS CURRENT KEYCODE
04EA FE 0A       CPI  10           IF CURKEY .LT. 10
                ;                    PROCESS NUMERIC KEY
04EC DA 8A 04    JC   PNUMK          PNUMK(CURKEY)
                ;                         ( A     )
                ;                         ( I     )
                ;                    RETURN
                ;                  ELSE IF CURKEY .EQ. 10
04EF CA 47 04    JZ   PCLRK          PROCESS CLEAR KEY
                ;                    RETURN
04F2 FE 0C       CPI  12           ELSE IF CURKEY .EQ. 11
04F4 DA 50 04    JC   PDCMK          PROCESS DECIMAL KEY
                ;                    RETURN
                ;                  ELSE IF CURKEY .EQ. 12
04F7 CA 16 05    JZ   PSETK          PROCESS SET KEY
                ;                    RETURN
04FA FE 0D       CPI  13           ELSE IF CURKEY .EQ. 13
04FC CA 1F 04    JZ   PAUTHK         PROCESS AUTHORIZATION KEY
                ;                    RETURN
                ;                  ELSE
                ;                    A = HEADER = PROKE3[INDEX]
                ;                    EXECUTE HEADER
04FF C3 C7 0D    JMP  XEQHDR         XEQHDR(HEADER,ERROR)
                ;                         ( A     ,PSW:Z)
                ;                         ( I     , 0    )
                ;                    RETURN
                ;                  ENDIF
                PROKE3;   CURKEY   INDEX   DESCRIPTION
                ;           OR
                ;         HEADER
                ;
0502 C4          DB      HSETDA      0     SET DATE
0503 C6          DB      HENTCO      1     ENTER COMBINATION
0504 C5          DB      HENTAM      2     ENTER AMOUNT
0505 0D          DB      13          3     AUTHORIZATION KEY
0506 0C          DB      12          4     SET KEY
0507 0B          DB      11          5     DECIMAL KEY
0508 00          DB       0          6     0 KEY
0509 0A          DB      10          7     CLEAR KEY
050A 55          DB      HREQPC      8     REQUEST PIECE COUNT
050B 09          DB       9          9     9 KEY
050C 08          DB       8         10     8 KEY
050D 07          DB       7         11     7 KEY
050E 53          DB      HREQDR     12     REQUEST DESCENDING REGISTER
050F 06          DB       6         13     6 KEY
0510 05          DB       5         14     5 KEY
0511 04          DB       4         15     4 KEY
0512 52          DB      HREQAR     16     REQUEST ASCENDING REGISTER
0513 03          DB       3         17     3 KEY
0514 02          DB       2         18     2 KEY
0515 01          DB       1         19     1 KEY
```

```
                  ;PSETK()(DBUF   ,NORFLG)
                  ;       (NIBSTR,BITSTR)
                  ;       ( I    , O    )
                  ;       ( RAM  , RAM  )
                  ;       ( C    , C    )
                  ;
                  ;PSW AND REGISTERS DESTROYED
                  ;
                  ;PROCESS SET KEY
                  ;
                  PSETK;                    ****ENTRY POINT
                  ;                         PROCESS SET KEY ACCORDING TO DISPLAY
0516 3A 40 74       LDA  DBUF/2+X           A = DBUF[0..1]
0519 B7             ORA  A                  IF DBUF[0..1] .EQ. HEX00
051A C2 2F 05       JNZ  PSETK1
                  ;                           DISPLAY IS IN KEYENTRY MODE
051D 21 36 05       LXI  H,PSETK2             SET TO QUE POSTAGE VIA RETURN
0520 E5             PUSH H
0521 3A 41 74       LDA  (DBUF+2)/2+X         A = DBUF[2..3]
0524 FE 0F          CPI  0FH                  IF DBUF[2..3] .EQ. HEX0F
0526 C8             RZ                          DISPLAY IS CLEAR
                  ; >>RETURN AHEAD<<            QUE POSTAGE REQUEST
                  ;                             NORFLG.QUEPOS = TRUE
                  ;                           ELSE
                  ;                             DISPLAY CONTAINS KEYENTERED VALUE
                  ;                             SET POSTAGE
0527 3E C1          MVI  A,HSETPO               A = HSETPO
0529 CD C7 0D       CALL XEQHDR                 XEQHDR(HSETPO,ERRFLG)
                  ;                                    ( A    ,PSW:Z )
                  ;                                    ( I    , O    )
052C C0             RNZ                         IF ERRFLG .EQ. FALSE
                  ; >>RETURN AHEAD<<              QUE POSTAGE REQUEST
                  ;                               NORFLG.QUEPOS = TRUE
                  ;                             ENDIF
                  ;                           ENDIF
052D E1             POP  H                    CLEAN UP STACK
052E C9             RET
                  PSETK1;                   ELSE
                  ;                           DISPLAY NOT IN KEYENTRY MODE
052F FE 81          CPI  HPSET                PSW:Z = SETTING=DBUF[0..1].EQ.HPSET
0531 3E 41          MVI  A,HENABL             A = HENABL
                  ;                           IF SETTING .EQ. TRUE
                  ;                             SETTING IS ON DISPLAY
                  ;                             ENABLE METER
0533 CA C7 0D       JZ   XEQHDR                 XEQHDR(HENABL,ERRFLG)
                  ;                                    ( A    ,PSW:Z )
                  ;                                    ( I    , O    )
                  ;                           ELSE
                  ;                             SETTING IS NOT ON DISPLAY
                  PSETK2;                       >>TARGET OF RETURN AHEAD<<
                  ;                             QUE POSTAGE REQUEST
0536 21 26 74       LXI  H,NORFLG/2+X           HL = ADDRESS, NORFLG
0539 7E             MOV  A,M                    A = NORFLG
053A F6 40          ORI  40H                    NORFLG.QUEPOS = TRUE
053C 77             MOV  M,A
                  ;                           ENDIF
                  ;                         ENDIF
                  ;SEGCOD(CODE)
                  ;      (BYTE)
                  ;      (I/O )
                  ;      ( A  )
                  ;      ( C  )
                  ;
                  ;PSW:S, Z, P, CY DESTROYED
                  ;
                  ;CONVERT 4 BIT HEX VALUE INTO 7 SEGMENT DISPLAY CODE
                  ;
```

```
                     SEGCOD;                 ****ENTRY POINT
053E E5                PUSH H                SAVE HL
                     ;                       FETCH 7 SEGMENT DISPLAY CODE
053F C6 4A             ADI  >SEGC01          HL = ADDRESS, SEGC01[CODE]
0541 6F                MOV  L,A
0542 3E 00             MVI  A,0
0544 CE 05             ACI  <SEGC01
0546 67                MOV  H,A
0547 7E                MOV  A,M              A = CODE = SEGC01[CODE]
0548 E1                POP  H                RESTORE HL
0549 C9                RET                   RETURN
                     ;
                     SEGC01; 7 SEG CODE;  HEX VALUE;  GRAPHIC
                     ;
054A FC                DB      0FCH          0        0
054B 60                DB      060H          1        1
054C DA                DB      0DAH          2        2
054D F2                DB      0F2H          3        3
054E 66                DB      066H          4        4
054F B6                DB      0B6H          5        5
0550 BE                DB      0BEH          6        6
0551 E0                DB      0E0H          7        7
0552 FE                DB      0FEH          8        8
0553 F6                DB      0F6H          9        9
0554 9E                DB      09EH          A        E
0555 0A                DB      00AH          B        r
0556 3A                DB      03AH          C        o
0557 92                DB      092H          D        WING, ENABLED
0558 02                DB      002H          E        WING, DISABLED
0559 00                DB      000H          F        BLANK
                     ;VALDSP()(DIMAGE,KDCTRL,DBUF  ,DSPTMR)
                     ;        (BYTSTR,BITSTR,NIBSTR,UBYTE )
                     ;        ( 0    , 0    , I    , 0    )
                     ;        ( RAM  , RAM  , RAM  , RAM  )
                     ;        ( C    , C    , NC   , C    )
                     ;
                     ;PSW:S, Z, P, CY = NO CHANGE
                     ;
                     ;TRANSLATE CONTENTS OF DISPLAY BUFFER INTO 7 SEGMENT
                     ;CHARACTER CODES WHICH ARE PLACED IN THE DISPLAY IMAGE
                     ;BUFFER
                     ;
                     VALDSP;                 ****ENTRY POINT
055A E5                PUSH H                SAVE HL
055B D5                PUSH D                SAVE DE
055C C5                PUSH B                SAVE BC
055D F5                PUSH PSW              SAVE A, PSW
                     ;                       CLEAR DISPLAY IMAGE BUFFER
055E AF                XRA A                 A = BLANK
055F CD 22 03          CALL FILDIM           FILDIM(BLANK)
                     ;                             ( A    )
                     ;                             ( I    )
                     ;                       DEFINE DEFAULT DISPLAY MODE
0562 3A 27 74          LDA  KDCTRL/2+X       A = KDCTRL
0565 E6 7F             ANI  7FH              KDCTRL.STGDSP = FALSE
0567 F6 20             ORI  20H              KDCTRL.TIMED = TRUE
0569 57                MOV  D,A              D = KDCTRL
                     ;                       FETCH VALUES FROM DBUF'S FORMAT BYTE
056A 06 82             MVI  B,DBUF+2         B = OFFSET, DBUF[2]
056C CD 35 0F          CALL GETNIB           GETNIB(NCHAR,ZERO ,DBUF[2])
                     ;                             ( A    ,PSW:Z, @B     )
                     ;                             ( 0    , 0   , I      )
056F 4F                MOV  C,A              C = NCHAR
0570 04                INR  B                B = OFFSET, DBUF[3]
0571 CD 35 0F          CALL GETNIB           GETNIB(DECPOS,ZERO ,DBUF[3])
                     ;                             ( A    ,PSW:Z, @B     )
                     ;                             ( 0    , 0   , I      )
```

```
0574 5F          MOV  E,A            E = DECPOS
               ;                     POINT AT L/O OF DISPLAY IMAGE BUFFER
0575 21 87 74    LXI  H,DIMAGE/2+Y+(NDISP*4-1)
               ;                     HL = ADDRESS, DIMAGE[NDISP*4-1]
               ;                     CHECK FOR KEYENTRY IN DISPLAY BUFFER
0578 3A 40 74    LDA  DBUF/2+X       A = DBUF[0..1]
057B B7          ORA  A              IF DBUF[0..1] .EQ. HEX00
057C C2 8D 05    JNZ  VALDS2
               ;                       CHECK FOR NULL MESSAGE IN DBUF
057F 3A 41 74    LDA  (DBUF+2)/2+X     A = DBUF[2..3]
0582 FE 0F       CPI  0FH              IF DBUF[2..3] .EQ. HEX0F
0584 C2 89 05    JNZ  VALDS1
               ;                         PUT SMALL O IN DISPLAY
0587 36 3A       MVI  M,3AH              OUTPUT DIMAGE[NDISP*4-1] = 'o'
               VALDS1;                 ENDIF
0589 7A          MOV  A,D              A = KDCTRL
               ;                       MAKE UNTIMED DISPLAY
058A C3 97 05    JMP  VALDS3
               ; >>JUMP AHEAD<<
               VALDS2;               ENDIF
               ;                     CHECK WHETHER SETTING IS ON DISPLAY
058D FE 81       CPI  HPSET          COMPARE DBUF[0..1] WITH HPSET
058F 7A          MOV  A,D            A = KDCTRL
0590 C2 99 05    JNZ  VALDS4         IF DBUF[0..1] .EQ. HPSET
               ;                       SHIFT DESTINATION TO LEFT
0593 1C          INR  E                E = DECPOS = DECPOS + 1
0594 2B          DCX  H                HL = ADDRESS, DIMAGE[DST=NDISP*4-2]
               ;                       SET SETTING-ON-DISPLAY FLAG
0595 F6 80       ORI  80H              KDCTRL.STGDSP = TRUE
               VALDS3;                 >>TARGET OF JUMP AHEAD<<
               ;                       CLEAR DISPLAY-IS-TIMED FLAG
0597 E6 DF       ANI  0DFH             KDCTRL.TIMED = FALSE
               VALDS4;               ENDIF
0599 32 27 74    STA  KDCTRL/2+X     OUTPUT KDCTRL
               ;                     POINT AT L/O DATA IN DBUF
059C 79          MOV  A,C            A = N = NCHAR
059D B7          ORA  A              A = N/2;  CY = N .MOD. 2
059E 1F          RAR
059F CE 00       ACI  0              B = OFFSET, DBUF[SRC=(N/2+N.MOD.2)*2+3]
05A1 17          RAL
05A2 C6 83       ADI  DBUF+3
05A4 47          MOV  B,A
               VALDS5;               DO WHILE NCHAR .GT. 0
05A5 0D          DCR  C
05A6 FA B5 05    JM   VALDS6
               ;                       FETCH BCD CHARACTER FROM DBUF
05A9 CD 35 0F    CALL GETNIB           GETNIB(CODE,ZERO ,DBUF[SRC])
               ;                             ( A  ,PSW:Z, @B      )
               ;                             ( 0  , 0   , I       )
               ;                       TRANSLATE TO 7 BIT DISPLAY CODE
05AC CD 3E 05    CALL SEGCOD           SEGCOD(CODE)
               ;                             ( A  )
               ;                             ( I/O)
               ;                       PUT CODE INTO DISPLAY IMAGE BUFFER
05AF 77          MOV  M,A              DIMAGE[DST] = CODE
               ;                       MOVE INDICES LEFT
05B0 05          DCR  B                B = OFFSET, DBUF[SRC=SRC-1]
05B1 2B          DCX  H                HL = ADDRESS, DIMAGE[DST=DST-1]
05B2 C3 A5 05    JMP  VALDS5
               VALDS6;               ENDDO
               ;                     CHECK WHETHER DECIMAL IS DISPLAYABLE
05B5 7B          MOV  A,E            A = DECPOS
05B6 FE 08       CPI  DSPCHR         IF DECPOS .LT. DSPCHR
05B8 D2 C3 05    JNC  VALDS7
               ;                       CALC DECIMAL'S ADDRESS IN DIAMGE
05BB 2F          CMA                   A = -DECPOS-1
05BC C6 88       ADI  (DIMAGE/2+Y-X)+(NDISP*4)
```

```
05BE 6F          MOV  L,A
                 ;                   HL = ADDRESS,
                 ;                   DIMAGE[N=(NDISP*4-1)-DECPOS]
                 ;                   INSERT DECIMAL INTO DISPLAY
05BF 7E          MOV  A,M            DIMAGE[N] = DIMAGE[N] .OR. HEX01
05C0 F6 01       ORI  01H
05C2 77          MOV  M,A
                VALDS7;             ENDIF
                 ;                  START DISPLAY TIMER
05C3 3E 07       MVI  A,DSPVAL      DSPTMR = DSPVAL
05C5 32 29 74    STA  DSPTMR/2+X
05C8 F1          POP  PSW           RESTORE A, PSW
05C9 C1          POP  B             RESTORE BC
05CA D1          POP  D             RESTORE DE
05CB E1          POP  H             RESTORE HL
05CC C9          RET                RETURN
                ;CMDDSB/DISABL()(MRSTS1,NORFLG)
                ;               (BITSTR,BITSTR)
                ;               ( I/O  , O     )
                ;               ( RAM  , RAM   )
                ;               ( C    , C     )
                ;
                ;PSW = NO CHANGE
                ;
                ;DISABLE METER
                ;
                CMDDSB;              ****ENTRY POINT FOR EXTERNAL DISABLES
05CD F5          PUSH PSW            SAVE A, PSW
                ;                    SET TO SET NORFLG.LATDSB = TRUE
05CE 3E 01       MVI  A,1            A = LATMSK = HEX01
05D0 C3 D5 05    JMP  DISAB1
                ; >>JUMP AHEAD<<
                DISABL;              ****ENTRY POINT FOR INTERNAL DISABLES
05D3 F5          PUSH PSW            SAVE A,PSW
                ;                    SET TO PRESERVE NORFLG.LATSDB
05D4 AF          XRA  A              A = LATMSK = HEX00
                DISAB1;              >>TARGET OF JUMP AHEAD<<
05D5 D5          PUSH D              SAVE DE
05D6 E5          PUSH H              SAVE HL
05D7 21 26 74    LXI  H,NORFLG/2+X   HL = ADDRESS, NORFLG
                ;                    UPDATE NORFLG.LATDSB
05DA B6          ORA  M              NORFLG = NORFLG .OR. LATMSK
05DB 77          MOV  M,A
05DC 11 24 74    LXI  D,MRSTS1/2+X   DE = ADDRESS, MRSTS1
05DF 1A          LDAX D              IF MRSTS1.ENABLD .EQ. TRUE
05E0 E6 04       ANI  4
05E2 CA EF 05    JZ   DISAB2
05E5 1A          LDAX D                MRSTS1.ENABLD = FALSE
05E6 E6 FB       ANI  0FBH
05E8 12          STAX D
05E9 7E          MOV  A,M              NORFLG.TRPREQ = FALSE
05EA E6 F7       ANI  0F7H
05EC F6 80       ORI  80H              NORFLG QUESTS = TRUE
05EE 77          MOV  M,A
                DISAB2;              ENDIF
05EF E1          POP  H              RESTORE HL
05F0 D1          POP  D              RESTORE DE
05F1 F1          POP  PSW            RESTORE A, PSW
05F2 C9          RET                 RETURN
                ;CMDENB/ENABLE()(MRSTS1,NORFLG,NVMCTL)
                ;               (BITSTR,BITSTR,BITSTR)
                ;               ( I/O  , I/O  , I    )
                ;               ( RAM  , RAM  , RAM  )
                ;               ( C    , C    , NC   )
                ;
                ;PSW = NO CHANGE
                ;
```

```
                ;ENABLE METER
                ;
                CMDENB;                 ****ENTRY POINT FOR EXTERNAL ENABLES
05F3 F5           PUSH PSW              SAVE A, PSW
                ;                       SET TO SET NORFLG.LATDSB = FALSE
05F4 3E FE        MVI  A,0FEH           A = LATMSK = HEXFE
05F6 C3 FC 05     JMP  ENABL1
                ; >>JUMP AHEAD<<
                ENABLE;                 ****ENTRY POINT FOR INTERNAL ENABLES
05F9 F5           PUSH PSW              SAVE A, PSW
                ;                       SET TO PRESERVE NORFLG.LATDSB
05FA 3E FF        MVI  A,0FFH           A = LATMSK = HEXFF
                ENABL1;                 >>TARGET OF JUMP AHEAD<<
05FC C5           PUSH B                SAVE BC
05FD D5           PUSH D                SAVE DE
05FE E5           PUSH H                SAVE HL
05FF 21 26 74     LXI  H,NORFLG/2+X     HL = ADDRESS, NORFLG
                ;                       UPDATE NORFLG.LATDSB
0602 A6           ANA  M                NORFLG = NORFLG .AND. LATMSK
0603 77           MOV  M,A
0604 3A 33 74     LDA  NVMCTL/2+X       IF NVMCTL[0] .NE. HEXF
0607 B7           ORA  A
0608 FA 27 06     JM   ENABL4
                ;                         A BLOCK IS OPEN
060B CD 4E 0F     CALL LSTATE             LSTATE(FATMOD,NORMOD,SERMOD,PRVMOD)
                ;                               (PSW:S ,PSW:Z ,PSW:P ,PSW:CY)
                ;                               ( 0    , 0    , 0    , 0    )
060E C2 27 06     JNZ  ENABL3             IF NORMOD .EQ. TRUE
0611 11 24 74     LXI  D,MRSTS1/2+X         DE = ADDRESS, MRSTS1
0614 1A           LDAX D
0615 E6 EC        ANI  0ECH
0617 47           MOV  B,A                  B = FLAGS = MRSTS1.UNKSEL,
                ;                                       MRSTS1.DATDOR,
                ;                                       MRSTS1.INSFND,
                ;                                       MRSTS1.ENABLD
0618 7E           MOV  A,M
0619 E6 03        ANI  3
061B B0           ORA  B                    A = FLAGS = FLAGS .OR.
                ;                                       NORFLG.UNVSEL,
                ;                                       NORFLG.LATDSB
061C C2 27 06     JNZ  ENABL2               IF FLAGS .EQ. FALSE
061F 7E           MOV  A,M                    NORFLG.QUESTS = TRUE
0620 F6 80        ORI  80H
0622 77           MOV  M,A
0623 1A           LDAX D                      MRSTS1.ENABLD = TRUE
0624 F6 04        ORI  4
0626 12           STAX D
                ENABL2;                     ENDIF
                ENABL3;                   ENDIF
                ENABL4;                 ENDIF
0627 E1           POP  H                RESTORE HL
0628 D1           POP  D                RESTORE DE
0629 C1           POP  B                RESTORE BC
062A F1           POP  PSW              RESTORE A, PSW
062B C9           RET                   RETURN
                ;CONFIG(ERRFLG)(MTRCHR,XMTBUF)
                ;      (BIT   )(BYTE  ,BYTSTR)
                ;      ( 0    )( I    , 0    )
                ;      (PSW:S )( RAM  , RAM  )
                ;      ( C    )( NC   , C    )
                ;
                ;REGISTERS DESTROYED
                ;PSW DESTROYED
                ;
                ;PUT METER CONFIGURATION MESSAGE IN TRANSMIT BUFFER
                ;
                CONFIG;                 ****ENTRY POINT
```

```
062C 21 50 74   LXI  H,XMTBUF/2+X  HL = ADDRESS, XMTBUF[0]
               ;                   DEFINE MESSAGE LENGTH
062F 36 02      MVI  M,2           XMTBUF[0] = 2
               ;                   DEFINE MESSAGE HEADER
0631 23         INX  H             HL = ADDRESS, XMTBUF[1]
0632 36 AB      MVI  M,HCONFG      XMTBUF[1] = HCONFG
               ;                   DEFINE ERROR FLAG
0634 2C         INR  L             HL = ADDRESS, XMTBUF[2]
               ;                   PSW:Z = ERRFLG = FALSE
               ;                   DEFINE METER CHARACTERISTICS
0635 3A 23 74   LDA  MTRCHR/2+X    XMTBUF[2] = MTRCHR
0638 77         MOV  M,A
0639 C9         RET                RETURN
               ;CONSUM(ERRFLG)(CTLCRC)
               ;     (BIT   )(BYTE  )
               ;     ( 0    )( I    )
               ;     (PSW:Z )( RAM  )
               ;     ( C    )( NC   )
               ;
               ;REGISTERS DESTROYED
               ;PSW DESTROYED
               ;
               ;CHECK CONTROL SUM CRC AGAINST EXPECTED CRC
               ;
               CONSUM;             ****ENTRY POINT
               ;                   CALCULATE CONTROL SUM CRC
063A CD 4E 06   CALL CTLSUM        CTLSUM(CSMCRC,ERRFLG)
               ;                         ( D    ,PSW:Z )
               ;                         ( 0    , 0    )
063D CA 47 06   JZ   CONSU1        IF ERRFLG .EQ. TRUE
               ; >>JUMP AHEAD<<      DECLARE DEAD METER. BAD CRC
               ;                     A = BADCRC
               ;                     NVMDED(BADCRC,ERRFLG)
               ;                           ( A    ,PSW:Z )
               ;                           ( I    , 0    )
               ;                   ELSE
0640 3A 08 74   LDA  CTLCRC/2+X    A = DIF = CTLCRC-CSMCRC
0643 92         SUB  D
0644 CA 4C 06   JZ   CONSU2        IF DIF .NE. 0
               CONSU1;               >>TARGET OF JUMP AHEAD<<
               ;                     DECLARE DEAD METER. BAD CRC
0647 3E 00      MVI  A,BADCRC        A = BADCRC
0649 C3 85 10   JMP  NVMDED          NVMDED(BADCRC,ERRFLG)
               ;                           ( A    ,PSW:Z )
               ;                           ( I    , 0    )
               CONSU2;             ELSE
064C 3C         INR  A               PSW:Z = ERRFLG = FALSE
               ;                   ENDIF
064D C9         RET                RETURN
               ;CTLSUM(CSMCRC,ERRFLG)(ASCREG,DSCREG,WORK1 )
               ;     (BYTE  ,BIT   )(NIBSTR,NIBSTR,NIBSTR)
               ;     ( 0    , 0    )( I    , I    , 0    )
               ;     ( D    ,PSW:Z )( RAM  , RAM  , RAM  )
               ;     ( C    , C    )( NC   , NC   , C    )
               ;
               ;REGISTERS DESTROYED
               ;PSW DESTROYED
               ;
               ;CALCULATE CONTROL SUM AND ITS CRC FOR THE CURRENT VALUES
               ;OF THE ASCENDING AND DESCENDING REGISTERS
               ;
               CTLSUM;             ****ENTRY POINT
               ;                   COPY ASCENDING REGISTER INTO WORK AREA
064E 01 C9 3F   LXI  B,(ASCREG+ASCSIZ-1)*100H+(WORK1+9)
               ;                   B = OFFSET, ASCREG[I=ASCSIZ-1]
               ;                   C = OFFSET, WORK1[J=10-1]
0651 3E 08      MVI  A,ASCSIZ      A = ASCSIZ
```

```
0653 CD C2 0F   CALL MVRNIB       MVRNIB(WORK1[J],ASCREG[I],ASCSIZ,
               ;                        ( @C      , @B       , A     ,
               ;                        ( 0       , I        , I     ,
               ;
               ;                        NONBCD,ZROFLG)
               ;                        PSW:S ,PSW:Z )
               ;                         0    , 0    )
0656 F2 5B 06   JP   CTLSU1       IF NONBCD .EQ. TRUE
0659 AF         XRA  A              PSW:Z = ERRFLG = TRUE
065A C9         RET
               CTLSU1;            ELSE
065B 3A 17 74   LDA  DSCREG/2+X   IF DSCREG[0..1] .EQ. HEXFF
065E FE FF      CPI  0FFH           PSW:Z = ERRFLG = TRUE
0660 C8         RZ
               ;                  ELSE
               ;                    CALCULATE CONTROL SUM IN WORK AREA
0661 06 35      MVI  B,DSCREG+DSCSIZ-1
               ;                    B = OFFSET, DSCREG[K=DSCSIZ-1]
0663 11 08 07   LXI  D,DSCSIZ*100H+ASCSIZ
               ;                    D = DSCSIZ
               ;                    E = ASCSIZ
0666 CD F8 06   CALL DECADD         DECADD(WORK1[J],DSCREG[K],
               ;                          ( 0       , I        ,
               ;                          ( @C      , @B       ,
               ;
               ;                          ASCSIZ,DSCSIZ,OVRFLO)
               ;                           I    , I    , 0    )
               ;                           E    , D    ,PSW:CY)
               ;                    CALCULATE CRC FOR CONTROL SUM
0669 01 C2 08   LXI  B,(ASCSIZ)*100H+(WORK1+10-ASCSIZ)
               ;                    B = ASCSIZ
               ;                    C = OFFSET, WORK1[L=10-ASCSIZ]
066C CD B1 0E   CALL CRC            CRC(WORK1[L],ASCSIZ,CSMCRC)
               ;                       ( I      , I     , 0    )
               ;                       ( @C     , B     , D    )
066F 04         INR  B              PSW:Z = ERRFLG = FALSE
               ;                  ENDIF
0670 C9         RET               RETURN
               ;DBLHDR(HEADER,ERRFLG)(LOWWRN,SERNUM,ERRST ,SETLIM,ASCREG,
               ;      (BYTE  ,BIT   )(NIBSTR,NIBSTR,NIBSTR,NIBSTR,NIBSTR,
               ;      ( I    , 0    )( I    , I    , I    , I    , I    ,
               ;      ( A    ,PSW:Z )( RAM  , RAM  , RAM  , RAM  , RAM  ,
               ;      ( NC   , C    )( NC   , NC   , NC   , NC   , NC   ,
               ;
               ;      DSCREG,WORK1 ,PCEREG,MRSTS1)
               ;      NIBSTR,NIBSTR,NIBSTR,BITSTR)
               ;       I    , I    , I    , 0    )
               ;       RAM  , RAM  , RAM  , RAM  )
               ;       NC   , NC   , NC   , C    )
               ;
               ;REGISTERS DESTROYED
               ;PSW DESTROYED
               ;
               ;PROCESS DOUBLY DEFINED HEADERS
               ;
               DBLHDR;            ****ENTRY POINT
0671 CD 4E 0F   CALL LSTATE       LSTATE(FATMOD,NORMOD,SERMOD,PRVMOD)
               ;                        (PSW:S ,PSW:Z ,PSW:P ,PSW:CY)
               ;                        ( 0    , 0    , 0    , 0    )
0674 21 E2 06   LXI  H,DBLH04     SET TO RETURN TO ENDCASE
0677 E5         PUSH H
0678 E2 A6 06   JPO  DBLH02       IF SERMOD .EQ. TRUE
               ;                  --CASE (HEADER)
067B FE 52      CPI  HREQDL         **52: DOLLAR LOCK VALUE REQUEST
067D 11 E3 06   LXI  D,DBLH05+0
0680 CA 5B 0D   JZ   VALREQ         VALREQ(UNLOCK,LOKFMT,HDLOCK,ERRFLG)
               ;                          (@@DE+0,@DE+1 ,@DE+2 ,PSW:Z )
```

```
                ;                      ( I    , I    , I    , 0    )
0683 FE 53        CPI  HREQLP       **53: LOW POSTAGE WARNING VALUE REQ
0685 01 8B 1C     LXI  B,LOWWRN*100H+HLOPOS
0688 CA 34 0D     JZ   SRVREQ       SRVREQ(LOWWRN,HLOPOS,ERRFLG)
                ;                      ( @B   , C    ,PSW:Z )
                ;                      ( I    , I    , 0    )
068B FE 54        CPI  HREQMN       **54: METER SERIAL NUMBER REQUEST
                DBLH01;             ****ALTERNATE ENTRY POINT
068D 11 E6 06     LXI  D,DBLH05+3
0690 CA 5B 0D     JZ   VALREQ       VALREQ(SERNUM,MSNFMT,HMTRNO,ERRFLG)
                ;                      (@@DE+0,@DE+1 ,@DE+2 ,PSW:Z )
                ;                      ( I    , I    , I    , 0    )
0693 FE 55        CPI  HREQDS       **55: DIAGNOSTIC REQUEST
0695 11 E9 06     LXI  D,DBLH05+6
0698 CA 5B 0D     JZ   VALREQ       VALREQ(ERRST ,DIAFMT,HDIAGS,ERRFLG)
                ;                      (@@DE+0,@DE+1 ,@DE+2 ,PSW:Z )
                ;                      ( I    , I    , I    , 0    )
069B FE 56        CPI  HREQSL       **56: SETTING LIMIT VALUE REQUEST
069D 01 8E 1E     LXI  B,SETLIM*100H+HHSLIM
06A0 CA 34 0D     JZ   SRVREQ       SRVREQ(SETLIM,HHSLIM,ERRFLG)
                ;                      ( @B   , C    ,PSW:Z )
                ;                      ( I    , I    , 0    )
                ;                   **ELSE: PROCESS ERROR
06A3 C3 A1 0B     JMP  PROERR       PROERR(ERRFLG)
                ;                      (PSW:Z )
                ;                      ( 0    )
                ;                 --ENDCASE
                DBLH02;           ELSE
                ;                 --CASE (HEADER)
06A6 FE 52        CPI  HREQAR       **52: ASCENDING REGISTER REQUEST
06A8 11 EC 06     LXI D,DBLH05+9
06AB CA 5B 0D     JZ   VALREQ       VALREQ(ASCREG,ASCFMT,HAREG ,ERRFLG)
                ;                      (@@DE+0,@DE+1 ,@DE+2 ,PSW:Z )
                ;                      ( I    , I    , I    , 0    )
06AE FE 53        CPI  HREQDR       **53: DESCENDING REGISTER REQUEST
06B0 11 EF 06     LXI  D,DBLH05+12
06B3 CA 5B 0D     JZ   VALREQ       VALREQ(DSCREG,DSCFMT,HDREG ,ERRFLG)
                ;                      (@@DE+0,@DE+1 ,@DE+2 ,PSW:Z )
                ;                      ( I    , I    , I    , 0    )
06B6 FE 54        CPI  HREQCS       **54: CONTROL SUM REQUEST
06B8 C2 C5 06     JNZ  DBLH03
06BB CD 3A 06     CALL CONSUM       CONSUM(ERRFLG)
                ;                      (PSW:Z )
                ;                      ( 0    )
06BE 11 F2 06     LXI  D,DBLH05+15
                ;                   IF ERRFLG .EQ. FALSE
                ;                     I = 10-ASCSIZ
06C1 C4 5B 0D     CNZ  VALREQ         VALREQ(WORK1[I],CSMFMT,HCSUM,ERRFLG)
                ;                        (@@DE+0  ,@DE+1 ,@DE+2,PSW:Z )
                ;                        ( I      , I    , I   , 0    )
                ;                   ENDIF
06C4 C9           RET
                DBLH03;
06C5 FE 55        CPI  HREQPC       **55: PIECE COUNT REQUEST
06C7 11 F5 06     LXI  D,DBLH05+18
06CA CA 5B 0D     JZ   VALREQ       VALREQ(PCEREG,PCEFMT,HPCNT ,ERRFLG)
                ;                      (@@DE+0,@DE+1 ,@DE+2 ,PSW:Z )
                ;                      ( I    , I    , I    , 0    )
06CD FE 5B        CPI  HREQCF       **5B: CONFIGURATION DATA REQUEST
06CF CA 2C 06     JZ   CONFIG       CONFIG(ERRFLG)
                ;                      (PSW:Z )
                ;                      ( 0    )
06D2 FE C4        CPI  HSETDA       **C4: RESET DATER DOOR
06D4 C2 A1 0B     JNZ  PROERR
06D7 21 24 74     LXI  H,MRSTS1/2+X HL = ADDRESS, MRSTS1
06DA 7E           MOV  A,M          MRSTS1.DATDOR = FALSE
06DB E6 BF        ANI  0BFH
```

```
06DD 77          MOV  M,A
06DE 24          INR  H              PSW:Z = ERRFLG = FALSE
06DF C3 48 0C    JMP  SELVAL         DISPLAY SELECTION VALUE
                ;                    **ELSE: PROCESS ERROR
                ;                    PROERR(ERRFLG)
                ;                         (PSW:Z )
                ;                         ( 0    )
                DBLH04;             --ENDCASE
                ;                   ENDIF
06E2 C9          RET                RETURN
                DBLH05;             ARGUMENTS FOR VALREQ
06E3 18 40 8A    DB   UNLOCK,LOKFMT,HDLOCK          ;+0
06E6 21 7F 8C    DB   SERNUM,MSNFMT,HMTRNO          ;+3
06E9 13 5F 8D    DB   ERRST,DIAFMT,HDIAGS           ;+6
06EC 38 80 82    DB   ASCREG,ASCFMT,HAREG           ;+9
06EF 2F 70 83    DB   DSCREG,DSCFMT,HDREG           ;+12
06F2 C2 80 84    DB   WORK1+10-ASCSIZ,CSMFMT,HCSUM  ;+15
06F5 28 7F 85    DB   PCEREG,PCEFMT,HPCNT           ;+18
                ;DECADD(V1[V1DGTS-1],V2[V2DGTS-1],V1DGTS,V2DGTS,OVRFLO)
                ;       (NIBSTR      ,NIBSTR      ,BYTE  ,BYTE  , BIT  )
                ;       ( I/O        , I          , I    , I    , 0    )
                ;       ( @C         , @B         , E    , D    ,PSW:CY)
                ;       ( C          , NC         , C    , C    , C    )
                ;
                ;PSW DESTROYED
                ;REGISTERS DESTROYED
                ;
                ;BCD ADDITION OF UNSIGNED BCD VALUE STRINGS
                ;V1[0..V1DGTS-1] = V1[0..V1DGTS-1] + V2[0..V2DGTS-1]
                ;WHERE V1DGTS .GE. V2DGTS
                ;
                DECADD;             ****ENTRY POINT
                ;                   C  OFFSET, V1[I=V1DGTS-1]
                ;                   B  OFFSET, V2[J=V2DGTS-1]
06F8 7B          MOV  A,E           IF V1DGTS .LT. V2DGTS
06F9 BA          CMP  D
06FA DA 20 07    JC   DECERR          DECLARE BAD ARGUMENT
                ;                     ENTER FATAL ERROR MODE
                ;                   ENDIF
06FD AF          XRA  A             PSW:CY = CARRY = FALSE
                DECAD1;             DO WHILE V1DGTS .GE. 0
06FE 1D          DCR  E               E = V1DGTS = V1DGTS-1
06FF F8          RM
0700 CD 0C 07    CALL DECCOM          DECCOM(V1[I],V2[J],V1DGTS,V2DGTS,
                ;                            ( @C  , @B  , E    , D    ,
                ;                            ( I   , I/O , -    , I/O  ,
                ;
                ;                            VAL1,VAL2)
                ;                             L   , A  )
                ;                             0   , 0  )
                ;                     L[0..1] = VAL1 = HEX90 .OR. V1[I]
                ;                     A[0..1] = VAL2 = V2[J]
                ;                     B = OFFSET, V2[J=J-1]
                ;                     D = V2DGTS = V2DGTS-1
0703 8D          ADC  L               A[1] = VAL1 = VAL1+VAL2+CARRY
0704 27          DAA
                ;                     PSW:CY = CARRY
0705 CD EE 0F    CALL PUTNIB          PUTNIB(V1[I],VAL1)
                ;                            ( @C  ,A[1])
                ;                            ( 0   , I  )
0708 0D          DCR  C               C = OFFSET, V1[I=I-1]
0709 C3 FE 06    JMP  DECAD1
                ;                   ENDDO
                ;                   RETURN
                ;DECCOM(V1[I] ,V2[J] ,V1DGTS,V2DGTS,VAL1,VAL2)
                ;       (NIBBLE,NIBBLE,BYTE  ,BYTE  ,BYTE,BYTE)
                ;       ( I    , I/O  , -    , I/O  , 0  , 0  )
```

```
                 ;       ( @C    , @B    , E     , D     , L   , A  )
                 ;       ( NC    , C     , NC    , C     , C   , C  )
                 ;
                 ;PSW:CY = NO CHANGE
                 ;PSW:S, Z, P CHANGED
                 ;REGISTERS DESTROYED
                 ;
                 ;COMMON ROUTINE CALLED BY DECADD AND DECSUB
                 ;FETCHES NEXT PAIR OF OPERANDS
                 ;VAL1 = HEX90 .OR. V1[I]
                 ;VAL2 = V2[J]
                 ;J AND V2DGTS WILL BE DECREMENTED
                 ;
                 DECCOM;               ****ENTRY POINT
070C F5            PUSH PSW            SAVE PSW:CY
070D 60            MOV  H,B            H = OFFSET, V2[J]
070E 41            MOV  B,C            B = OFFSET, V1[I]
070F CD 35 0F      CALL GETNIB         GETNIB(VAL1,ZROFLG,V1[I])
                 ;                           ( A  ,PSW:Z , @B  )
                 ;                           ( 0  , 0    , I   )
0712 F6 90         ORI  90H            L[0..1] = VAL1 = HEX90 .OR. VAL1
0714 6F            MOV  L,A
0715 44            MOV  B,H            B = OFFSET, V2[J]
0716 F1            POP  PSW            RESTORE PSW:CY
0717 3E 00         MVI  A,0            A[0..1] = VAL2 = 0
0719 15            DCR  D              D = V2DGTS = V2DGTS-1
071A F8            RM                  IF V2DGTS .GE. 0
071B CD 35 0F      CALL GETNIB           GETNIB(VAL2    ,ZROFLG,V2[J])
                 ;                             (A[0..1],PSW:Z , @B  )
                 ;                             ( 0      , 0    , I   )
071E 05            DCR  B                B = OFFSET, V2[J=J-1]
                 ;                     ENDIF
071F C9            RET                 RETURN
                 ;DECERR()
                 ;
                 ;PSW DESTROYED
                 ;ALL REGISTERS DESTROYED
                 ;
                 ;ERROR ROUTINE CALLED BY DECADD AND DECSUB
                 ;
                 DECERR;               ****ENTRY POINT
0720 3E 02         MVI  A,SFTWRE       A = SFTWRE
0722 CD 80 08      CALL FATERR         ENTER FATAL MODE. SOFTWARE ERROR
0725 CD 68 10      CALL NVMCHG         SAVE NONVOLATILE MEMORY
0728 C3 B6 01      JMP  PWRDN          FREEZE UNTIL NEXT POWER UP
                 ;DECSUB(V1[V1DIGS-1],V2[V2DGTS-1],V1DGTS,V2DGTS)
                 ;       (NIBSTR      ,NIBSTR      ,BYTE  ,BYTE  )
                 ;       ( I/O        , I          , I    , I    )
                 ;       ( @C         , @B         , E    , D    )
                 ;       ( C          , NC         , C    , C    )
                 ;
                 ;PSW DESTROYED
                 ;REGISTERS DESTROYED
                 ;
                 ;BCD SUBTRACTION OF UNSIGNED BCD VALUE STRINGS
                 ;V1[0..V1DGTS-1] = V1[0..V1DGTS-1] - V2[0..V2DGTS-1]
                 ;WHERE V1DGTS .GE. V2DGTS
                 ;
                 DECSUB;               ****ENTRY POINT
                 ;                     C = OFFSET, V1[I=V1DGTS-1]
                 ;                     B = OFFSET, V2[J=V2DGTS-1]
072B 7B            MOV  A,E            IF V1DGTS .LT. V2DGTS
072C BA            CMP  D
072D DA 20 07      JC   DECERR           DECLARE BAD ARGUEMENT
                 ;                       ENTER FATAL ERROR MODE
                 ;                     ENDIF
0730 AF            XRA  A              PSW:CY = BORROW = FALSE
```

```
                    DECSU1;                 DO WHILE V1DGTS .GE. 0
     0731 1D         DCR  E                   E = V1DGTS = V1DGTS-1
     0732 F8         RM
     0733 CD 0C 07   CALL DECCOM              DECCOM(V1[I],V2[J],V1DGTS,V2DGTS,
                    ;                                ( @C  , @B  , E    , D    ,
                    ;                                ( I   , I/O , -    , I/O  ,
                    ;
                    ;                                VAL1,VAL2)
                    ;                                 L   , A  )
                    ;                                 O   , O  )
                    ;                         L[0..1] = VAL1 = HEX90 .OR. V1[I]
                    ;                         A[0..1] = VAL2 = V2[J]
                    ;                         B = OFFSET, V2[J=J-1]
                    ;                         D = V2DGTS = V2DGTS-1
     0736 CE F6      ACI  -10                 A[1] = VAL1-VAL2-BORROW
     0738 2F         CMA
     0739 3C         INR  A
     073A 85         ADD  L
     073B 27         DAA
     073C 3F         CMC                      PSW:CY = BORROW
     073D CD EE 0F   CALL PUTNIB              PUTNIB(V1[I],VAL1)
                    ;                                ( @C  , A  )
                    ;                                ( O   , I  )
     0740 0D         DCR  C                   C = OFFSET, V1[I=I-1]
     0741 C3 31 07   JMP  DECSU1
                    ;                       ENDDO
                    ;                       RETURN
                    ;DOACCT()(POSREG,ASCCRC,ASCREG,DSCCRC,DSCREG,PCEREG,WORK1 )
                    ;        (NIBSTR,BYTE  ,NIBSTR,BYTE  ,NIBSTR,NIBSTR,NIBSTR)
                    ;        ( I    , O    , I/O  , O    , I/O  , I/O  , O    )
                    ;        ( RAM  , RAM  , RAM  , RAM  , RAM  , RAM  , RAM  )
                    ;        ( NC   , C    , C    , C    , C    , C    , C    )
                    ;
                    ;PSW DESTROYED
                    ;REGISTERS DESTROYED
                    ;
                    ;DO ACCOUNTING FOR METER TRIP
                    ;
                    DOACCT;                 ****ENTRY POINT
                    ;                       ADD POSTAGE TO ASCENDING REGISTER
     0744 11 08 04   LXI  D,NBANKS*100H+ASCSIZ
                    ;                       D = NBANKS
                    ;                       E = ASCSIZ
     0747 01 3F 45   LXI  B,(POSREG+NBANKS-1)*100H+(ASCREG+ASCSIZ-1)
                    ;                       B = OFFSET, POSREG[I=NBANKS-1]
                    ;                       C = OFFSET, ASCREG[J=ASCSIZ-1]
     074A CD F8 06   CALL DECADD            DECADD(ASCREG[J],POSREG[I],
                    ;                             ( @C     , @B      ,
                    ;                             ( I/O    , I       ,
                    ;
                    ;                             ASCSIZ,NBANKS)
                    ;                              E    , D    )
                    ;                              I    , I    )
                    ;                       COMPUTE CRC FOR ASCENDING REGISTER
     074D 01 38 08   LXI  B,ASCSIZ*100H+ASCREG
                    ;                       B = ASCSIZ
                    ;                       C = OFFSET, ASCREG
     0750 CD B1 0E   CALL CRC               CRC(ASCREG,ASCSIZ,CRCVAL)
                    ;                          ( @C    , B    , D    )
                    ;                          ( I     , I    , O    )
     0753 7A         MOV  A,D               ASCCRC = CRCVAL
     0754 32 20 74   STA  ASCCRC/2+X
                    ;                       SUBTRACT POSTAGE FROM DESCENDING REG
     0757 11 07 04   LXI  D,NBANKS*100H+DSCSIZ
                    ;                       D = NBANKS
                    ;                       E = DSCSIZ
     075A 01 35 45   LXI  B,(POSREG+NBANKS-1)*100H+(DSCREG+DSCSIZ-1)
```

```
                  ;                    B = OFFSET, POSREG[I=NBANKS-1]
                  ;                    C = OFFSET, DSCREG[J=DSCSIZ-1]
0750 CD 2B 07      CALL DECSUB         DECSUB(DESCREG[J],POSREG[I],
                  ;                           ( @C       , @B       ,
                  ;                           ( I/O      , I        ,
                  ;
                  ;                           DSCSIZ,NBANKS)
                  ;                            E    , D    )
                  ;                            I    , I    )
                  ;                    COMPUTE CRC FOR DESCENDING REGISTER
0760 01 2F 07      LXI  B,DSCSIZ*100H+DSCREG
                  ;                    B = DSCSIZ
                  ;                    C = OFFSET,DSCREG
0763 CD B1 0E      CALL CRC            CRC(DSCREG,DSCSIZ,CRCVAL)
                  ;                       ( @C    , B     , D     )
                  ;                       ( I     , I     , O     )
0766 7A            MOV  A,D            DSCCRC = CRCVAL
0767 32 1B 74      STA  DSCCRC/2+X
                  ;                    INCREMENT THE PIECE COUNT
076A 3E 10         MVI  A,10H          WORK1[0] = 1
076C 32 60 74      STA  WORK1/2+X
076F 11 07 01      LXI  D,1*100H+PCESIZ
                  ;                    D = ONESIZ = 1
                  ;                    E = PCESIZ
0772 01 2E C0      LXI  B,(WORK1+1-1)*100H+(PCEREG+PCESIZ-1)
                  ;                    B = OFFSET, WORK1[I=ONESIZ-1]
                  ;                    C = OFFSET, PCEREG[J=PCESIZ-1]
0775 C3 F8 06      JMP  DECADD         DECADD(PCEREG[J],WORK1[I],
                  ;                           ( @C       , @B       ,
                  ;                           ( I/O      , I        ,
                  ;
                  ;                           PCESIZ,ONESIZ)
                  ;                            E    , D    )
                  ;                            I    , I    )
                  ;                    RETURN
                  ;DOSTAT()(MRSTS1,MRSTS2,NORFLG)
                  ;        (BITSTR,BITSTR,BITSTR)
                  ;        ( I    , I/O  , I/O  )
                  ;        ( RAM  , RAM  , RAM  )
                  ;        ( NC   , C    , C    )
                  ;
                  ;REGISTERS DESTROYED
                  ;PSW DESTROYED
                  ;
                  ;UPDATE METER STATUS TO AGREE WITH SWITCHES AND SENSORS
                  ;
                  DOSTAT;              ****ENTRY POINT
                  ;                    FETCH PRESENT SWITCH VALUES
0778 CD 31 0C      CALL REDSTS         REDSTS(TRPSW,PRVSW)
                  ;                           ( B    , A    )
                  ;                           ( O    , O    )
077B E6 01         ANI  1              C = PRVSW = PRVSW .AND. HEX01
077D 4F            MOV  C,A
077E 78            MOV  A,B            B = TRPSW = TRPSW .AND. HEX08
077F E6 08         ANI  8
0781 47            MOV  B,A
0782 81            ADD  C              C = NEWSWS = PRVSW + TRPSW
0783 4F            MOV  C,A
0784 21 25 74      LXI  H,MRSTS2/2+X   HL = ADDRESS, MRSTS2
                  ;                    SAVE ENTRY STATUS
0787 7E            MOV  A,M            A = MRSTS2
0788 57            MOV  D,A            D = OLDST2 = MRSTS2
                  ;                    UPDATE STATUS
                  ;                    MRSTS2.TRPSW = TRPSW
                  ;                    MRSTS2.PRVMOD = PRVSW
0789 E6 F6         ANI  0F6H           MRSTS2 = MRSTS2.AND.HEXF6.OR.NEWSWS
078B B1            ORA  C
```

```
078C 77         MOV  M,A
               ;                    CHECK METER STATUS
078D CD 4E 0F   CALL LSTATE         LSTATE(FATMOD,NORMOD,SERMOD,PRVMOD)
               ;                          (PSW:S ,PSW:Z ,PSW:P ,PSW:CY)
               ;                          ( 0    , 0    , 0    , 0    )
0790 F8         RM                  IF FATMOD .EQ. FALSE
               ;                      READ CYCLE SWITCH
0791 CD AF 0B   CALL RDCYC            RDCYC(INCYC,INCYC,ADRESS,MRSTS1)
               ;                            ( A    ,PSW:C, HL   , @HL  )
               ;                            ( 0    , 0   , 0    , -    )
0794 3E 04      MVI  A,BADCYC         A = BADCYC
               ;                      IF INCYC .EQ. TRUE
               ;                        CYCLE SWITCH SAYS METER NOT HOME
               ;                        DECLARE DEAD METER, BAD SWITCH
0796 DA 85 10   JC   NVMDED             NVMDED(BADCYC,ERRFLG)
               ;                               ( A    ,PSW:Z )
               ;                               ( I    , 0    )
               ;                      ELSE
               ;                        CALC SEQ SWITCH CLOSURE VALUE
0799 7A         MOV  A,D
079A A0         ANA  B
079B A8         XRA  B
079C 4F         MOV  C,A                C = CLOSUR = OLDST2.TRPSW .AND.
               ;                                     TRPSW .XOR. TRPSW
               ;                        DEFINE TRIP REQUEST VALUE
079D 7E         MOV  A,M                A=TRPREQ=MRSTS1.ENABLD.AND.CLOSUR
079E 17         RAL
079F A1         ANA  C
               ;                        UPDATE TRIP REQUEST STATUS
               ;                        NORFLG.TRPREQ = TRPREQ
07A0 23         INX  H                  HL = ADDRESS, NORFLG
07A1 23         INX  H
07A2 B6         ORA  M                  NORFLG = TRPREQ .OR. NORFLG
07A3 77         MOV  M,A
               ;                      ENDIF
               ;                    ENDIF
07A4 C9         RET                 RETURN
               ;DOTRIP()(MRSTS1,NORFLG,PORTA )
               ;         (BITSTR,BITSTR,BITSTR)
               ;         ( 0    , 0    , 0    )
               ;         ( RAM  , RAM  , 7001 )
               ;         ( C    , C    , C    )
               ;
               ;REGISTERS DESTROYED
               ;PSW DESTROYED
               ;
               ;TRIP METER
               ;
               DOTRIP;              ****ENTRY POINT
07A5 CD DE 0E   CALL DBLANK         TURN OFF DISPLAY
               ;                    CHECK CYCLE SWITCH WHILE METER HOME
07A8 CD AF 0B   CALL RDCYC          RDCYC(INCYC,INCYC,ADRESS,MRSTS1)
               ;                          ( A    ,PSW:C, HL   , @HL  )
               ;                          ( 0    , 0   , 0    , -    )
07AB 3E 04      MVI  A,BADCYC       A = BADCYC
               ;                    IF INCYC .EQ. TRUE
               ;                      CYCLE SWITCH SAYS METER NOT HOME
               ;                      DECLARE DEAD METER, BAD SWITCH
07AD DA 85 10   JC   NVMDED           NVMDED(BADCYC,ERRFLG)
               ;                             ( A    ,PSW:Z )
               ;                             ( I    , 0    )
               ;                    ELSE
               ;                      CYCLE SWITCH SAYS METER IS HOME
               ;                      INDICATE TRIP HAS STARTED
07B0 7E         MOV  A,M              A = MRSTS1
07B1 F6 81      ORI  81H              MRSTS1.UNKSEL = TRUE
               ;                      MRSTS1.QUEREG = TRUE
```

```
07B3 77            MOV  M,A
07B4 23            INX  H                HL = ADDRESS, NORFLG
07B5 23            INX  H
07B6 7E            MOV  A,M              NORFLG.TRPREQ = FALSE
07B7 E6 F7         ANI  0F7H
07B9 F6 40         ORI  40H              NORFLG.QUEPOS = TRUE
07BB 77            MOV  M,A
                  ;                      TRIP METER
07BC CD 7C 18      CALL MVTRIP           MVTRIP(ERROR)
                  ;                            ( A    )
                  ;                            ( 0    )
07BF B7            ORA  A                IF ERROR .NE. 0
                  ;                        DECLARE TRIP ERROR
07C0 C2 80 08      JNZ  FATERR             FATERR(ERROR,ERRFLG)
                  ;                              ( A    ,PSW:Z )
                  ;                              ( I    , 0    )
                  ;                      ELSE
                  ;                        TRIP STARTED OK
                  ;                        START AC MOTOR TO CONTINUE CYCLE
07C3 21 01 70      LXI  H,PORTA            HL = ADDRESS, PORTA
07C6 7E            MOV  A,M                PORTA = PORTA .AND. HEXEF
07C7 E6 EF         ANI  0EFH
07C9 77            MOV  M,A
07CA F3            DI                      DISABLE INTERRUPT
07CB CD 44 07      CALL DOACCT             ACCOUNT FOR TRIP
                  ;                        PREVENT DOUBLE ACCOUNTING
07CE 21 24 74      LXI  H,MRSTS1/2+X       HL = ADDRESS, MRSTS1
07D1 7E            MOV  A,M                MRSTS1.INCYC = TRUE
07D2 F6 02         ORI  2
07D4 77            MOV  M,A
07D5 FB            EI                      ENABLE INTERRUPT
                  ;                        CHECK CYCLE SWITCH WHILE NOT HOME
07D6 01 B8 0B      LXI  B,3000             BC = N = 3000 ;FOR 300 MSEC LOOP
                  DOTR01;                  LOOP
07D9 CD AF 0B      CALL RDCYC                RDCYC(INCYC,INCYC,ADRESS,MRSTS1)
                  ;                                ( A    ,PSW:C, HL    , @HL   )
                  ;                                ( 0    , 0    , 0    , -     )
                  ;                          IF INCYC .EQ. TRUE
07DC DA ED 07      JC   DOTR02                 BREAK
                  ;                          ENDIF
07DF CD 19 0B      CALL NPAUSE               NPAUSE(N   ,ZROFLG)
                  ;                                (BC  ,PSW:Z )
                  ;                                (I/O, 0     )
07E2 C2 D9 07      JNZ  DOTR01               IF N .EQ. 0
                  ;                            TIMEOUT
                  ;                            CYC SWT SAYS MOTOR STILL HOME
                  ;                            FATAL ERROR, NOT IN CYCLE
07E5 3E 18         MVI  A,NINCYC               A = NINCYC
07E7 CD 80 08      CALL FATERR                 FATERR(NINCYC,ERRFLG)
                  ;                                  ( A     ,PSW:Z )
                  ;                                  ( I     , 0    )
07EA C3 A0 08      JMP  FINTRP                 TRY TO DRIVE METER HOME
                  ;                            RETURN
                  ;                          ENDIF
                  DOTR02;                  ENDLOOP
                  ;                        CYCLE SWITCH SAYS CYCLE STARTED
                  ;                        MOVE FROM TRIP TO LOCK
07ED CD 96 18      CALL MVLOCK             MVLOCK(ERROR)
                  ;                              ( A    )
                  ;                              ( 0    )
07F0 B7            ORA  A                  IF ERROR .NE. 0
                  ;                          DECLARE LOCK ERROR
07F1 C4 80 08      CNZ  FATERR               FATERR(ERROR,ERRFLG)
                  ;                                ( A    ,PSW:Z )
                  ;                                ( I    , 0    )
                  ;                        ENDIF
                  ;                        CHECK CYCLE SWITCH WHEN HOME AGAIN
```

```
07F4 01 10 27   LXI  B,10000          BC = N = 10000 ;FOR 1 SEC LOOP
               DOTR03;                LOOP
07F7 CD AF 0B   CALL RDCYC              RDCYC(INCYC,INCYC,ADRESS,MRSTS1)
               ;                             ( A    ,PSW:C, HL    , @HL  )
               ;                             ( 0    , 0   , 0     , -    )
               ;                        IF INCYC .EQ. FALSE
07FA D2 0D 08   JNC  DOTR04               BREAK
               ;                        ENDIF
07FD CD 19 0B   CALL NPAUSE             NPAUSE(N  ,ZROFLG)
               ;                              (BC ,PSW:Z )
               ;                              (I/O, 0    )
0800 C2 F7 07   JNZ  DOTR03             IF N .EQ. 0
               ;                          TIMEOUT
               ;                          CYC SWT SAYS MOTOR NOT HOME
0803 E5         PUSH H                    SAVE HL
0804 CD D0 08   CALL FINTR4               FATAL ERROR, SLOW TRIP
0807 E1         POP  H                    RESTORE HL
0808 3E FB      MVI  A,0FBH               A = MASK, WILL SET:
               ;                          MRSTS1.ENABLD = FALSE
080A C3 0F 08   JMP  DOTR05               DISABLE METER
               ; >>JUMP AHEAD<<           STOP AC MOTOR
               ;                          RETURN
               ;                        ENDIF
               DOTR04;                ENDLOOP
               ;                      CYCLE SWITCH SAYS METER CAME HOME
               ;                      INDICATE TRIP COMPLETION
080D 3E 7B      MVI  A,7BH            A = MASK, WILL SET:
               ;                      MRSTS1.ENABLD = FALSE
               ;                      MRSTS1.UNKSEL = FALSE
               DOTR05;                >>TARGET OF JUMP AHEAD<<
               ;                      UPDATE MRSTS1 ACCORDING TO MASK
080F A6         ANA  M                MRSTS1 = MASK .AND. MRSTS1
0810 77         MOV  M,A
               DOTR06;                ****ALTERNATE ENTRY POINT
               ;                      STOP AC MOTOR
0811 21 01 70   LXI  H,PORTA          HL = ADDRESS, PORTA
0814 7E         MOV  A,M              PORTA = PORTA .OR. HEX10
0815 F6 10      ORI  10H
0817 77         MOV  M,A
               ;                    ENDIF
               ;                  ENDIF
0818 C9         RET               RETURN
               ;ENDENT(ERRFLG)(NORFLG)
               ;      (BIT   )(BITSTR)
               ;      ( 0    )( I    )
               ;      (PSW:Z )( RAM  )
               ;      ( C    )( NC   )
               ;
               ;PSW DESTROYED
               ;REGISTERS DESTROYED
               ;
               ;PROCESS END OF ENTRY HEADER
               ;
               ENDENT;            ****ENTRY POINT
0819 3A 26 74   LDA  NORFLG/2+X    IF(NORFLG.CMBIN .AND.
               ;                       NORFLG.AMTIN) .NE. TRUE
081C 2F         CMA
081D E6 30      ANI  30H
               ;                     PROCEEDURAL ERROR
081F C2 A1 0B   JNZ  PROERR          PROERR(ERRFLG)
               ;                           (PSW:Z )
               ;                           ( 0    )
               ;                  ELSE
0822 CD 4E 0F   CALL LSTATE          LSTATE(FATMOD,NORMOD,SERMOD,PRVMOD)
               ;                           (PSW:S ,PSW:Z ,PSW:P ,PSW:CY)
               ;                           ( 0    , 0    , 0    , 0    )
               ;                     IF SERMOD .EQ. TRUE
```

```
                  ;                          SERVICE MODE END OF ENTRY
0825 EA 63 0C      JPE  SEREOE               SEREOE(ERRFLG)
                  ;                                 (PSW:Z )
                  ;                                 ( 0    )
                  ;                        ELSE
                  ;                        IF PRVMOD .EQ. TRUE
                  ;                          MANUAL RESET
0828 DA E9 09      JC   MANRST               MANRST(ERRFLG)
                  ;                                 (PSW:Z )
                  ;                                 ( 0    )
                  ;                        ELSE
                  ;                          VARIABLE REMOTE RESET
082B C3 BE 13      JMP  VRMRS                VRMRS(ERRFLG)
                  ;                                 (PSW:Z )
                  ;                                 ( 0    )
                  ;                        ENDIF
                  ;                      ENDIF
                  ;ENTAMT/ENTCMB(MSGBUF)(AMTBUF,CMBBUF,NORFLG)
                  ;              (NIBSTR)(NIBSTR,NIBSTR,BITSTR)
                  ;              ( I    )( 0    , 0    , 0    )
                  ;              ( @B   )( RAM  , RAM  , RAM  )
                  ;              ( NC   )( C    , C    , C    )
                  ;REGISTERS DESTROYED
                  ;PSW DESTROYED
                  ;
                  ;MOVE FIELD, FORMAT AND VALUE
                  ;FROM MESSAGE BUFFER TO APPROPRIATE RESET BUFFER
                  ;
                  ENTAMT;                  ****ENTRY POINT FOR RESET AMOUNT
082E 0E E0          MVI  C,AMTBUF          C = OFFSET, DEST = OFFSET, AMTBUF
                  ;                        SET TO SET NORFLG.AMTIN = TRUE
0830 3E 10          MVI  A,10H             A = MASK = HEX10
0832 C3 39 08       JMP  ENTCM1
                  ; >>JUMP AHEAD<<
                  ENTCMB;                  ****ENTRY POINT FOR RESET COMBINATION
0835 0E F0          MVI  C,CMBBUF          C = OFFSET, DEST = OFFSET, CMBBUF
                  ;                        SET TO SET NORFLG.CMBIN = TRUE
0837 3E 20          MVI  A,20H             A = MASK = HEX20
                  ENTCM1;                  >>TARGET OF JUMP AHEAD<<
0839 21 26 74       LXI  H,NORFLG/2+X      HL = ADDRESS, NORFLG
                  ;                        UPDATE FLAG
083C B6             ORA  M                 NORFLG = NORFLG .OR. MASK
083D 77             MOV  M,A
                  ;                        FETCH COUNT FROM MESSAGE FORMAT
083E CD 35 0F       CALL GETNIB            GETNIB(CNT,ZERO,MSGBUF)
                  ;                              ( A ,PSW:Z, @B  )
                  ;                              ( 0 , 0   , I   )
                  ;                        INCLUDE LEAD ZERO AND FORMAT IN COUNT
0841 C6 03          ADI  3                 CNT = (CNT+3) .AND. HEXFE
0843 E6 FE          ANI  0FEH
                  ;                        MOVE MESSAGE TO DESTINATION BUFFER
0845 C3 B3 0F       JMP  MVLNIB            MVLNIB(DEST,MSGBUF,CNT,PSW)
                  ;                              ( @C , @B   , A ,PSW)
                  ;                              ( 0  , I    , I , 0 )
                  ;                        RETURN
                  ;ENTSER()(MRSTS1)
                  ;        (BITSTR)
                  ;        ( 0    )
                  ;        ( RAM  )
                  ;        ( C    )
                  ;
                  ;PSW DESTROYED
                  ;REGISTERS DESTROYED
                  ;
                  ;ENTER SERVICE MODE
                  ;
                  ENTSER;                  ****ENTRY POINT
```

```
0848 21 24 74   LXI  H,MRSTS1/2+X  HL = ADDRESS, MRSTS1
084B 7E         MOV  A,M           MRSTS1.SERMOD = TRUE
084C F6 08      ORI  08H
084E E6 FB      ANI  0FBH          MRSTS1.ENABLD = FALSE
0850 77         MOV  M,A
0851 C9         RET                RETURN
               ;EXTSER()(MRSTS1,NORFLG)
               ;        (BITSTR,BITSTR)
               ;        ( 0    , 0    )
               ;        ( RAM  , RAM  )
               ;        ( C    , C    )
               ;
               ;PSW DESTROYED
               ;REGISTERS DESTROYED
               ;
               ;EXIT SERVICE MODE
               ;
               EXTSER;             ****ENTRY POINT
0852 21 24 74   LXI  H,MRSTS1/2+X  HL = ADDRESS, MRSTS1
0855 7E         MOV  A,M           MRSTS1.SERMOD = FALSE
0856 E6 F7      ANI  0F7H
0858 77         MOV  M,A
0859 23         INX  H             HL = ADDRESS, NORFLG
085A 23         INX  H
085B 7E         MOV  A,M           NORFLG.COMDSB = FALSE
085C E6 FB      ANI  0FBH
085E 77         MOV  M,A
085F C9         RET                RETURN
               ;EXTTRP()(KDCTRL,MRSTS1,MTRCHR,SERFLG)
               ;        (BITSTR,BITSTR,BITSTR,BITSTR)
               ;        ( I    , I    , I    , I    )
               ;        ( RAM  , RAM  , RAM  , RAM  )
               ;        ( NC   , NC   , NC   , NC   )
               ;
               ;REGISTERS DESTROYED
               ;PSW DESTROYED
               ;
               ;INITIATE TRIP IN RESPONSE TO EXTERNAL MESSAGE
               ;
               EXTTRP;             ****ENTRY POINT
               ;                   SET TO REACH PROERR VIA RETURN
0860 21 A1 0B   LXI  H,PROERR
0863 E5         PUSH H
0864 3A 27 74   LDA KDCTRL/2+X     PSW:CY = KDCTRL.KBDDSB
0867 1F         RAR
               ;                   IF KDCTRL.KBDDSB .EQ. FALSE
               ;                     KEYBOARD HAS NOT BEEN DISABLED
0868 D0         RNC                  PROERR(ERRFLG)
               ;                   ELSE
0869 21 24 74   LXI  H,MRSTS1/2+X  HL = ADDRESS, MRSTS1
086C 7E         MOV  A,M           PSW:Z =DISABL=MRSTS1.ENABLD .EQ. FALSE
086D E6 04      ANI  4
               ;                   IF DISABL .EQ. TRUE
               ;                     METER IS DISABLED
086F C8         RZ                   PROERR(ERRFLG)
               ;                   ELSE
0870 2B         DCX  H               HL = ADDRESS, MTRCHR
0871 3A 10 74   LDA  SERFLG/2+X      A.2 = (.NOT. SERFLG.SNOLCK) .OR.
               ;                           MTRCHR.TRPCTL
0874 17         RAL
0875 2F         CMA
0876 B6         ORA  M
0877 E6 20      ANI  20H             PSW:Z = TRPLCK = A.2 .EQ. FALSE
               ;                     IF TRPLCK .EQ. TRUE
               ;                       RESPONSE TO EXT TRIP IS FORBIDDEN
0879 C8         RZ                     PROERR(ERRFLG)
               ;                     ELSE
```

```
                    ;                         EXTERNAL TRIPPING ALLOWED
087A E1               POP  H                  CLEAN UP STACK
087B C3 A5 07         JMP  DOTRIP             TRIP METER
                    ;                       ENDIF
                    ;                     ENDIF
                    ;                     RETURN
                    ;FATERR(CODE,ERRFLG)(MRSTS2,ERRCOD,NORFLG,ERRCNT)
                    ;      (BYTE,BIT   )(BITSTR,BYTE  ,BITSTR,NIBSTR)
                    ;      ( I   , 0   )( 0    , 0    , 0    , 0    )
                    ;      ( A   ,PSW:Z )( RAM  , RAM  , RAM  , RAM  )
                    ;      ( C   , C   )( C    , C    , C    , C    )
                    ;
                    ;PSW DESTROYED
                    ;REGISTERS DESTROYED
                    ;
                    ;PROCESS FATAL ERROR
                    ;
                    FATINT;               ****ENTRY POINT FROM INTERRUPT VECTOR
                    ;                     INDICATE WATCHDOG INTERRUPT OR
                    ;                     INCORRECTLY ENABLED TEST INTERRUPT
087E 3E 17            MVI  A,BARF         A = BARF
                    FATERR;               ****ENTRY POINT
0880 21 25 74         LXI  H,MRSTS2/2+X   HL = ADDRESS, MRSTS2
0883 46               MOV  B,M            IF MRSTS2.FATMOD .EQ. FALSE
0884 04               INR  B
0885 FA 9E 08         JM   FATE01
0888 32 0A 74         STA  ERRCOD/2+X       ERRCOD = CODE
088B 7E               MOV  A,M              MRSTS2.FATMOD = TRUE
088C F6 80            ORI  80H
088E 77               MOV  M,A
088F 23               INX  H                HL = ADDRESS, NORFLG
0890 7E               MOV  A,M              NORFLG.QUESTS = TRUE
0891 F6 80            ORI  80H
0893 77               MOV  M,A
0894 21 0B 74         LXI  H,ERRCNT/2+X     HL = ADDRESS, ERRCNT
0897 7E               MOV  A,M              ERRCNT[0..1] = ERRCNT[0..1]+1
0898 3C               INR  A
0899 27               DAA
089A 77               MOV  M,A
089B CD 64 04         CALL PERDSP           MAKE ERROR DISPLAY
                    FATE01;               ENDIF
089E AF               XRA  A              PSW:Z = ERRFLG = TRUE
089F C9               RET                 RETURN
                    ;FINTRP()(MRSTS1,PORTA )
                    ;        (BITSTR,BITSTR)
                    ;        ( 0    , 0    )
                    ;        ( RAM  , 7001 )
                    ;        ( C    , C    )
                    ;
                    ;REGISTERS DESTROYED
                    ;PSW DESTROYED
                    ;
                    ;ATTEMPT TO DRIVE METER HOME
                    ;
                    FINTRP;               ****ENTRY POINT
                    ;                     START AC MOTOR
08A0 21 01 70         LXI  H,PORTA        HL = ADDRESS, PORTA
08A3 7E               MOV  A,M            PORTA = PORTA .AND. HEXEF
08A4 E6 EF            ANI  0EFH
08A6 77               MOV  M,A
                    ;                     DRIVE METER FOR 0.2 SEC. TO INSURE
                    ;                     THAT METER AT START OF TRIP CYCLE IS
                    ;                     DRIVEN FAR ENOUGH TO MAKE THE CYCLE
                    ;                     SWITCH AGREE WITH THE METER STATE.
08A7 01 D0 07         LXI  B,2000         BC = N = 2000; FOR 0.2 SEC. LOOP
                    FINTR1;               DO UNTIL N .EQ. 0
08AA CD 19 0B         CALL NPAUSE           NPAUSE(N  ,ZROFLG)
```

```
                    ;                    (BC ,PSW:Z )
                    ;                    (I/O, 0    )
08AD C2 AA 08        JNZ  FINTR1
                    ;              ENDDO
                    ;              NOW DRIVE METER HOME
08B0 01 40 1F        LXI  B,8000   BC = N = 8000; FOR 0.8 SEC. LOOP
                    FINTR2;        LOOP
                    ;                READ CYCLE SWITCH
08B3 CD AF 0B        CALL RDCYC      RDCYC(INCYC,INCYC,ADRESS,MRSTS1)
                    ;                     ( A   ,PSW:C, HL   , @HL  )
                    ;                     ( 0   , 0   , 0    , -    )
                    ;                IF INCYC .EQ. FALSE
08B6 D2 BF 08        JNC  FINTR3       BREAK
                    ;                ENDIF
08B9 CD 19 0B        CALL NPAUSE     NPAUSE(N  ,ZROFLG)
                    ;                      (BC ,PSW:Z )
                    ;                      (I/O, 0    )
08BC C2 B3 08        JNZ  FINTR2     IF N .EQ. 0
                    ;                  BREAK
                    ;                ENDIF
                    FINTR3;        ENDLOOP
08BF CD 11 08        CALL DOTR06   STOP AC MOTOR
                    ;              READ CYCLE SWITCH
08C2 CD AF 0B        CALL RDCYC    RDCYC(INCYC,INCYC,ADRESS,MRSTS1)
                    ;                   ( A   ,PSW:C, HL   , @HL  )
                    ;                   ( 0   , 0   , 0    , -    )
08C5 F5              PUSH PSW      SAVE A, PSW
                    ;              COPY INCYC INTO MRSTS1
08C6 E6 82           ANI  82H
08C8 57              MOV  D,A
08C9 7E              MOV  A,M
08CA E6 7D           ANI  7DH
08CC B2              ORA  D
08CD 77              MOV  M,A      MRSTS1.UNKSEL = INCYC
                    ;              MRSTS1.INCYC  = INCYC
08CE F1              POP  PSW      RESTORE A, PSW
08CF D0              RNC           IF INCYC .EQ. TRUE
                    ;                CYC SWT SAYS METER DIDN'T COME HOME
                    FINTR4;          ****ALTERNATE ENTRY POINT
                    ;                FATAL ERROR, SLOW TRIP
08D0 3E 08           MVI  A,TRPTIM   A = TRPTIM
08D2 C3 80 08        JMP  FATERR     FATERR(TRPTIM,ERRFLG)
                    ;                      ( A    ,PSW:Z )
                    ;                      ( I    , 0    )
                    ;              ENDIF
                    ;              RETURN
                    ;HDRONY(HEADER,ERRFLG)(NORFLG,XMTBUF)
                    ;      (BYTE  ,BIT   )(BITSTR,NIBSTR)
                    ;      ( I    , 0    )( 0    , I    )
                    ;      ( A    ,PSW:Z )( RAM  , RAM  )
                    ;      ( NC   , C    )( C    , NC   )
                    ;
                    ;REGISTERS DESTROYED
                    ;PSW DESTROYED
                    ;
                    ;INITIATE PROCESSING  RELATED TO HEADERS WHICH CONSIST
                    ;OF A HEADER NOT FOLLOWED BY DATA
                    ;
                    HDRONY;        ****ENTRY POINT
08D5 B7              ORA  A        PSW:Z = ERRFLG = HEADER .EQ. HEX00
08D6 F5              PUSH PSW      SAVE A, PSW
08D7 21 1F 09        LXI  H,HDR002 SET TO RETURN TO ENDCASE
08DA E5              PUSH H
                    ;              CASE (HEADER)
08DB FE 41           CPI  HENABL     **41: ENABLE METER
08DD CA F3 05        JZ   CMDENB
08E0 FE 42           CPI  HDISAB     **42: DISABLE METER
```

```
08E2 CA CD 05   JZ    CMDDSB
08E5 FE 46      CPI   HSETSV          **46: ENTER SERVICE MODE
08E7 CA 48 08   JZ    ENTSER
08EA FE 47      CPI   HCLRSV          **47: EXIT SERVICE MODE
08EC CA 52 08   JZ    EXTSER
08EF FE 4E      CPI   HEXTRP          **4E: EXTERNAL TRIP
08F1 CA 60 08   JZ    EXTTRP
08F4 FE 50      CPI   HREQST          **50: STATUS REQUEST
08F6 C8         RZ                          CONTINUE
08F7 FE 62      CPI   HENAKB          **62: ENABLE KEYBOARD
08F9 CA 14 0F   JZ    ENAKBD
08FC FE 63      CPI   HDISKB          **63: DISABLE KEYBOARD
08FE CA 02 0F   JZ    DSBKBD
0901 21 1C 09   LXI   H,HDR001        SET TO RETURN TO ALTERNATE ENDCASE
0904 E3         XTHL
0905 FE 40      CPI   HREQAC          **40: ACCESS CODE REQUEST
0907 CA EE 12   JZ    ACCODE                ACCODE(ERRFLG)
               ;                                  (PSW:Z )
               ;                                  ( 0    )
090A FE 43      CPI   HENDEN          **43: END OF ENTRY
090C CA 19 08   JZ    ENDENT                ENDENT(ERRFLG)
               ;                                  (PSW:Z )
               ;                                  ( 0    )
090F FE 51      CPI   HREQPO          **51: SELECTION VALUE REQUEST
0911 CA 48 0C   JZ    SELVAL                SELVAL(ERRFLG)
               ;                                  (PSW:Z )
               ;                                  ( 0    )
0914 FE 5C      CPI   HREQSN          **5C: SERIAL NUMBER REQUEST
0916 CA 8D 06   JZ    DBLH01                DBLH01(TRUE ,ERRFLG)
               ;                                  (PSW:Z,PSW:Z )
               ;                                  ( I    , 0    )
               ;                      **ELSE: DOUBLY DEFINED HEADER
0919 C3 71 06   JMP   DBLHDR                DBLHDR(HEADER,ERRFLG)
               ;                                  ( A     ,PSW:Z )
               ;                                  ( I     , 0    )
               HDR001;                ALTERNATE ENDCASE, SAVES NEW ERRFLG
               ;                      PSW:Z = ERRFLG
091C C1         POP   B               A = HEADER
091D 78         MOV   A,B
091E F5         PUSH  PSW             SAVE A, PSW
               HDR002;               ENDCASE
091F 21 26 74   LXI   H,NORFLG/2+X   HL = ADDRESS, NORFLG
0922 3A 50 74   LDA   XMTBUF/2+X     IF XMTBUF[0..1] .EQ. 0
0925 B7         ORA   A
0926 C2 2D 09   JNZ   HDR003
               ;                        QUE DEFAULT STATUS MESSAGE
0929 7E         MOV   A,M               NORFLG.QUESTS = TRUE
092A F6 80      ORI   80H
092C 77         MOV   M,A
               HDR003;               ENDIF
092D F1         POP   PSW            A = HEADER
092E F5         PUSH  PSW
092F FE 42      CPI   HDISAB         IF HEADER .NE. HDISAB
0931 CA 3F 09   JZ    HDR005
0934 E6 F0      ANI   0F0H             IF (HEADER .AND. HEXF0) .NE. HEX50'
0936 FE 50      CPI   50H
0938 CA 3F 09   JZ    HDR004
               ;                          CANCEL ANY RESET IN PROGRESS
093B 7E         MOV   A,M
093C E6 CF      ANI   0CFH
093E 77         MOV   M,A                 NORFLG.CMBIN = FALSE
               ;                          NORFLG.AMTIN = FALSE
               HDR004;                 ENDIF
               HDR005;               ENDIF
093F F1         POP   PSW            A = HEADER
               ;                     PSW:Z = ERRFLG
0940 C9         RET                  RETURN
```

```
                ;HDRPLS(HEADER,MSGBUF,ERRFLG)(NORFLG)
                ;      (BYTE  ,NIBSTR,BIT   )(BITSTR)
                ;      ( I    , I    , 0    )( 0    )
                ;      ( A    , @B   ,PSW:Z )( RAM  )
                ;      ( NC   , NC   , C    )( C    )
                ;
                ;REGISTERS DESTROYED
                ;PSW DESTROYED
                ;
                ;INITIATE PROCESSING RELATED TO HEADERS WHICH CONSIST
                ;OF A HEADER ASSOCIATED WITH DATA
                ;
                HDRPLS;                 ****ENTRY POINT
0941 B7           ORA  A                PSW:Z = ERRFLG = HEADER .EQ. HEX00
0942 F5           PUSH PSW              SAVE A, PSW
0943 21 26 74     LXI  H,NORFLG/2+X     HL = ADDRESS, NORFLG
                ;                       CHECK FOR INTERRUPTED RESET SEQUENCE
0946 FE C5        CPI  HENTAM           IF HEADER .NE. HENTAM
0948 CA 54 09     JZ   HDRP02
094B FE C6        CPI  HENTCO             IF HEADER .NE. HENTCO
094D CA 54 09     JZ   HDRP01
0950 7E           MOV  A,M
0951 E6 CF        ANI  0CFH
0953 77           MOV  M,A                  NORFLG.CMBIN. = FALSE
                ;                           NORFLG.AMTIN = FALSE
                HDRP01;                   ENDIF
                HDRP02;                 ENDIF
                ;                       QUE STATUS MESSAGE
0954 7E           MOV  A,M              NORFLG.QUESTS = TRUE
0955 F6 80        ORI  80H
0957 77           MOV  M,A
0958 F1           POP  PSW              A = HEADER
0959 F5           PUSH PSW
095A 21 7C 09     LXI  H,HDRP04         SET TO RETURN TO ENDCASE
095D E5           PUSH H
                ;                       CASE (HEADER)
095E FE C5        CPI  HENTAM             **C5: ENTER AMOUNT
0960 CA 2E 08     JZ   ENTAMT                   ENTAMT(MSGBUF)
                ;                                      ( @B   )
                ;                                      ( I    )
0963 FE C6        CPI  HENTCO             **C6: ENTER COMBINATION
0965 CA 35 08     JZ   ENTCMB                   ENTCMB(MSGBUF)
                ;                                      ( @B   )
                ;                                      ( I    )
0968 21 79 09     LXI  H,HDRP03           SET TO RETURN TO ALTERNATE ENDCASE
096B E3           XTHL
096C FE C0        CPI  HSETMN             **C0: ENTER SERIAL NUMBER
096E CA 38 0A     JZ   MSERNO                   MSERNO(MSGBUF,ERRFLG)
                ;                                      ( @B   ,PSW:Z )
                ;                                      ( I    , 0    )
0971 FE C1        CPI  HSETPO             **C1: SET POSTAGE
0973 CA 9F 0C     JZ   SETPOS                   SETPOS(MSGBUF,ERRFLG)
                ;                                      ( @B   ,PSW:Z )
                ;                                      ( I    , 0    )
                ;                         **ELSE: PROCESS ERROR
0976 C3 A1 0B     JMP   PROERR                  PROERR(ERRFLG)
                ;                                      (PSW:Z )
                ;                                      ( 0    )
                HDRP03;                   ALTERNATE ENDCASE, SAVES NEW ERRFLG
0979 C1           POP  B                  A = HEADER
097A 78           MOV  A,B                PSW:Z = ERRFLG
097B F5           PUSH PSW                SAVE A, PSW
                HDRP04;                 ENDCASE
097C F1           POP  PSW              A = HEADER
                ;                       PSW:Z = ERRFLG
097D C9           RET                   RETURN
```

```
                 ;IDLE()(CTLBKT,KDCTRL,MRSTS1,NORFLG,RECBUF,XMTBUF)
                 ;      (BYTE  ,BITSTR,BITSTR,BITSTR,BYTSTR,BYTSTR)
                 ;      ( I    , I    , I/O  , I    , I    , I    )
                 ;      ( RAM  , RAM  , RAM  , RAM  , RAM  , RAM  )
                 ;      ( NC   , NC   , C    , NC   , NC   , NC   )
                 ;
                 ;MAINLINE IDLE LOOP
                 ;
                 IDLE;                      LOOP
097E FB            EI                         ENABLE INTERRUPTS
                 ;                            SET TO RESTART LOOP
097F 21 7E 09      LXI  H,IDLE                HL = ADDRESS, IDLE
0982 E5            PUSH H                     PUSH HL, USED BY RETURN STATEMENTS
                 ;                            UPDATE METER STATUS:
0983 CD 78 07      CALL DOSTAT                WITH RESPECT TO SWITCHES/SENSORS
0986 CD 23 0B      CALL POSUPD                WITH RESPECT TO POSTAGE SETTING
0989 CD 6B 10      CALL NVMCHG                WITH RESPECT TO NONVOLATILE MEMORY
098C 3A 50 74      LDA  XMTBUF/2+X            A = XMTBUF[0]
098F B7            ORA  A                     IF XMTBUF[0] .NE. 0
0990 C2 15 0E      JNZ  XMIT                    TRANSMIT MESSAGE
                 ;                            ELSE
0993 3A 26 74      LDA  NORFLG/2+X            A = NORFLG
0996 4F            MOV  C,A                   C = NORFLG
0997 17            RAL                        PSW:CY = NORFLG.QUESTS
                 ;                            IF NORFLG.QUESTS .EQ. TRUE
0998 DA F4 0A      JC   MTRSTS                  TRANSMIT METER STATUS
                 ;                            ELSE
099B 17            RAL                        PSW:CY = NORFLG.QUEPOS
099C D2 A4 09      JNC  IDLE01                IF NORFLG.QUEPOS .EQ. TRUE
                 ;                              REQUEST POSTAGE SETTING
099F 3E 51         MVI  A,HREQPO                A = HREQPO
09A1 C3 C7 0D      JMP  XEQHDR                  XEQHDR(HREQPO,ERRFLG)
                 ;                                    ( A    ,PSW:Z )
                 ;                                    ( I    , O    )
                 IDLE01;
                 ;                            ELSE
09A4 CD 4E 0F      CALL LSTATE                LSTATE(FATMOD,NORMOD,SERMOD,PRVMOD)
                 ;                                  (PSW:S ,PSW:Z ,PSW:P ,PSW:CY)
                 ;                                  ( O    , O    , O    , O    )
09A7 C2 D1 09      JNZ  IDLE03                IF NORMOD .EQ. TRUE
09AA 21 24 74      LXI  H,MRSTS1/2+X            HL = ADDRESS, MRSTS1
09AD 7E            MOV  A,M                     PSW:CY = MRSTS1.QUEREG
09AE 1F            RAR
09AF D2 D1 09      JNC  IDLE02                  IF MRSTS1.QUEREG .EQ. TRUE
                 ;                                TRIP HAS COMPLETED NORMALLY
09B2 B7            ORA  A                         MRSTS1.QUEREG = FALSE
09B3 17            RAL
09B4 77            MOV  M,A
09B5 21 2B 74      LXI  H,CTLBKT/2+X              HL = ADDRESS, CTLBKT
09B8 3E 41         MVI  A,41H                     PSW:Z = CTLBKT .EQ. HEX41
09BA AE            XRA  M
09BB 3E 52         MVI  A,HREQAR                  A = HREQAR
                 ;                                IF CTLBKT .EQ. HEX41
                 ;                                  REQUEST ASCENDING REGISTER
09BD CA C7 0D      JZ   XEQHDR                      XEQHDR(HREQAR,ERRFLG)
                 ;                                        ( A    ,PSW:Z )
                 ;                                        ( I    , O    )
                 ;                                ELSE
09C0 3E 31         MVI  A,31H                     PSW:Z = CTLBKT .EQ. HEX31
09C2 AE            XRA  M
09C3 3E 53         MVI  A,HREQDR                  A = HREQDR
                 ;                                IF CTLBKT .EQ. HEX31
                 ;                                  REQUEST DESCENDING REGISTER
09C5 CA C7 0D      JZ   XEQHDR                      XEQHDR(HREQDR,ERRFLG)
                 ;                                        ( A    ,PSW:Z )
                 ;                                        ( I    , O    )
                 ;                                ELSE
```

```
09C8 3E 21       MVI  A,21H             PSW:Z = CTLBKT .EQ. HEX21
09CA AE          XRA  M
09CB 3E 55       MVI  A,HREQPC          A = HREQPC
                ;                       IF CTLBKT .EQ. HEX21
                ;                         REQUEST PIECE COUNT
09CD CA C7 0D    JZ   XEQHDR              XEQHDR(HREQPC,ERRFLG)
                ;                                ( A    ,PSW:Z )
                ;                                ( I    , O    )
                ;                       ENDIF
09D0 C9          RET
                IDLE02;                ENDIF
                IDLE03;              ELSE
09D1 3A 48 74    LDA  RECBUF/2+X     A = RECBUF[0]
09D4 B7          ORA  A              IF RECBUF[0] .NE. 0
09D5 C2 EE 09    JNZ  MESAGE           PROCESS MESSAGE
                ;                    ELSE
09D8 3E 08       MVI  A,08H          PSW:Z = NORFLG.TRPREQ .EQ. FALSE
09DA A1          ANA  C
09DB CA E6 09    JZ   IDLE04         IF NORFLG.TRPREQ .EQ. TRUE
09DE 3A 27 74    LDA  KDCTRL/2+X       PSW:CY = KDCTRL.KBDDSB
09E1 1F          RAR
                ;                      IF KDCTRL.KBDDSB .EQ. FALSE
09E2 D2 A5 07    JNC  DOTRIP             PROCESS TRIP REQUEST
                ;                      ENDIF
09E5 C9          RET
                IDLE04;              ELSE
09E6 C3 2E 03    JMP  KEYBRD           PROCESS KEYBOARD
                ;                    ENDIF
                ;                   ENDLOOP
                ;MANRST
                ;
                ;REGISTERS DESTROYED
                ;PSW DESTROYED
                ;
                ;MANUAL METER RESET
                ;
                MANRST;             ****ENTRY POINT
                ;                   DECLARE SOFTWARE ERROR
09E9 3E 02       MVI  A,SFTWRE      A = SFTWRE
09EB C3 80 08    JMP  FATERR        FATERR(SFTWRE,ERRFLG)
                ;                         ( A    ,PSW:Z )
                ;                         ( I    , O    )
                ;                   RETURN
                ;MESAGE()(RECBUF,XMTBUF,DBUF  )
                ;        (NIBSTR,NIBSTR,NIBSTR)
                ;        ( I/O  , I    , O    )
                ;        ( RAM  , RAM  , RAM  )
                ;        ( C    , NC   , C    )
                ;
                ;PSW DESTROYED
                ;REGISTERS DESTROYED
                ;
                ;PROCESS MESSAGE RECEIVED FROM EXTERNAL DEVICE
                ;
                MESAGE;             ****ENTRY POINT
                ;                   REMEMBER IF XMTBUF CLEAR ON ENTRY
09EE 3A 50 74    LDA  XMTBUF/2+X    PSW:Z = XMTCLR = XMTBUF[0..1] .EQ. 0
09F1 B7          ORA  A
09F2 F5          PUSH PSW           SAVE A, PSW
09F3 21 48 74    LXI  H,RECBUF/2+X  HL = ADDRESS, RECBUF[0..1]
                ;                   FETCH MESSAGE SIZE, IN BYTES
09F6 4E          MOV  C,M           C = SIZE = RECBUF[0..1]
                ;                   FLAG MESSAGE AS PROCESSED
09F7 36 00       MVI  M,0           RECBUF[0..1] = 0
09F9 23          INX  H             HL = ADDRESS, RECBUF[2..3]
09FA 0D          DCR  C             C = SIZE-1
09FB C2 1A 0A    JNZ  MESAG3        IF (SIZE-1) .EQ. 0
```

```
09FE 7E          MOV  A,M             A = HEADER = RECBUF[2..3]
                ;                     PROCESS MESSAGE WITHOUT DATA
09FF CD D5 08    CALL HDRONY          HDRONY(HEADER,ERRFLG)
                ;                           ( A     ,PSW:Z )
                ;                           ( I     , O     )
0A02 CA 17 0A    JZ   MESAG2          IF ERRFLG .EQ. FALSE
0A05 FE 51       CPI  HREQPO            IF HEADER .EQ. HREQPO
0A07 C2 17 0A    JNZ  MESAG1
                ;                         REVERT TO SETTING DISPLAY
0A0A 01 80 A2    LXI  B,(XMTBUF+2)*100H+DBUF+0
                ;                         B = OFFSET, XMTBUF[2]
                ;                         C = OFFSET, DBUF[0]
0A0D 3A 50 74    LDA  XMTBUF/2+X          A = NIBCNT = XMTBUF[0..1]*2
0A10 87          ADD  A
0A11 CD B3 0F    CALL MVLNIB              MVLNIB(DBUF[0],XMTBUF[2],NIBCNT,
                ;                               ( @C     , @B       , A     ,
                ;                               ( O      , I        , I     ,
                ;
                ;                               NONBCD,ZERO )
                ;                               PSW:S ,PSW:Z)
                ;                                O     , O    )
0A14 CD 5A 05    CALL VALDSP              DISPLAY CONTENTS OF DBUF
                MESAG1;                 ENDIF
                MESAG2;               ENDIF
0A17 C3 31 0A    JMP  MESAG6
                MESAG3;             ELSE
                ;                     CHECK FORMAT AGAINST MESSAGE SIZE
0A1A 06 94       MVI  B,RECBUF+4      B = OFFSET, RECBUF[4]
0A1C CD 35 0F    CALL GETNIB          GETNIB(NIBCNT,ZERO ,RECBUF[4])
                ;                           ( A     ,PSW:Z, @B       )
                ;                           ( O     , O   , I        )
0A1F 3C          INR  A               A = BYTCNT = (NIBCNT+1)/2
0A20 B7          ORA  A
0A21 1F          RAR
0A22 0D          DCR  C               C = SIZE-2
0A23 B9          CMP  C               IF BYTCNT .EQ. (SIZE-2)
0A24 C2 2E 0A    JNZ  MESAG4
                ;                       PROCESS MESSAGE WITH DATA
0A27 7E          MOV  A,M               A = HEADER = RECBUF[2..3]
0A28 CD 41 09    CALL HDRPLS            HDRPLS(HEADER,RECBUF[4],ERRFLG)
                ;                             ( A     , @B       ,PSW:Z )
                ;                             ( I     , I        , O     )
0A2B C3 31 0A    JMP  MESAG5
                MESAG4;               ELSE
                ;                       BAD MESSAGE, PROCEEDURAL ERROR
0A2E CD A1 0B    CALL PROERR            PROERR(ERRFLG)
                ;                             (PSW:Z )
                ;                             ( O     )
                MESAG5;               ENDIF
                MESAG6;             ENDIF
                ;                   CHECK FOR OVERLAY OF TRANSMIT BUFFER
0A31 F1          POP  PSW           PSW:Z = XMTCLR
0A32 3E 12       MVI  A,BUFOVR      A = BUFOVR
                ;                   IF XMTCLR .EQ. FALSE
                ;                     BUFFER OVERLAY, FATAL ERROR
0A34 C4 80 08    CNZ  FATERR          FATERR(BUFOVR,ERRFLG)
                ;                           ( A     ,PSW:Z )
                ;                           ( I     , O     )
                ;                   ENDIF
0A37 C9          RET                RETURN
                ;MSERNO(MSGBUF,ERRFLG)(ASCCRC,ASCREG,CTLCRC,DSCCRC,DSCREG,
                ;       (NIBSTR,BIT    )(BYTE   ,NIBSTR,BYTE   ,BYTE   ,NIBSTR,
                ;       ( I     , O     )( O     , O     , O     , O     , O     ,
                ;       ( @B    ,PSW:Z )( RAM   , RAM   , RAM   , RAM   , RAM   ,
                ;       ( NC    , C     )( C     , C     , C     , C     , C     ,
                ;
                ;       ERRCNT,ERRCOD,PCEREG,SERFLG,SERNUM)
```

```
                ;      NIBSTR,BYTE  ,NIBSTR,BITSTR,NIBSTR)
                ;       0    , 0    , 0    , I/O  , I/O  )
                ;       RAM  , RAM  , RAM  , RAM  , RAM  )
                ;       C    , C    , C    , C    , C    )
                ;
                ;PSW DESTROYED
                ;REGISTERS DESTROYED
                ;
                ;REDEFINE UNLOCKED SERIAL NUMBER OR
                ;LOCK SERIAL NUMBER TO PREVENT FURTHER REDEFINITION
                ;
                MSERNO;               ****ENTRY POINT
                ;                      SET TO REACH PROERR VIA RETURN
0A38 21 A1 0B    LXI  H,PROERR
0A3B E5          PUSH H
                ;                      CONVERT OFFSET INTO ADDRESS
0A3C 16 74       MVI  D,X/100H         DE = ADDRESS, MSGBUF[0..1]
0A3E AF          XRA  A
0A3F 78          MOV  A,B
0A40 1F          RAR
0A41 5F          MOV  E,A
                ;                      ADJUST OFFSET
0A42 04          INR  B                B = OFFSET, MSGBUF[3]
0A43 04          INR  B
0A44 04          INR  B
                ;                      CHECK FOR VARIOUS ERROR CONDITIONS
0A45 CD 4E 0F    CALL LSTATE           LSTATE(FATMOD,NORMOD,SERMOD,PRVMOD)
                ;                            (PSW:S ,PSW:Z ,PSW:P ,PSW:CY)
                ;                            ( 0    , 0    , 0    , 0    )
                ;                      IF FATMOD .EQ. TRUE
                ;                        METER HAS FATALED
0A48 F8          RM                      PROERR(ERRFLG)
                ;                        RETURN
                ;                      ELSE
                ;                      IF SERMOD .EQ. FALSE
                ;                        METER NOT IN SERVICE MODE
0A49 E0          RPO                     PROERR(ERRFLG)
                ;                        RETURN
                ;                      ELSE
0A4A 3A 10 74    LDA  SERFLG/2+X       PSW:Z = OPEN = SERFLG.SNOLCK .EQ. TRUE
0A4D E6 10       ANI  10H
                ;                      IF OPEN .EQ. FALSE
                ;                        METER NUMBER ALREADY LOCKED
0A4F C0          RNZ                     PROERR(ERRFLG)
                ;                        RETURN
                ;                      ELSE
0A50 1A          LDAX D                PSW:Z = FMTOK = MSGBUF[0..1].EQ.HEX8F
0A51 FE 8F       CPI  8FH
                ;                      IF FMTOK .EQ. FALSE
                ;                        NOT 8 CHARACTERS WITHOUT DECIMAL
0A53 C0          RNZ                     PROERR(ERRFLG)
                ;                        RETURN
                ;                      ELSE
0A54 13          INX  D                DE = ADDRESS, MSGBUF[2..3]
0A55 1A          LDAX D                A = MSGBUF[2..3]
0A56 FE 20       CPI  20H              PSW:CY = CODEOK = MSGBUF[2..3].LT.HEX20
                ;                      IF CODEOK .EQ. FALSE
                ;                        CODE IS NOT 0 OR 1
0A58 D0          RNC                     PROERR(ERRFLG)
                ;                        RETURN
                ;                      ENDIF
                ;                      PROCESS ACCORDING TO CODE IN MSGBUF[2]
0A59 FE 10       CPI  10H              PSW:CY = CODE0 = MSGBUF[2..3].LT.HEX10
0A5B 3E 07       MVI  A,7              A = NIBCNT = 7
0A5D D2 6D 0A    JNC  MSERN1           IF CODE0 .EQ. TRUE
                ;                        SERIAL NUMBER IS BEING ENTERED
                ;                        CHECK INPUT DATA
```

```
0A60 48          MOV  C,B              C = OFFSET, MSGBUF[3]
0A61 CD B3 OF    CALL MVLNIB           MVLNIB(MSGBUF[3],MSGBUF[3],NIBCNT,.
                ;                            ( @C       , @B       , A    ,
                ;                            ( 0        , I        , I    ,
                ;
                ;                            NONBCD,ZROFLG)
                ;                            PSW:S ,PSW:Z )
                ;                             0    , 0    )
                ;                      IF NONBCD .EQ. TRUE
                ;                        BAD INPUT
0A64 F8          RM                      PROERR(ERRFLG)
                ;                      ELSE
                ;                        STORE NEW SERIAL NUMBER
0A65 0E 21       MVI  C,SERNUM           C = OFFSET, SERNUM
0A67 CD B3 OF    CALL MVLNIB             MVLNIB(SERNUM[0],MSGBUF[3],NIBCNT,
                ;                              ( @C       , @B       , A    ,
                ;                              ( 0        , I        , I    ,
                ;
                ;                              NONBCD,ZROFLG)
                ;                              PSW:S ,PSW:Z )
                ;                               0    , 0    )
                ;                      ENDIF
0A6A E1          POP  H                CLEAN UP STACK
0A6B 0C          INR  C                PSW:Z = ERRFLG = (C+1).EQ.0 = FALSE
0A6C C9          RET
               MSERN1;               ELSE
                ;                      SERIAL NUMBER IS BEING LOCKED
                ;                      CHECK INPUT DATA
0A6D 50          MOV  D,B              D = OFFSET, MSGBUF[3]
0A6E 1E 21       MVI  E,SERNUM         E = OFFSET, SERNUM[0]
0A70 CD BE OE    CALL CMPARE           CMPARE(MSGBUF[3],SERNUM[0],NIBCNT,
                ;                            ( @D       , @E       , A    ,
                ;                            ( I        , I        , I    ,
                ;
                ;                            NEGFLG,ZROFLG)
                ;                            PSW:S ,PSW:Z )
                ;                             0    , 0    )
                ;                      IF ZROFLG .EQ. FALSE
                ;                        INPUT DOESN'T MATCH SERIAL NUMBER
0A73 C0          RNZ                     PROERR(ERRFLG)
                ;                      ELSE
0A74 CD 9E 12    CALL NVMWR              WRITE NEW ACTIVE SERVICE BLOCK
                ;                        NO BLOCK IS NOW OPEN
                ;                        LOCK SERIAL NUMBER
0A77 21 10 74    LXI  H,SERFLG/2+X       HL = ADDRESS, SERFLG
0A7A 7E          MOV  A,M                SERFLG.SNOLCK = TRUE
0A7B F6 10       ORI  10H
0A7D 77          MOV  M,A
                ;                        UPDATE DATA FOR NORMAL BLOCK
                ;                        CLEAR PIECE COUNT REGISTER
                ;                        CLEAR ASCENDING REGISTER
                ;                        CLEAR DESCENDING REGISTER
0A7E AF          XRA  A                  A = NULL = 0
0A7F 01 28 1A    LXI  B,(4+PCESIZ+DSCSIZ+ASCSIZ)*100H+PCEREG
                ;                        B = NIBCNT = 4+PCESIZ+DSCSIZ+ASCSIZ
                ;                        C = OFFSET, PCEREG
0A82 CD 24 OF    CALL FILNIB             FILNIB(PCEREG,NULL,NIBCNT)
                ;                              ( @C   , A  , B    )
                ;                              ( 0    , I  , I    )
                ;                        CLEAR ERROR CODE
0A85 32 0A 74    STA  ERRCOD/2+X         ERRCOD = 0
                ;                        CLEAR ERROR COUNT
0A88 32 0B 74    STA  ERRCNT/2+X         ERRCNT = 0
                ;                        STORE NEW CONTROL SUM CRC
0A8B CD 4E 06    CALL CTLSUM             CTLSUM(CSMCRC,ERRFLG)
                ;                              ( D    ,PSW:Z )
                ;                              ( 0    , 0    )
```

```
0A8E 7A          MOV  A,D              CTLCRC = CSMCRC
0A8F 32 08 74    STA  CTLCRC/2+X
                ;                      STORE NEW ASCENDING REGISTER CRC
0A92 01 38 08    LXI  B,ASCSIZ*100H+ASCREG
                ;                      B = NIBCNT = ASCSIZ
                ;                      C = OFFSET, ASCREG
0A95 CD B1 0E    CALL CRC              CRC(ASCREG,NIBCNT,CRCVAL)
                ;                         ( @C   , B     , D    )
0A98 7A          MOV  A,D              ASCCRC = CRCVAL
0A99 32 20 74    STA  ASCCRC/2+X
                ;                      STORE NEW DESCENDING REGISTER CRC
0A9C 01 2F 07    LXI  B,DSCSIZ*100H+DSCREG
                ;                      B = NIBCNT = DSCSIZ
                ;                      C = OFFSET, DSCREG
0A9F CD B1 0E    CALL CRC              CRC(DSCREG,NIBCNT,CRCVAL)
                ;                         ( @C   , B     , D    )
                ;                         ( I    , I     , 0    )
0AA2 7A          MOV  A,D              DSCCRC = CRCVAL
0AA3 32 1B 74    STA  DSCCRC/2+X
0AA6 E1          POP  H                CLEAN UP STACK
                ;                      WRITE NORMAL BLOCK AND
                ;                      OPEN ERASED SERVICE BLOCK
0AA7 C3 19 12    JMP  NVMSTO           NVMSTO(ERRFLG)
                ;                            (PSW:Z )
                ;                            ( 0    )
                ;                   ENDIF
                ;                 ENDIF
                ;                 RETURN
                ;MSG2MU(FMTNIB,DSTSIZ,ERRFLG)(WORK1 ,DEFDCM,DIEDCM)
                ;      (NIBSTR,UBYTE ,BIT   )(NIBSTR,BYTE  ,BYTE  )
                ;      ( I    , I    , 0    )( 0    , I    , I    )
                ;      ( @B   , D    ,PSW:Z )( RAM  , RAM  , RAM  )
                ;      ( NC   , NC   , C    )( C    , NC   , NC   )
                ;
                ;PSW DESTROYED
                ;REGISTERS DESTROYED
                ;
                ;TRANSFORM FORMAT AND DATA IN MESSAGE FORMAT INTO A  METER
                ;UNIT FORMAT BCD STRING RIGHT JUSTIFIED IN WORK1.
                ;
                MSG2MU;                ****ENTRY POINT
                ;                      CLEAR OUTPUT BLOCK
0AAA 3E C0       MVI  A,WORK1          A = OFFSET, WORK1[J=0]
0AAC CD 85 0E    CALL CLRBLK           CLRBLK(WORK1)
                ;                             ( @A  )
                ;                             ( 0   )
0AAF 2E 01       MVI  L,1              L = FLAGV = 1; WHICH DECREMENTS TO 0
                ;                      PRODUCING:
                ;                      PSW:Z = ERRFLG = TRUE
                ;                      CALCULATE TOTAL CHARACTER COUNT
                ;                      INCLUDING POSSIBLE LEADING ZERO
                ;                      B = OFFSET, FMTNIB[I=0]
0AB1 CD 35 0F    CALL GETNIB           GETNIB(NTOTAL,ZERO ,FMTNIB[I])
                ;                             ( A    ,PSW:Z, @B      )
                ;                             ( 0    , 0   , I       )
0AB4 3C          INR  A                H = NTOTAL = (NTOTAL+1) .AND. HEXFE
0AB5 E6 FE       ANI  0FEH
0AB7 67          MOV  H,A
                ;                      CALCULATE COUNT OF CHARACTERS TO RIGHT
                ;                      OF DECIMAL POINT
0AB8 04          INR  B                B = OFFSET, FMTNIB[I=1]
0AB9 CD 35 0F    CALL GETNIB           GETNIB(NFRAC,ZERO ,FMTNIB[I])
                ;                             ( A   ,PSW:Z, @B      )
                ;                             ( 0   , 0   , I       )
                ;                      CHECK FOR UNSPECIFIED DECIMAL POSITION
0ABC FE 0F       CPI  0FH              IF NFRAC .EQ. HEX0F
0ABE C2 C4 0A    JNZ  MSG2M1
```

```
                       ;                       USE DEFAULT DECIMAL POSITION
     0AC1 3A 36 74       LDA   DEFDCM/2+X      A = NFRAC = DEFDCM
                       MSG2M1;               ENDIF
                       ;                     CHECK FOR TOO MANY FRACTIONAL DIGITS
     0AC4 4F             MOV   C,A           C = NFRAC
     0AC5 3A 35 74       LDA   DIEDCM/2+X    A = DIEDCM
     0AC8 B9             CMP   C             IF DIEDCM .GE. NFRAC
     0AC9 DA F2 0A       JC    MSG2M5
                       ;                       THERE IS ROOM FOR FRACTIONAL DIGITS
                       ;                       CALCULATE INDEX FOR LOW ORDER DIGIT
     0ACC 2F             CMA                   A = J = 15-DIEDCM+NFRAC
     0ACD C6 10          ADI   16
     0ACF 81             ADD   C
                       ;                       CHECK DATA LENGTH AND ALIGNMENT WITH
                       ;                       RESPECT TO WORK AREA
     0AD0 BC             CMP   H               IF DINDEX .GE. NTOTAL
     0AD1 DA F2 0A       JC    MSG2M4
                       ;                         DATA FITS IN WORK AREA
                       ;                         MOVE DATA INTO WORK AREA
     0AD4 C6 C0          ADI   WORK1             C = OFFSET, WORK1[J]
     0AD6 4F             MOV   C,A
     0AD7 78             MOV   A,B               B = OFFSET, FMTNIB[I=NTOTAL+1]
     0AD8 84             ADD   H
     0AD9 47             MOV   B,A
     0ADA 7C             MOV   A,H               A = NTOTAL
     0ADB CD C2 0F       CALL  MVRNIB            MVRNIB(WORK1[J],FMTNIB[I],NTOTAL,
                       ;                               ( @C     , @B      , A    ,
                       ;                               ( O      , I       , I    ,
                       ;
                       ;
                       ;                         NONBCD,ZROFLG)
                       ;                         PSW:S ,PSW:Z )
                       ;                          O     , O     )
                       ;                         CHECK CHARACTERS MOVED
     0ADE FA F2 0A       JM    MSG2M3            IF NONBCD .EQ. FALSE
                       ;                           ONLY NUMERIC CHARS WERE MOVED.
                       ;                           CHECK DATA LENGTH WITH RESPECT TO
                       ;                           DECLARED SIZE OF DESTINATION.
                       ;                           SET INDEX TO LEFT OF DECLARED
                       ;                           HIGH ORDER DIGIT POSITION.
     0AE1 7A             MOV   A,D                 A = I = 15-DSTSIZ
     0AE2 2F             CMA
     0AE3 C6 10          ADI   16
                       ;                           CALCULATE NUMBER OF DIGIT
                       ;                           POSITIONS ABOVE HIGH ORDER
                       ;                           DIGIT POSITION
     0AE5 67             MOV   H,A                 H = NTOTAL = 16-DSTSIZ
     0AE6 24             INR   H
                       ;                           SCAN POSITIONS ABOVE HIGH ORDER
                       ;                           DIGIT POSITION
     0AE7 C6 C0          ADI   WORK1               B = OFFSET, WORK1[I]
     0AE9 47             MOV   B,A
     0AEA 7C             MOV   A,H                 A = NTOTAL
     0AEB CD 0F 10       CALL  RSCAN               RSCAN(WORK1[I],NTOTAL,
                       ;                                 ( @B     , A    ,
                       ;                                 ( I      , I    ,
                       ;
                       ;                                NONBCD,ZROFLG)
                       ;                                 PSW:S ,PSW:Z )
                       ;                                  O     , O     )
                       ;                           CHECK CHARACTERS SCANNED
     0AEE C2 F2 0A       JNZ   MSG2M2              IF ZROFLG .EQ. FALSE
                       ;                             DECLARED DATA LENGTH EXCEEDED
     0AF1 2C             INR   L                     L = FLAGV = 2; DECREMENTS TO 1
                       ;                             PRODUCING:
                       ;                             PSW:Z = ERRFLG = FALSE
                       MSG2M2;                     ENDIF
```

```
                MSG2M3;                 ENDIF
                MSG2M4;                ENDIF
                MSG2M5;              ENDIF
0AF2 2D           DCR  L             PSW:Z = ERRFLG
0AF3 C9           RET                RETURN
                ;MTRSTS()(XMTBUF,KDCTRL,MRSTS1,MRSTS2,NORFLG)
                ;        (BYTSTR,BITSTR,BITSTR,BITSTR,BITSTR)
                ;        ( O    , I    , I    , I    , O    )
                ;        ( RAM  , RAM  , RAM  , RAM  , RAM  )
                ;        ( C    , NC   , NC   , NC   , C    )
                ;
                ;ALL REGISTERS DESTROYED
                ;PSW DESTROYED
                ;
                ;PUT CURRENT STATUS MESSAGE INTO TRANSMIT BUFFER
                ;
                MTRSTS;               ****ENTRY POINT
0AF4 21 03 80     LXI  H,HSTAT*100H+3
                ;                      L = BYTCNT = 3
                ;                      H = HSTAT
0AF7 22 50 74     SHLD XMTBUF/2+X+0   XMTBUF[0] = BYTCNT
                ;                      XMTBUF[1] = HSTAT
0AFA 11 52 74     LXI  D,XMTBUF/2+X+2
                ;                      DE = ADDRESS, XMTBUF[2]
0AFD 21 24 74     LXI  H,MRSTS1/2+X   HL = ADDRESS, MRSTS1
                ;                      XMTBUF[2].0 = 0
                ;                      XMTBUF[2].1 = MRSTS1.DATDOR
                ;                      XMTBUF[2].2 = MRSTS1.INSFND
                ;                      XMTBUF[2].3 = MRSTS1.LOWPOS
                ;                      XMTBUF[2].4 = MRSTS1.SERMOD
                ;                      XMTBUF[2].5 = MRSTS1.ENABLD
                ;                      XMTBUF[2].6 = 0
                ;                      XMTBUF[2].7 = MRSTS1.QUEREG
0B00 7E           MOV  A,M
0B01 E6 7D        ANI  7DH
0B03 12           STAX D
0B04 23           INX  H               HL = ADDRESS, MRSTS2
0B05 13           INX  D               DE = ADDRESS, XMTBUF[3]
                ;                      XMTBUF[3].0 = MRSTS2.FATMOD
                ;                      XMTBUF[3].1 = KDCTRL.KBDDSB
                ;                      XMTBUF[3].2..7 = 0
0B06 7E           MOV  A,M
0B07 E6 80        ANI  80H
0B09 47           MOV  B,A
0B0A 3A 27 74     LDA  KDCTRL/2+X
0B0D 0F           RRC
0B0E 0F           RRC
0B0F E6 40        ANI  40H
0B11 B0           ORA  B
0B12 12           STAX D
0B13 23           INX  H               HL = ADDRESS, NORFLG
0B14 7E           MOV  A,M             NORFLG.QUESTS = FALSE
0B15 E6 7F        ANI  7FH
0B17 77           MOV  M,A
0B18 C9           RET                  RETURN
                ;NPAUSE(N    ,ZROFLG)
                ;      (WORD,BIT    )
                ;      (I/O ,O      )
                ;      (BC   ,PSW:Z )
                ;      ( C   , C    )
                ;
                ;REGISTERS DESTROYED
                ;PSW DESTROYED
                ;
                ;PAUSE FOR ABOUT 100 USEC, AND DECREMENT N
                ;
                NPAUSE;                ****ENTRY POINT
```

```
                  ;                PAUSE
0B19 3E 0A         MVI  A,10       A = 10
                  NPAUS1;          DO UNTIL A = 0
0B1B 3D            DCR  A            A = A-1
0B1C C2 1B 0B      JNZ  NPAUS1
                  ;                ENDDO
                  ;                DECREMENT N
0B1F 0B            DCX  B          BC = N = N-1
                  ;                DEFINE STATUS OF N
0B20 78            MOV  A,B        PSW:Z = ZROFLG = N .EQ. 0
0B21 B1            ORA  C
0B22 C9            RET             RETURN
                  ;POSUPD()(WORK1 ,LOWWRN,POSREG,ASCREG,DSCREG,
                  ;        (NIBSTR,NIBSTR,NIBSTR,NIBSTR,NIBSTR,
                  ;        ( I/O  , I     , I     , I     , I     ,
                  ;        ( RAM  , RAM   , RAM   , RAM   , RAM   ,
                  ;        ( C    , NC    , NC    , C     , C     ,
                  ;
                  ;         ASCCRC,DSCCRC,UNLOCK,MRSTS1,MRSTS2)
                  ;         BYTE  ,BYTE  ,NIBSTR,BITSTR,BITSTR)
                  ;          I    , I    , I    , I/O  , I     )
                  ;          RAM  , RAM  , RAM  , RAM  , RAM   )
                  ;          NC   , NC   , NC   , C    , NC    )
                  ;
                  ;PSW DESTROYED
                  ;REGISTERS DESTROYED
                  ;
                  ;UPDATE METER STATUS FOR CURRENT POSTAGE SETTING
                  ;
                  POSUPD;          ****ENTRY POINT
                  ;------------------------------------------------------
                  ;                BUILD WARNING VALUE SAME LENGTH AS
                  ;                DESCENDING REGISTER STARTING AT
                  ;                WORK1[0]
                  ;                CLEAR WORK AREA
0B23 3E C0         MVI  A,WORK1    A = OFFSET, WORK1
0B25 CD 85 0E      CALL CLRBLK     CLRBLK(WORK1)
                  ;                      ( @A   )
                  ;                      ( 0    )
0B28 06 1D         MVI  B,LOWWRN+1 B = OFFSET, LOWWRN[1]
0B2A CD 35 0F      CALL GETNIB     GETNIB(EXPONT,ZROFLG,LOWWRN[1])
                  ;                      ( A     ,PSW:Z , @B      )
                  ;                      ( 0     , 0    , I       )
0B2D 2F            CMA             A = -EXPONT-1
0B2E C6 C7         ADI  WORK1+DSCSIZ C = OFFSET, WORK1[DSCSIZ-1-EXPONT]
0B30 4F            MOV  C,A
0B31 05            DCR  B          B = OFFSET, LOWWRN[0]
0B32 3E 01         MVI  A,1        A = NIBCNT = 1
0B34 CD B3 0F      CALL MVLNIB     MVLNIB(WORK1[DSCSIZ-1-EXPONT],
                  ;                      ( @C                        ,
                  ;                      ( 0                         ,
                  ;
                  ;                      LOWWRN[0],NIBCNT,NONBCD,ZROFLG)
                  ;                       @B      , A    ,PSW:S ,PSW:Z )
                  ;                       I       , I    , 0    , 0    )
                  ;------------------------------------------------------
                  ;                INITIALIZE FOR CALLS TO POSUP1
0B37 21 24 74      LXI  H,MRSTS1/2+X HL = ADDRESS, MRSTS1
0B3A 7E            MOV  A,M
0B3B E6 CF         ANI  0CFH
0B3D 77            MOV  M,A        MRSTS1.INSFND = FALSE
                  ;                MRSTS1.LOWPOS = FALSE
                  ;------------------------------------------------------
                  ;                COMPARE DESCENDING REGISTER WITH
                  ;                WARNING VALUE
0B3E 06 10         MVI  B,10H      B.LOWPOS = TRUE
0B40 CD 85 0B      CALL POSUP1     IF DSCREG .LT. WORK1[0]
```

```
                    ;                       MRSTS1.LOWPOS = B.LOWPOS = TRUE
                    ;                     ENDIF
                    ;-----------------------------------------------------
                    ;                     BUILD POSTAGE SETTING REGISTER SAME
                    ;                     LENGTH AS DESCENDING REGISTER
                    ;                     STARTING AT WORK1[0]
                    ;                     CLEAR WORK AREA
0B43 3E C0          MVI  A,WORK1          A = OFFSET, WORK1
0B45 CD 85 0E       CALL CLRBLK           CLRBLK(WORK1)
                    ;                            ( @A   )
                    ;                            ( 0    )
0B48 01 C3 42       LXI  B,POSREG*100H+WORK1+0+DSCSIZ-NBANKS
                    ;                     B = OFFSET, POSREG
                    ;                     C = OFFSET, WORK1[0+DSCSIZ-NBANKS]
0B4B 3E 04          MVI  A,NBANKS         A = NBANKS
0B4D CD B3 0F       CALL MVLNIB           MVLNIB(WORK1[0+DSCSIZ-NBANKS],
                    ;                            ( @C                     ,
                    ;                            ( 0                      ,
                    ;
                    ;                            POSREG,NBANKS,NONBCD,ZROFLG)
                    ;                             @B    , A     ,PSW:S ,PSW:Z )
                    ;                             I     , I     , O    , O    )
                    ;-----------------------------------------------------
                    ;                     COMPARE DESCENDING REGISTER WITH
                    ;                     POSTAGE SETTING
0B50 06 20          MVI  B,20H            B.INSFND = TRUE
0B52 CD 85 0B       CALL POSUP1           IF DSCREG .LT. WORK1[0]
                    ;                       MRSTS1.INSFND = B.INSFND = TRUE
                    ;                     ENDIF
                    ;-----------------------------------------------------
                    ;                     CHECK ASCENDING REGISTER CRC
0B55 01 38 08       LXI  B,ASCSIZ*100H+ASCREG
                    ;                     B = ASCSIZ
                    ;                     C = OFFSET, ASCREG[0]
0B58 3A 20 74       LDA  ASCCRC/2+X       A = ASCCRC
0B5B CD 92 0B       CALL POSUP2           IF ASCCRC INCORRECT
                    ;                       FILL ASCREG WITH HEXOF
                    ;                       DECLARE DEAD METER. BAD CRC
                    ;                     ENDIF
                    ;-----------------------------------------------------
                    ;                     CHECK DESCENDING REGISTER CRC
0B5E 01 2F 07       LXI  B,DSCSIZ*100H+DSCREG
                    ;                     B = DSCSIZ
                    ;                     C = OFFSET, DSCREG[0]
0B61 3A 1B 74       LDA  DSCCRC/2+X       A = DSCCRC
0B64 CD 92 0B       CALL POSUP2           IF DSCCRC INCORRECT
                    ;                       FILL DSCREG WITH HEXOF
                    ;                       DECLARE DEAD METER. BAD CRC
                    ;                     ENDIF
                    ;-----------------------------------------------------
                    ;                     CHECK CONTROL SUM CRC
                    ;                     MRSTS2.FATMOD WILL BE USED VS ERRFLG
0B67 CD 3A 06       CALL CONSUM           CONSUM(ERRFLG)
                    ;                            (PSW:Z )
                    ;                            ( 0    )
                    ;-----------------------------------------------------
                    ;                     ENABLE OR DISABLE METER
0B6A 01 24 74       LXI  B,MRSTS1/2+X     BC = ADDRESS, MRSTS1
0B6D 0A             LDAX B
0B6E E6 68          ANI  68H
0B70 67             MOV  H,A              H = FLAGS = MRSTS1.DATDOR,
                    ;                                 MRSTS1.INSFND,
                    ;                                 MRSTS1.SERMOD
0B71 03             INX  B                BC = ADDRESS, MRSTS2
0B72 0A             LDAX B
0B73 E6 81          ANI  81H
0B75 B4             ORA  H                A = FLAGS = FLAGS .OR.
```

```
                  ;                           MRSTS2.FATMOD,
                  ;                           MRSTS2.PRVMOD
                  ;                     IF FLAGS .NE. 0
0B76 C2 D3 05      JNZ  DISABL            DISABLE
                  ;                     ELSE
                  ;                       COMPARE $ UNLOCK VALUE WITH SETTING
0B79 11 18 42      LXI  D,POSREG*100H+UNLOCK
                  ;                       D = OFFSET, POSREG
                  ;                       E = OFFSET, UNLOCK
0B7C 3E 04         MVI  A,NBANKS          A = NBANKS
0B7E CD 8E 0E      CALL CMPARE            CMPARE(POSREG,UNLOCK,NBANKS,
                  ;                              ( @D    , @E    , A     ,
                  ;                              ( I     , I     , I     ,
                  ;
                  ;                              NEGFLG,ZROFLG)
                  ;                              PSW:S ,PSW:Z )
                  ;                               O     , O     )
0B81 FC F9 05      CM   ENABLE            IF NEGFLG .EQ. TRUE
                  ;                         ENABLE
                  ;                       ENDIF
                  ;                     ENDIF
                  ;--------------------------------------------------------
0B84 C9            RET                  RETURN
                  ;--------------------------------------------------------
                  ;--------------------------------------------------------
                  ;--------------------------------------------------------
                  POSUP1;               ****LOCAL ENTRY POINT
0B85 11 C0 2F      LXI  D,DSCREG*100H+WORK1+0
                  ;                     D = OFFSET, DSCREG[0]
                  ;                     E = OFFSET, WORK1[0]
0B88 3E 07         MVI  A,DSCSIZ        A = DSCSIZ
0B8A CD 8E 0E      CALL CMPARE          CMPARE(DSCREG[0],WORK1[0],DSCSIZ,
                  ;                            ( @D      , @E      , A     ,
                  ;                            ( I       , I       , I     ,
                  ;
                  ;                            NEGFLG,ZROFLG)
                  ;                            PSW:S ,PSW:Z )
                  ;                             O     , O     )
0B8D F0            RP                   IF NEGFLG .EQ. TRUE
0B8E 7E            MOV  A,M               MRSTS1.FLAG = B.FLAG = TRUE
0B8F B0            ORA  B
0B90 77            MOV  M,A
                  ;                     ENDIF
0B91 C9            RET                  RETURN
                  ;--------------------------------------------------------
                  ;--------------------------------------------------------
                  ;--------------------------------------------------------
                  POSUP2;               ****LOCAL ENTRY POINT
0B92 CD B1 0E      CALL CRC             CRC(REGSTR[0],REGSIZ,CRCVAL)
                  ;                       ( @C      , B     , D     )
                  ;                       ( I       , I     , O     )
0B95 BA            CMP  D               PSW:Z = NOERR = REGCRC .EQ. CRCVAL
0B96 C8            RZ                   IF NOERR .EQ. FALSE
                  ;                       FILL BAD REGISTER WITH HEXOF
0B97 3E 0F         MVI  A,0FH             A = HEXOF
0B99 C3 24 0F      JMP  FILNIB            FILNIB(REGSTR[0],HEXOF,REGSIZ)
                  ;                              ( @C      , A    , B     )
                  ;                              ( O       , I    , I     )
                  ;                       DECLARE DEAD METER. BAD CRC
0B9C 3E 00         MVI  A,BADCRC          A = CODE = BADCRC
0B9E C3 85 10      JMP  NVMDED            NVMDED(CODE,ERRFLG)
                  ;                              ( A   ,PSW:Z )
                  ;                              ( I   , O    )
                  ;                     ENDIF
                  ;                     RETURN
                  ;--------------------------------------------------------
                  ;--------------------------------------------------------
                  ;--------------------------------------------------------
```

```
                     ;PROERR(ERRFLG)(XMTBUF)
                     ;       (BIT   )(BYTSTR)
                     ;       ( 0    )( 0    )
                     ;       (PSW:Z )( RAM  )
                     ;       ( C    )( C    )
                     ;
                     ;REGISTERS DESTROYED
                     ;PSW DESTROYED
                     ;
                     ;PROCESS PROCEDURAL ERROR
                     ;
                     PROERR;              ****ENTRY POINT
0BA1 CD F4 0A          CALL MTRSTS        PUT STATUS MESSAGE IN TRANSMIT BUFFER
0BA4 11 53 74          LXI  D,XMTBUF/2+X+3
                     ;                    DE =  ADDRESS, XMTBUF[3]
                     ;                    DECLARE PROCEDURAL ERROR
0BA7 1A                LDAX D             XMTBUF[3].PROERR = TRUE
0BA8 F6 02             ORI  2
0BAA 12                STAX D
0BAB AF                XRA  A             PSW:Z = ERRFLG = TRUE
0BAC C3 64 04          JMP  PERDSP        MAKE PROCEDURAL ERROR DISPLAY
                     ;                    RETURN
                     ;RDCYC(INCYC ,INCYC,ADRESS,MRSTS1)(DATA1 )
                     ;     (BITSTR,BIT  ,ADRESS,BITSTR)(BITSTR)
                     ;     ( 0    , 0   , 0    , -    )( I    )
                     ;     ( A    ,PSW:C, HL   , @HL  )( 6800 )
                     ;     ( C    , C   , C    , NC   )( NC   )
                     ;
                     ;REGISTERS NOT CHANGED
                     ;PSW DESTROYED
                     ;
                     ;RETURN STATUS OF METER CYCLE SWITCH
                     ;
                     RDCYC;               ****ENTRY POINT
                     ;                    DEFINE ADDRESS FOR CALLING ROUTINES
0BAF 21 24 74          LXI  H,MRSTS1/2+X  HL = ADDRESS, MRSTS1
                     ;                    READ CYCLE SWITCH
0BB2 3A 00 68          LDA  DATA1         A = INCYC,INCYCN = DATA1.2,DATA1.3
0BB5 E6 30             ANI  30H
0BB7 C2 C2 0B          JNZ  RDCYC1        IF BOTH SIDES OF SWITCH CLOSED
                     ;                      DECLARE DEAD METER; BAD CYCLE SWITCH
0BBA 3E 04             MVI  A,BADCYC        A = BADCYC
0BBC CD 85 10          CALL NVMDED          NVMDED(BADCYC,ERRFLG)
                     ;                             ( A     ,PSW:Z )
                     ;                             ( I     , 0    )
0BBF C3 B6 01          JMP PWRDN            ABORT
                     RDCYC1;              ELSE
0BC2 17                RAL                  PSW:C = INCYC = DATA1.2
0BC3 17                RAL
0BC4 17                RAL
0BC5 9F                SBB  A               A.0..7 = INCYC
0BC6 C9                RET                  RETURN
                     ;                    ENDIF
                     ;RECEVE()(SID,SOD,SOE,RECBUF,NORFLG)
                     ;        (BIT,BIT,BIT,BYTSTR,BITSTR)
                     ;        ( I , 0 , 0 , 0    , I    )
                     ;        (RIM,SIM,SIM, RAM  , RAM  )
                     ;        ( NC, C , C , C    , NC   )
                     ;
                     ;REGISTERS DESTROYED
                     ;PSW DESTROYED
                     ;
                     ;RECEIVE INCOMING MESSAGE IF EXTERNAL RTS IS PRESENT.
                     ;RECBUF[0], THE MESSAGE BYTE COUNT, IS CLEARED IF A
                     ;REQUEST TO SEND IS DETECTED.
                     ;
                     RECEVE;              ****ENTRY POINT
```

```
0BC7 3A 26 74   LDA  NORFLG/2+X    IF NORFLG.COMDSB .EQ. TRUE
0BCA E6 04      ANI  4
               ;                     COMMUNICATIONS ARE DISABLED
0BCC C0         RNZ                  RETURN
               ;                   END IF
0BCD 20         RIM                INPUT BIT
               ;                   A.0 = BIT = RIM.SID ;RTS OR IDLE
0BCE B7         ORA A              IF RIM.SID .NE. RTS
               ;                     NO INCOMING REQUEST TO SEND PRESENT
0BCF F0         RP                   RETURN
               ;                   ENDIF
               ;                   STOP TIMER
0BD0 CD 34 01   CALL STPTMR        STPTMR(WASOFF)
               ;                         (PSW:Z )
               ;                         ( 0    )
0BD3 21 27 0C   LXI  H,RECE06      SET TO REACH QUIT ROUTINE VIA RETURN
0BD6 E5         PUSH H
0BD7 21 48 74   LXI  H,RECBUF/2+X  HL = ADDRESS, RECBUF[N=0]
               ;                   (2 MVI VS 1 LXI FOR T3 = 100.012 USEC)
0BDA 06 00      MVI  B,0           B = BYTCNT = 0
0BDC 0E 80      MVI  C,80H         C = SIM*2 .AND. HEXFF, WHERE
               ;                      SIM.SOE = ENABLD = 1
0BDE 70         MOV  M,B           RECBUF[0] = 0

               RECE01;             DO UNTIL BIT .EQ. EOM
0BDF 3E C0      MVI  A,0C0H          SIM.SOD = ONEBIT=1 ;CTS,OR EOB ECHO
               ;                     SIM.SOE = ENABLD = 1
0BE1 30         SIM                  OUTPUT ONEBIT
0BE2 11 FB FE   LXI  D,-261          DE = COUNT ;FOR T13 = 3.494 MSEC
               RECE02;               DO UNTIL (BIT .EQ. START) .OR.
               ;                       (COUNT .GE. 0)
0BE5 20         RIM                    INPUT BIT
               ;                       A.0 = BIT = RIM.SID ;START,RTS,EOB
0BE6 13         INX  D                 DE = COUNT = COUNT+1
0BE7 A2         ANA  D                 A.0 = BIT .AND. COUNT.0
0BE8 FA E5 0B   JM   RECE02
               ;                     ENDDO
               ;
0BEB B2         ORA  D               IF COUNT .GE. 0
               ;                       T13 TIMEOUT OCCURRED
               ;                       START NOT RECEIVED AFTER RTS
0BEC F0         RP                     QUIT
               ;                     ENDIF
               ;                     THE FIRST BYTE'S START BIT HAS BEEN
               ;                     READ. IT WILL BE READ AGAIN AND
               ;                     ECHOED LATER.
               ;                     POINT AT NEXT BYTE IN RECBUF.
0BED 23         INX  H               HL = ADDRESS, RECBUF[N=N+1]
               ;                     CHECK FOR BUFFER OVERFLOW
0BEE 04         INR  B               B = BYTCNT = BYTCNT+1
0BEF 3E 07      MVI  A,7             IF 7 .LT. BYTCNT
0BF1 B8         CMP  B
               ;                       TRYING TO RECEIVE 8TH BYTE
0BF2 D8         RC                     QUIT
               ;                     ENDIF
               ;                     SET TO INPUT 10 BITS
               ;                     1 START, 8 DATA, AND 1 EOB OR EOM
0BF3 16 0A      MVI  D,10            D = BITCNT = 10

               RECE03;               LOOP ;BREAK ON BITCNT .EQ. 0
0BF5 20         RIM                    INPUT BIT
               ;                       A.0 = BIT = RIM.SID
0BF6 17         RAL                    PSW:CY  = BIT
0BF7 79         MOV  A,C               PSW:CY,A = SIM*2
0BF8 1F         RAR                    A = SIM
               ;                       SIM.SOD = ECHO = BIT
               ;                       SIM.SOE = ENABLD = 1
```

```
0BF9 30          SIM                   OUTPUT 10 ECHO BITS
0BFA 15          DCR  D                D = BITCNT = BITCNT-1
                ;                      IF BITCNT .EQ. 0
0BFB CA 0C 0C    JZ   RECE04             BREAK
                ;                      ENDIF
0BFE 17          RAL                   PSW:CY = BIT
                ;                      SHIFT 9 BITS INTO BUFFER
                ;                      1 START,(LOST); 8 DATA,(KEPT)
0BFF 7E          MOV  A,M              PSW:CY,A = RECBUF[N]*2
0C00 1F          RAR                   RECBUF[N] = (PSW:CY,A)/2
0C01 77          MOV  M,A
0C02 77          MOV  M,A              DELAY ;BIT PERIOD = 103.923 USEC
0C03 3E 07       MVI  A,7
0C05 3D          DCR  A
0C06 F2 05 0C    JP   $-1
0C09 C3 F5 0B    JMP  RECE03
                RECE04;              ENDLOOP
0C0C B7          ORA  A              CHECK FOR EOM
0C0D FA DF 0B    JM   RECE01
                ;                  ENDDO
0C10 3E 21       MVI  A,33         DELAY ;T8 = 1264.965 USEC
0C12 3D          DCR  A
0C13 F2 12 0C    JP   $-1
                ;                  CHECK FOR NO-ERROR PULSE
0C16 20          RIM               INPUT BIT
                ;                  A.0 = BIT = RIM.SID
0C17 B7          ORA  A            IF BIT .EQ. ACK
0C18 F2 1F 0C    JP   RECE05
                ; .                  MESSAGE RECEIVED WITHOUT ERROR
                ;                    PUT NONZERO BYTE COUNT IN BUFFER
0C1B 78          MOV  A,B            RECBUF[0] = BYTCNT
0C1C 32 48 74    STA  RECBUF/2+X
                RECE05;            ENDIF
0C1F F1          POP  PSW          CLEAN UP STACK
0C20 16 22       MVI  D,34         DELAY ;T15 = 1560.533 USEC
0C22 15          DCR  D
0C23 F2 22 0C    JP   $-1
0C26 C9          RET               RETURN
                ;
                RECE06;            QUIT RECEIVE ROUTINE
0C27 3E 40       MVI  A,40H        SIM.SOD = IDLE = 0
                ;                  SIM.SOE = ENABLD = 1
0C29 30          SIM               OUTPUT IDLE
0C2A 16 C2       MVI  D,194        DELAY ;T15 = 1558.298 USEC
0C2C 15          DCR  D
0C2D F2 2C 0C    JP   $-1
0C30 C9          RET               RETURN
                ;REDSTS(TRPSW,PRVSW)(PORTA ,PORTC )
                ;      (BYTE ,BYTE )(BITSTR,BITSTR)
                ;      ( O   , O   )( I/O  , I     )
                ;      ( B   , A   )( 7001 , 7003  )
                ;      ( C   , C   )( C    , NC    )
                ;
                ;REGISTERS DESTROYED
                ;PSW DESTROYED
                ;
                ;RETURNS VALUES FOR TRIP SWITCH AND PRIVELEGED SWITCH
                ;OFF = HEX00
                ;ON  = HEXFF
                ;
                REDSTS;            ****ENTRY POINT
                ;                  FETCH PORTA IMAGE
                ;                  SENSOR LEDS ASSUMED TO BE OFF
0C31 21 01 70    LXI  H,PORTA      HL = ADDRESS, PORTA
0C34 56          MOV  D,M          D = LEDOFF = PORTA
                ;                  TURN SENSOR LEDS ON
0C35 7A          MOV  A,D          PORTA = PORTA .AND. HEXDF
```

```
0C36 E6 DF      ANI  0DFH
0C38 77         MOV  M,A
               ;                    READ SENSORS
0C39 3A 03 70   LDA  PORTC
0C3C 07         RLC
0C3D 07         RLC
0C3E 07         RLC                 PSW:CY = TRPBIT = PORTC.2
0C3F 4F         MOV  C,A            C.0    = PRVBIT = PORTC.3
0C40 9F         SBB  A              B = TRPSW = TRPBIT*HEXFF
0C41 47         MOV  B,A
0C42 79         MOV  A,C            A = PRVSW = (.NOT. PRVBIT)*HEXFF
0C43 07         RLC
0C44 3F         CMC
0C45 9F         SBB  A
               ;                    TURN SENSOR LEDS OFF
0C46 72         MOV  M,D            PORTA = LEDOFF
0C47 C9         RET                 RETURN
               ;SELVAL(ERRFLG)(NORFLG,MRSTS1,POSREG)
               ;      (BIT   )(BITSTR,BITSTR,NIBSTR)
               ;      ( 0    )( 0    , I    , I    )
               ;      (PSW:Z )( RAM  , RAM  , RAM  )
               ;      ( C    )( C    , NC   , NC   )
               ;
               ;REGISTERS DESTROYED
               ;PSW DESTROYED
               ;
               ;PROCESS SELECTION VALUE REQUEST
               ;
               SELVAL;              ****ENTRY POINT
0C48 21 26 74   LXI  H,NORFLG/2+X   HL = ADDRESS, NORFLG
0C4B 7E         MOV  A,M            NORFLG.QUEPOS = FALSE
0C4C E6 BF      ANI  0BFH
0C4E 77         MOV  M,A
0C4F 3A 24 74   LDA  MRSTS1/2+X     IF MRSTS1.UNKSEL .EQ. TRUE
0C52 B7         ORA  A
               ;                      SELECTION VALUE IS UNKNOWN
0C53 FA A1 0B   JM   PROERR           PROERR(ERRFLG)
               ;                             (PSW:Z )
               ;                             ( 0    )
               ;                      RETURN
               ;                    ELSE
               ;                      FLAG VERIFICATION OF SELECTION VALUE
0C56 7E         MOV  A,M              NORFLG.UNVSEL = FALSE
0C57 E6 FD      ANI  0FDH
0C59 77         MOV  M,A
0C5A 11 60 0C   LXI  D,SELV01         DE = ADDRESS, SELV01
               ;                      PUT REPLY IN TRANSMIT BUFFER
0C5D C3 5B 0D   JMP  VALREQ           VALREQ(POSREG,POSFMT,HPSET,ERRFLG)
               ;                             (@@DE+0,@DE+1 ,@DE+2,PSW:Z )
               ;                             ( I    , I    , I   , 0    )
               ;                      RETURN
               ;                    ENDIF
               SELV01;              ARGUMENT LIST FOR VALREQ
0C60 42 40 81   DB   POSREG,POSFMT,HPSET
               ;SEREOE(ERRFLG)(CMBBUF,LOWWRN,SETLIM,AMTBUF,WORK1 ,UNLOCK)
               ;      (BIT   )(NIBSTR,NIBSTR,NIBSTR,NIBSTR,NIBSTR,NIBSTR)
               ;      ( 0    )( I    , 0    , 0    , I    , I/0  , 0    )
               ;      (PSW:Z )( RAM  , RAM  , RAM  , RAM  , RAM  , RAM  )
               ;      ( C    )( C    , C    , C    , NC   , C    , C    )
               ;
               ;PSW DESTROYED
               ;REGISTERS DESTROYED
               ;
               ;PERFORM SERVICE FUNCTIONS WHICH ARE INITIATED BY THE
               ;ENTRY OF AN AMOUNT AND COMBINATION
               ;
               SEREOE;              ****ENTRY POINT
```

```
                         ;                      CHECK METER STATUS
0C63 CD 4E 0F    CALL LSTATE           LSTATE(FATMOD,NORMOD,SERMOD,PRVMOD)
                         ;                            (PSW:S ,PSW:Z ,PSW:P ,PSW:C )
                         ;                            ( 0    , 0    , 0    , 0    )
                         ;                      IF FATMOD .EQ. TRUE
                         ;                        PROCESS ERROR
0C66 FA A1 0B    JM   PROERR             PROERR(ERRFLG)
                         ;                            (PSW:Z )
                         ;                            ( 0    )
                         ;                      ELSE
                         ;                        CHECK FORMAT BYTE IN CMBBUF
0C69 21 78 74    LXI  H,CMBBUF/2+X       HL = ADDRESS, CMBBUF[0..1]
0C6C 7E          MOV  A,M                IF CMBBUF[0..1] .NE. HEX1F
0C6D FE 1F       CPI  1FH
                         ;                        BAD FORMAT, PROCEEDURAL ERROR
0C6F C2 A1 0B    JNZ  PROERR                PROERR(ERRFLG)
                         ;                            (PSW:Z )
                         ;                            ( 0    )
                         ;                        ELSE
                         ;                        CHECK FOR OUT OF RANGE COMBINATION
0C72 23          INX  H                  HL = ADDRESS, CMBBUF[2..3]
0C73 7E          MOV  A,M                A = CMBBUF[2..3]
0C74 FE 04       CPI  4                  IF CMBBUF[2..3] .GE. 4
                         ;                        BAD COMBINATION, PROCEEDURAL ERROR
0C76 D2 A1 0B    JNC  PROERR                PROERR(ERRFLG)
                         ;                            (PSW:Z )
                         ;                            ( 0    )
                         ;                        ELSE
                         ;                        --CASE (CMBBUF[2..3])
0C79 11 1C 07    LXI  D,DSCSIZ*100H+LOWWRN
0C7C FE 01       CPI  1                     **01:
                         ;                            CHANGE LOW POSTAGE WARN LIMIT
0C7E CA FB 0C    JZ   SRVCNV                  SRVCNV(LOWWRN,DSCSIZ,ERRFLG)
                         ;                            ( @E   , D    ,PSW:Z )
                         ;                            ( 0    , I    , 0    )
0C81 11 1E 05    LXI  D,(NBANKS+1)*100H+SETLIM
0C84 FE 02       CPI  2                     **02:
                         ;                            CHANGE SETTING LIMIT
0C86 CA FB 0C    JZ   SRVCNV                  SRVCNV(SETLIM,NBANKS+1,ERRFLG)
                         ;                            ( @E   , D      ,PSW:Z )
                         ;                            ( 0    , I      , 0    )
0C89 06 E0       MVI  B,AMTBUF
                         ;                          **03:
                         ;                            CHANGE SERIAL NUMBER
0C8B F2 38 0A    JP   MSERNO                  MSERNO(AMTBUF,ERRFLG)
                         ;                            ( @B   ,PSW:Z )
                         ;                            ( I    , 0    )
                         ;                          **00:
0C8E 15          DCR  D                       D = NBANKS
                         ;                            CHANGE DOLLAR UNLOCK VALUE
0C8F CD AA 0A    CALL MSG2MU                  MSG2MU(AMTBUF,NBANKS,ERRFLG)
                         ;                            ( @B   , D    ,PSW:Z )
                         ;                            ( I    , I    , 0    )
                         ;                            IF ERRFLG .EQ. TRUE
                         ;                              BAD AMOUNT, PROCEEDURAL ERROR
0C92 CA A1 0B    JZ   PROERR                    PROERR(ERRFLG)
                         ;                                (PSW:Z )
                         ;                                ( 0    )
                         ;                            ELSE
                         ;                              REDEFINE $ UNLOCK VALUE
0C95 3E 04       MVI  A,NBANKS                  A = NBANKS
0C97 01 18 CC    LXI  B,(WORK1+16-NBANKS)*100H+UNLOCK
                         ;                              B = OFFSET, WORK1[16-NBANKS]
                         ;                              C = OFFSET, UNLOCK
0C9A CD B3 0F    CALL MVLNIB                    MVLNIB(UNLOCK,WORK1[16-NBANKS],
                         ;                                ( @C   , @B              ,
                         ;                                ( 0    , I              ,
```

```
                ;                             NBANKS,NONBCD,ZERO )
                ;                              A    ,PSW:S ,PSW:Z)
                ;                              I    , 0    , 0    )
0C9D 0C          INR  C                       PSW:Z = ERRFLG = FALSE
                ;                           ENDIF
                ;                         --ENDCASE
                ;                         ENDIF
                ;                       ENDIF
0C9E C9          RET                    RETURN
                ;SETPOS(MSGBUF,ERRFLG)(SETLIM,WORK1 ,WORK2 ,MRSTS1,
                ;      (NIBSTR,BIT   )(NIBSTR,NIBSTR,NIBSTR,BITSTR,
                ;      ( I    , 0    )( I    , 0    , 0    , 0    ,
                ;      ( @B   ,PSW:Z )( RAM  , RAM  , RAM  , RAM  ,
                ;      ( NC   , C    )( NC   , C    , C    , C    ,
                ;
                ;      NORFLG,POSREG)
                ;      BITSTR,NIBSTR)
                ;       0    , 0    )
                ;       RAM  , RAM  )
                ;       C    , C    )
                ;
                ;REGISTERS DESTROYED
                ;PSW DESTROYED
                ;
                ;PROCESS SET POSTAGE COMMAND
                ;
                SETPOS;                 ****ENTRY POINT
                ;                       SET TO REACH PROERR VIA RETURN
0C9F 21 A1 0B    LXI  H,PROERR
0CA2 E5          PUSH H
0CA3 CD 4E 0F    CALL LSTATE            LSTATE(FATMOD,NORMOD,SERMOD,PRVMOD)
                ;                             (PSW:S ,PSW:Z ,PSW:P ,PSW:CY)
                ;                             ( 0    , 0    , 0    , 0    )
                ;                       IF NORMOD .EQ. FALSE
                ;                         METER NOT IN NORMAL MODE
0CA6 C0          RNZ                      PROERR(ERRFLG)
                ;                       ELSE
                ;                         PUT NEW SETTING VALUE INTO WORK1
0CA7 16 04       MVI  D,NBANKS            D = NIBCNT = NBANKS
0CA9 CD AA 0A    CALL MSG2MU              MSG2MU(MSGBUF,NIBCNT,ERRFLG)
                ;                               ( @B    , D    ,PSW:Z )
                ;                               ( I     , I    , 0    )
0CAC F5          PUSH PSW                 SAVE A,PSW
0CAD 21 24 74    LXI  H,MRSTS1/2+X        HL = ADDRESS, MRSTS1
0CB0 7E          MOV  A,M                 MRSTS1.ENABLD = FALSE
0CB1 E6 FB       ANI  0FBH
0CB3 77          MOV  M,A
0CB4 F1          POP  PSW                 RESTORE A,PSW
                ;                         IF ERRFLG .EQ. TRUE
                ;                           NEW SETTING VALUE IS IMPROPER
0CB5 C8          RZ                         PROERR(ERRFLG)
                ;                         ELSE
                ;                           FETCH SETTING LIMIT EXPONENT
0CB6 06 1F       MVI  B,SETLIM+1            B = OFFSET, SETLIM[1]
0CB8 CD 35 0F    CALL GETNIB                GETNIB(EXPONT,ZROFLG,SETLIM[1])
                ;                                 ( A    ,PSW:Z , @B      )
                ;                                 ( 0    , 0    , I       )
                ;                           CALCULATE WORK2 INDEX FOR MANTISSA
0CBB 2F          CMA                        A = -EXPONT-1
0CBC C6 10       ADI  16                    C = I = 15-EXPONT
0CBE 4F          MOV  C,A
                ;                           CLEAR WORK2
0CBF 3E D0       MVI  A,WORK2               A = OFFSET, WORK2
0CC1 CD 85 0E    CALL CLRBLK                CLRBLK(WORK2)
                ;                                 ( @A  )
                ;                                 ( 0   )
```

```
                  ;                       PUT SET LIMIT MANTISSA INTO WORK2
0CC4 81            ADD  C                 C = OFFSET, WORK2[I]
0CC5 4F            MOV  C,A
0CC6 05            DCR  B                 B = OFFSET, SETLIM[0]
0CC7 CD 35 0F      CALL GETNIB            GETNIB(MANTIS,ZROFLG,SETLIM[0])
                  ;                             ( A     ,PSW:Z , @B       )
                  ;                             ( 0     , 0    , I        )
0CCA CD EE 0F      CALL PUTNIB            PUTNIB(WORK2[I],MANTIS)
                  ;                             ( @C      , A     )
                  ;                             ( 0       , I     )
                  ;                       COMPARE NEW SETTING VS SETTING LIM
0CCD 11 DB CB      LXI  D,(WORK1+15-NBANKS)*100H+(WORK2+15-NBANKS)
                  ;                       D = OFFSET, WORK1[N=15-NBANKS]
                  ;                       E = OFFSET, WORK2[N]
0CD0 3E 05         MVI  A,NBANKS+1        A = NIBCNT = NBANKS+1
0CD2 CD 8E 0E      CALL CMPARE            CMPARE(WORK1[N],WORK2[N],NIBCNT,
                  ;                             ( @D      , @E      , A     ,
                  ;                             ( I       , I       , I     ,
                  ;
                  ;                             NEGFLG,ZROFLG)
                  ;                             PSW:S ,PSW:Z )
                  ;                              0    , 0    )
                  ;                        IF NEGFLG .EQ. FALSE
                  ;                          NEW SETTING EXCEEDS LIMIT
0CD5 F0            RP                        PROERR(ERRFLG)
                  ;                       ELSE
0CD6 F1            POP  PSW                  CLEAN UP STACK
                  ;                          SET POSTAGE
0CD7 11 26 74      LXI  D,NORFLG/2+X         DE = ADDRESS, NORFLG
0CDA 1A            LDAX D                    NORFLG.LATDSB = FALSE
0CDB E6 FE         ANI  0FEH
0CDD F6 02         ORI  2                    NORFLG.UNVSEL = TRUE
0CDF 12            STAX D
0CE0 7E            MOV  A,M                  MRSTS1.UNKSEL = TRUE
0CE1 F6 80         ORI  80H
0CE3 77            MOV  M,A
0CE4 E5            PUSH H                    SAVE HL
0CE5 CD 25 1A      CALL MVPOST               MVPOST(ERROR)
                  ;                                 ( A    )
                  ;                                 ( 0    )
0CE8 E1            POP  H                    RESTORE HL
0CE9 B7            ORA  A                    PSW:Z = NOERR = ERROR .EQ. 0
                  ;                          IF NOERR .EQ. FALSE
                  ;                            METER DID NOT SET
0CEA C2 80 08      JNZ  FATERR                 FATERR(ERROR,ERRFLG)
                  ;                                   ( A    ,PSW:Z )
                  ;                                   ( I    , 0    )
                  ;                          ELSE
                  ;                            REPORT SUCCESSFUL SETTING
0CED 01 42 CC      LXI  B,(WORK1+16-NBANKS)*100H+POSREG
                  ;                            B = OFFSET, WORK1[N]
                  ;                            C = OFFSET, POSREG
0CF0 3E 04         MVI  A,NBANKS               A = NIBCNT = NBANKS
0CF2 CD B3 0F      CALL MVLNIB                 MVLNIB(POSREG,WORK1[N],NBANKS,
                  ;                                   ( @C    , @B      , A     ,
                  ;                                   ( 0     , I       , I     ,
                  ;
                  ;                                 NONBCD,ZROFLG)
                  ;                                 PSW:S ,PSW:Z )
                  ;                                  0    , 0    )
0CF5 7E            MOV  A,M                  MRSTS1.UNKSEL = FALSE
0CF6 E6 7F         ANI  7FH
0CF8 77            MOV  M,A
                  ;                            CLEAR ERROR FLAG
0CF9 0C            INR  C                      C = OFFSET, POSREG[1]
                  ;                            PSW:Z = ERRFLG = C.EQ.0=FALSE
                  ;                          ENDIF
                  ;                       ENDIF
```

```
                   ;                    ENDIF
                   ;                  ENDIF
0CFA C9             RET               RETURN
                   ;SRVCNV(SRVREG,MAXCNT,ERRFLG)(AMTBUF,DIEDCM)
                   ;      (NIBSTR,BYTE  ,BIT   )(NIBSTR,BYTE  )
                   ;      ( O     , I    , O    )( I     , I    )
                   ;      ( @E    , D    ,PSW:Z )( RAM   , RAM  )
                   ;      ( C     , C    , C    )( NC    , NC   )
                   ;
                   ;PSW DESTROYED
                   ;REGISTERS DESTROYED
                   ;
                   ;CONVERT MESSAGE FORMATTED VALUE IN AMTBUF INTO A
                   ;SPECIAL SERVICE REGISTER FORMAT IN THE FORM:
                   ;MANTISSA*10**EXPONENT, IN WHICH
                   ;SRVREG[0] = MANTISSA
                   ;SRVREG[1] = EXPONENT
                   ;
                   SRVCNV;                ****ENTRY POINT
                   ;                      SET TO REACH PROERR VIA RETURN
0CFB 21 A1 0B       LXI  H,PROERR
0CFE E5             PUSH H
                   ;                      FETCH VALUES FROM MESSAGE FORMAT
0CFF 06 E1          MVI  B,AMTBUF+1       B = OFFSET, AMTBUF[1]
0D01 CD 35 0F       CALL GETNIB           GETNIB(DECPOS,ZROFLG,AMTBUF[1])
                   ;                             ( A    ,PSW:Z , @B      )
                   ;                             ( O    , O    , I       )
0D04 6F             MOV  L,A              L = DECPOS
0D05 05             DCR  B                B = OFFSET, AMTBUF[0]
0D06 CD 35 0F       CALL GETNIB           GETNIB(MSGCNT,ZROFLG,AMTBUF[0])
                   ;                             ( A    ,PSW:Z , @B      )
                   ;                             ( O    , O    , I       )
0D09 67             MOV  H,A              H = MSGCNT
                   ;                      IF ZROFLG .EQ. TRUE
                   ;                        NO VALUE WAS ENTERED
0D0A C8             RZ                      PROERR(ERRFLG)
                   ;                      ELSE
                   ;                      POINT TO RIGHT OF H/O MESSAGE DIGIT
0D0B E6 01          ANI  1                B = OFFSET, AMTBUF[I=
                   ;                                  (MSGCNT .AND. HEX01)+3]
0D0D C6 E3          ADI AMTBUF+3
0D0F 47             MOV  B,A
0D10 4F             MOV  C,A              C = OFFSET, AMTBUF[I]
                   ;                      SCAN DIGITS TO RIGHT OF H/O MSG DIGIT
0D11 7C             MOV  A,H              A = NIBCNT = MSGCNT-1
0D12 3D             DCR  A
0D13 CD B3 0F       CALL MVLNIB           MVLNIB(AMTBUF[I],AMTBUF[I],NIBCNT,
                   ;                             ( @C       , @B       , A    ,
                   ;                             ( O        , I        , I    ,
                   ;
                   ;                             NONBCD,ZROFLG)
                   ;                             PSW:S ,PSW:Z )
                   ;                              O    , O    )
                   ;                      IF ZROFLG .EQ. FALSE
                   ;                        NOT ALL DIGITS SCANNED WERE ZEROES
0D16 C0             RNZ                     PROERR(ERRFLG)
                   ;                      ELSE
0D17 3A 35 74       LDA  DIEDCM/2+X       A = DIEDCM-DECPOS
0D1A 95             SUB  L
                   ;                      IF (DIEDCM-DECPOS) .LT. 0
                   ;                        BAD DECIMAL IN MESSAGE FORMAT
0D1B D8             RC                      PROERR(ERRFLG)
                   ;                      ELSE
                   ;                      CALCULATE EXPONENT
0D1C 84             ADD  H                L = EXPONT = MSGCNT-1+DIEDCM-DECPOS
0D1D 3D             DCR  A
0D1E 6F             MOV  L,A
```

```
0D1F BA          CMP  D           IF EXPONT .GE. MAXCNT
                ;                   MESSAGE IS TOO LONG
0D20 D0          RNC                PROERR(ERRFLG)
                ;                 ELSE
                ;                 FETCH H/O MESSAGE DIGIT AS MANTISSA
0D21 05          DCR  B           B = OFFSET, AMTBUF[I=I-1]
0D22 CD 35 0F    CALL GETNIB      GETNIB(MANTIS,ZROFLG,AMTBUF[I])
                ;                        ( A    ,PSW:Z , @B      )
0D25 FE 0A       CPI  10          IF MANTIS .GE. 10
                ;                   NON BCD CHAR IN MESSAGE
0D27 D0          RNC                PROERR(ERRFLG)
                ;                 ELSE
0D28 C1          POP  B             CLEAN UP STACK
                ;                   PUT MANTISSA IN SERVICE REGISTER
0D29 4B          MOV  C,E           C = OFFSET, SRVREG[0]
0D2A CD EE 0F    CALL PUTNIB        PUTNIB(SRVREG[0],MANTIS)
                ;                          ( @C       , A    )
                ;                          ( O        , I    )
                ;                   PUT EXPONENT IN SERVICE REGISTER
0D2D 0C          INR  C             C = OFFSET, SRVREG[1]
0D2E 7D          MOV  A,L           A = EXPONT
0D2F CD EE 0F    CALL PUTNIB        PUTNIB(SRVREG[1],EXPONT)
                ;                          ( @C       , A    )
                ;                          ( O        , I    )
0D32 0C          INR  C             PSW:Z = ERRFLG = FALSE
                ;                 ENDIF
0D33 C9          RET              RETURN
                ;SRVREQ(SRVVAL,SRVHDR,ERRFLG)(WORK1 ,WORK2 ,DIEDCM)
                ;      (NIBSTR,BYTE  ,BIT   )(NIBSTR,NIBSTR,BYTE  )
                ;      ( I     , I    , O    )( O     , O     , I    )
                ;      ( @B    , C    ,PSW:Z )( RAM   , RAM   , RAM  )
                ;      ( NC    , C    , C    )( C     , C     , NC   )
                ;
                ;PSW DESTROYED
                ;REGISTERS DESTROYED
                ;
                ;EXPAND COMPRESSED SERVICE REGISTER TO WORK BUFFER.
                ;CALL VALREQ TO BUILD MESSAGE IN XMTBUF.
                ;
                SRVREQ;                   ****ENTRY POINT
                ;                         CLEAR WORK AREA
0D34 3E C0       MVI A,WORK1      A = OFFSET, WORK1
0D36 CD 85 0E    CALL CLRBLK      CLRBLK(WORK1)
                ;                        ( @A   )
                ;                        ( O    )
0D39 21 6A 74    LXI  H,(WORK2+4)/2+X
                ;                 HL = ADDRESS, WORK2[4..5]
0D3C 71          MOV  M,C         WORK2[4..5] = SRVHDR
0D3D 0E C4       MVI  C,WORK1+4   C = OFFSET, WORK1[4]
                ;                 MOVE MANTISSA INTO WORK AREA
0D3F 3E 01       MVI  A,1         A = NIBCNT = 1
0D41 CD B3 0F    CALL MVLNIB      MVLNIB(WORK1[4],SRVVAL[0],NIBCNT,PSW)
                ;                        ( @C      , @B       , A    ,PSW)
                ;                        ( O       , I        , I    , O )
0D44 04          INR  B           B = OFFSET, SRVVAL[1]
                ;                 FETCH EXPONENT
0D45 CD 35 0F    CALL GETNIB      GETNIB(EXPONT,PSW,SRVVAL[1])
                ;                        ( A    ,PSW, @B      )
                ;                        ( O    , O , I       )
0D48 3C          INR  A           A = NIBCNT = EXPONT+1
0D49 07          RLC              B = FORMAT = HEX10*NIBCNT
0D4A 07          RLC
0D4B 07          RLC
0D4C 07          RLC
0D4D 47          MOV  B,A
0D4E 3A 35 74    LDA  DIEDCM/2+X  A = FORMAT = FORMAT+DIEDCM
0D51 80          ADD  B
0D52 2B          DCX  H           HL = ADDRESS, WORK2[2..3]
```

```
0D53 77        MOV  M,A         WORK2[2..3] = FORMAT
0D54 2B        DCX  H           HL = ADDRESS, WORK2[0..1]
0D55 36 C4     MVI  M,WORK1+4   WORK2[0..1] = OFFSET, WORK1[4]
0D57 EB        XCHG             DE = ADDRESS, WORK2[0..1]
               ;                PUT REPLY INTO TRANSMIT BUFFER
0D58 C3 5B 0D  JMP  VALREQ      VALREQ(WORK1[4],WORK2[2],WORK2[4],
              ;                       (@@DE+0  ,@DE+1   ,@DE+2   ,
              ;                       ( I      , I      , I      ,
              ;
              ;                       ERRFLG)
              ;                       PSW:Z )
              ;                        0    )
              ;                 RETURN
              ;VALREQ(SOURCE,VALFMT,ANSHDR,ERRFLG)(DIEDCM,DEFDCM,XMTBUF)
              ;      (NIBSTR,BYTE  ,BYTE  ,BYTE  )(BYTE  ,BYTE  ,NIBSTR)
              ;      ( I     , I     , I     , O    )( I     , I     , O     )
              ;      (@@DE+0, @DE+1, @DE+2,PSW:Z )( RAM   , RAM   , RAM   )
              ;      ( NC    , NC    , NC    , C    )( NC    , NC    , C     )
              ;
              ;PSW DESTROYED
              ;ALL REGISTERS DESTROYED
              ;
              ;BUILD VALUE REPLY MESSAGE IN TRANSMIT BUFFER
              ;
              VALREQ;               ****ENTRY POINT
              ;                     FETCH OFFSET OF SOURCE
0D5B EB        XCHG                 HL = ADDRESS, (OFFSET, SOURCE[L=0])
0D5C 46        MOV  B,M             B = OFFSET, SOURCE[L=0]
              ;                     FETCH FORMAT TEMPLATE FOR MESSAGE
0D5D 23        INX  H               HL = ADDRESS, VALFMT
0D5E 7E        MOV  A,M             E = DECPOS = VALFMT[1]
0D5F E6 0F     ANI  0FH
0D61 5F        MOV  E,A
0D62 7E        MOV  A,M             D = NDIGIT = VALFMT[0]
0D63 AB        XRA  E
0D64 0F        RRC
0D65 0F        RRC
0D66 0F        RRC
0D67 0F        RRC
0D68 57        MOV  D,A
              ;                     FETCH HEADER FOR REPLY
0D69 23        INX  H               HL = ADDRESS, ANSHDR
0D6A 4E        MOV  C,M             C = ANSHDR
              ;                     SCAN FOR MOST SIGNIFICANT DIGIT
              VALR01:               DO WHILE SOURCE[L] .EQ. 0
0D6B CD 35 0F  CALL GETNIB            GETNIB(LDIGIT,ZROFLG,SOURCE[L])
              ;                              ( A     , PSW:Z, @B      )
              ;                              ( O     , O    , I       )
0D6E C2 78 0D  JNZ  VALR02
0D71 04        INR  B                 B = OFFSET, SOURCE[L=L+1]
0D72 15        DCR  D                 D = NDIGIT = NDIGIT-1
0D73 C2 6B 0D  JNZ  VALR01            IF NDIGIT .EQ. 0
0D76 14        INR  D                   D = NDIGIT = 1
0D77 05        DCR  B                   B = OFFSET, SOURCE[L=L-1]
              ;                         BREAK
              ;                       ENDIF
              VALR02;               ENDDO
0D78 1C        INR  E               IF DECPOS .EQ. 0
0D79 1D        DCR  E
0D7A C2 9E 0D  JNZ  VALR05
              ;                       METER CHARACTERISTCS WILL
              ;                       DETERMINE FORMAT.
              ;                       ADJUST VALUES SO THAT AT LEAST ONE
              ;                       DIGIT WILL BE TO LEFT OF DECIMAL.
0D7D 2A 35 74  LHLD DIEDCM/2+X        L = DIEDCM
              ;                       H = DEFDCM
0D80 5D        MOV  E,L               E = DECPOS = DIEDCM
0D81 7D        MOV  A,L               A = ADJUST = DIEDCM+1-NDIGIT
0D82 3C        INR  A
0D83 92        SUB  D
```

```
0D84 FA 8D 0D   JM   VALR03         IF ADJUST .GE. 0
0D87 6F         MOV  L,A              L = ADJUST
0D88 82         ADD  D                D = NDIGIT = NDIGIT+ADJUST
0D89 57         MOV  D,A
0D8A 78         MOV  A,B              B = OFFSET, SOURCE[L=L-ADJUST]
0D8B 95         SUB  L
0D8C 47         MOV  B,A
               VALR03;              ENDIF
                ;                   SUPPRESS TRAILING ZERO IN THE
                ;                   EVENT DIEDCM .GT. DEFDCM
0D8D C5         PUSH B              SAVE BC
0D8E 78         MOV  A,B            B = OFFSET, SOURCE[R=L+NDIGIT-1]
0D8F 82         ADD  D
0D90 3D         DCR  A
0D91 47         MOV  B,A
0D92 CD 35 0F   CALL GETNIB         GETNIB(NDIGIT,ZROFLG,SOURCE[R])
                ;                         ( A     , PSW:Z, @B       )
                ;                         ( 0     , 0    , I        )
0D95 C1         POP  B              B = SOURCE[L]
                ;                   C = ANSHDR
0D96 C2 9E 0D   JNZ  VALR04          IF NDIGIT .EQ. 0
                ;                      TRAILING ZERO IS PRESENT
0D99 7A         MOV  A,D               D = NDIGIT = NDIGIT+DEFDCM-DECPOS
0D9A 93         SUB  E
0D9B 84         ADD  H
0D9C 57         MOV  D,A
0D9D 5C         MOV  E,H               E = DECPOS = DEFDCM
               VALR04;               ENDIF
               VALR05;              ENDIF
                ;                   CLEAR TRANSMIT BUFFER
0D9E 3E A0      MVI  A,XMTBUF       A = OFFSET, XMTBUF
0DA0 CD 85 0E   CALL CLRBLK         CLRBLK(XMTBUF)
                ;                         ( @A    )
                ;                         ( 0     )
                ;                   BUILD MESSAGE IN TRANSMIT BUFFER
0DA3 7A         MOV  A,D            L = MSGSIZ = 2+(NDIGIT+1)/2
0DA4 B7         ORA  A
0DA5 1F         RAR
0DA6 CE 02      ACI  2
0DA8 6F         MOV  L,A
0DA9 61         MOV  H,C            H = ANSHDR
0DAA 22 50 74   SHLD XMTBUF+2+X     XMTBUF[0..1] = MSGSIZ
                ;                   XMTBUF[2..3] = ANSHDR
0DAD 0E A4      MVI  C,XMTBUF+4     C = OFFSET, XMTBUF[4]
0DAF 7A         MOV  A,D            A = NDIGIT
0DB0 CD EE 0F   CALL PUTNIB         PUTNIB(XMTBUF[4],NDIGIT)
                ;                         ( @C        , A     )
                ;                         ( 0         , I     )
0DB3 0C         INR  C              C = OFFSET, XMTBUF[5]
0DB4 7B         MOV  A,E            A = DECPOS
0DB5 CD EE 0F   CALL PUTNIB         PUTNIB(XMTBUF[5],DECPOS)
                ;                         ( @C        , A     )
                ;                         ( 0         , I     )
0DB8 0C         INR  C              C = OFFSET, XMTBUF[I=6+(NDIGIT.MOD.2)]
0DB9 7A         MOV  A,D
0DBA E6 01      ANI  1
0DBC 81         ADD  C
0DBD 4F         MOV  C,A
0DBE 7A         MOV  A,D            A = NDIGIT
0DBF CD B3 0F   CALL MVLNIB         MVLNIB(XMTBUF[I],SOURCE[L],NDIGIT,
                ;                         ( @C        , @B        , A     ,
                ;                         ( 0         , I         , I     ,
                ;
                ;                          NONBCD,ZROFLG)
                ;                          PSW:S ,PSW:Z )
                ;                           0     , 0     )
0DC2 FA A1 0B   JM   PROERR         IF NONBCD .EQ. TRUE
                ;                     PROCESS ERROR
                ;                     PROERR(ERRFLG)
                ;                           ( A     )
                ;                           ( 0     )
```

```
                ;                         RETURN
                ;                       ELSE
0DC5 0C           INR  C                  PSW:Z = ERRFLG = FALSE
0DC6 C9           RET                     RETURN
                ;                       ENDIF
                ;XEQHDR(HEADER,ERRFLG)(DBUF   ,XMTBUF,MORFLG)
                ;       (BYTE   ,BIT   )(NIBSTR,NIBSTR,BITSTR)
                ;       ( I     , 0    )( I/O  , I     , 0     )
                ;       ( A     ,PSW:Z )( RAM  , RAM   , RAM   )
                ;       ( NC    , C    )( C    , NC    , C     )
                ;
                ;PSW = DESTROYED
                ;
                ;SUPERVISES THE EXECUTION OF INTERNALLY GENERATED HEADERS
                ;
                XEQHDR;                 ****ENTRY POINT
0DC7 E5           PUSH H                SAVE HL
0DC8 D5           PUSH D                SAVE DE
0DC9 C5           PUSH B                SAVE BC
0DCA 47           MOV  B,A              B = HEADER
                ;                       STOP TIMER
0DCB CD 34 01     CALL STPTMR           STPTMR(WASOFF)
                ;                             (PSW:Z )
                ;                             ( 0    )
0DCE 3A 40 74     LDA  DBUF/2+X         A = DBUF[0..1]
0DD1 B7           ORA  A                PSW:Z = DBUF[0..1] .EQ. 0
0DD2 78           MOV  A,B              A = HEADER
0DD3 C2 E7 0D     JNZ  XEQH02           IF DBUF[0..1] .EQ. 0
                ;                         DISPLAY HAS KEYENTERED DATA
0DD6 FE C4        CPI  HSETDA             IF(HEADER .LT .0) .AND.
                ;                           (HEADER .NE. HSETDA)
0DD8 CA E7 0D     JZ   XEQH01
0DDB B7           ORA  A
0DDC F2 E7 0D     JP   XEQH01
                ;                           PROCESS HEADER WITH DATA IN DBUF
0DDF 06 82        MVI  B,DBUF+2             B = OFFSET, DBUF[2]
0DE1 CD 41 09     CALL HDRPLS               HDRPLS(HEADER,DBUF[2],ERRFLG)
                ;                                 ( A     , @B    ,PSW:Z)
                ;                                 ( I     , I     , 0   )
0DE4 C3 EA 0D     JMP  XEQH03
                XEQH01;                   ELSE
                ;                           PROCESS HEADER WITHOUT DATA
                ;                           HDRONY(HEADER,ERRFLG)
                ;                                 ( A     ,PSW:Z)
                ;                                 ( I     , 0   )
                ;                         ENDIF
                XEQH02;                 ELSE
                ;                         PROCESS HEADER WITHOUT DATA
0DE7 CD D5 08     CALL HDRONY             HDRONY(HEADER,ERRFLG)
                ;                               ( A     ,PSW:Z)
                ;                               ( I     , 0   )
                XEQH03;                 ENDIF
0DEA CA 11 0E     JZ   XEQH07           IF ERRFLG .EQ. FALSE
0DED F5           PUSH PSW                SAVE A, PSW
0DEE 3A 50 74     LDA  XMTBUF/2+X         A = BYTCNT = XMTBUF[0..1]
0DF1 B7           ORA  A                  PSW:Z = BYTCNT .EQ. 0
                ;                         PSW:CY = 0
0DF2 CA 02 0E     JZ   XEQH04             IF BYTCNT .NE. 0
                ;                           CONVERT BYTE COUNT TO NIBBLE COUNT
0DF5 17           RAL                       A = NIBCNT = 2*BYTCNT
0DF6 01 B0 A2     LXI  B,(XMTBUF+2)*100H+DBUF
                ;                           B = OFFSET, XMTBUF[2]
                ;                           C = OFFSET, DBUF[0]
                ;                           MOVE DATA INTO DBUF
0DF9 CD B3 0F     CALL MVLNIB               MVLNIB(DBUF[0],XMTBUF[2],NIBCNT)
                ;                                 ( @C     , @B      , A     )
                ;                                 ( 0      , I       , I     )
0DFC CD 5A 05     CALL VALDSP               MOVE DBUF INTO DISPLAY
0DFF C3 10 0E     JMP  XEQH06
                XEQH04;                   ELSE
                ;                           BYTCNT .EQ. 0
```

```
                       ;                          COMMAND AFFECTED STATUS ONLY
     0E02 3A 40 74       LDA  DBUF/2+X            IF DBUF[0..1] = HEX00
     0E05 B7             ORA  A
     0E06 C2 10 0E       JNZ  XEQH05
                       ;                            KEYENTERED DISPLAY UNCHANGED
                       ;                            QUE POSTAGE REQUEST
     0E09 21 26 74       LXI  H,NORFLG/2+X          HL = ADDRESS, NORFLG
     0E0C 7E             MOV  A,M                   NORFLG.QUEPOS = TRUE
     0E0D F6 40          ORI  40H
     0E0F 77             MOV  M,A
                       XEQH05;                    ENDIF
                       XEQH06;                  ENDIF
     0E10 F1             POP  PSW               A = HEADER
                       ;                        PSW:Z = ERRFLG
                       XEQH07;                ENDIF
     0E11 C1             POP  B               RESTORE BC
     0E12 D1             POP  D               RESTORE DE
     0E13 E1             POP  H               RESTORE HL
     0E14 C9             RET                  RETURN
                       ;XMIT()(SID,SOD,SOE,XMTBUF,NORFLG)
                       ;      (BIT,BIT,BIT,BYTSTR,BYTSTR)
                       ;      ( I , O , O , I/O  , I     )
                       ;      (RIM,SIM,SIM, RAM  , RAM   )
                       ;      ( NC, C , C , C    , NC    )
                       ;
                       ;REGISTERS DESTROYED
                       ;PSW DESTROYED
                       ;
                       ;ATTEMPT TO TRANSMIT MESSAGE IN XMTBUF.
                       ;ONE ATTEMPT ONLY.  XMTBUF[0], THE MESSAGE BYTE COUNT,
                       ;IS CLEARED WHETHER OR NOT THE MESSAGE IS ACTUALLY SENT.
                       ;XMTBUF[0] IS ASSUMED .GT. 0, AND .LE. 7 ON ENTRY.
                       ;
                       XMIT;                  ****ENTRY POINT
                       ;                      FETCH BYTE COUNT OF OUTBOUND MESSAGE
     0E15 21 50 74       LXI  H,XMTBUF/2+X    HL =  ADDRESS, XMTBUF[N=0]
     0E18 4E             MOV  C,M             C = BYTCNT = XMTBUF[N]
                       ;                      CANCEL MSG BY CLEARING XMTBUF[0]
     0E19 36 00          MVI  M,0             XMTBUF[N] = 0
     0E1B 3A 26 74       LDA  NORFLG/2+X      IF NORFLG.COMDSB .EQ. TRUE
     0E1E E6 04          ANI  4
                       ;                        COMMUNICATIONS ARE DISABLED
     0E20 C0             RNZ                    RETURN
                       ;                      ENDIF
                       ;                      STOP TIMER
     0E21 CD 34 01       CALL STPTMR          STPTMR(WASOFF)
                       ;                             (PSW:Z )
                       ;                             ( 0    )
     0E24 E5             PUSH H               SAVE HL
     0E25 C5             PUSH B               SAVE BC
     0E26 CD C7 0E       CALL RECEVE          IF INCOMING RTS IS PRESENT
                       ;                        RECEIVE MESSAGE
                       ;                      ENDIF
     0E29 3E C0          MVI  A,0C0H          SIM.SOD = RTS = 1
                       ;                      SIM.SOE = ENABLD = 1
     0E2B 30             SIM                  OUTPUT RTS
     0E2C C1             POP  B               RESTORE BC
     0E2D E1             POP  H               RESTORE HL
     0E2E 16 D9          MVI  D,217           D = COUNT ;FOR T13 = 3.509 MSEC
                       XMIT01;                DO UNTIL BIT .EQ. CTS
     0E30 15             DCR  D                 COUNT = COUNT-1
     0E31 CA 7B 0E       JZ   XMIT06            IF COUNT+1 .EQ. 0
                       ; <<JUMP AHEAD>>            TIMEOUT HAS OCCURRED
                       ;                           QUIT
                       ;                        ENDIF
     0E34 20             RIM                    INPUT BIT
                       ;                        A.0 = BIT = RIM.SID ;CTS OR IDLE
     0E35 B7             ORA  A                 CHECK BIT
     0E36 F2 30 0E       JP   XMIT01
                       ;                      ENDDO
```

```
                  XMIT03;              DO UNTIL BYTCNT .EQ. 0
                  ;                      DEFINE STOP BIT
0E37 3E 01          MVI  A,1             IF 1 .LT. BYTCNT
0E3B B9             CMP  C
                  ;                        THIS IS NOT LAST BYTE
                  ;                        PSW:CY = STOP = EOB = 1
                  ;                      ELSE
                  ;                        THIS IS THE LAST BYTE
                  ;                        PSW:CY = STOP = EOM = 0
                  ;                      ENDIF
0E3C 23             INX  H               HL = ADDRESS, XMTBUF[N=N+1]
0E3D 3E 12          MVI  A,18            DELAY ;FOR T4 = 178.234 USEC
0E3F 3D             DCR  A
0E40 F2 3F 0E       JP   $-1
                  ;                      SET TO OUTPUT 9 BITS FROM LOOP
                  ;                      8 DATA, AND 1 EOB OR EOM
0E43 06 0A          MVI  B,9+1           BITCNT = 10 = 9+1
0E45 3E 40          MVI  A,40H           SIM.SOD = START = 0
                  ;                      SIM.SOE = ENABLD = 1
0E47 57             MOV  D,A             D.0 = OUTBIT = START
0E48 30             SIM                  OUTPUT = START
                  ;                      LOAD 8 DATA BITS
0E49 7E             MOV A,M              A = XMTBUF[N]
                  ;                      SAVE 8 DATA BITS AND 1 STOP BIT
0E4A F5             PUSH PSW

                  XMIT04;                LOOP ;BREAK IF BITCNT .EQ. 0
0E4B 3E 06          MVI  A,6               DELAY ;BIT PERIOD = 103.923 USEC
0E4D 3D             DCR  A
0E4E F2 4D 0E       JP   $-1
0E51 F0             RP
0E52 F1             POP  PSW               GET NEXT BIT
0E53 1F             RAR                    PSW.CY = OUTBIT
0E54 F5             PUSH PSW
0E55 3E 80          MVI  A,80H             PSW:CY,A = SIM+2
0E57 1F             RAR                    A = SIM
                  ;                        SIM.SOD = OUTBIT
                  ;                        SIM.SOE = ENABLD = 1
0E58 5A             MOV  E,D               E.0 = PRVBIT = OUTBIT
0E59 57             MOV  D,A               D.0 = OUTBIT
0E5A 05             DCR  B                 BITCNT = BITCNT-1
                  ;                        IF BITCNT .EQ. 0
0E5B CA 68 0E       JZ   XMIT05              BREAK
                  ;                        ENDIF
0E5E 30             SIM                    OUTPUT OUTBIT
0E5F 20             RIM                    READ ECHO
                  ;                        A.0 = ECHO = RIM.SID
0E60 AB             XRA  E                 IF ECHO .NE. PRVBIT
0E61 F2 4B 0E       JP   XMIT04
0E64 F1             POP  PSW                 CLEAN UP STACK
0E65 C3 7B 0E       JMP  XMIT06              QUIT
                  ; >>JUMP AHEAD<<
                  ;                        ENDIF
                  XMIT05;                ENDLOOP
0E68 F1             POP  PSW             CLEAN UP STACK
0E69 20             RIM                  READ ECHO
                  ;                      A.0 = ECHO = RIM.SID
0E6A AB             XRA  E               IF ECHO .NE. STOP
0E6B FA 7B 0E       JM   XMIT06            QUIT
                  ; >>JUMP AHEAD<<
                  ;                      ENDIF
0E6E 0D             DCR  C               C = BYTCNT = BYTCNT-1
0E6F C2 39 0E       JNZ  XMIT03
                  ;                    ENDDO

0E72 3E C0          MVI  A,0C0H        SIM.SOD = ACK = 1
                  ;                    SIM.SOE = ENABLD = 1
0E74 30             SIM                OUTPUT ACK
0E75 16 29          MVI  D,41          DELAY ;T7 = 336.914 USEC
0E77 15             DCR  D
0E78 F2 77 0E       JP   $-1
```

```
                    XMIT06;                  ; TARGET OF JUMP AHEAD
                    ;                        QUIT XMIT ROUTINE
0E7B 3E 40            MVI  A,40H             SIM.SOD = IDLE = 0
                    ;                        SIM.SOE = ENABLD = 1
0E7D 30               SIM                    OUTPUT IDLE
0E7E 16 C8            MVI  D,200             DELAY ;T14 = 1606.908 USEC
0E80 15               DCR  D
0E81 F2 80 0E         JP   $-1
0E84 C9               RET                    RETURN
                    ;CLRBLK(BLOCK )
                    ;      (NIBSTR)
                    ;      ( O    )
                    ;      ( @A   )
                    ;      ( C    )
                    ;
                    ;PSW:S, Z, P, CY = NO CHANGE
                    ;
                    ;CLEAR A 16 NIBBLE BLOCK TO ZEROS
                    ;BLOCK[0..15] = 0
                    ;
                    CLRBLK;                  ****ENTRY POINT
0E85 F5               PUSH PSW               SAVE A, PSW
0E86 C5               PUSH B                 SAVE BC
0E87 4F               MOV  C,A               C = OFFSET, BLOCK
0E88 AF               XRA  A                 A = NIBVAL = 0
0E89 06 10            MVI  B,16              B = NIBCNT = 16
0E8B C3 26 0F         JMP  FILN01            FILNIB(BLOCK,NIBVAL,NIBCNT)
                    ;                              ( @C   , A    , B    )
                    ;                              ( O    , I    , I    )
                    ;                        RESTORE BC
                    ;                        RESTORE A, PSW
                    ;                        RETURN
                    ;CMPARE(MINUEN,SUBTRA,NNIB ,SGNFLG,ZROFLG)
                    ;      (NIBSTR,NIBSTR,BYTE ,BIT   ,BIT   )
                    ;      ( I    , I    , I   , O    , O    )
                    ;      ( @D   , @E   , A   ,PSW:S ,PSW:Z )
                    ;      ( NC   , NC   , NC  , C    , C    )
                    ;
                    ;PSW:CY = NO CHANGE
                    ;PSW:S, Z, P CHANGED
                    ;
                    ;COMPARE EQUAL LENGTH BCD NIBBLE STRINGS
                    ;
                    CMPARE;                  ****ENTRY POINT
0E8E E5               PUSH H                 SAVE HL
0E8F F5               PUSH PSW               SAVE A, PSW
0E90 C5               PUSH B                 SAVE BC
0E91 D5               PUSH D                 SAVE DE
0E92 67               MOV  H,A               H = COUNT = NNIB
                    CMPAR1;                  DO WHILE COUNT .GT. 0
0E93 25               DCR  H                   H = COUNT-1
0E94 FA A9 0E         JM   CMPAR2
0E97 43               MOV  B,E                 B = OFFSET,
                    ;                            SUBTRA[SINDEX = NNIB-COUNT]
0E98 CD 35 0F         CALL GETNIB              GETNIB(SDIGIT,ZERO ,SUBTRA[SINDEX])
                    ;                                ( A     ,PSW:Z, @B          )
                    ;                                ( O     , O   , I           )
0E9B 4F               MOV  C,A                 C = SDIGIT
0E9C 42               MOV  B,D                 B = OFFSET,
                    ;                            MINUEN[MINDEX = NNIB-COUNT]
0E9D CD 35 0F         CALL GETNIB              GETNIB(MDIGIT,ZERO ,MINUEN[MINDEX])
                    ;                                ( A     ,PSW:Z, @B          )
                    ;                                ( O     , O   , I           )
0EA0 91               SUB  C                   A = DIFRNC = MDIGIT-SDIGIT
0EA1 C2 A9 0E         JNZ  CMPAR2              IF DIFRNC .NE. 0
                    ;                            BREAK
                    ;                          ENDIF
0EA4 1C               INR  E                   E = OFFSET,
                    ;                            SUBTRA[SINDEX = NNIB-(COUNT-1)]
0EA5 14               INR  D                   D = OFFSET,
                    ;                            MINUEN[MINDEX = NNIB-(COUNT-1)]
```

```
                  ;                    H = COUNT = COUNT-1
0EA6 C3 93 0E       JMP  CMPAR1
                  CMPAR2;             ENDDO
0EA9 D1             POP  D            RESTORE DE
0EAA C1             POP  B            RESTORE BC
                  ;                   IF NNIB .EQ. 0
0EAB 67             MOV  H,A            H = DIFRNC = NNIB = 0
                  ;                   ELSE
                  ;                     H = DIFRNC
                  ;                   ENDIF
0EAC F1             POP  PSW          RESTORE A, PSW:CY
                  ;                   OUTPUT PSW:S = SGNFLG
                  ;                   OUTPUT PSW:Z = ZROFLG
0EAD 24             INR  H
0EAE 25             DCR  H
0EAF E1             POP  H            RESTORE HL
0EB0 C9             RET               RETURN
                  ;CRC(BLOCK ,NIBCNT,CRCVAL)
                  ;   (NIBSTR,UBYTE ,UBYTE )
                  ;   ( I    , I    , O     )
                  ;   ( @C   , B    , D     )
                  ;   ( NC   , NC   , C     )
                  ;
                  ;PSW = NO CHANGE
                  ;
                  ;COMPUTE CRC FOR BLOCK OF NIBCNT NIBBLES
                  ;
                  CRC;                ****ENTRY POINT
0EB1 C5             PUSH B            SAVE BC
0EB2 F5             PUSH PSW          SAVE A, PSW
0EB3 78             MOV  A,B          A = NIBCNT
0EB4 41             MOV  B,C          B = OFFSET, BLOCK[N = 0]
0EB5 4F             MOV  C,A          C = NIBCNT
0EB6 16 FF          MVI  D,0FFH       D = CRCVAL = HEXFF
                  CRC1;               DO UNTIL NIBCNT = 0
0EB8 CD 35 0F       CALL GETNIB         GETNIB(NIBVAL,ZERO ,BLOCK[N])
                  ;                           ( A    ,PSW:Z, @B     )
                  ;                           ( O    , O    , I      )
0EBB CD C6 0E       CALL CRCNIB         CRCNIB(NIBVAL,CRCVAL)
                  ;                           ( A    , D    )
                  ;                           ( I    , I/O  )
0EBE 04             INR  B              B = OFFSET, BLOCK[N = N+1]
0EBF 0D             DCR  C              NIBCNT = NIBCNT-1
0EC0 C2 B8 0E       JNZ  CRC1
                  ;                   ENDDO
0EC3 F1             POP  PSW          RESTORE A, PSW
0EC4 C1             POP  B            RESTORE BC
0EC5 C9             RET
                  ;CRCNIB(NIBVAL,CRCVAL)
                  ;      (BYTE  ,BYTE  )
                  ;      ( I    , I/O  )
                  ;      ( A    , D    )
                  ;      ( NC   , C    )
                  ;
                  ;PSW DESTROYED
                  ;
                  ;INCLUDE NIBBLE INTO DEVELOPING VALUE OF CRC
                  ;
                  CRCNIB;             ****ENTRY POINT
0EC6 C5             PUSH B            SAVE BC
0EC7 06 04          MVI  B,4          B = BITCNT = 4
                  ;                   SHIFT BITS TO HIGH ORDER OF NIBVAL
0EC9 07             RLC               A = NIBVAL = NIBVAL*HEX10
0ECA 07             RLC
0ECB 07             RLC
0ECC 07             RLC
                  ;                   ROTATE NIBVAL ONE BIT AT A TIME
                  ;                   BACK INTO ITS ORIGINAL FORM WHILE
```

```
                    ;                         MODIFYING CRCVAL TO REFLECT
                    ;                         THE BIT'S VALUE
                    CRCNI1;                   DO UNTIL BITCNT .EQ. 0
0ECD 07               RLC                       CY = NIBBIT
                    ;                           A = NIBVAL = ((NIBVAL*2) .AND.
                    ;                               HEXFF)+NIBBIT
0ECE 4F               MOV  C,A                  C = NIBVAL
0ECF 7A               MOV  A,D                  A = CRCVAL
0ED0 17               RAL                       CY = CRCBIT
                    ;                           A = CRCVAL = ((CRCVAL*2) .AND.
                    ;                                       HEXFF)+NIBBIT
0ED1 D2 D6 0E         JNC  CRCNI2               IF CRCBIT = 1
0ED4 EE 9B            XRI  9BH                    A = CRCVAL = CRCVAL .XOR. HEX9B
                    CRCNI2;                     ENDIF
0ED6 57               MOV  D,A                  D = CRCVAL
0ED7 79               MOV  A,C                  A = NIBVAL
0ED8 05               DCR  B                    B = BITCNT = BITCNT-1
0ED9 C2 CD 0E         JNZ  CRCNI1
                    ;                         ENDDO
0EDC C1               POP  B                  RESTORE BC
0EDD C9               RET                     RETURN
                    ;DBLANK()(PORTA )
                    ;         (BITSTR)
                    ;         ( I/O  )
                    ;         ( 7001 )
                    ;         ( C    )
                    ;
                    ;REGISTERS DESTROYED
                    ;PSW DESTROYED
                    ;
                    ;DISPLAY BLANKING ROUTINE
                    ;
                    DBLANK;                   ****ENTRY POINT
                    ;                         PREVENT INTERRUPT DISPLAY REFRESH
0EDE CD 34 01         CALL STPTMR             STPTMR(WASOFF)
                    ;                               (PSW:Z )
                    ;                               ( 0    )
                    ;                         FLUSH POSSIBLE NOISE OUT OF DISPLAY
0EE1 CD F6 0E         CALL DFLUSH             DFLUSH(ADDRESS,PORTA)
                    ;                               ( HL    , @HL )
                    ;                               ( 0       -   )
                    ;                         (PORTA .AND HEX0F) .EQ. HEX0F, FOR
                    ;                         3 DARK BITS AND IDLE DISPLAY CLOCK
0EE4 7E               MOV  A,M
0EE5 E6 F1            ANI  0F1H
0EE7 77               MOV  M,A                PORTA = PORTA .AND. HEXF1, FOR
                    ;                         3 START BITS AND IDLE DISPLAY CLOCK
0EE8 35               DCR  M                  PULSE DISPLAY CLOCK
0EE9 34               INR  M
                    ;                         SET TO OUTPUT 35*3 DARK BITS
0EEA F6 0F            ORI  0FH
0EEC 77               MOV  M,A                PORTA = PORTA .OR. HEX0F, FOR
                    ;                         3 DARK BITS AND IDLE DISPLAY CLOCK
0EED 3E 22            MVI  A,34               A = COUNT = 34
                    DBLAN1;                   ****ALTERNATE ENTRY POINT
                    DBLAN2;                   DO UNTIL COUNT .LT. 0
0EEF 35               DCR  M                    PULSE DISPLAY CLOCK
0EF0 34               INR  M
0EF1 3D               DCR  A                    A = COUNT = COUNT-1
0EF2 F2 EF 0E         JP   DBLAN2
                    ;                         ENDDO
0EF5 C9               RET
                    ;DFLUSH(ADDRES)(PORTA )
                    ;      (ADDRES)(BITSTR)
                    ;      ( 0    )( I/O  )
                    ;      ( HL   )( 7001 )
                    ;      ( C    )( C    )
```

```
                    ;
                    ;REGISTERS DESTROYED
                    ;PSW DESTROYED
                    ;
                    ;FLUSH POSSIBLE NOISE OUT OF DISPLAY SHIFT REGISTER
                    ;
                    DFLUSH;               ****ENTRY POINT
0EF6 21 01 70         LXI  H,PORTA        HL = ADDRESS, PORTA
0EF9 7E               MOV  A,M
0EFA F6 0F            ORI  0FH
0EFC 77               MOV  M,A            PORTA = PORTA .OR. HEX0F, FOR
                    ;                     3 DARK BITS AND IDLE DISPLAY CLOCK
                    ;                     CLOCK 36*3 DARK BITS INTO DISPLAY
0EFD 3E 23            MVI  A,35           A = COUNT = 35
0EFF C3 EF 0E         JMP  DBLAN1
                    ;                     RETURN
                    ;DSBKBD()(KDCTRL,CHRBKT,CTLBKT)
                    ;        (BITSTR,BYTE  ,BYTE  )
                    ;        ( 0    , 0    , 0    )
                    ;        ( RAM  , RAM  , RAM  )
                    ;        ( C    , C    , C    )
                    ;
                    ;PSW:S, Z, P, CY = NO CHANGE
                    ;
                    ;DISABLE KEYBOARD
                    ;
                    DSBKBD;               ****ENTRY POINT
0F02 F5               PUSH PSW            SAVE A, PSW
                    ;                     PREVENT KDIO FROM SCANNING KEYBOARD
0F03 3A 27 74         LDA  KDCTRL/2+X     KDCTRL.KBDDSB = TRUE
0F06 F6 01            ORI  01H
0F08 32 27 74         STA  KDCTRL/2+X
                    ;                     CLEAR OUTPUT OF DBOUNCE ROUTINE
0F0B AF               XRA  A              CHRBKT = HEX00
0F0C 32 2C 74         STA  CHRBKT/2+X
0F0F 32 2B 74         STA  CTLBKT/2+X     CTLBKT = HEX00
0F12 F1               POP  PSW            RESTORE A, PSW
0F13 C9               RET                 RETURN
                    ;ENAKBD()(KEYBKT,KDCTRL)
                    ;        (BYTE  ,BITSTR)
                    ;        ( 0    , 0    )
                    ;        ( RAM  , RAM  )
                    ;        ( C    , C    )
                    ;
                    ;PSW:S, Z, P, CY = NO CHANGE
                    ;
                    ;ENABLE KEYBOARD
                    ;
                    ENAKBD;               ****ENTRY POINT
0F14 F5               PUSH PSW            SAVE A, PSW
                    ;                     FORCE KDIO TO RESYNC KEYBOARD SCAN
0F15 3E 80            MVI  A,MULKEY       KEYBKT = MULKEY
0F17 32 2A 74         STA  KEYBKT/2+X
                    ;                     ALLOW KDIO TO SCAN KEYBOARD
0F1A 3A 27 74         LDA  KDCTRL/2+X     KDCTRL.KDBDSB = FALSE
0F1D E6 FE            ANI  0FEH
0F1F 32 27 74         STA  KDCTRL/2+X
0F22 F1               POP  PSW            RESTORE A, PSW
0F23 C9               RET                 RETURN
                    ;FILNIB(DEST  ,NIBVAL,NIBCNT)
                    ;     (NIBSTR,BYTE  ,UBYTE )
                    ;     ( 0    , I    , I    )
                    ;     ( @C   , A    , B    )
                    ;     ( C    , NC   , NC   )
                    ;
                    ;PSW:S, Z, P, CY = NO CHANGE
                    ;
```

```
                  ;FILL A NIBBLE STRING WITH A VALUE
                  ;DEST[0..NIBCNT-1] = NIBVAL
                  ;
                  FILNIB;                ****ENTRY POINT
0F24 F5             PUSH PSW             SAVE A, PSW
0F25 C5             PUSH B               SAVE BC
                  FILN01;                ****SPECIAL JUMP ENTRY
                  ;                      C = OFFSET, DEST[N = 0]
                  ;                      FILL NIBCNT NIBBLES IN DEST WITH NIBVAL
0F26 04             INR  B               CONDITION NIBCNT FOR DO WHILE
                  FILN02;                DO WHILE NIBCNT .NE. 0
0F27 05             DCR  B                 B = NIBCNT-1
0F28 CA 32 0F       JZ   FILN03
                  ;                        PUT NIBVAL INTO DEST
0F2B CD EE 0F       CALL PUTNIB            PUTNIB(DEST[N],NIBVAL)
                  ;                               ( @C    , A    )
                  ;                               ( 0     , I    )
                  ;                        POINT AT NEXT NIBBLE TO RIGHT
0F2E 0C             INR  C                 C = OFFSET, DEST[N+1]
                  ;                        B = NIBCNT = NIBCNT-1
0F2F C3 27 0F       JMP  FILN02
                  FILN03;                ENDDO
0F32 C1             POP  B               RESTORE BC
0F33 F1             POP  PSW             RESTORE A, PSW
0F34 C9             RET                  RETURN
                  ;GETNIB(NIBVAL,ZERO ,SOURCE)
                  ;       (BYTE  ,BIT  ,NIB    )
                  ;       ( 0    , 0   , I     )
                  ;       ( A    ,PSW:Z, @B    )
                  ;       ( C    , C   , NC    )
                  ;
                  ;PSW:CY = NO CHANGE
                  ;PSW:S, Z, P CHANGED; CORRESPOND TO VALUE OF NIBVAL
                  ;
                  ;FETCH HIGH ORDER 4 BIT VALUE FROM SOURCE[N=EVEN]
                  ;OR LOW ORDER 4 BIT VALUE FROM SOURCE[N=ODD],
                  ;AND PLACE IT IN LOW ORDER OF NIBVAL.
                  ;CLEAR HIGH ORDER OF NIBVAL.
                  ;NIBVAL = SOURCE[N],   ZERO = NIBVAL .EQ. 0
                  ;
                  GETNIB;                ****ENTRY POINT
0F35 E5             PUSH H               SAVE HL
0F36 F5             PUSH PSW             SAVE A, PSW
                  ;                      FLAG WHETHER L/O NIBBLE OF BYTE WANTED
0F37 AF             XRA  A               A = OFFSET, SOURCE[N]/2
0F38 78             MOV  A,B
0F39 1F             RAR
                  ;                      PSW:CY = ODD = TRUE, IF N = ODD
                  ;                      CALCULATE ADDRESS OF SOURCE
0F3A 26 74          MVI  H,X/100H        HL = ADDRESS, SOURCE[N]
0F3C 6F             MOV  L,A
                  GETN01;                ****SPECIAL JUMP ENTRY
                  ;                      FETCH BYTE CONTAINING DESIRED NIBBLE
0F3D 7E             MOV  A,M             A = SOURCE[N]
                  ;                      CHECK WHETHER NIBBLE IN HIGH ORDER
0F3E DA 45 0F       JC   GETN02          IF ODD .EQ. FALSE
                  ;                        MOVE H/O NIBBLE TO L/O
0F41 0F             RRC                    A = SOURCE[N] = SOURCE[N]/HEX10
0F42 0F             RRC
0F43 0F             RRC
0F44 0F             RRC
                  GETN02;                ENDIF
                  ;                      CLEAR HIGH ORDER NIBBLE
0F45 E6 0F          ANI  0FH             H = NIBVAL = SOURCE[N] .AND. HEX0F
0F47 67             MOV  H,A
0F48 F1             POP  PSW             RESTORE PSW:CY
0F49 7C             MOV  A,H             A = NIBVAL
```

```
                 ;                 INDICATE NIBVAL STATUS
0F4A 3C            INR  A          PSW:Z = ZERO = NIBVAL .EQ. 0
0F4B 3D            DCR  A
0F4C E1            POP  H          RESTORE HL
0F4D C9            RET             RETURN
                 ;LSTATE(FATMOD,NORMOD,SERMOD,PRVMOD)(MRSTS1,MRSTS2)
                 ;      (BIT   ,BIT   ,BIT   ,BIT   )(BITSTR,BITSTR)
                 ;      ( 0    , 0    , 0    , 0    )( I    , I    )
                 ;      (PSW:S ,PSW:Z ,PSW:P ,PSW:CY)(RAM   ,RAM   )
                 ;      ( C    , C    , C    , C    )( NC   , NC   )
                 ;
                 ;PSW:S = MINUS STATUS IF FATAL MODE
                 ;PSW:Z = ZERO STATUS IF NORMAL MODE
                 ;PSW:P = EVEN PARITY STATUS IF SERVICE MODE
                 ;PSW:CY= 1 IF PRIVILEGED MODE
                 ;
                 ;COPIES METER STATE FLAGS INTO PSW FOR EASY TESTING
                 ;
                 LSTATE;           ****ENTRY POINT
0F4E E5            PUSH H          SAVE HL
0F4F F5            PUSH PSW        H = A, SAVED FOR RETURN
0F50 E1            POP  H
0F51 3A 25 74      LDA  MRSTS2/2+X L = MRSTS2.FATMOD + MRSTS2.PRVMOD
0F54 E6 81         ANI  81H            (PSW:S POS  ) , (PSW:CY POS )
0F56 6F            MOV  L,A
0F57 3A 24 74      LDA  MRSTS1/2+X A = MRSTS1.SERMOD
0F5A E6 08         ANI  08H            (           )
0F5C 0F            RRC                 (PSW:P POS  )
0F5D B5            ORA  L          A = FATMOD, PRVMOD, SERMOD
                 ;                     (PSW:S, PSW:CY, PSW:P)
0F5E C2 63 0F      JNZ  LSTAT1     IF NO STATUS BITS ARE SET
0F61 3E 40         MVI  A,40H        A = NORMOD
                 ;                       (PSW:Z)
                 LSTAT1;           ENDIF
0F63 6F            MOV  L,A        L = A = STATUS
0F64 E5            PUSH H          RESTORE A; PSW = STATUS
0F65 F1            POP  PSW
0F66 E1            POP  H          RESTORE HL
0F67 C9            RET             RETURN
                 ;MOVBIT(SOURCE,SBIT ,DEST  ,DBIT ,VALUE)
                 ;      (BITSTR,UBYTE,BITSTR,UBYTE,BIT  )
                 ;      ( I    , I   , 0    , I   , 0   )
                 ;      ( @H   , L   , @D   , E   ,PSW:Z)
                 ;      ( NC   , NC  , C    , NC  , C   )
                 ;
                 ;PSW:CY = NO CHANGE
                 ;PSW:S, Z, P CHANGED; CORRESPOND TO VALUE OF BIT
                 ;
                 ;MOVE BIT FROM BIT POSITION SBIT IN SOURCE TO BIT POSITION
                 ;DBIT IN DEST.  VALUE INDICATES WHETHER BIT IS 0 OR 1.
                 ;BIT 0 IS HIGH ORDER BIT OF STRING.
                 ;DEST[DBIT] = SOURCE[SBIT]
                 ;
                 MOVBIT;           ****ENTRY POINT
0F68 E5            PUSH H          SAVE HL
0F69 C5            PUSH B          SAVE BC
0F6A F5            PUSH PSW        SAVE A, PSW
0F6B D5            PUSH D          SAVE DE
                 ;                 H = SRCOFS = OFFSET, SOURCE
                 ;                 BUILD SOURCE ADDRESS AND MASK
0F6C CD 8A 0F      CALL MOVB01     MOVB01(SRCOFS,SBIT,SRCADR,SMASK)
                 ;                        ( H    , L  , HL   , A   )
                 ;                        ( I    , I  , 0    , 0   )
                 ;                 HL = SRCADR = ADDRESS, SOURCE.SBIT
0F6F 47            MOV  B,A        B = SMASK
0F70 7E            MOV  A,M        PSW:CY = SOURCE.SBIT
0F71 A0            ANA  B
0F72 C6 FF         ADI  0FFH
```

```
                ;                       IF SOURCE.SBIT .NE. 0
0F74 9F           SBB  A                  B = SRCBIT = HEXFF
0F75 47           MOV  B,A
                ;                       ELSE
                ;                         B = SRCBIT = HEX00
                ;                       ENDIF
0F76 E1           POP  H                H = DSTOFS = OFFSET, DEST
                ;                       L = DBIT
0F77 E5           PUSH H                RESAVE HL
                ;                       BUILD DESTINATION ADDRESS AND MASK
0F78 CD BA OF     CALL MOVB01           MOVB01(DSTOFS,DBIT,DSTADR,DMASK)
                ;                             ( H     , L  , HL    , A    )
                ;                             ( I     , I  , O     , O    )
                ;                       HL = DSTADR = ADDRESS, DEST.DBIT
0F7B 4F           MOV  C,A              C = DMASK
0F7C A0           ANA  B                B = DSTBIT = DMASK .AND. SRCBIT
0F7D 47           MOV  B,A
0F7E 79           MOV  A,C              A = DEST.DBIT = 0
0F7F 2F           CMA
0F80 A6           ANA  M
0F81 B0           ORA  B                DEST.DBIT = DEST.DBIT .OR. DSTBIT
0F82 77           MOV  M,A
0F83 D1           POP  D                RESTORE DE
0F84 F1           POP  PSW              RESTORE A, PSW:CY
0F85 04           INR  B                PSW:Z = DSTBIT .EQ. 0
0F86 05           DCR  B
0F87 C1           POP  B                RESTORE BC
0F88 E1           POP  H                RESTORE HL
0F89 C9           RET                   RETURN
                ;MOVB01(NIBOFS,BITNO,BYTADR,MASK)
                ;       (OFFSET,UBYTE,ADDR  ,BYTE)
                ;       ( I    , I    , O    , O   )
                ;       ( H    , L    , HL   , A   )
                ;       ( C    , C    , C    , C   )
                ;
                ;PSW:S, Z, P, CY DESTROYED
                ;REGISTER DE DESTROYED
                ;
                ;CONVERT NIBBLE OFFSET AND BIT NUMBER INTO ADDRESS OF
                ;BYTE CONTAINING BIT.  A BIT SELECTION MASK IS ALSO
                ;PRODUCED
                ;
                MOVB01;                 ****ENTRY POINT FOR MOVBIT ONLY
0F8A 7D           MOV  A,L              E = ((BITNO/4)+NIBOFS)/2
0F8B 1F           RAR
0F8C 1F           RAR
0F8D E6 2F        ANI  2FH
0F8F 84           ADD  H
0F90 1F           RAR
0F91 5F           MOV  E,A
0F92 7C           MOV  A,H              PSW:CY = NIBOFS .MOD. 2
0F93 1F           RAR
0F94 7D           MOV  A,L              A = BITNO
0F95 D2 9A OF     JNC  MOVB02           IF PSW:CY .EQ. 1
                ;                         NIBOFS NOT ON BYTE BOUNDARY
0F98 DE 04        SBI  4                  MAKE CORRECTION TO BITNO
                MOVB02;                 ENDIF
0F9A E6 07        ANI  07H              A = BITNUM, WITHIN BYTE
0F9C 16 00        MVI  D,0              DE = ((BITNO/4)+NIBOFS)/2
0F9E 21 00 74     LXI  H,X              HL = BYTADR
0FA1 19           DAD  D
0FA2 E5           PUSH H                SAVE BYTADR
0FA3 5F           MOV  E,A              DE = BITNUM
0FA4 21 AB OF     LXI  H,MOVB03         HL = ADDRESS, MASK
0FA7 19           DAD  D
0FA8 7E           MOV  A,M              A = MASK
0FA9 E1           POP  H                HL = BYTADR
```

```
0FAA C9          RET               RETURN
                ;
                MOVB03;            MASK TABLE
0FAB 80          DB   80H          0 BIT MASK; HIGH ORDER
0FAC 40          DB   40H          1
0FAD 20          DB   20H          2
0FAE 10          DB   10H          3
0FAF 08          DB   08H          4
0FB0 04          DB   04H          5
0FB1 02          DB   02H          6
0FB2 01          DB   01H          7 BIT MASK; LOW ORDER
                ;MVLNIB(DEST  ,SOURCE,NIBCNT,NONBCD,ZERO  )
                ;      (NIBSTR,NIBSTR,BYTE  ,BIT   ,BIT   )
                ;      ( 0    , I     , I    , 0    , 0    )
                ;      ( @C   , @B    , A    ,PSW:S ,PSW:Z )
                ;      ( C    , NC    , NC   , C    , C    )
                ;
                ;PSW:CY = NO CHANGE
                ;PSW:S, Z, P CHANGED
                ;
                ;FOR A STRING ADDRESSED AT THE LEFT SIDE,
                ;FROM RIGHT TO LEFT MOVE NIBCNT NIBBLES FROM SOURCE TO
                ;DEST.  THE NONBCD AND ZERO FLAGS REFER TO THE LARGEST
                ;NIBBLE VALUE MOVED.
                ;DEST[0..NIBCNT-1] = SOURCE[0..NIBCNT-1]
                ;
                MVLNIB;             ****ENTRY POINT
0FB3 C5          PUSH B             SAVE  BC
                MVLN01;             ****SPECIAL JUMP ENTRY
0FB4 F5          PUSH PSW           SAVE A, PSW
0FB5 D5          PUSH D             SAVE DE
0FB6 3D          DCR  A             D = NIBCNT-1
0FB7 57          MOV  D,A
0FB8 80          ADD  B             B = OFFSET, SOURCE[N=NIBCNT-1]
0FB9 47          MOV  B,A
0FBA 7A          MOV  A,D           A = NIBCNT-1
0FBB 81          ADD  C             C = OFFSET, DEST[N=NIBCNT-1]
0FBC 4F          MOV  C,A
0FBD D1          POP  D             RESTORE DE
0FBE F1          POP  PSW           RESTORE A, PSW
0FBF C3 C3 0F    JMP  MVRN01        MVRNIB(DEST[N],SOURCE[N],NIBCNT,
                ;                          ( @C    , @B      , A    ,
                ;                          ( 0     , I       , I    ,
                ;
                ;                          NONBCD,ZERO )
                ;                          PSW:S ,PSW:Z)
                ;                           0    , 0   )
                ;                   RESTORE BC
                ;                   RETURN
                ;MVRNIB(DEST  ,SOURCE,NIBCNT,NONBCD,ZERO )
                ;      (NIBSTR,NIBSTR,BYTE  ,BIT   ,BIT   )
                ;      ( 0    , I     , I    , 0    , 0    )
                ;      ( @C   , @B    , A    ,PSW:S ,PSW:Z)
                ;      ( C    , NC    , NC   , C    , C    )
                ;
                ;PSW:CY = NO CHANGE
                ;PSW:S, Z, P CHANGED
                ;
                ;FOR A STRING ADDRESSED AT THE RIGHT SIDE,
                ;FROM RIGHT TO LEFT MOVE NIBCNT NIBBLES FROM SOURCE TO
                ;DEST.  THE NONBCD AND ZERO FLAGS REFER TO THE LARGEST
                ;NIBBLE VALUE MOVED.
                ;DEST[1-NIBCNT..0] = SOURCE[1-NIBCNT..0]
                ;
                MVRNIB;             ****ENTRY POINT
0FC2 C5          PUSH B             SAVE BC
                MVRN01;             ****SPECIAL JUMP ENTRY
```

```
0FC3 F5         PUSH PSW          SAVE A, PSW
0FC4 E5         PUSH H            SAVE HL
0FC5 67         MOV  H,A          H = NIBCNT
               ;                  B = OFFSET, SOURCE[N=0]
               ;                  C = OFFSET, DEST[N=0]
               ;                  SET FLAGS FOR RETURN IF NIBCNT .LE. 0
0FC6 2E 00      MVI  L,0          L = FLAGV = 0; WHICH WILL PRODUCE:
               ;                  PSW:Z = ZERO = TRUE
               ;                  PSW:S = NONBCD = FALSE
               ;                  MOVE NIBCNT NIBBLES
               MVRN02;            DO WHILE NIBCNT .GT. 0
0FC8 25         DCR  H              H = NIBCNT-1
0FC9 FA E7 0F   JM   MVRN06
               ;                    MOVE ONE NIBBLE
0FCC CD 35 0F   CALL GETNIB         GETNIB(NIBVAL,ZERO ,SOURCE[N])
               ;                          ( A     ,PSW:Z, @B      )
               ;                          ( 0     , 0   , I       )
0FCF CD EE 0F   CALL PUTNIB         PUTNIB(DEST[N],NIBVAL)
               ;                          ( @C     , A    )
               ;                          ( 0      , I    )
               ;                    CHECK FOR NONZERO NIBBLE
0FD2 CA DB 0F   JZ   MVRN04         IF ZERO .EQ. FALSE
               ;                      CHECK FOR NO PREVIOUS FLAGS
0FD5 2C         INR  L                IF FLAGV .EQ. 0
0FD6 2D         DCR  L
0FD7 C2 DB 0F   JNZ  MVRN03
0FDA 2C         INR  L                  L = FLAGV = 1
               ;                        WHICH WILL PRODUCE:
               ;                        PSW:Z = ZERO = FALSE
               ;                        PSW:S = NONBCD = FALSE
               MVRN03;                ENDIF
               MVRN04;              ENDIF
               ;                    CHECK FOR NONBCD NIBBLE
0FDB FE 0A      CPI  10             IF NIBVAL .GE. 10
0FDD DA E2 0F   JC   MVRN05
0FE0 2E 80      MVI  L,80H            L = FLAGV = HEX80
               ;                      WHICH WILL PRODUCE:
               ;                      PSW:Z = ZERO = FALSE
               ;                      PSW:S = NONBCD = TRUE
               MVRN05;              ENDIF
               ;                    MOVE INDICES FROM RIGHT TO LEFT
0FE2 05         DCR  B              B = OFFSET, SOURCE[N=N-1]
0FE3 0D         DCR  C              C = OFFSET.DEST[N=N-1]
               ;                    H = NIBCNT = NIBCNT-1
0FE4 C3 C8 0F   JMP  MVRN02
               MVRN06;            ENDDO
0FE7 4D         MOV  C,L          C = FLAGV
0FE8 E1         POP  H            RESTORE HL
0FE9 F1         POP  PSW          RESTORE A, PSW:CY
0FEA 0C         INR  C            PSW = STATUS, FLAGV
0FEB 0D         DCR  C
0FEC C1         POP  B            RESTORE BC
0FED C9         RET               RETURN
               ;PUTNIB(DEST  ,NIBVAL)
               ;      (NIBBLE,BYTE  )
               ;      ( 0     , I     )
               ;      ( @C    , A     )
               ;      ( C     , NC    )
               ;
               ;PSW:S, Z, P, CY = NO CHANGE
               ;
               ;INSERT LOW ORDER 4 BITS OF NIBVAL INTO DEST
               ;DEST = NIBVAL .AND. HEXOF
               ;
               PUTNIB;            ****ENTRY POINT
0FEE E5         PUSH H            SAVE HL
0FEF C5         PUSH B            SAVE BC
```

```
OFFO F5        PUSH PSW         SAVE A, PSW
              ;                 CLEAR H/O NIBBLE OF NIBVAL
OFF1 E6 OF     ANI  OFH         B = NIBVAL = NIBVAL .AND. HEXOF
OFF3 47        MOV  B,A
              ;                 FLAG WHETHER NIBBLE GOES INTO L/O
              ;                 OF BYTE CONTAINING DEST
OFF4 AF        XRA  A           PSW:CY = OFFSET, DEST .MOD. 2
OFF5 79        MOV  A,C
OFF6 1F        RAR
              ;                 A = (OFFSET, DEST)/2
OFF7 26 74     MVI  H,X/100H    HL = ADDRESS, DEST
OFF9 6F        MOV  L,A
              ;                 MAKE MASK TO CLEAR L/O OF BYTE
OFFA OE FO     MVI  C,OFOH      C = MASK = HEXFO
              ;                 CHECK WHETHER NIBBLE GOES IN H/O
OFFC DA 07 10  JC   PUTNO1      IF PSW:CY .EQ. 0
              ;                   MAKE MASK TO CLEAR H/O OF BYTE
OFFF OE OF     MVI  C,OFH         C = MASK = HEXOF
              ;                   SHIFT L/O NIBBLE OF NIBVAL TO H/O
1001 78        MOV  A,B           B = NIBVAL = NIBVAL * HEX10
1002 07        RLC
1003 07        RLC
1004 07        RLC
1005 07        RLC
1006 47        MOV  B,A
              PUTNO1;           ENDIF
              ;                 FETCH BYTE CONTAINING DEST
1007 7E        MOV  A,M         A = DEST
              ;                 MAKE HOLE IN BYTE FOR NIBBLE
1008 A1        ANA  C           A = DEST = 0
              ;                 PUT NIBBLE IN HOLE
1009 B0        ORA  B           DEST = NIBVAL
100A 77        MOV  M,A
100B F1        POP  PSW         RESTORE A, PSW
100C C1        POP  B           RESTORE BC
100D E1        POP  H           RESTORE HL
100E C9        RET              RETURN
              ;RSCAN(SOURCE,NIBCNT,NONBCD,ZERO  )
              ;     (NIBSTR,BYTE  ,BIT   ,BIT   )
              ;     ( I    , I    , 0    , 0    )
              ;     ( @B   , A    ,PSW:S ,PSW:Z )
              ;     ( NC   , NC   , C    , C    )
              ;
              ;PSW:CY= NO CHANGE
              ;PSW:S, Z, P CHANGED
              ;
              ;FOR A STRING ADDRESSED AT THE RIGHT SIDE,
              ;FROM RIGHT TO LEFT SCAN NIBCNT NIBBLES.
              ;THE NONBCD AND ZERO FLAGS REFER TO THE LARGEST
              ;NIBBLE SCANNED.
              ;SCAN SOURCE[1-NIBCNT..0]
              ;
              RSCAN;            ***ENTRY POINT
100F C5        PUSH B           SAVE BC
              ;                 SCAN BY MOVING SOURCE INTO ITSELF
1010 48        MOV  C,B         C = OFFSET, SOURCE
1011 C3 C3 OF  JMP  MVRNO1      MVRNIB(SOURCE,SOURCE,NIBCNT,
              ;                        ( @C   , @B   , A    ,
              ;                        ( 0    , I    , I    ,
              ;
              ;                        NONBCD,ZERO  )
              ;                        PSW:S ,PSW:Z )
              ;                         0    , 0    )
              ;                 RESTORE BC
              ;                 RETURN
              ;TDBITM(SOURCE,BITCNT,DEST  ,DBIT  ,SBIT  )
              ;      (BITSTR,UBYTE ,BITSTR,UBYTE ,BYTSTR)
```

```
                  ;       ( I    , I    , 0    , I    , I    )
                  ;       ( @H   , L    , @D   , E    , @BC  )
                  ;       ( NC   , C    , C    , C    , NC   )
                  ;
                  ;REGISTERS DESTROYED
                  ;PSW DESTROYED
                  ;
                  ;TABLE DRIVEN BIT MOVE ROUTINE.
                  ;MOVES BITCNT BITS INTO DEST STARTING AT DEST.DBIT;
                  ;THE SOURCE BITS ARE SOURCE.SBIT[0] THROUGH
                  ;SOURCE.SBIT[BITCNT-1]
                  ;
                  TDBITM;                 ****ENTRY POINT
1014 7D             MOV  A,L              A = BITCNT = BITCNT+1
1015 3C             INR  A
                  ;                       BC = ADDRESS, SBIT[N=0]
                  TDBIT1;                 DO WHILE BITCNT .NE. 0
1016 3D             DCR  A                  A =  BITCNT = BITCNT-1
1017 C8             RZ
1018 F5             PUSH PSW                SAVE A, PSW
1019 0A             LDAX B                  L = SBIT[N]
101A 6F             MOV  L,A
                  ;                         MOVE BIT
101B CD 68 0F       CALL MOVBIT             MOVBIT(SOURCE,SBIT[N],DEST,DBIT,VALUE)
                  ;                                ( @H   , L     , @D , E  ,PSW:Z)
                  ;                                ( I    , I     , 0  , I  , 0   )
101E F1             POP  PSW                A = BITCNT
101F 03             INX B                   BC = ADDRESS, SBIT[N=N+1]
1020 1C             INR  E                  E = DBIT = DBIT+1
1021 C3 16 10       JMP  TDBIT1
                  ;                       ENDDO
                  ;                       RETURN
                  ;VCALL(RTNADR)
                  ;     (ADDR  )
                  ;     ( I    )
                  ;     ( HL   )
                  ;
                  ;REGISTER AND STATUS CHANGES DEPEND ON ROUTINE @HL
                  ;
                  ;VECTOR CALL TO ROUTINE WHOSE ADDRESS IS IN HL
                  ;
                  VCALL;                  ****ENTRY POINT
1024 E9             PCHL                  GO TO ROUTINE @HL
                  ;                       RETURN VIA RTS IN THAT ROUTINE
                  ;VCALLS(RTNADR)
                  ;      (ADDR  )
                  ;      ( I    )
                  ;      ( HL   )
                  ;      ( NC   )
                  ;
                  ;PSW:S, Z, P, CY = NO CHANGE
                  ;
                  ;VECTOR CALL TO ROUTINE @HL
                  ;
                  VCALLS;                 ****ENTRY POINT
1025 C5             PUSH B                SAVE ALL REGISTERS
1026 D5             PUSH D
1027 E5             PUSH H
1028 F5             PUSH PSW
                  ;                       VECTOR CALL TO ROUTINE @HL
1029 CD 24 10       CALL VCALL            VCALL(RTNADR)
                  ;                            ( HL    )
                  ;                            ( I     )
                  ;                       RESTORE ALL REGISTERS
102C F1             POP  PSW
102D E1             POP  H
102E D1             POP  D
```

```
102F C1          POP  B
1030 C9          RET
                ;NVM30F()(PORTA )
                ;        (BITSTR)
                ;        ( I/O  )
                ;        ( 7001 )
                ;        ( C    )
                ;
                ;REGISTERS NOT CHANGED
                ;PSW NOT CHANGED
                ;
                ;REMOVE 30 VOLTS FROM NONVOLATILE MEMORY TO DISABLE
                ;WRITING AND ERASING.
                ;
                NVM30F;                 ****ENTRY POINT
1031 F5          PUSH PSW               SAVE A,PSW
1032 C5          PUSH B                 SAVE BC
                ;                       REMOVE 30 VOLTS FROM NVM
1033 3A 01 70    LDA  PORTA             PORTA = PORTA .OR. HEX40
1036 F6 40       ORI  40H
1038 32 01 70    STA  PORTA
                ;                       PAUSE FOR 10 MSEC TO ALLOW NVM
                ;                       VOLTAGE TO TRANSITION FROM
                ;                       -30 TO +5
103B 01 64 00    LXI  B,100             BC = LOOPCT = 100
                NVM30G;                 DO UNTIL LOOPCT .EQ. 0
103E CD 19 0B    CALL NPAUSE              NPAUSE(LOOPCT,ZROFLG)
                ;                                ( BC   ,PSW:Z )
                ;                                ( I/O  , 0    )
1041 C2 3E 10    JNZ  NVM30G
                ;                       ENDDO
1044 C1          POP  B                 RESTORE BC
1045 F1          POP  PSW               RESTORE A,PSW
1046 C9          RET                    RETURN
                ;NVM30T()(PORTA )
                ;        (BITSTR)
                ;        ( I/O  )
                ;        ( 7001 )
                ;        ( C    )
                ;
                ;REGISTERS NOT CHANGED
                ;PSW NOT CHANGED
                ;
                ;APPLY 30 VOLTS TO NONVOLATILE MEMORY TO ENABLE
                ;WRITING AND ERASING.
                ;
                NVM30T;                 ****ENTRY POINT
1047 F5          PUSH PSW               SAVE A,PSW
                ;                       SUPPLY 30 VOLTS TO NVM
1048 3A 01 70    LDA  PORTA             PORTA = PORTA .AND. HEXBF
104B E6 BF       ANI  0BFH
104D 32 01 70    STA  PORTA
                ;                       DELAY ABOUT 100 USEC BEFORE RETURNING
1050 3E 0B       MVI  A,11
1052 3D          DCR  A
1053 C2 52 10    JNZ  $-1
1056 F1          POP  PSW               RESTORE A,PSW
1057 C9          RET                    RETURN
                ;NVMBYT(ADRESS,NVMRED[J],BYTE)
                ;      (ADRESS,NIBSTR   ,BYTE)
                ;      ( I/O  , I       , O  )
                ;      ( HL   , @HL     , A  )
                ;      ( C    , NC      , C  )
                ;
                ;PSW DESTROYED
                ;REGISTERS NOT CHANGED
```

```
                    ;
                    ;ASSEMBLE 2 NIBBLES FROM NVM INTO A SINGLE BYTE
                    ;
                    NVMBYT;                 ****ENTRY POINT
1058 C5               PUSH B                SAVE BC
1059 7E               MOV  A,M              B = HINIB = NVMRED[J]*HEX10
105A 87               ADD  A
105B 87               ADD  A
105C 87               ADD  A
105D 87               ADD  A
105E 47               MOV  B,A
                    ;                       POINT AT NEXT NIBBLE
105F CD BB 11         CALL NVMNXT           NVMNXT(ADRESS,NVMRED[J=J+?])
                    ;                             ( HL    , @HL         )
                    ;                             ( I/O   , -           )
1062 7E               MOV  A,M              A = LOWNIB = NVMRED[J] .AND. HEXOF
1063 E6 0F            ANI  0FH
1065 B0               ORA  B                A = BYTE = LOWNIB .OR. HINIB
1066 C1               POP  B                RESTORE BC
1067 C9               RET                   RETURN
                    ;NVMCHG()(NVMCTL)
                    ;         (NIBSTR)
                    ;         ( I    )
                    ;         ( RAM  )
                    ;         ( NC   )
                    ;
                    ;A,PSW DESTROYED
                    ;REGISTERS DESTROYED
                    ;
                    ;PROVIDES NVM NORMAL BLOCK IF METER IN NORMAL MODE.
                    ;PROVIDES NVM SERVICE BLOCK IF METER NOT IN NORMAL MODE.
                    ;
                    ;NVMCTL[0] = F IF NO BLOCK IS OPEN
                    ;          = 0 IF NORMAL BLOCK IS OPEN
                    ;          = 1 IF SERVICE BLOCK IS OPEN
                    ;NVMCTL[1] = NUMBER OF OPEN BLOCK
                    ;
                    NVMCHG;                 ****ENTRY POINT
                    ;                       FETCH BLOCK TYPE
1068 06 66            MVI  B,NVMCTL         B = OFFSET, NVMCTL[0]
106A CD 35 0F         CALL GETNIB           GETNIB(BLKTYP,ZROFLG,NVMCTL[0])
                    ;                             ( A     ,PSW:Z , @B       )
                    ;                             ( 0     , 0    , I        )
106D FE 02            CPI  2                IF BLKTYP .LT. 2
106F D0               RNC
                    ;                         A BLOCK IS OPEN
                    ;                         DETERMINE METER STATUS
1070 CD 4E 0F         CALL LSTATE             LSTATE(FATMOD,NORMOD,SERMOD,PRVMOD)
                    ;                               (PSW:S ,PSW:Z ,PSW:P ,PSW:C )
                    ;                               ( 0    , 0    , 0    , 0    )
1073 CA 77 10         JZ   NVMCH1             IF NORMOD .EQ. FALSE
                    ;                           A SERVICE BLOCK IS REQUIRED
1076 3D               DCR  A                    A = DIFRNC = BLKTYP-(SRVTYP=1)
                    NVMCH1;                   ELSE
                    ;                           A NORMAL BLOCK IS REQUIRED
                    ;                           A = DIFRNC = BLKTYP-(NORHDR=0)
                    ;                         ENDIF
1077 B7               ORA  A                  IF DIFRNC .NE. 0
1078 C8               RZ
                    ;                           CURRENT BLOCK NOT REQUIRED
1079 CD DE 0E         CALL DBLANK               STOP CLOCK. BLANK DISPLAY
                    ;                           CLOSE CURRENT BLOCK
107C F3               DI                        DISABLE INTERRUPTS
107D CD 9E 12         CALL NVMWR                NVMWR(ERRFLG)
                    ;                                (PSW:Z )
                    ;                                ( 0    )
1080 FB               EI                        ENABLE INTERRUPTS
```

```
                        ;                           IF ERRFLG .EQ. FALSE
                        ;                             OPEN REQUIRED BLOCK
     1081 C2 C4 11        JNZ  NVMOPN                 NVMOPN(ERRFLG)
                        ;                                   (PSW:Z )
                        ;                                   ( 0    )
                        ;                           ENDIF
                        ;                         ENDIF
                        ;                       ENDIF
     1084 C9              RET                   RETURN
                        ;NVMDED(CODE,ERRFLG)(SERFLG,NVMRED)
                        ;      (BYTE,BIT   )(BIT   ,NIBSTR)
                        ;      ( I  , 0    )( 0    , I     )
                        ;      ( A  ,PSW:Z )( RAM  , NVM   )
                        ;      ( C  , C    )( C    , NC    )
                        ;
                        ;A,PSW DESTROYED
                        ;REGISTERS DESTROYED
                        ;
                        ;FLAG METER DEAD AND INDICATE ERROR
                        ;
                        NVMDED;                 ****ENTRY POINT
     1085 47              MOV  B,A              B = CODE
                        ;                       TEST SPECIAL NVM LOCATION
     1086 3A BE 46        LDA  NVMRED+KILCOD IF NVMRED[KILCOD] .EQ. HEXOF
     1089 3C              INR  A
     108A E6 OF           ANI  OFH
     108C C2 A0 10        JNZ NVMDE2
                                                  LOCATION STILL CLEAR
                        ;                         WRITE ERROR CODE TO LOCATION
                        ;                         
     108F 78              MOV  A,B                A[1] = CODE
     1090 21 BE 02        LXI  H,KILCOD           H = BASE = KILCOD
     1093 CD 47 10        CALL NVM30T             TURN ON -30 V TO NVM
     1096 CD 61 12        CALL NVMWN              NVMWN(CODE,BASE,ERRFLG)
                        ;                              (A[1], HL ,PSW:Z )
                        ;                              ( I  , I  , 0    )
                        NVMDE1;                   ****ENTRY POINT
                        ;                             NVMDE1(CODE,ERRFLG)
                        ;                                   ( B   ,PSW:Z )
                        ;                                   ( I   , 0    )
                        ;                         FLAG METER DEAD
     1099 21 10 74        LXI  H,SERFLG/2+X       HL = ADDRESS, SERFLG
     109C 7E              MOV  A,M                SERFLG.DEAD = TRUE
     109D F6 80           ORI  80H
     109F 77              MOV  M,A
                        NVMDE2;                 ENDIF
     10A0 CD 31 10        CALL NVM30F           TURN OFF -30 V TO NVM
                        ;                       DECLARE FATAL ERROR
     10A3 78              MOV  A,B              A = DEDCOD = HEX20+CODE
     10A4 F6 20           ORI  20H
     10A6 C3 80 08        JMP  FATERR           FATERR(DEDCOD,ERRFLG)
                        ;                             ( A     ,PSW:Z )
                        ;                             ( I     , 0    )
                        ;                       RETURN
                        ;NVMDXB(ERRFLG,BLKCTL)
                        ;      (BIT   ,NIBSTR)
                        ;      ( 0    , I    )
                        ;      (PSW:Z , B    )
                        ;      ( C    , NC   )
                        ;
                        ;A,PSW DESTROYED
                        ;REGISTERS DESTROYED
                        ;
                        ;DEACTIVATES NVM BLOCK
                        ;
                        NVMDXB;                 ****ENTRY POINT
                        ;                       MOVE NVM CONTROL BYTE TO ACCUMULATOR
     10A9 78              MOV  A,B              A = BLKCTL
```

```
                    ;                      FORM BASE VALUE FOR BLOCK
10AA CD 91 11        CALL NVMMAP           NVMMAP(BLKCTL,BASE,BLKTYP)
                    ;                            ( A     , HL , A[1] )
                    ;                            ( I     , 0  , 0    )
                    ;                      WRITE NUL HEADER TO DEACTIVATE BLOCK
10AD AF              XRA  A                A[1] = NULHDR = 0
10AE C3 61 12        JMP  NVMWN            NVMWN(NULHDR,BASE,ERRFLG)
                    ;                           ( A[1] , HL ,PSW:Z )
                    ;                           ( I    , I  , 0    )
                    ;                      RETURN
                    ;NVMER(ERRFLG)(NVMCTL,NVMERS,NVMRED,SERFLG)
                    ;     (BIT   )(NIBSTR,NIBSTR,NIBSTR,BITSTR)
                    ;     ( 0    )( I    , 0    , I    , I    )
                    ;     (PSW:Z )( RAM  , NVM  , NVM  , RAM  )
                    ;     ( C    )( NC   , C    , NC   , C    )
                    ;
                    ;A,PSW DESTROYED
                    ;REGISTERS DESTROYED
                    ;
                    ;ERASE A BLOCK OF NONVOLATILE MEMORY
                    ;
                    NVMER;                 ****ENTRY POINT
                    ;                      GET CONTROL BYTE TO ERASE NEXT BLOCK
10B1 CD 9F 11        CALL NVMNBK           NVMNBK(ERRFLG,OLDCTL,NXTCTL,
                    ;                            (PSW:Z , B     , C     ,
                    ;                            ( 0    , 0     , 0     ,
                    ;
                    ;                            ADRESS,NVMCTL)
                    ;                             HL    , @HL  )
                    ;                             0     , -    )
10B4 C8              RZ                    IF ERRFLG .EQ. FALSE
                    ;                        SET TO CHECK AND ERASE NEXT BLOCK
10B5 79              MOV  A,C                NVMCTL = NXTCTL .OR. HEXF0
10B6 F6 F0           ORI  0F0H
10B8 77              MOV  M,A
                    ;                        FETCH BLOCK LENGTH
10B9 CD DF 11        CALL NVMPRP             NVMPRP(NIBCNT,OFFSET,RAM[I])
                    ;                               ( B     , C     , @C   )
                    ;                               ( 0     , 0     , -    )
10BC C5              PUSH B                  SAVE BC
                    ;                        FETCH BASE ADDRESS OF CURRENT BLOCK
10BD 7E              MOV  A,M                A = NVMCTL
10BE CD 91 11        CALL NVMMAP             NVMMAP(NVMCTL,BASE,BLKTYP)
                    ;                               ( A     , HL , A[1] )
                    ;                               ( I     , 0  , 0    )
10C1 E5              PUSH H                  SAVE HL
                    ;                        FORM NVM READ ADDRESS
10C2 11 00 44        LXI  D,NVMRED           HL = ADDRESS, NVMRED[J=BASE]
10C5 19              DAD  D
10C6 E5              PUSH H                  SAVE HL
                    ;                        INITIALIZE CRC VALUE
10C7 16 FF           MVI  D,0FFH             D = CRCVAL = HEXFF
                    ;                        CHECK BLOCK HEADER
10C9 7E              MOV  A,M                A = BLKHDR[0] = NVMRED[J]
10CA E6 0F           ANI  0FH                IF BLKHDR[0] .EQ. 0
10CC C2 EB 10        JNZ  NVMER4
                    ;                          BLOCK IS INACTIVE AND NOT ERASED
                    ;                          POINT AT START OF BLOCK'S DATA
10CF 23              INX  H                    HL = ADDRESS, NVMRED[J=J+2]
10D0 23              INX  H
                    ;                          CHECK BLOCK CHECKSUM
                    NVMER1;                    LOOP - WITH 1 BREAK
10D1 05              DCR  B                      B = NIBCNT = NIBCNT-1
10D2 FA DF 10        JM   NVMER2                 IF NIBCNT .LT. 0
                    ;                              BREAK
                    ;                            ENDIF
                    ;                            DEVELOP CRC
```

```
10D5 7E         MOV  A,M           A = DATA = NVMRED[J]
10D6 CD C6 0E   CALL CRCNIB        CRCNIB(DATA,CRCVAL)
                ;                        ( A  , D    )
                ;                        ( I  , O    )
                ;                  POINT AT NEXT DATA
10D9 CD BB 11   CALL NVMNXT        NVMNXT(ADRESS,NVMRED[J=J+?])
                ;                        ( HL   , @HL         )
                ;                        ( I/O  , -           )
10DC C3 D1 10   JMP  NVMER1
               NVMER2;           ENDLOOP
                ;                FETCH CRC FROM NVM
10DF CD 58 10   CALL NVMBYT      NVMBYT(ADRESS,NVMRED[J],NVMCRC)
                ;                      ( HL   , @HL      , A    )
                ;                      ( I/O  , I        , O    )
10E2 BA         CMP  D           IF NVMCRC .NE. CRCVAL
10E3 CA EB 10   JZ   NVMER3
                ;                  DECLARE DEAD METER. WEAK NVM
10E6 3E 02      MVI  A,NVMRET      A = NVMRET
10E8 CD 85 10   CALL NVMDED        NVMDED(NVMRET,ERRFLG)
                ;                        ( A    ,PSW:Z )
                ;                        ( I    , O    )
               NVMER3;           ENDIF
               NVMER4;         ENDIF
10EB D1         POP  D         DE = ADDRESS, NVMRED[J=BASE]
10EC E1         POP  H         HL = BASE
10ED 01 00 40   LXI  B,NVMERS  HL = ADDRESS, NVMERS[I=BASE]
10F0 09         DAD  B
10F1 F1         POP  PSW       B = NIBCNT = NIBCNT+4
10F2 C6 04      ADI  4
10F4 47         MOV  B,A
10F5 3A 10 74   LDA  SERFLG/2+X   IF SERFLG.DEAD .EQ. TRUE
10F8 B7         ORA  A
10F9 F2 FE 10   JP   NVMER5
10FC AF         XRA  A            PSW:Z = ERRFLG = TRUE
10FD C9         RET
               NVMER5;         ELSE
10FE CD 47 10   CALL NVM30T      SUPPLY 30 VOLTS TO NVM
               NVMER6;           LOOP - WITH 2 BREAKS
1101 05         DCR  B             B = NIBCNT = NIBCNT-1
                ;                  IF NIBCNT .LT. 0
                ;                    PSW:Z = ERRFLG = FALSE
1102 FA 31 10   JM   NVM30F          REMOVE 30 VOLTS FROM NVM
                ;                    BREAK
                ;                  ENDIF
1105 F3         DI                 DISABLE INTERRUPTS
                ;                  START ERASE FUNCTION
1106 77         MOV  M,A           NVMERS[J] = DUMMY
                ;                  PAUSE FOR 10 MSEC
1107 C5         PUSH B             SAVE BC
1108 01 64 00   LXI  B,100         BC = LOOPCT = 100
               NVMER7;             DO UNTIL LOOPCT .EQ. 0
110B CD 19 0B   CALL NPAUSE          NPAUSE(LOOPCT,ZROFLG)
                ;                          ( BC   ,PSW:Z )
                ;                          ( I/O  , O    )
110E C2 0B 11   JNZ  NVMER7
                ;                  ENDDO
1111 C1         POP  B             RESTORE BC
                ;                  STOP ERASE FUNCTION
1112 1A         LDAX D             A = GARBAGE = NVMRED[J]
1113 7B         MOV  A,E           A=(ADDRESS,NVMRED[J]).AND.HEX3F
1114 E6 3F      ANI  3FH
1116 CA 1A 11   JZ   NVMER8        IF A .EQ. 0
                ;                    HEADER[0] NOT JUST ERASED
1119 FB         EI                   ENABLE INTERRUPTS
               NVMER8;             ENDIF
                ;                  ADVANCE ERASE ADDRESS
111A CD BB 11   CALL NVMNXT        NVMNXT(ADRESS,NVMERS[I=I+?])
```

```
                 ;                         ( HL    , @HL          )
                 ;                         ( I/O   , -            )
                 ;                      READ ERASED NIBBLE
111D 1A           LDAX D                C = DATA = NVMRED[J] .AND. HEXF0
111E F6 F0        ORI  0F0H
1120 4F           MOV  C,A
                 ;                      ADVANCE READ ADDRESS
1121 EB           XCHG
1122 CD BB 11     CALL NVMNXT           NVMNXT(ADRESS,NVMRED[J=J+?])
                 ;                         ( HL    , @HL          )
                 ;                         ( I/O   , -            )
1125 EB           XCHG
                 ;                      CHECK FOR PROPER ERASURE
1126 0C           INR  C                IF DATA+1 .NE. 0
1127 CA 01 11     JZ   NVMER6
                 ;                        BAD ERASURE
                 ;                        DECLARE DEAD METER. BAD NVM
112A 3E 01        MVI  A,NVMBAD           A = NVMBAD
112C C3 85 10     JMP  NVMDED             NVMDED(NVMBAD,ERRFLG)
                 ;                               ( A    ,PSW:Z )
                 ;                               ( I    , 0    )
                 ;                        BREAK
                 ;                      ENDIF
                 ;                    ENDLOOP
                 ;                  ENDIF
                 ;                ENDIF
                 ;                RETURN
                 ;NVMFND(ERRFLG)(NVMCTL,NVMRED)
                 ;      (BIT   )(NIBSTR,NIBSTR)
                 ;      ( 0    )( I/O  , I    )
                 ;      (PSW:Z )( RAM  , NVM  )
                 ;      ( C    )( C    , NC   )
                 ;
                 ;A,PSW DESTROYED
                 ;REGISTERS DESTROYED
                 ;
                 ;FIND CURRENT BLOCK CORRESPONDING TO METER MODE
                 ;
                 NVMFND;                ****ENTRY POINT
112F 11 33 74     LXI  D,NVMCTL/2+X     DE = ADDRESS, NVMCTL[0..1]
1132 1A           LDAX D                PSW:CY = OPEN = NVMCTL[0] .LT. 2
1133 FE 20        CPI  20H
1135 3E 02        MVI  A,SFTWRE         A = SFTWRE
                 ;                      IF OPEN .EQ. TRUE
                 ;                        LOOKING FOR BLOCK IS INAPPROPRIATE
                 ;                        DECLARE DEAD METER. SOFTWARE ERROR.
1137 DA 85 10     JC   NVMDED             NVMDED(SFTWRE,ERRFLG)
                 ;                               ( A    ,PSW:Z )
                 ;                               ( I    , 0    )
                 ;                      ELSE
                 ;                        SET TO LOCATE ACTIVE SERVICE HEADER
113A 06 F1        MVI  B,0F1H             B = TEST = HEXF1
                 ;                        SET TO INCREMENT TO BLOCK 0
113C 1A           LDAX D                  NVMCTL[1] = HEX0F
113D F6 0F        ORI  0FH
113F 12           STAX D
                 ;                        THERE ARE 2 SERVICE BLOCKS
1140 0E 02        MVI  C,2                C = BLKCTR = 2
                 ;                        DETERMINE METER MODE
1142 CD 4E 0F     CALL LSTATE             LSTATE(FATMOD,NORMOD,SERMOD,PRVMOD)
                 ;                               (PSW:S ,PSW:Z ,PSW:P ,PSW:C )
                 ;                               ( 0    , 0    , 0    , 0    )
1145 C2 4E 11     JNZ  NVMFN1             IF NORMOD .EQ. TRUE
                 ;                          SET TO INCREMENT TO BLOCK 2
1148 1A           LDAX D                    NVMCTL[1] = HEX01
1149 A0           ANA  B
114A 12           STAX D
```

```
                   ;                        SET TO LOCATE ACTIVE NORMAL HEADER
114B 05              DCR  B                 B = TEST = HEXF0
                   ;                        THERE ARE 14 NORMAL BLOCKS
114C 0E 0E           MVI  C,14              C = BLKCTR = 14
                   NVMFN1:                ENDIF
                   NVMFN2:                LOOP - WITH 2 BREAKS.
                   ;                        INCREMENT BLOCK NUMBER
114E 1A              LDAX D                 NVMCTL[1] = NVMCTL[1]+1
114F 3C              INR  A
1150 F6 F0           ORI  0F0H
1152 12              STAX D
                   ;                        FETCH CORRESPONDING BASE ADDRESS
1153 CD 91 11        CALL NVMMAP            NVMMAP(NVMCTL,BASE,BLKTYP)
                   ;                              ( A     , HL , A[1] )
                   ;                              ( I     , O  , O    )
                   ;                        CONVERT TO READ ADDRESS
1156 C5              PUSH B                 SAVE BC
1157 01 00 44        LXI  B,NVMRED          HL = ADDRESS, NVMRED[J=BASE]
115A 09              DAD  B
115B C1              POP  B                 RESTORE BC
115C 0D              DCR  C                 C = BLKCTR = BLKCTR-1
                   ;                        PSW:S = DONE = BLKCTR .LT. 0
115D 3E 01           MVI  A,NVMBAD          A = NVMBAD
                   ;                        IF DONE .EQ. TRUE
                   ;                          DECLARE DEAD METER. BAD NVM
115F FA 85 10        JM   NVMDED              NVMDED(NVMBAD,ERRFLG)
                   ;                                ( A     ,PSW:Z )
                   ;                                ( I     , O    )
                   ;                          BREAK
                   ;                        ENDIF
                   ;                        FETCH BLOCK HEADER
1162 CD 58 10        CALL NVMBYT            NVMBYT(ADRESS,NVMRED[J],HEADER)
                   ;                              ( HL    , @HL      , A     )
                   ;                              ( I/O   , I        , O     )
1165 B8              CMP  B                 IF HEADER .EQ. TEST
1166 C2 4E 11        JNZ  NVMFN2
1169 04              INR  B                   PSW:Z = ERRFLG = FALSE
116A C9              RET                      BREAK
                   ;                        ENDIF
                   ;                      ENDLOOP
                   ;                    ENDIF
                   ;                    RETURN
                   ;NVMLOD()(NORFLG,NVMCTL,MRSTS1)
                   ;         (BITSTR,NIBSTR,BITSTR)
                   ;         ( O     , O     , O     )
                   ;         ( RAM   , RAM   , RAM   )
                   ;         ( C     , C     , C     )
                   ;
                   ;A,PSW DESTROYED
                   ;REGISTERS DESTROYED
                   ;
                   ;INITIALIZATION. LOAD NONVOLATILE MEMORY
                   ;
                   NVMLOD:                  ****ENTRY POINT
116B 21 26 74        LXI  H,NORFLG/2+X      HL = ADDRESS, NORFLG
                   ;                        SENT STATUS AND POSTAGE AFTER POWERUP
116E 7E              MOV  A,M               NORFLG.QUESTS = NORFLG.QUEPOS = TRUE
116F F6 C0           ORI  0C0H
1171 77              MOV  M,A
                   ;                        DECLARE THAT NO BLOCK IS OPEN
1172 3E F0           MVI  A,0F0H            NVMCTL = HEXF0
1174 32 33 74        STA  NVMCTL/2+X
                   ;                        METER GUARANTEED TO BE IN NORMAL MODE
                   ;                        SEARCH FOR NORMAL BLOCK
1177 CD 2F 11        CALL NVMFND            NVMFND(ERRFLG)
                   ;                              (PSW:Z )
                   ;                              ( O    )
```

```
                 ;                       IF ERRFLG .EQ. FALSE
117A C4 EE 11      CNZ NVMRD               LOAD NORMAL BLOCK
                 ;                       ENDIF
117D 21 24 74      LXI  H,MRSTS1/2+X     HL = ADDRESS, MRSTS1
                 ;                       SET TO LOAD SERVICE BLOCK
                 ;                       INITIALIZE CHECK DATE STATUS
1180 7E            MOV  A,M              MRSTS1.DATDOR = MRSTS1.SERMOD = TRUE
1181 F6 48         ORI  48H
1183 77            MOV  M,A
1184 E5            PUSH H                SAVE HL
                 ;                       SEARCH FOR SERVICE BLOCK
1185 CD 2F 11      CALL NVMFND           NVMFND(ERRFLG)
                 ;                             (PSW:Z )
                 ;                             ( 0    )
                 ;                       IF ERRFLG .EQ. FALSE
1188 C4 EE 11      CNZ  NVMRD              LOAD SERVICE BLOCK
                 ;                       ENDIF
118B E1            POP  H                RESTORE HL
                 ;                       RETURN TO NORMAL MODE
                 ;                       DISABLE METER
118C 7E            MOV  A,M              MRSTS1.SERMOD = MRSTS1.ENABLD = FALSE
118D E6 F3         ANI  0F3H
118F 77            MOV  M,A
1190 C9            RET                   RETURN
                 ;NVMMAP(NVMCTL,BASE   ,BLKTYP)
                 ;      (NIBSTR,ADRESS,NIBSTR)
                 ;      ( I    , 0    , 0    )
                 ;      ( A    , HL   , A[1] )
                 ;      ( C    , C    , C    )
                 ;
                 ;PSW DESTROYED
                 ;REGISTERS NOT CHANGED
                 ;
                 ;MAPS BLOCK NUMBER IN L/O NIBBLE OF ACCUMULATOR INTO
                 ;CORRESPONDING NONVOLATILE MEMORY ADDRESS
                 ;
                 NVMMAP;                 ****ENTRY POINT
1191 0F            RRC                   A = NVMCTL[1]*HEX10+NVMCTL[0]
1192 0F            RRC
1193 0F            RRC
1194 0F            RRC
1195 F5            PUSH PSW              SAVE A,PSW
1196 E6 F0         ANI  0F0H             HL = BASE = NVMCTL[1]*HEX40
1198 6F            MOV  L,A
1199 26 00         MVI  H,0
119B 29            DAD  H
119C 29            DAD  H
119D F1            POP  PSW              RESTORE A,PSW
                 ;                       A[1] = BLKTYP = NVMCTL[0]
119E C9            RET                   RETURN
                 ;NVMNBK(ERRFLG,OLDCTL,NXTCTL,ADRESS,NVMCTL)(NVMCTL)
                 ;      (BIT   ,NIBSTR,NIBSTR,ADRESS,NIBSTR)(NIBSTR)
                 ;      ( 0    , 0    , 0    , 0    , -    )( I    )
                 ;      (PSW:Z , B    , C    , HL   , @HL  )( RAM  )
                 ;      ( C    , C    , C    , C    , -    )( NC   )
                 ;
                 ;A,PSW DESTROYED
                 ;REGISTERS DESTROYED
                 ;
                 ;DEVELOP CONTROL BYTE VALUES FOR DEACTIVATING BLOCK OF
                 ;CURRENT TYPE, AND FOR OPENING NEXT BLOCK.
                 ;
                 NVMNBK;                 ****ENTRY POINT
                 ;                       SET NVMCTL TO INDICATE ACTIVE CLOSED
                 ;                       BLOCK CORRESPONDING TO CURRENT STATUS
119F CD 2F 11      CALL NVMFND           NVMFND(ERRFLG)
                 ;                             (PSW:Z )
```

```
                    ;                          ( 0     )
11A2 C8               RZ                    IF ERRFLG .EQ. FALSE
                    ;                         NVMCTL[0] = HEXF, NO FILES OPEN
                    ;                         NVMCTL[1] = ACTIVE BLOCK NUMBER
11A3 21 33 74         LXI  H,NVMCTL/2+X       HL = ADDRESS, NVMCTL
11A6 46               MOV  B,M                B = OLDCTL = NVMCTL
11A7 0E 02            MVI  C,2                C = NVMCTL = HEX02
11A9 78               MOV  A,B                A = OLDCTL+1
11AA 3C               INR  A
11AB CA B9 11         JZ   NVMNB1             IF OLDCTL+1 .EQ. 0
                    ; >>JUMP AHEAD<<            OLD BLOCK WAS 15
                    ;                           NEWCTL SET FOR BLOCK 2, NORMAL
                    ;                           PSW:Z = ERRFLG = FALSE
                    ;                         ELSE
                    ;                           OLD BLOCK WAS NOT 15
11AE E6 0F            ANI  0FH                  A=OLDBLK+1=(OLDCTL+1).AND.HEX0F
11B0 4F               MOV  C,A                  C = OLDBLK+1
11B1 DE 03            SBI  3                    A = OLDBLK-2
11B3 F2 B9 11         JP   NVMNB1               IF OLDBLK-2 .GE. 0
                    ; >>JUMP AHEAD<<              OLD BLOCK WAS 2 TO 14
                    ;                             NEWCTL SET FOR BLK 3 TO 15, NORM
                    ;                             PSW:Z = ERRFLG = FALSE
                    ;                           ELSE
                    ;                             OLD BLOCK WAS 0 OR 1
                    ;                             SET NEWCTL FOR BLK 0 OR 1, SERVC
11B6 EE EF            XRI  0EFH                   C=NEWCTL=(OLDBLK-2).XOR.HEXEF
11B8 4F               MOV  C,A
                    ;                           ENDIF
                    ;                         ENDIF
                    NVMNB1;                   >>TARGET OF JUMP AHEAD<<
11B9 B1               ORA  C                  PSW:Z = ERRFLG = FALSE
11BA C9               RET
                    ;                       ENDIF
                    ;                       RETURN
                    ;NVMNXT(ADRESS)
                    ;      (ADRESS)
                    ;      ( I/O  )
                    ;      ( HL   )
                    ;      ( C    )
                    ;
                    ;A,PSW DESTROYED
                    ;REGISTERS NOT CHANGED
                    ;
                    ;ADVANCE ADDRESS TO NEXT HIGHER LOCATION SKIPPING XXXF
                    ;
                    NVMNXT;                 ****ENTRY POINT
11BB 23               INX  H                HL = ADRESS = ADRESS+1
11BC 7D               MOV  A,L              IF ADRESS[3] .EQ. HEX0F
11BD E6 0F            ANI  0FH
11BF FE 0F            CPI  0FH
11C1 C0               RNZ
11C2 23               INX  H                  HL = ADRESS = ADRESS+1
                    ;                       ENDIF
11C3 C9               RET                   RETURN
                    ;NVMOPN(ERRFLG)(NVMCTL,SERFLG)
                    ;      (BIT   )(NIBSTR,BITSTR)
                    ;      ( 0    )( 0    , I    )
                    ;      (PSW:Z )( RAM  , RAM  )
                    ;      ( C    )( C    , C    )
                    ;
                    ;A,PSW DESTROYED
                    ;REGISTERS DESTROYED
                    ;
                    ;OPENS NVM BLOCK
                    ;
                    NVMOPN;                 ****ENTRY POINT
11C4 3A 10 74         LDA  SERFLG/2+X       IF SERFLG.DEAD .EQ. TRUE
```

```
11C7 F6 7F      ORI  7FH             PSW:Z = ERRFLG = TRUE
11C9 2F         CMA
               ;                    ELSE
               ;                      PSW:Z = ERRFLG = FALSE
               ;                    ENDIF
11CA C8         RZ                  IF ERRFLG .EQ. FALSE
               ;                      ERASE NEXT BLOCK
11CB CD B1 10   CALL NVMER            NVMER(ERRFLG)
               ;                           (PSW:Z )
               ;                           ( 0    )
11CE C8         RZ                    IF ERRFLG .EQ. FALSE
11CF CD 47 10   CALL NVM30T             TURN ON -30V TO NVM
               ;                        DEVELOP CONTROL BYTES FOR OPENING
               ;                        NEXT BLOCK AND DEACTIVATING
               ;                        OLD BLOCK
11D2 CD 9F 11   CALL NVMNBK             NVMNBK(ERRFLG,OLDCTL,NXTCTL,
               ;                              (PSW:Z , B    , C    ,
               ;                              ( 0    , 0    , 0    ,
               ;
               ;                              ADRESS,NVMCTL)
               ;                               HL    , @HL  )
               ;                               0     , -    )
11D5 F3         DI                      DISABLE INTERRUPTS
               ;                        OPEN NEXT BLOCK
11D6 71         MOV  M,C                NVMCTL = NXTCTL
               ;                        DEACTIVATE OLD BLOCK
11D7 CD A9 10   CALL NVMDXB             NVMDXB(ERRFLG,OLDCTL)
               ;                              (PSW:Z , B    )
               ;                              ( 0    , I    )
11DA FB         EI                      ENABLE INTERRUPTS
11DB CD 31 10   CALL NVM30F             TURN OFF -30V TO NVM
               ;                      ENDIF
               ;                    ENDIF
11DE C9         RET                 RETURN
               ;NVMPRP(NIBCNT,OFFSET,RAM[I])(NVMCTL)
               ;      (BYTE  ,OFFSET,NIBSTR)(NIBSTR)
               ;      ( 0    , 0    , -    )( I    )
               ;      ( B    , C    , @C   )( RAM  )
               ;      ( C    , C    , NC   )( NC   )
               ;
               ;A,PSW DESTROYED
               ;REGISTERS NOT CHANGED
               ;
               ;RETURN RAM PARAMETERS CORRESPONDING TO NVM BLOCK TYPE
               ;
               NVMPRP;              ****ENTRY POINT
11DF 06 22      MVI  B,NORSIZ       B = NIBCNT = NORSIZ
11E1 0E 28      MVI  C,NORSTR       C = OFFSET = NORSTR
11E3 3A 33 74   LDA  NVMCTL/2+X     IF NVMCTL[1] .LT. 2
11E6 E6 0E      ANI  0EH
11E8 C0         RNZ
11E9 06 28      MVI  B,SRVSIZ         B = NIBCNT = SRVSIZ
11EB 0E 00      MVI  C,SRVSTR         C = OFFSET = SRVSTR
               ;                    ENDIF
11ED C9         RET                 RETURN
               ;NVMRD()(NVMCTL,RAM[I],NVMRED)
               ;       (NIBSTR,NIBSTR,NIBSTR)
               ;       ( I    , 0    , I    )
               ;       ( RAM  , RAM  , NVM  )
               ;       ( NC   , C    , NC   )
               ;
               ;A,PSW DESTROYED
               ;REGISTERS DESTROYED
               ;
               ;READ NONVOLATILE MEMORY INTO RAM
               ;
               NVMRD;               ****ENTRY POINT
```

```
                        ;               GET RAM DESTINATION PARAMETERS
11EE CD DF 11     CALL NVMPRP           NVMPRP(NIBCNT,OFFSET,RAM[I])
                        ;                     ( B    , C     , @C    )
                        ;                     ( 0    , 0     , -     )
                        ;               DEFINE NVM SOURCE BASE
11F1 3A 33 74     LDA  NVMCTL/2+X       A = NVMCTL
11F4 CD 91 11     CALL NVMMAP           NVMMAP(NMVCTL,BASE,BLKTYP)
                        ;                     ( A    , HL , A[1] )
                        ;                     ( I    , 0  , 0    )
                        ;               FORM NVM READ ADDRESS OF SOURCE DATA
11F7 11 02 44     LXI  D,NVMRED+2       HL = ADDRESS, NVMRED[J=BASE+2]
11FA 19           DAD  D
                        ;               INITIALIZE CRC VALUE
11FB 16 FF        MVI  D,0FFH           D = CRCVAL = HEXFF
                  NVMRD1;               LOOP - WITH 1 BREAK
11FD 05           DCR  B                  B = NIBCNT = NIBCNT-1
11FE FA 0F 12     JM   NVMRD2             IF NIBCNT .LT. 0
                        ;                   BREAK
                        ;                 ENDIF
                        ;                 COPY NVM TO RAM
1201 7E           MOV  A,M                A = NVMRED[J]
1202 CD EE 0F     CALL PUTNIB             PUTNIB(RAM[I],NVMRED[J])
                        ;                     ( @C    , A      )
                        ;                     ( 0     , I      )
                        ;                 UPDATE CRC
1205 CD C6 0E     CALL CRCNIB             CRCNIB(NVMRED[J],CRCVAL)
                        ;                     ( A        , D    )
                        ;                     ( I        , I/0  )
1208 0C           INR  C                  C = OFFSET, RAM[I=I+1]
                        ;                 CALCULATE NEXT NVM SOURCE ADDRESS
1209 CD BB 11     CALL NVMNXT             NVMNXT(ADRESS,NVMRED[J=J+?])
                        ;                     ( HL    , @HL          )
                        ;                     ( I/0   , -            )
120C C3 FD 11     JMP  NVMRD1
                  NVMRD2;               ENDDO
                        ;               CHECK CRC VALUES
120F CD 58 10     CALL NVMBYT           NVMBYT(ADRESS,NVMRED[J],NVMCRC)
                        ;                     ( HL    , @HL     , A    )
                        ;                     ( I/0   , I       , 0    )
1212 BA           CMP  D                IF NVMCRC .NE. CRCVAL
1213 C8           RZ
                        ;                 DECLARE DEAD METER. BAD CRC
1214 3E 00        MVI  A,BADCRC           A = BADCRC
1216 C3 85 10     JMP  NVMDED             NVMDED(BADCRC,ERRFLG)
                        ;                     ( A    ,PSW:Z )
                        ;                     ( I    , 0    )
                        ;               ENDIF
                        ;               RETURN
                  ;NVMSTO(ERRFLG)(MRSTS1,MRSTS2,NVMCTL)
                  ;      ( BIT   )(BITSTR,BITSTR,NIBSTR)
                  ;      (  0    )( I/0  , I/0  , 0    )
                  ;      (PSW:Z  )( RAM  , RAM  , RAM  )
                  ;      (  C    )( C    , C    , C    )
                  ;
                  ;A,PSW DESTROYED
                  ;REGISTERS DESTROYED
                  ;
                  ;STARTING WITH NO NVM BLOCKS OPEN:
                  ;WRITE NEW ACTIVE NVM BLOCK NOT CORRESPONDING TO CURRENT
                  ;METER MODE.
                  ;OPEN AN ERASED BLOCK CORRESPONDING TO CURRENT METER MODE.
                  ;
                  NVMSTO;               ****ENTRY POINT
1219 CD 4E 0F     CALL LSTATE           LSTATE(FATMOD,NORMOD,SERMOD,PRVMOD)
                  ;                       (PSW:S ,PSW:Z ,PSW:P ,PSW:C )
                  ;                       ( 0    , 0    , 0    , 0    )
121C F2 21 12     JP   NVMST1           IF FATMOD .EQ. TRUE
```

```
121F AF          XRA  A              ERRFLG = PSW:Z = TRUE
1220 C9          RET
               NVMST1;             ELSE
               ;                     ERASE BLOCK FOR UNTOGGLED NORMOD
1221 CD B1 10    CALL NVMER            NVMER(ERRFLG)
               ;                          (PSW:Z )
               ;                          ( 0    )
               ;                     IF ERRFLG .EQ. TRUE
1224 CA B6 01    JZ   PWRDN            REINITIALIZE METER
               ;                     ELSE
               ;                       SET TO TOGGLE NORMOD INDIRECTLY BY
               ;                       TOGGLING THE SERVICE OR PRIVILEGED
               ;                       MODE FLAGS
1227 21 24 74    LXI  H,MRSTS1/2+X     HL=ADDRESS,MRSTS?=ADDRESS,MRSTS1
122A 1E 08       MVI  E,08H            E.M = E.SERMOD = TRUE
122C EA 32 12    JPE  NVMST2           IF LSTATE(SERMOD) .EQ. FALSE
122F 23          INX  H                  HL=ADDRESS,MRSTS?=ADDRESS,MRSTS2
1230 1E 01       MVI  E,01H              E.M = E.PRVMOD = TRUE
               NVMST2;                 ENDIF
               ;                       TOGGLE NORMOD
1232 7B          MOV  A,E              MRSTS?.M = MRSTS?.M .XOR. E.M
1233 AE          XRA  M
1234 77          MOV  M,A
1235 E5          PUSH H                SAVE HL
1236 D5          PUSH D                SAVE DE
               ;                       ERASE BLOCK FOR TOGGLED NORMOD
1237 CD B1 10    CALL NVMER            NVMER(ERRFLG)
               ;                            (PSW:Z )
               ;                            ( 0    )
               ;                       IF ERRFLG .EQ. TRUE
123A CA B6 01    JZ   PWRDN              REINITIALIZE METER
               ;                       ELSE
123D F3          DI                      DISABLE INTERRUPTS
               ;                         SET TO STORE BLK FOR TOG NORMOD
123E CD 9F 11    CALL NVMNBK             NVMNBK(ERRFLG,OLD,NXT,ADR,NVMCTL)
               ;                               (PSW:Z , B , C , HL, @HL  )
               ;                               ( 0    , 0 , 0 , 0 , -    )
               ;                         IF ERRFLG .EQ. TRUE
1241 CA B6 01    JZ   PWRDN                REINITIALIZE METER
               ;                         ELSE
1244 CD 47 10    CALL NVM30T               TURN ON -30 V TO NVM
1247 E5          PUSH H                    SAVE HL
               ;                           DEACTIVATE BLK FOR TOG NORMOD
1248 CD A9 10    CALL NVMDXB               NVMDXB(ERRFLG,OLD)
               ;                                  (PSW:Z , B )
               ;                                  ( 0    , I )
               ;                           OPEN BLK FOR TOG NORMOD
124B E1          POP  H                    RESTORE HL
124C 71          MOV  M,C                  NVMCTL = NXT
               ;                           STORE BLK FOR TOGLED NORMOD
124D CD 9E 12    CALL NVMWR                NVMWR(ERRFLG)
               ;                                 (PSW:Z )
               ;                                 ( 0    )
               ;                           RETURN TO UNTOGGLED NORMOD
1250 D1          POP  D                    RESTORE DE
1251 E1          POP  H                    RESTORE HL
1252 7B          MOV  A,E                  MRSTS?.M =
1253 AE          XRA  M                          MRSTS?.M .XOR. E.M
1254 77          MOV  M,A
               ;                           GET CONTROL BYTES
1255 CD 9F 11    CALL NVMNBK               NVMNBK(ERRFLG,OLD,NXT,
               ;                                  (PSW:Z , B , C ,
               ;                                  ( 0    , 0 , 0 ,
               ;
               ;                                  ADRESS,NVMCTL)
               ;                                   HL    , @HL  )
               ;                                   0     , -    )
```

```
                   ;                        OPEN ERASED BLOCK
1258 71              MOV  M,C               NVMCTL = NXT
1259 CD 47 10        CALL NVM30T            TURN ON -30 V TO NVM
                   ;                        DEACTIVATE OLD BLOCK
125C CD A9 10        CALL NVMDXB            NVMDXB(ERRFLG,OLD)
                   ;                              (PSW:Z , B )
                   ;                              ( 0    , I )
125F FB              EI                     ENABLE INTERRUPTS
1260 C9              RET
                   ;                      ENDIF
                   ;                    ENDIF
                   ;                  ENDIF
                   ;                ENDIF
                   ;                RETURN
                   ;NVMWN(DATA  ,BASE  ,ERRFLG)(NVMRED,NVMWRT)
                   ;    (NIBBLE,ADRESS,BIT   )(NIBSTR,NIBSTR)
                   ;    ( I    , I     , 0    )( I     , 0     )
                   ;    ( A[1] , HL    ,PSW:Z )( NVM   , NVM   )
                   ;    ( C    , NC    , C    )( NC    , C     )
                   ;
                   ;A,PSW DESTROYED
                   ;REGISTERS NOT CHANGED
                   ;
                   ;WRITE NIBBLE TO NONVOLATILE MEMORY
                   ;
                   NVMWN;               ****ENTRY POINT
1261 C5              PUSH B             SAVE REGISTERS
1262 D5              PUSH D
1263 E5              PUSH H
1264 E5              PUSH H
1265 01 00 46        LXI  B,NVMWRT      DE = ADDRESS, NVMWRT[BASE]
1268 09              DAD  B
1269 EB              XCHG
126A E1              POP  H             HL = ADDRESS, NVMRED[BASE]
126B 01 00 44        LXI  B,NVMRED
126E 09              DAD  B
126F F5              PUSH PSW           SAVE A,PSW
                   ;                    START WRITING DATA
1270 12              STAX D             NVMWRT[BASE] = DATA
                   ;                    DELAY FOR 1 MSEC
1271 01 0A 00        LXI  B,10          BC = LOOPCT = 10
                   NVMWN1;              DO UNTIL LOOPCT .EQ. 0
1274 CD 19 0B        CALL NPAUSE          NPAUSE(LOOPCT,ZROFLG)
                   ;                             ( BC   ,PSW:Z )
                   ;                             ( I/O  , 0     )
1277 C2 74 12        JNZ NVMWN1
                   ;                    ENDDO
                   ;                    STOP WRITE FUNCTION
127A 7E              MOV  A,M           A = GARBAGE = NVMRED[BASE]
127B C1              POP  B             B = DATA
                   ;                    C = GARBAGE
127C 7E              MOV  A,M           A = SAVDAT = NVMRED[BASE]
127D 90              SUB  B             A = TEST = (SAVDAT-DATA) .AND. HEXOF
127E E6 0F           ANI  0FH
1280 C2 87 12        JNZ  NVMWN2         IF TEST .EQ. 0
                   ;                       SAVDAT .EQ. DATA
1283 3C              INR  A                PSW:Z = ERRFLG = FALSE
1284 C3 9A 12        JMP NVMWN4
                   NVMWN2;               ELSE
                   ;                       SAVDAT .NE. DATA
1287 01 9A 12        LXI  B,NVMWN3         SET TO RETURN TO ENDIF
128A C5              PUSH B
128B 01 42 B9        LXI  B,-(NVMRED+KILCOD)
                   ;                       BC = -(ADDRESS, NVMRED[KILCOD])
128E 09              DAD  B                HL = BASE-KILCOD
128F 7C              MOV  A,H              PSW:Z = (BASE-KILCOD).EQ.0
1290 B5              ORA  L
```

```
1291 3E 01       MVI  A,NVMBAD         A = NVMBAD
1293 47          MOV  B,A              B = NVMBAD
                ;                      IF (BASE-KILCOD).EQ.0
                ;                        DECLARE DEAD METER. BAD NVM
                ;                        DO NOT WRITE NVMBAD INTO NVM
1294 CA 99 10    JZ   NVMDE1             NVMDE1(NVMBAD,ERRFLG)
                ;                               ( B    ,PSW:Z )
                ;                               ( I    , 0    )
                ;                      ELSE
                ;                        DECLARE DEAD METER. BAD NVM
                ;                        WRITE NVMBAD INTO NVM
1297 C2 85 10    JNZ  NVMDED             NVMDED(NVMBAD,ERRFLG)
                ;                               ( A    ,PSW:Z )
                ;                               ( I    , 0    )
                NVMWN3;                ENDIF
                NVMWN4;              ENDIF
129A E1          POP  H              RESTORE REGISTERS
129B D1          POP  D
129C C1          POP  B
129D C9          RET
                ;NVMWR(ERRFLG)(NVMCTL,RAM[I],SERFLG)
                ;     (BIT   )(NIBSTR,NIBSTR,BITSTR)
                ;     ( 0    )( I/O  , I    , I    )
                ;     (PSW:Z )( RAM  , RAM  , RAM  )
                ;     ( C    )( C    , NC   , NC   )
                ;
                ;A,PSW DESTROYED
                ;REGISTERS DESTROYED
                ;
                ;WRITE BLOCK FROM RAM TO NONVOLATILE MEMORY
                ;
                NVMWR;               ****ENTRY POINT
                ;                    FETCH RAM SOURCE PARAMETERS
129E CD DF 11    CALL NVMPRP         NVMPRP(NIBCNT,OFFSET,RAM[I])
                ;                          ( B    , C     , @C    )
                ;                          ( 0    , 0     , -     )
12A1 79          MOV  A,C            C = NIBCNT
12A2 48          MOV  C,B
12A3 47          MOV  B,A            B = OFFSET, RAM[I]
                ;                    INITIALIZE CRC VALUE
12A4 16 FF       MVI  D,0FFH         D = CRCVAL = HEXFF
12A6 3A 33 74    LDA NVMCTL/2+X      A = NVMCTL
12A9 FE 20       CPI  20H            IF NVMCTL[0] .LT. 2
12AB D2 E6 12    JNC  NVMWR3
12AE CD 47 10    CALL NVM30T           TURN ON -30 V TO NVM
                ;                      FETCH NVM DESTINATION BASE
12B1 CD 91 11    CALL NVMMAP           NVMMAP(NVMCTL,BASE,BLKTYP)
                ;                             ( A    , HL , A[1] )
                ;                             ( I    , 0  , 0    )
                ;                      STORE BLOCK TYPE IN NVM HEADER
12B4 23          INX  H                HL = BASE +1
12B5 CD 61 12    CALL NVMWN            NVMWN(BLKTYP,BASE+1,ERRFLG)
                ;                            ( A[1] , HL    ,PSW:Z )
                ;                            ( I    , I     , 0    )
                ;                      POINT AT START OF DATA IN NVM
12B8 23          INX  H                HL = BASE+2
                NVMWR1;                LOOP - WITH 1 BREAK
12B9 0D          DCR  C                  C = NIBCNT = NIBCNT-1
12BA FA CD 12    JM   NVMWR2             IF NIBCNT .LT. 0
                ;                          BREAK
                ;                        ENDIF
                ;                        FETCH DATA FROM RAM
12BD CD 35 0F    CALL GETNIB             GETNIB(DATA ,ZROFLG,RAM[I])
                ;                               ( A[1],PSW:Z , @B    )
                ;                               ( 0   , 0    , I     )
                ;                        UPDATE CRC VALUE
12C0 CD C6 0E    CALL CRCNIB             CRCNIB(DATA ,CRCVAL)
```

```
                ;                        ( A[1], D      )
                ;                        ( I    , 0     )
                ;                      WRITE DATA TO NVM
12C3 CD 61 12     CALL NVMWN           NVMWN(DATA ,BASE+?,ERRFLG)
                ;                        ( A[1], HL    ,PSW:Z )
                ;                        ( I    , I    , 0     )
                ;                      POINT AT NEXT DATA LOCATIONS
12C6 04           INR  B               B = OFFSET, RAM[I=I+1]
12C7 CD BB 11     CALL NVMNXT          NVMNXT(ADRESS,BASE+?)
                ;                        ( HL    , @HL  )
                ;                        ( I/O   , -    )
12CA C3 B9 12     JMP NVMWR1
                NVMWR2;                ENDDO
                ;                      STORE CRC IN NVM
12CD 7A           MOV  A,D             A[1] = CRCVAL[0]
12CE 0F           RRC
12CF 0F           RRC
12D0 0F           RRC
12D1 0F           RRC
12D2 CD 61 12     CALL NVMWN           NVMWN(CRCVAL[0],BASE+?,ERRFLG)
                ;                        ( A[1]      , HL    ,PSW:Z )
                ;                        ( I         , I     , 0     )
12D5 CD BB 11     CALL NVMNXT          NVMNXT(ADRESS,BASE+?)
                ;                        ( HL    , @HL  )
                ;                        ( I/O   , -    )
12D8 7A           MOV  A,D             A[1] = CRCVAL[1]
12D9 CD 61 12     CALL NVMWN           NVMWN(CRCVAL[1],BASE+?,ERRFLG)
                ;                        ( A[1]      , HL    ,PSW:Z )
                ;                        ( I         , I     , 0     )
                ;                      INDICATE BLOCK NOT OPEN
12DC 21 33 74     LXI  H,NVMCTL/2+X    HL = ADDRESS, NVMCTL
12DF 3E F0        MVI  A,0F0H          NVMCTL[0] = HEX0F
12E1 B6           ORA  M
12E2 77           MOV  M,A
12E3 CD 31 10     CALL NVM30F          TURN OFF -30V TO NVM
                NVMWR3;                ENDIF
12E6 3A 10 74     LDA  SERFLG/2+X      IF SERFLG.DEAD .EQ. TRUE
12E9 E6 80        ANI  80H               PSW:Z = ERRFLG = TRUE
12EB EE 80        XRI  80H
                ;                      ELSE
                ;                        PSW:Z = ERRFLG = FALSE
                ;                      ENDIF
12ED C9           RET                  RETURN
                ;ACCODE(ERRFLG)(WORK1 ,DSCREG,RSTCNT,SERFLG)
                ;      (BIT   )(NIBCTR,NIBSTR,NIBBLE,BITSTR)
                ;      ( 0    )( 0    , I    , I    , I     )
                ;      (PSW:Z )( RAM  , RAM  , RAM  , RAM   )
                ;      ( C    )( C    , NC   , NC   , NC    )
                ;
                ;A,PSW DESTROYED
                ;REGISTERS DESTROYED
                ;
                ;BUILD ACCESS CODE MESSAGE IN TRANSMIT BUFFER
                ;
                ACCODE;                ****ENTRY POINT
                ;                      CLEAR WORK AREA
12EE 3E C0        MVI  A,WORK1         A = OFFSET, WORK1
12F0 CD 85 0E     CALL CLRBLK          CLRBLK(WORK1)
                ;                        ( @A  )
                ;                        ( 0   )
                ;                      PUT 10 DGT CONTROL SUM IN WORK1[0..9]
12F3 CD 3A 06     CALL CONSUM          CONSUM(ERRFLG)
                ;                        (PSW:Z )
                ;                        ( 0    )
                ;                      IF ERRFLG .EQ. TRUE
                ;                        PROCESS ERROR
12F6 CA A1 0B     JZ   PROERR            PROERR(ERRFLG)
```

```
                        ;               (PSW:Z )
                        ;               ( 0    )
                        ;          ELSE
                        ;            MOVE CONTROL SUM TO WORK1[6..15]
12F9 01 C6 C0   LXI  B,(WORK1+0)*100H+(WORK1+6)
                        ;            B = OFFSET, WORK1[0]
                        ;            C = OFFSET, WORK1[6]
12FC 3E 0A      MVI  A,10            A = NIBCNT = 10
12FE CD B3 0F   CALL MVLNIB          MVLNIB(WORK1[6],WORK1[0],NIBCNT,
                        ;                   ( @C     , @B     , A    ,
                        ;                   ( 0      , I      , I    ,
                        ;
                        ;                   NONBCD,ZROFLG)
                        ;                   PSW:S ,PSW:Z )
                        ;                    0    , 0    )
                        ;            PUT DESC REGISTER IN WORK1[0..4]
1301 01 C0 2F   LXI  B,DSCREG*100H+WORK1
                        ;            B = OFFSET, DSCREG[0]
                        ;            C = OFFSET, WORK1[0]
1304 3E 05      MVI  A,5             A = NIBCNT = 5
1306 CD B3 0F   CALL MVLNIB          MVLNIB(WORK1[0],DSCREG[0],NIBCNT,
                        ;                   ( @C     , @B      , A    ,
                        ;                   ( 0      , I       , I    ,
                        ;
                        ;                   NONBCD,ZROFLG)
                        ;                   PSW:S ,PSW:Z )
                        ;                    0    , 0    )
                        ;            PARSE RSTCNT INTO RESET NUMBER AND
                        ;            RESET BIT
1309 01 C5 12   LXI  B,RSTCNT*100H+(WORK1+5)
                        ;            B = OFFSET, RSTCNT
                        ;            C = OFFSET, WORK1[5]
130C CD 35 0F   CALL GETNIB          GETNIB(RSTCNT,ZROFLG,RSTCNT)
                        ;                   ( A    ,PSW:Z , @B    )
                        ;                   ( 0    , 0    , I     )
130F 0F         RRC
1310 57         MOV  D,A             D[1] = RSTCNT/2
                        ;            D[0].0 = RSTBIT = RSTCNT .MOD. 2
1311 07         RLC                  A = RSTBIT
1312 E6 01      ANI 01H
                        ;            PUT RSTBIT INTO WORK1[5]
1314 CD EE 0F   CALL PUTNIB          PUTNIB(WORK1[5],RSTBIT)
                        ;                   ( @C     , A    )
                        ;                   ( 0      , I    )
                        ;            EXTRACT RESET NUMBER FROM RIGHTMOST
                        ;            DIGIT OF WORK1[0..4] WHICH WILL NOT
                        ;            BE TRANSFORMED INTO A NON BCD DIGIT.
1317 0D         DCR  C               C = OFFSET, WORK1[I=4]
1318 41         MOV  B,C             B = OFFSET, WORK1[I=4]
1319 1E 05      MVI  E,5             E = NIBCNT = 5
              ACCOD1;                DO UNTIL NIBCNT .EQ. 0; WITH 1 BREAK
131B CD 35 0F   CALL GETNIB            GETNIB(BCDDGT,ZROFLG,WORK1[I])
                        ;                     ( A    ,PSW:Z , @B     )
                        ;                     ( 0    , 0    , I      )
131E FE 08      CPI  8                 IF BCDDGT .LT. 8
1320 D2 2A 13   JNC  ACCOD2
1323 AA         XRA  D                   BCDDGT = BCDDGT .XOR. RSTNO
1324 CD EE 0F   CALL PUTNIB              PUTNIB(WORK1[I],BCDDGT)
                        ;                       ( @C     , A    )
                        ;                       ( 0      , I    )
1327 C3 30 13   JMP  ACCOD3              BREAK
              ACCOD2;                  ENDIF
132A 05         DCR  B                 B = OFFSET, WORK1[I=I-1]
132B 0D         DCR  C                 C = OFFSET, WORK1[I=I-1]
132C 1D         DCR  E                 E = NIBCNT = NIBCNT-1
132D C2 1B 13   JNZ  ACCOD1
              ACCOD3;                ENDDO
```

```
                     ;                     CALCULATE CRC OF WORK AREA
1330 01 C0 10         LXI  B,16*100H+WORK1
                     ;                     B = NIBCNT = 16
                     ;                     C = OFFSET, WORK1[0]
1333 CD B1 0E         CALL CRC             CRC(WORK1[0],NIBCNT,CRCVAL)
                     ;                       ( @C     , B     , D     )
                     ;                       ( I      , I     , O     )
1336 3A 10 74         LDA  SERFLG/2+X      PSW:Z=NVMOK=SERFLG.WEKNVM .EQ. FALSE
1339 E6 20            ANI  20H
133B 7A               MOV  A,D             A = CRCVAL
133C CA 40 13         JZ   ACCOD4          IF NVMOK .EQ. FALSE
133F 2F               CMA                    A = CRCVAL = .NOT. CRCVAL
                     ACCOD4;               ENDIF
                     ;                     COMPLETE ACCESS CODE IN WORK[0..7]
                     ;                     AS FOLLOWS:
                     ;                     WORK1[4].0..3 = WORK1[4].0..3
                     ;                     WORK1[5].1..2 = WORK1[5].1..2 .OR.
                     ;                                     CRCVAL.0..1
                     ;                     WORK1[6].0 = 0
                     ;                     WORK1[6].1..3 = CRCVAL.2..4
                     ;                     WORK1[7].0 = 0
                     ;                     WORK1[7].1..3 = CRCVAL.5..7
1340 57               MOV  D,A             D = CRCVAL
1341 E6 F8            ANI  0F8H            D = FCRC2
1343 82               ADD  D
1344 57               MOV  D,A
1345 17               RAL                  A = FCRC1
1346 17               RAL
1347 17               RAL
1348 E6 06            ANI  6
134A 21 62 74         LXI  H,(WORK1+4)/2+X HL = ADDRESS, WORK1[4..5]
134D B6               ORA  M               WORK1[4..5] = WORK1[4..5] .OR. FCRC1
134E 77               MOV  M,A
134F 7A               MOV  A,D             A = FCRC3 = FCRC2 .AND. HEX77
1350 E6 77            ANI  77H
1352 23               INX  H               HL = ADDRESS, WORK1[6..7]
1353 77               MOV  M,A             WORK1[6..7] = FCRC3
                     ;                     BUILD ACCESS CODE MSG IN XMIT BUFFER
1354 11 5A 13         LXI  D,ACCOD5        DE = ADDRESS, ACCOD5
1357 C3 5B 0D         JMP  VALREQ          VALREQ(WORK1 ,ACCFMT,HACODE,ERRFLG)
                     ;                           (@@DE+0,@DE+1 ,@DE+2 ,PSW:Z )
                     ;                           ( I    , I    , I    , O    )
                     ;                   ENDIF
                     ;                   RETURN
                     ACCOD5;             ARGUEMENTS FOR VALREQ
135A C0 8F 90         DB   WORK1,ACCFMT,HACODE
                     ;BINOCT(BINARY,OCTAL ,DIGCNT)
                     ;      (BITSTR,NIBSTR,BYTE  )
                     ;      ( I    , O    , I    )
                     ;      ( @H   , @D   , B    )
                     ;      ( NC   , C    , C    )
                     ;
                     ;A,PSW DESTROYED
                     ;REGISTERS DESTROYED
                     ;
                     ;INSERT BITS FROM BIT STRING 3 AT A TIME INTO A PREVIOUSLY
                     ;CLEARED NIBBLE STRING.
                     ;DIGCNT ASSUMED .NE. 0.
                     ;
                     BINOCT;             ****ENTRY POINT
135D 78               MOV  A,B           E = DBIT = DIGCNT*4-1
135E 07               RLC
135F 07               RLC
1360 3D               DCR  A
1361 5F               MOV  E,A
1362 90               SUB  B             L = SBIT = DBIT-DIGCNT
1363 6F               MOV  L,A
```

```
                BINOC1;                DO UNTIL DBIT .LT. 0
                ;                        SET TO MOVE 3 BITS INTO OCTAL NIBBLE
1364 0E 03       MVI  C,3                C = BITCNT = 3
                BINOC2;                  DO UNTIL BITCNT .EQ. 0
                ;                          MOVE 3 L/O BITS INTO NIBBLE
1366 CD 69 0F    CALL MOVBIT               MOVBIT(BINARY,SBIT,OCTAL,DBIT,ZRO)
                ;                                ( @H   , L  , @D  , E  ,P:Z)
                ;                                ( I    , I  , O   , I  , O )
1369 2D          DCR  L                   L = SBIT = SBIT-1
136A 1D          DCR  E                   E = DBIT = DBIT-1
136B 0D          DCR  C                   C = BITCNT = BITCNT-1
136C C2 66 13    JNZ  BINOC2
                ;                        ENDDO
                ;                        SKIP OVER H/O BIT IN NIBBLE
136F 1D          DCR  E                   E = DBIT = DBIT-1
1370 F2 64 13    JP   BINOC1
                ;                      ENDDO
1373 C9          RET                   RETURN
                ;VRCDR(ERRFLG)(DSCREG,DSCCRC)
                ;     (BIT   )(NIBSTR,BYTE  )
                ;     ( O    )( O     , O   )
                ;     (PSW:Z )( RAM   , RAM )
                ;     ( C    )( C     , C   )
                ;
                ;A,PSW DESTROYED
                ;REGISTERS DESTROYED
                ;
                ;CLEAR VARIABLE RMRS DESCENDING REGISTER
                ;
                VRCDR;                 ****ENTRY POINT
                ;                      PERFORM RULE CHECKING AND REFORMATTING
1374 CD 03 14    CALL VRPREP           VRPREP(ERRFLG)
                ;                            (PSW:Z )
                ;                            ( O    )
1377 C8          RZ                    IF ERRFLG .EQ. FALSE
                ;                        CLEAR DESCENDING REGISTER
1378 AF          XRA  A                  A = NIBVAL = 0
1379 06 07       MVI  B,DSCSIZ           B = DSCSIZ
137B 0E 2F       MVI  C,DSCREG           C = OFFSET, DSCREG
137D CD 24 0F    CALL FILNIB             FILNIB(DSCREG,NIBVAL,DSCSIZ)
                ;                               ( @C    , A     , B    )
                ;                               ( O     , I     , I    )
                ;                        UPDATE DESCENDING REGISTER CRC
1380 CD B1 0E    CALL CRC                CRC(DSCREG,DSCSIZ,CRCVAL)
                ;                            ( @C    , B     , D    )
                ;                            ( I     , I     , O    )
1383 7A          MOV  A,D                DSCCRC = CRCVAL
1384 32 1B 74    STA  DSCCRC/2+X
                ;                        CHECK METER STATUS
1387 CD 4E 0F    CALL LSTATE             LSTATE(FATMOD,NORMOD,SERMOD,PRVMOD)
                ;                               (PSW:S ,PSW:Z ,PSW:P ,PSW:C )
                ;                               ( O    , O    , O    , O    )
                ;                        IF FATMOD .EQ. FALSE
                ;                          EXECUTE RESET
138A F2 03 14    JP   VRXEQ                VRXEQ(ERRFLG)
                ;                                (PSW:Z )
                ;                                ( O    )
                ;                        ELSE
                ;                          DECLARE DEAD METER. FATAL RESET
138D 3E 03       MVI  A,FATRST             A = FATRST
138F C3 85 10    JMP  NVMDED               NVMDED(FATRST,ERRFLG)
                ;                                 ( A    ,PSW:Z )
                ;                                 ( I    , O    )
                ;                        ENDIF
                ;                      ENDIF
                ;                      RETURN
```

```
                ;VRCLR(ERRFLG)(AMTBUF)
                ;     (BIT   )(NIBSTR)
                ;     ( 0    )( I    )
                ;     (PSW:Z )( RAM  )
                ;     ( C    )( NC   )
                ;
                ;A,PSW DESTROYED
                ;REGISTERS DESTROYED
                ;
                ;SELECT VARIABLE RMRS CLEAR REGISTER FUNCTION
                ;
                VRCLR;                  ****ENTRY POINT
                ;                       SELECT FUNCTION VIA AMOUNT FORMAT
1392 21 70 74    LXI  H,AMTBUF/2+X      HL = ADDRESS, AMTBUF[0..1]
1395 7E          MOV  A,M               A = AMTBUF[0..1]
                ;                       CASE (AMTBUF[0..1])
1396 FE 1F       CPI  1FH                 **1F: CLEAR RESET ERROR COUNTER
1398 CA A3 13    JZ   VRCREC                    VRCREC(ERRFLG,ADRESS,AMTBUF)
                ;                                     (PSW:Z , HL    , @HL   )
                ;                                     ( 0    , I     , -     )
139B FE 22       CPI  22H                 **22: CLEAR DESCENDING REGISTER
139D CA 74 13    JZ   VRCDR                     VRCDR(ERRFLG)
                ;                                    (PSW:Z )
                ;                                    ( 0    )
                ;                         **ELSE:
                ;                               PROCESS ERROR
13A0 C3 A1 0B    JMP  PROERR                    PROERR(ERRFLG)
                ;                                     (PSW:Z )
                ;                                     ( 0    )
                ;                       ENDCASE
                ;                       RETURN
                ;VRCREC(ERRFLG,ADRESS,AMTBUF)(AMTBUF)
                ;      (BIT   ,ADRESS,NIBSTR)(NIBSTR)
                ;      ( 0    , I    , -    )( 0    )
                ;      (PSW:Z , HL   , @HL  )( RAM  )
                ;      ( C    , C    , -    )( C    )
                ;
                ;A,PSW DESTROYED
                ;REGISTERS DESTROYED
                ;
                ;CLEAR VARIABLE RMRS RESET ERROR COUNTER
                ;
                VRCREC;                 ****ENTRY POINT
                ;                       CHECK AMOUNT BUFFER
13A3 23          INX  H                 HL = ADDRESS, AMTBUF[2..3]
13A4 7E          MOV  A,M               IF AMTBUF[2..3] .EQ. HEX00
13A5 B7          ORA  A
                ;                         DON'T CLEAR DES REG BY MISTAKE
13A6 CA A1 0B    JZ   PROERR              PROERR(ERRFLG)
                ;                               (PSW:Z )
                ;                               ( 0    )
                ;                       ELSE
                ;                         CHECK METER STATUS
13A9 CD 4E 0F    CALL LSTATE              LSTATE(FATMOD,NORMOD,SERMOD,PRVMOD)
                ;                               (PSW:S ,PSW:Z ,PSW:P ,PSW:C )
                ;                               ( 0    , 0    , 0    , 0    )
                ;                         IF FATMOD .EQ. TRUE
                ;                           PROCESS ERROR
13AC FA A1 0B    JM   PROERR                PROERR(ERRFLG)
                ;                                 (PSW:Z )
                ;                                 ( 0    )
                ;                         ELSE
                ;                           ALTER AMOUNT FORMAT
13AF 3A 35 74    LDA  DIEDCM/2+X            A = DIEDCM
13B2 0E E1       MVI  C,AMTBUF+1            C = OFFSET, AMTBUF[1]
13B4 CD EE 0F    CALL PUTNIB                PUTNIB(AMTBUF[1],DIEDCM)
                ;                                 ( @C       , A     )
```

```
                      ;                      ( 0        , I     )
                      ;                      PERFORM RULE CHECK AND REFORMATTING
1387 CD 03 14           CALL VRPRE1          VRPRE1(ERRFLG)
                      ;                            (PSW:Z )
                      ;                            ( 0    )
                      ;                      IF ERRFLG .EQ. FALSE
                      ;                        EXECUTE RESET
13BA C2 03 14           JNZ  VRXEQ             VRXEQ(ERRFLG)
                      ;                              (PSW:Z )
                      ;                              ( 0    )
                      ;                      ENDIF
                      ;                    ENDIF
                      ;                  ENDIF
13BD C9                 RET              RETURN
                      ;VRMRS(ERRFLG)(CMBBUF)
                      ;     (BIT   )(NIBSTR)
                      ;     ( 0    )( I    )
                      ;     (PSW:Z )( RAM  )
                      ;     ( C    )( NC   )
                      ;
                      ;A,PSW DESTROYED
                      ;REGISTERS DESTROYED
                      ;
                      ;SELECT VARIABLE RMRS FUNCTION
                      ;
                      VRMRS;                 ****ENTRY POINT
                      ;                      SELECT FUNCTION VIA COMBINATION FORMAT
13BE 3A 78 74           LDA  CMBBUF/2+X      A = CMBBUF[0..1]
                      ;                      CASE (CMBBUF[0..1])
13C1 FE 4F              CPI  4FH               **4F: CLEAR REGISTERS
13C3 CA 92 13           JZ   VRCLR                   VRCLR(ERRFLG)
                      ;                                    (PSW:Z )
                      ;                                    ( 0    )
13C6 FE 6F              CPI  6FH               **6F: RESET POSTAGE
13C8 CA CE 13           JZ   VRSET                   VRSET(ERRFLG)
                      ;                                    (PSW:Z )
                      ;                                    ( 0    )
                      ;                        **ELSE:
                      ;                              PROCESS ERROR
13CB C3 A1 0B           JMP  PROERR                  PROERR(ERRFLG)
                      ;                                     (PSW:Z )
                      ;                                     ( 0    )
                      ;                      ENDCASE
                      ;                      RETURN
                      ;VRSET(ERRFLG)(AMTBUF,DSCREG,DSCCRC)
                      ;     (BIT   )(NIBSTR,NIBSTR,BYTE  )
                      ;     ( 0    )( I    , 0    , 0    )
                      ;     (PSW:Z )( RAM  , RAM  , RAM  )
                      ;     ( C    )( NC   , C    , C    )
                      ;
                      ;A,PSW DESTROYED
                      ;REGISTERS DESTROYED
                      ;
                      ;RESET VARIABLE RMRS DESCENDING REGISTER
                      ;
                      VRSET;                 ****ENTRY POINT
                      ;                      CHECK METER STATUS
13CE CD 4E 0F           CALL LSTATE          LSTATE(FATMOD,NORMOD,SERMOD,PRVMOD)
                      ;                            (PSW:S ,PSW:Z ,PSW:P ,PSW:C )
                      ;                            ( 0    , 0    , 0    , 0    )
                      ;                      IF NORMOD .EQ. FALSE
                      ;                        PROCESS ERROR
13D1 C2 A1 0B           JNZ  PROERR            PROERR(ERRFLG)
                      ;                              (PSW:Z )
                      ;                              ( 0    )
                      ;                      ELSE
                      ;                        CHECK AMOUNT FORMAT
```

```
13D4 3A 70 74   LDA  AMTBUF/2+X       IF AMTBUF[1] .EQ. HEXOF
13D7 E6 0F      ANI  0FH
13D9 FE 0F      CPI  0FH
               ;                        PROCESS ERROR. NO DECIMAL ENTERED
13DB CA A1 0B   JZ   PROERR             PROERR(ERRFLG)
               ;                               (PSW:Z )
               ;                               ( 0    )
               ;                      ELSE
               ;                        PERFORM RULE CHECK AND REFORMATTING
13DE CD 03 14   CALL VRPREP             VRPREP(ERRFLG)
               ;                               (PSW:Z )
               ;                               ( 0    )
13E1 C8         RZ                      IF ERRFLG .EQ. FALSE
               ;                          CALC NEW DESC REGISTER VALUE
13E2 0E E7      MVI  C,AMTBUF+8-1         C = OFFSET, AMTBUF[7]
13E4 06 35      MVI  B,DSCREG+DSCSIZ-1    B = OFFSET, DSCREG[I=DSCSIZ-1]
13E6 11 07 07   LXI  D,DSCSIZ*100H+DSCSIZ
               ;                          D = DSCSIZ
               ;                          E = DSCSIZ
13E9 CD F8 06   CALL DECADD               DECADD(AMTBUF[7],DSCREG[I],
               ;                                 ( @C      , @B      ,
               ;                                 ( I/O     , I       ;
               ;
               ;                                 DSCSIZ,DSCSIZ,OVRFLO)
               ;                                  D    , E    ,PSW:C )
               ;                                  I    , I    , 0    )
               ;                          IF OVRFLO .EQ. TRUE
               ;                            PROCESS ERROR. OVERFLOW
13EC DA A1 0B   JC   PROERR                 PROERR(ERRFLG)
               ;                                   (PSW:Z )
               ;                                   ( 0    )
               ;                          ELSE
               ;                            UPDATE DESCENDING REGISTER
13EF 0E 2F      MVI  C,DSCREG               C = OFFSET, DSCREG
13F1 06 E1      MVI  B,AMTBUF+8-DSCSIZ      B = OFFSET, AMTBUF[I=8-DSCSIZ]
13F3 3E 07      MVI  A,DSCSIZ               A = DSCSIZ
13F5 CD B3 0F   CALL MVLNIB                 MVLNIB(DSCREG,AMTBUF[I],DSCSIZ,
               ;                                   ( @C   , @B      , A    ,
               ;                                   ( 0    , I       , I    ,
               ;
               ;                                   NONBCD,NONZRO)
               ;                                   PSW:S ,PSW:Z )
               ;                                    0    , 0    )
               ;                            UPDATE DESC REGISTER CRC
13F8 47         MOV  B,A                    B = DSCSIZ
13F9 CD B1 0E   CALL CRC                    CRC(DSCREG,DSCSIZ,CRCVAL)
               ;                               ( @C    , B     , D     )
               ;                               ( I     , I     , 0     )
13FC 7A         MOV  A,D                    DSCCRC = CRCVAL
13FD 32 1B 74   STA  DSCCRC/2+X
               ;                            EXECUTE RESET
1400 C3 03 14   JMP  VRXEQ                  VRXEQ(ERRFLG)
               ;                                 (PSW:Z )
               ;                                 ( 0    )
               ;                          ENDIF
               ;                        ENDIF
               ;                      ENDIF
               ;                    ENDIF
               ;                    RETURN
               ;  Recharging programs have been deleted.
               VRPREP;
               VRPRE1; and
               VRXEQ;  are two (2) of the modules which have been removed for security
               ;  purposes.  One suitable system for the deleted set of modules
               ;  is disclosed in U. S. Patent No. 4,097,923 for REMOTE POSTAGE
               ;  METER CHARGING SYSTEM USING AN ADVANCED MICROCOMPUTERIZED
               ;  POSTAGE METER issued on June 27,1978 to Alton B. Eckert, Howell
```

```
;   A. Jones, Jr. and Frank T. Check, Jr.  This patent is hereby
;   incorporated by reference into the subject patent application.
; (*************************************************************)
;
;THIS IS THE DEMO PROGRAM FOR 6 STEPS/DIGIT MECHANISM
;   USED FOR 45 DEG ENCODER  & 30 DEG SENSOR MOUNTING
;Objective
;   Position the stepper motor through specified number of steps.
;   Flag the errors if
;                  1. the move fails
;                  2. if the sensors are not in home position
;                     after the completion of a move
;Level:
;   Calls RENC , BKLASH routines
;   utilizes look up table setup for determining the step count
;   requirements for retries.
;   Exits with the power held on to both motors.  It is the duty of the
;   invoking routine to judiciously hold the appropriate home phase.
;Procedure MOVCLS(MOTOR,RETRIES,MCOUNT,SPEED:ERROR)
;ERROR := 0
;Input (PORT.SENSOR,SENSPTN)
;SENSPTN := SENSPTN and MSNMASK
;If SENSPTN = (BODO or BODC or BCDO or BCDC) then PASSFLAG := 0
;                                                 go to Loop1
;                                            else ERROR := 5
;                                                 End MOVCLS
;Loop1:      Do while (RETRIES > 0 and MCOUNT <> 0 and ERROR > 0 )
;            If PASSFLAG = 0 then  ECOUNT := MCOUNT * 2
;                                  MSTEP := MCOUNT * 6
;            Input (PORT.SENSOR,SENSPTN)
;            If MOTOR = BANK then
;                              SENSPTN := (SENSPTN / 4) and MASKDSENSR
;            If SENSPTN = 11 then MOTPTN := PHASE1    (....  11H..)
;                              else MOTPTN := PHASE2          44H
;            If MCOUNT > 0 then MOTPTN := MOTPTN * 4
;            Input (PORTB,MOTHPTN)
;            IF MOTOR = BANK then MOTPTN := MOTPTN and MASKMSN
;                                 MOTHPTN := MOTHPTN and MASKLSN
;                                 MOTHPTN := MOTHPTN or MOTPTN
;                              else MOTPTN := MOTPTN and MASKLSN
;                                 MOTHPTN := MOTHPTN and MASKMSN
;                                 MOTHPTN := MOTHPTN or MOTPTN
;            Output ( PORTB,MOTHPTN)
;            If MCOUNT > 0 then  MSTEP := MSTEP-1
;                                MOTPTN := MOTPTN * 2
;                          else  MSTEP := MSTEP + 1
;                                MOTPTN := MOTPTN / 2
;            For X = 1 to SPEED by 1
;                    Procedure RENC (MOTOR,SPEED,OLDPTN :ERROR,ADJCOUNT)
;            End For
;            If MSTEP <> 0 then
;                    If ERROR = 0 then Continue Do
;            else For Y =1 to 60 by 1
;                        Procedure RENC (MOTOR,OLDPTN: ERRORT,ADJCOUNT)
;                 End For
;            MSTEP := MSTEP (look-up)
;            PASSFLAG := PASSFLAG + 1
;            Continue Do
;   End Do
;   If RETRIES = 0 or MCOUNT = 0 then
;                                Procedure BKLASH
;If ERROR > 0 THEN End
;If BNKPAT = 01 then ERROR := 5; End
;           else if BNKPAT = 10 then ERROR :5; End
;                                else if MCOUNT = 0 THEN    End
;                                                  else ERROR := 6;End
;If DGTPAT = 01 then ERROR := 5; End
```

```
                     ;          else if DGTPAT = 10 then ERROR := 5 ; End
                     ;                                else if MCOUNT = 0 then End
                     ;                                                    else ERROR := 6
                     ;End movcls
                     ;
                     ;
                     ; PARAM     (*C-REG*) COUNT : BYTE; (*- FOR CW, + FOR CCW*)
                     ;   (*E-REG*) MOTOR : MOTORS; (*1 FOR BANK, 0 FOR DIGIT*)
                     ;   (*H-REG*) SPEED : BYTE  ;Stepping speed of motor
                     ; . (*L-REG*) TRIES : BYTE;
                     ;
                     ; VAR       (*B-REG*) ENC_COUNT : BYTE;
                     ;   (*C-REG*) MOT_COUNT : BYTE;
                     ;   (*D-REG*) PATTERN : BYTE;
                     ;
0000                 BODO        EQU     0000B
0003                 BODC        EQU     0011B
000C                 BCDO        EQU     1100B
000F                 BCDC        EQU     1111B
0000                 PFLAG0      EQU     00
0003                 DGTMSK      EQU     03H
000C                 BNKMSK      EQU     0CH
000F                 LSNMSK      EQU     0FH
00F0                 MSNMSK      EQU     0F0H
0011                 PHASE1      EQU     11H
0044                 PHASE2      EQU     44H
0003                 SENSCL      EQU     03H
0005                 ERROR5      EQU     05H
0006                 ERROR6      EQU     06H
                     MOVCLS:                                        ; BEGIN
1403 AF                  XRA     A        ; ERROR := NO_ERRORS;
1404 32 38 74            STA     ERROR
                     ;
                     ;
1407 3A 00 68        MOVC4:      LDA     PORT2A  ;Combination sensor check
140A E6 0F               ANI     LSNMSK
140C FE 00               CPI     BODO
140E CA 23 14            JZ      MOVC7
1411 FE 03               CPI     BODC
1413 CA 23 14            JZ      MOVC7
1416 FE 0C               CPI     BCDO
1418 CA 23 14            JZ      MOVC7
141B FE 0F               CPI     BCDC
141D CA 23 14            JZ      MOVC7
1420 C3 F9 14            JMP     MOVC60
                     ;
                     ;
1423 3E 00           MOVC7:      MVI     A,PFLAG0  ;Passflag:=0
1425 F5                  PUSH    PSW
1426 7D              MOVC05:     MOV     A,L      ; WHILE (TRIES > 0) AND (COUNT <> 0)
1427 B7                  ORA     A        ;        AND (ERROR = NO_ERRORS) DO
1428 CA DB 14            JZ      MOVC50   ;branch here to movc70 for backlash correction
142B 79                  MOV     A,C
142C B7                  ORA     A
142D CA DB 14            JZ      MOVC50   ;branch here to movc70 for backlash correction
1430 3A 38 74            LDA     ERROR
1433 B7                  ORA     A
1434 C2 DB 14            JNZ     MOVC50
                                          ;     BEGIN
1437 F1                  POP     PSW      ;Passflag check.
1438 B7                  ORA     A
1439 F5                  PUSH    PSW      ;
143A C2 56 14            JNZ     MOVC5
143D 79              MOVC1:      MOV     A,C              ;
143E 87                  ADD     A
143F 47                  MOV     B,A              ;ENC COUNT=2*COUNT
1440 87                  ADD     A
```

```
1441 80          ADD     B              ;STEP = 6*COUNT
1442 4F          MOV     C,A
                ;
                ;
1443 7B          MOV     A,E
1444 B7          ORA     A
1445 3A 00 68    LDA     PORT2A
1448 CA 4D 14    JZ      MOVC6
                ;
                ;
144B 0F          RRC                    ;BANK MOTOR
144C 0F          RRC                    ;
                            ;     CASE SIGN (MOT_COUNT) OF
144D E6 03    MOVC6:     ANI     DGTMSK         ;
144F 16 44       MVI     D,PHASE2              ;
1451 CA 56 14    JZ      MOVC8                 ;
1454 16 11       MVI     D,PHASE1
              MOVC8:                    ;
1456 79          MOV     A,C                   ;
1457 B7          ORA     A                     ;
1458 7A          MOV     A,D                   ;
                            ;
1459 FA 5F 14    JM      MOVC15         ;
145C 07          RLC
145D 07          RLC                                          ;
                            ;                          AND PHASED AND PHASEA;
145E 57       MOVC10:    MOV     D,A    ;     END;
              MOVC15:                   ;     REPEAT
145F 7B          MOV     A,E        ;      CASE MOTOR OF
1460 B7          ORA     A
1461 7A          MOV     A,D
1462 CA 73 14    JZ      MOVC20
1465 E6 F0       ANI     MSNMSK
1467 C5          PUSH    B
1468 47          MOV     B,A
1469 3A 02 70    LDA     PORTB
146C E6 0F       ANI     LSNMSK
146E B0          ORA     B
146F C1          POP     B
1470 C3 7E 14    JMP     MOVC25
1473 E6 0F    MOVC20:    ANI     LSNMSK  ;         DIGIT: PORTB := (PATTERN OR PHASESOFF R
1475 C5          PUSH    B
1476 47          MOV     B,A
1477 3A 02 70    LDA     PORTB                 ;
147A E6 F0       ANI     MSNMSK                ;
147C B0          ORA     B                     ;
147D C1          POP     B                     ;
                            ;                 IS BEING MOVED
147E 32 02 70 MOVC25:    STA     PORTB   ;       END;
1481 79          MOV     A,C    ;      CASE SIGN (MOT_COUNT) OF
1482 B7          ORA     A
1483 7A          MOV     A,D
1484 FA 8C 14    JM      MOVC30
                            ;          +1: BEGIN
1487 0D          DCR     C  ;              MOT_COUNT := MOT_COUNT - 1;
1488 07          RLC        ;              PATTERN := PATTERN ROL 1
1489 C3 8E 14    JMP     MOVC35 ;          END;
              MOVC30:                   ;         -1: BEGIN
148C 0C          INR     C  ;              MOT_COUNT := MOT_COUNT - 1;
148D 0F          RRC        ;              PATTERN := PATTERN ROR 1
                            ;              END;
148E 57       MOVC35:    MOV     D,A    ;      END;
148F C5          PUSH    B  ;      READ_ENCODERS (10, MOTOR, ENC_COUNT)
1490 48          MOV     C,B
1491 D5          PUSH    D
1492 E5          PUSH    H
1493 6C          MOV     L,H
```

```
1494 CD 99 19        CALL    RENC
1497 E1              POP     H
1498 D1              POP     D
1499 79              MOV     A,C
149A C1              POP     B
149B 47              MOV     B,A
149C 79              MOV     A,C     ;     UNTIL (MOT_COUNT = 0) OR (ERROR <> NO_ERRORS);
149D B7              ORA     A
149E CA A8 14        JZ      MOVC40
14A1 3A 38 74        LDA     ERROR
14A4 B7              ORA     A
14A5 CA 5F 14        JZ      MOVC15
14A8 C5        MOVC40:  PUSH    B       ;     READ_ENCODERS (60, MOTOR, ENC_COUNT);
14A9 48              MOV     C,B
14AA D5              PUSH    D
14AB E5              PUSH    H
14AC 2E 3C           MVI     L,60.
14AE CD 99 19        CALL    RENC
14B1 E1              POP     H
14B2 D1              POP     D
14B3 79              MOV     A,C
14B4 C1              POP     B
14B5 47              MOV     B,A
14B6 B7              ORA     A       ;     COUNT := ENC_COUNT / 2;
14B7 F2 BC 14        JP      MOVC45
14BA 2F              CMA
14BB 3C              INR     A
14BC E5        MOVC45:  PUSH    H
14BD D5              PUSH    D
14BE 16 00           MVI     D,00H   ;Step error computation/lookup
14C0 5F              MOV     E,A
14C1 21 08 15        LXI     H,TABBASE
14C4 19              DAD     D
14C5 4E              MOV     C,M
14C6 78              MOV     A,B
14C7 B7              ORA     A
14C8 F2 CF 14        JP      MOVC42
14CB 79              MOV     A,C
14CC 2F              CMA
14CD 3C              INR     A
14CE 4F              MOV     C,A
14CF D1        MOVC42:  POP     D
14D0 E1              POP     H
14D1 2D              DCR     L
14D2 F1              POP     PSW
14D3 3C              INR     A               ;PASSFLAG:=PASSFLAG+1
14D4 F5              PUSH    PSW
14D5 C3 26 14        JMP     MOVC05
               ;
               ;
               ;
14D8 CD 1B 15  MOVC70:  CALL    BKLASH
14DB F1        MOVC50:  POP     PSW             ;retrieve passflag;
14DC 3A 38 74        LDA     ERROR
14DF B7              ORA     A
14E0 C0              RNZ
                     ;
               ;
               ;
14E1 3A 39 74        LDA     BNKPAT  ; IF BANK_PAT NOT IN [00H, 03H]
14E4 B7              ORA     A       ;    OR DIGIT_PAT NOT IN [00H,03H] THEN
14E5 CA ED 14        JZ      MOVC55
14E8 FE 03           CPI     SENSCL
14EA C2 F9 14        JNZ     MOVC60
14ED 3A 3A 74  MOVC55:  LDA     DGTPAT
14F0 B7              ORA     A
14F1 CA FF 14        JZ      MOVC65
```

```
14F4 FE 03          CPI     SENSCL
14F6 CA FF 14       JZ      MOVC65
                                    ;     BEGIN
14F9 3E 05     MOVC60:      MVI     A,ERROR5        ;     ERROR := NOT_HOME;
14FB 32 38 74       STA     ERROR
14FE C9             RET             ;     RETURN
                                    ;     END;
14FF 79        MOVC65:      MOV     A,C     ; IF COUNT <> 0 THEN ERROR := MOVE_FAILED
1500 B7             ORA     A
1501 C8             RZ
1502 3E 06          MVI     A,ERROR6
1504 32 38 74       STA     ERROR
1507 C9             RET
                                    ; END;
               ;
               ;
1508 00        TABBASE:DB   0
1509 04             DB      4H
150A 06             DB      6D
150B 08             DB      8D
150C 0C             DB      12D
150D 10             DB      16D
150E 12             DB      18D
150F 14             DB      20D
1510 18             DB      24D
1511 1C             DB      28D
1512 1E             DB      30D
1513 22             DB      34D
1514 24             DB      36D
1515 28             DB      40D
1516 2A             DB      42D
1517 2C             DB      44D
1518 30             DB      48D
1519 34             DB      52D
151A 36             DB      54D
               ;
               ;
               ;BACKLASH CORRECTION ROUTINE
               ;This routine advances the digit stepper motor by one step
               ;beyond the expected settling point and then drives one
               ;step backwards  to the final settling point
               ;None of the registers are affected.
               ;This routine will be invoked only if all retries are exhausted or if al
               ;motor phases are applied.
               ;This routine will not be invoked in case of an error condition arises
               ;in RENC routine before the specified number of pulses are applied
               ;
151B F5        BKLASH:      PUSH    PSW
151C C5             PUSH    B
151D 7B             MOV     A,E             ;motor type check
151E B7             ORA     A
151F C2 3C 15       JNZ     BKL50
1522 3A 02 70       LDA     PORTB
1525 F5             PUSH    PSW
1526 E6 F0          ANI     MSNMSK
1528 F5             PUSH    PSW
1529 7A             MOV     A,D             ;D register has the next pattern output
152A E6 0F          ANI     LSNMSK
152C 47             MOV     B,A
152D F1             POP     PSW
152E B0             ORA     B
152F 32 02 70       STA     PORTB
1532 CD A9 17       CALL    DEL30M          ;forward pulse
1535 F1             POP     PSW
1536 32 02 70       STA     PORTB
1539 CD A9 17       CALL    DEL30M          ;backward pulse to final settling point
153C C1        BKL50:       POP     B
```

```
1530 F1           POP     PSW
153E C9           RET
                ;
                ;
                ;  LEDON ROUTINE
                ;  TURNS ON THE STROBE FOR LEDS
                ;
                ;
153F F5         LEDON:    PUSH    PSW           ;SAVE CONTENTS
1540 3A 01 70     LDA     PORTA         ;LOADS THE CURRENT STATUS
1543 E6 DF        ANI     0DFH          ;BIT RESET
1545 32 01 70     STA     PORTA         ;PORT RESET
1548 F1           POP     PSW
1549 C9           RET                   ;
                ;
                ;
                ;  LEDOFF ROUTINE
                ;  TURNS THE STROBE OFF
                ;
                ;
154A F5         LEDOFF:   PUSH    PSW                 ;
154B 3A 01 70     LDA     PORTA           ;
154E F6 20        ORI     20H             ;
1550 32 01 70     STA     PORTA           ;
1553 F1           POP     PSW         ;
1554 C9           RET                     ;
                ;
                ;
                ;
                ;
                ;
                ;
                ;  DELAY ROUTINES
                ;
                ;
1555 00         DEL300:   NOP
1556 00           NOP         ;ADJUST TIME
1557 CD 64 15     CALL    DEL75   ;75 MICRO SECS
155A CD 64 15     CALL    DEL75   ;
155D CD 64 15     CALL    DEL75       ;
1560 CD 64 15     CALL    DEL75       ;
1563 C9           RET                 ;
                ;
                ;
                ;
1564 F5         DEL75:    PUSH    PSW                 ;
1565 3E 0A        MVI     A,0AH           ;
1567 3D         DEL1:     DCR     A                   ;
1568 C2 67 15     JNZ     DEL1            ;
156B F1           POP     PSW             ;
156C C9           RET                     ;
                ;
                ;
                ;  SENSOR INITIALISATION ROUTINE
                ;
                ;
156D            INITSM:
156D CD 3F 15   SENSR:    CALL    LEDON           ;LED STROBE ON
1570 CD 64 15     CALL    DEL75           ;SETTLING TIME
1573 3A 00 68     LDA     PORT2AD
1576 47           MOV     B,A             ;
1577 E6 03        ANI     DCTMSK
1579 CA 9E 15     JZ      SENS35
157C FE 03        CPI     DGTMSK
157E C2 A3 15     JNZ     SENS40
1581 3E 02        MVI     A,02H
1583 32 02 70   SENS25:   STA     PORTB
```

```
1586 CD A9 17      CALL    DEL30M
1589 3A 00 68      LDA     PORT2AD
158C 47            MOV     B,A
158D E6 03         ANI     DGTMSK                      ;
158F 32 3A 74      STA     DGTPAT                      ;DIGIT PATTERN
1592 78            MOV     A,B                         ;
1593 0F            RRC                                 ;
1594 0F            RRC                                 ;
1595 E6 03         ANI     DGTMSK                      ;
1597 32 39 74      STA     BNKPAT                      ;BANK PATTERN
159A CD 4A 15      CALL    LEDOFF
159D C9            RET                                 ;
                  ;
                  ;
159E 3E 08        SENS35:  MVI     A,08H
15A0 C3 83 15      JMP     SENS25
                  ;
                  ;
15A3 3E 0F        SENS40:  MVI     A,15D
15A5 32 38 74      STA     ERROR
15A8 C3 9E 15      JMP     SENS35
                  ;
                  ; (****************************************************************)
                  ;Objective: To compare present encoder status to previous encoder value
                  ;           and determine the deviation as no change, clockwise movement
                  ;           of one step, counterclockwise movement of one step or as an
                  ;           error, which corresponds to a two step jump in the status.
                  ;
                  ;           Does not call any subroutines
                  ;
                  ;
                  ; FUNCTION (*A-REG*) ENCODER_MOVE : BYTE;
                  ;
                  ; PARAM     (*C-REG*) PATTERN : ENCODER_PATTERNS;
                  ;   (*E-REG*) NEW_PATTERN : ENCODER_PATTERNS;
                  ;
                  ENCMOV:                       ; BEGIN
15AB 79            MOV     A,C      ; CASE PATTERN ROL 2 OR NEW_PATTERN OF
15AC 07            RLC
15AD 07            RLC
15AE B3            ORA     E
15AF 5F            MOV     E,A
15B0 AF            XRA     A
15B1 57            MOV     D,A
15B2 21 B8 15      LXI     H,ENCT
15B5 19            DAD     D
15B6 7E            MOV     A,M
15B7 C9            RET
15B8 00           ENCT:    DB      0       ;      00H: ENCODER_MOVE := 0;
15B9 01            DB       1      ;    01H: ENCODER_MOVE := +1;
15BA FF            DB      -1      ;    02H: ENCODER_MOVE := -1;
15BB 02            DB      +2      ;    03H: ENCODER_MOVE := +2;
15BC FF            DB      -1      ;    04H: ENCODER-MOVE := -1;
15BD 00            DB      0       ;    05H: ENCODER_MOVE := 0;
15BE 02            DB      +2      ;    06H: ENCODER_MOVE := +2;
15BF 01            DB      +1      ;    07H: ENCODER_MOVE := +1;
15C0 01            DB      +1      ;    08H: ENCODER_MOVE := +1;
15C1 02            DB      +2      ;    09H: ENCODER_MOVE := +2;
15C2 00            DB      0       ;    0AH: ENCODER_MOVE := 0;
15C3 FF            DB      -1      ;    0BH: ENCODER_MOVE := -1;
15C4 02            DB      +2      ;    0CH: ENCODER_MOVE := +2;
15C5 FF            DB      -1      ;    0DH: ENCODER_MOVE := -1;
15C6 01            DB      +1      ;    0EH: ENCODER_MOVE := +1;
15C7 00            DB      0       ;    0FH: ENCODER_MOVE := 0;
                                   ; END
                                   ; END;
```

```
                  ; (*************************************************************)
                  ;THIS SEGMENT IS USED TO MOVE THE BANK & DIGIT IN TO HOME
                  ;POSITION UPON DETECTION OF AN ERROR IN ATTEMPT TO
                  ;POSITION THE RACKS TO 00.00
                  ;
                  ; PROCEDURE ENDMOV_CLOSED;
                  ;
                  ; PARAM     (*C-REG*) COUNT : BYTE; (*- FOR CW, + FOR CCW*)
                  ;   (*E-REG*) MOTOR : MOTORS; (*1 FOR BANK, 0 FOR DIGIT*)
                  ;
                  ; VAR       (*B-REG*) ENC_COUNT : BYTE;
                  ;   (*C-REG*) MOT_COUNT : BYTE;
                  ;   (*D-REG*) PATTERN : BYTE;
                  ;
                  ;
                  ;
00F0              MSNMASK     EQU     0F0H
000F              LSNMASK     EQU     0FH
0014              NUMRD1      EQU     20D
003C              SETLTIM     EQU     60D
                  ;
                  ;
                  ;
                  ;
                  ;
15C8 AF           ENDMOV:     XRA     A                       ;    REPEAT
15C9 32 38 74        STA      ERROR
15CC 7B           ENDM05:    MOV     A,E     ;        CASE MOTOR OF
15CD B7              ORA      A
15CE 7A              MOV      A,D
15CF CA E0 15        JZ       ENDM20          ;MOTOR(BANK,DIGIT)
                  ;
                  ;
15D2 E6 F0           ANI      MSNMASK
15D4 C5              PUSH     B
15D5 47              MOV      B,A
15D6 3A 02 70        LDA      PORTB
15D9 E6 0F           ANI      LSNMASK
15DB B0              ORA      B
15DC C1              POP      B
15DD C3 EB 15        JMP      ENDM25
                  ;
                  ;
15E0 E6 0F        ENDM20:     ANI     LSNMASK     ;  DIGIT: PORTB := (PATTERN OR PHASESOFF ROL 4)
15E2 C5              PUSH     B
15E3 47              MOV      B,A
15E4 3A 02 70        LDA      PORTB                ;
15E7 E6 F0           ANI      MSNMASK              ;
15E9 B0              ORA      B                    ;
15EA C1              POP      B                    ;
                                      ;            IS BEING MOVED
15EB 32 02 70     ENDM25:     STA     PORTB   ;      END;
15EE 79            . MOV      A,C     ;      CASE SIGN (MOT_COUNT) OF
15EF B7              ORA      A
15F0 7A              MOV      A,D
15F1 FA F9 15        JM       ENDM30
                                      ;          +1: BEGIN
15F4 0D              DCR      C       ;       .     MOT_COUNT := MOT_COUNT - 1;
15F5 07              RLC              ;             PATTERN := PATTERN ROL 1
15F6 C3 FB 15        JMP      ENDM35  ;             END;
                  ;
                  ;
                  ENDM30:                     ;          -1: BEGIN
15F9 0C              INR      C       ;             MOT_COUNT := MOT_COUNT - 1;
15FA 0F              RRC              ;             PATTERN := PATTERN ROR 1
                                      ;             END;
15FB 57           ENDM35:     MOV     D,A     ;     END;
```

```
15FC C5          PUSH    B       ;        READ_ENCODERS (10, MOTOR, ENC_COUNT)
15FD 48          MOV     C,B
15FE D5          PUSH    D
15FF E5          PUSH    H
1600 2E 14       MVI     L,NUMRD1
1602 CD 99 19    CALL    RENC
1605 E1          POP     H
1606 D1          POP     D
1607 79          MOV     A,C
1608 C1          POP     B
1609 47          MOV     B,A
160A 79          MOV     A,C     ;    UNTIL (MOT_COUNT = 0) OR (ERROR <> NO_ERRORS);
160B B7          ORA     A
160C C2 CC 15    JNZ     ENDM05
                ;
                ;
160F C5         ENDM40:  PUSH    B       ;     READ_ENCODERS (60, MOTOR, ENC_COUNT);
1610 48          MOV     C,B
1611 D5          PUSH    D
1612 E5          PUSH    H
1613 2E 3C       MVI     L,SETLTIM
1615 CD 99 19    CALL    RENC
1618 E1          POP     H
1619 D1          POP     D
161A 79          MOV     A,C
161B C1          POP     B
161C 47          MOV     B,A
161D B7          ORA     A       ;    COUNT := ENC_COUNT / 2;
161E 3E 07       MVI     A,07H              ;ERROR 7
1620 C8          RZ                         ;NORMAL EXIT
                ;
                ;
1621 32 38 74    STA     ERROR
1624 C9          RET                        ;ERROR EXIT
                ;
0044            HPHAM1   EQU     044H
0088            HPHASE   EQU     88H
0000            SENS00   EQU     00H
0001            SENS01   EQU     01H
0002            SENS02   EQU     02H
0003            SENS03   EQU     03H
0004            SENS04   EQU     04H
0005            SENS05   EQU     05H
0006            SENS06   EQU     06H
0007            SENS07   EQU     07H
0008            SENS08   EQU     08H
0009            SENS09   EQU     09H
000A            SENS10   EQU     0AH
000B            SENS11   EQU     0BH
000C            SENS12   EQU     0CH
000D            SENS13   EQU     0DH
000E            SENS14   EQU     0EH
000F            SENS15   EQU     0FH
0003            SENMSK   EQU     03H
                ;
                ;
1625 CD 6D 15   SEKPOS:  CALL    SENSR
1628 CD 3F 15    CALL    LEDON
162B CD 3B 16    CALL    HDSEEK
162E CD 4A 15    CALL    LEDOFF
1631 CD BC 18    CALL    MODLN
1634 CD B0 18    CALL    ERRHDR
1637 C4 B5 18    CNZ     EXTERR
163A C9          RET
```

```
;
;
;
;
;
;Procedure HDSEEK
;Objective
;    This segment initialises the print wheels to 00.00 position.
;    Prior to the movement of the racks this segment aligns the
;    bank and digit motors to legitimate home positions. The 00.00
;    location is attained by hitting against the mechanical blocks.
;    Three retries will be provided before coming to the conclusion
;    that an error in movement is detected.
;Level
;;
;
;   RCOUNTERB := 4
;   RCOUNTERC := 8                   ;RETRY COUNTERS
;SEKP00:RCOUNTERB:= RCOUNTERB-1
;   If RCOUNTERB = 0 then ERROR := 12 ;     End.
;   MOTPATN := HOMEPHASE-1
;   Output(PORTB,MOTPATN)
;   Procedure TIMEDELAY(30msec)
;   MOTPATN := HOMEPHASE
;   Output (PORTB,MOTPATN)
;   Procedure TIMEDELAY(30msec)
;   RCOUNTERC := RCOUNTERC - 1
;   If RCOUNTERC = 0 then ERROR := 12 ;            End.
;   Input (PORT.SENSOR,SENSRPTN)
;   SENSRPTN := SENSRPTN.LSNMASK
;   Case SENSRPTN   00,03,12,15     SEKP85
;                   01,02,13,14     SEKP01
;                   04,07,08,11     SEKP02
;                   05,06,09,10     SEKP03
;
;   SEKP01: Procedure DALIGN(,TYPE 2 ERROR)
;           If TYPE2ERROR = FALSE then go to STEP0
;           else MOTPTN:= NOPHASEON
;                Output (PORTB,MOTPTN)
;                Procedure TIMEDELAY (30msec)
;                Go to SEEKP00
;   SEKP02: Procedure BALIGN(TYPE2ERROR)
;           If TYPE2ERROR = FALSE then go to STEP0
;           else MOTPTN := NOPHASEON
;                Procedure TIMEDELAY(30msec)
;                Go to SEEKP00
;   SEKP03: Procedure DALIGN(TYPE2 ERROR)
;           If TYPE2ERROR = FALSE then go to STEP0
;           else  Procedure BALIGN(TYPE2ERROR)
;           If TYPE2ERROR = FALSE then go to STEP0
;           else Input (PORTB,MOTPTN)
;                MOTPTN := MOTPTN.LSNMSK
;                Output (PORTB,MOTPTN)
;                Procedure TIMEDELAY(30msec)
;                Procedure DALIGN(TYPE2ERROR)
;                If TYPE2ERROR = TRUE then Input (PORTB,MOTPTN)
;                                          MOTPTN := NOPHASEON
;                                          Output(PORTB,MOTPTN)
;                                          Procedure TIMEDELAY(30msec)
;                                          Go to SEEKP00
;               else        Input (PORTB,MOTPTN)
;                           MOTPTN:=(( MOTPTN.LSNMSK)+HOMEPHASEBANK))
;                           Output (PORTB,MOTPTN)
;                           Procedure TIMEDELAY(30msec)
;                           Go to STEP0
;   SEKP85:
;           Procedure PINCHK(DIGIT:PINFLAG)
```

```
                    ;           If PTNFLAG <> 0 then go to SEKP00
                    ;           Procedure PTNCHK(BANK,PTNFLAG)
                    ;           If PTNFLAG <> 0 then go to SEKP00
                    ;end case
                    ;
                    ;   SEKP05: Procedure MOVE(DIGIT,CCW,1,SPD8:ERROR)
                    ;           Do while ERROR = 0
                    ;                   Procedure MOVE(DIGIT,CCW,1,SPD8:ERROR)
                    ;           End do.
                    ;           Procedure SELDRN(:DRN)
                    ;           Procedure POHOME(DRN:ERROR)
                    ;           If ERROR <>0 then End hdseek.
                    ;
                    ;           Procedure MOVE(BANK,CCW,1,SPD8:ERROR)
                    ;           Do while ERROR = 0
                    ;                   Procedure MOVE (BANK,CCW,1,SPD8:ERROR)
                    ;           end do.
                    ;           If BNKPAT = 01 then DRN:=CW else DRN:=CCW
                    ;           Procedure POHOME(DRN,ERROR)
                    ;           If ERROR <> 0 then End Hdseek.
                    ;           Procedure MOVE(BANK,CW,4,SPD8:ERROR)
                    ;           If ERROR <> 0 then End Hdseek.
                    ;           For BANK:=0 TO 4 by 1 Do
                    ;                   Procedure MOVE(DIGIT,CCW,1,SPD8:ERROR)
                    ;                   Do while ERROR =FALSE
                    ;                           Procedure MOVE(DIGIT,CCW,1,SPD8:ERROR)
                    ;                   end do
                    ;                   Procedure SELDRN(:DRN)
                    ;                   Procedure POHOME(DRN:ERROR)
                    ;                   If ERROR = TRUE then End hdseek.
                    ;                   Procedure MOVE(DIGIT,CW,9,SPD8:ERROR)
                    ;                   If ERROR = TRUE then End Hdseek.
                    ;                   BANK:= BANK+1
                    ;                   If BANK = 2 then
                    ;                                   Procedure MOVE(BANK,CCW,1,SPD8:ERROR)
                    ;                                   If ERROR = TRUE then end Hdseek.
                    ;                   end do
                    ;           end for.
                    ;           Procedure MOVE (BANK,CW,2,SPD8:ERROR)
                    ;           If ERROR = TRUE then end hdseek.
                    ;           Procedure MOVE (DIGIT,CW,2,SPD8:ERROR)
                    ;           If ERROR = TRUE then end hdseek.
                    ;           Input (PORTB.MOTPTN)
                    ;           MOTPTN:=MOTPTN.MSNMSK
                    ;           Output(PORTB,MOTPTN)
                    ;END.
                    ;
                    ;
163B 01 08 04 HDSEEK:   LXI     B,408H                  ;RETRY COUNT
163E C5                 PUSH    B
163F C1       SEKP00:   POP     B
1640 05                 DCR     B
1641 CA 5A 16           JZ      EREXIT
                    ;
                    ;
1644 C5                 PUSH    B
1645 3E 44              MVI     A,HPHAM1
1647 32 02 70           STA     PORTB
164A CD A9 17           CALL    DEL30M
164D 3E 88              MVI     A,HPHASE
164F 32 02 70           STA     PORTB
1652 CD A9 17           CALL    DEL30M
1655 C1       STEP0:    POP     B
1656 0D                 DCR     C
1657 C2 60 16           JNZ     CSTEP0
165A 3E 0C    EREXIT:   MVI     A,12D
165C 32 38 74           STA     ERROR
```

```
165F C9         RET
              ;
              ;
1660 C5       CSTEP0:    PUSH    B
1661 3A 00 68    LDA     PORT2A                  ;
1664 E6 0F       ANI     LSNMSK
              ;
              ;
1666 21 73 16    LXI     H,BASE5
1669 16 00       MVI     D,00H
166B 87          ADD     A
166C 5F          MOV     E,A
166D 19          DAD     D
166E 5E          MOV     E,M
166F 23          INX     H
1670 56          MOV     D,M
1671 EB          XCHG
1672 E9          PCHL
              ;
              ;
1673 D2 16    BASE5:     DW      SEKP85
1675 93 16       DW      SEKP01
1677 93 16       DW      SEKP01
1679 D2 16       DW      SEKP85
167B A5 16       DW      SEKP02
167D AF 16       DW      SEKP03
167F AF 16       DW      SEKP03
1681 A5 16       DW      SEKP02
1683 A5 16       DW      SEKP02
1685 AF 16       DW      SEKP03
1687 AF 16       DW      SEKP03
1689 A5 16       DW      SEKP02
168B D2 16       DW      SEKP85
168D 93 16       DW      SEKP01
168F 93 16       DW      SEKP01
1691 D2 16       DW      SEKP85
              ;
              ;
              ;  JZ      SEKP90
              ;                  ;CHECKING DIGIT POSITION
              ;  CPI     SENS01
              ;  JZ      SEKP01
              ;
              ;  CPI     SENS02
              ;  JZ      SEKP01
              ;;
              ;  CPI     SENS13
              ;  JZ      SEKP01
              ;;
              ;  CPI     SENS14
              ;  JZ      SEKP01
              ;;
              ;  CPI     SENS04
              ;  JZ      SEKP02
              ;;
              ;  CPI     SENS07
              ;  JZ      SEKP02
              ;;
              ;  CPI     SENS08
              ;; JZ      SEKP02
              ;;
              ;  CPI     SENS11
              ;  JZ      SEKP02
              ;;;
              ;  CPI     SENS05
              ;  JZ      SEKP03
              ;;
```

```
                     ;  CPI     SENS06
                     ;  JZ      SEKP03
                     ;;
                     ;  CPI     SENS09
                     ;  JZ      SEKP03
                     ;;
                     ;  CPI     SENS10
                     ;  JZ      SEKP03
                     ;;
                     ;  CPI     SENS03
                     ;  JZ      SEKP90
                     ;;
                     ;  JMP     SEKP05
                     ;
                     ;
                     ;                  DIGIT NOT IN HOME
1693 CD E7 17 SEKP01:   CALL    DALIGN
1696 B7                 ORA     A
1697 CA 55 16           JZ      STEP0           ;No Error condition
                                                ;Digit aligned and phased
                                                ;Bank aligned and phased
169A
                                                ;Type 1 error
                                                ;Digit aligned and phased
                                                ;Bank not aligned and/or phased
                                                ;
169A 3E 00    SEKP04:   MVI     A,00H                   ;Type 2 error
                                                ;Digit not aligned and/or phased
                                                ;Bank don't care
169C 32 02 70 SEP11:    STA     PORTB
169F CD A9 17           CALL    DEL30M
16A2 C3 3F 16           JMP     SEKP00
16A5 CD 12 18 SEKP02:   CALL    BALIGN
16A8 B7                 ORA     A
16A9 CA 55 16           JZ      STEP0           ;No Error condition
                                                ;Digit aligned and phased
                                                ;Bank aligned and phased
                                                ;
                                                ;Type 1 Error
                                                ;Bank aligned and phased
                                                ;Digit not aligned and/or phased
16AC C3 9A 16           JMP     SEKP04
16AF CD E7 17 SEKP03:   CALL    DALIGN
16B2 B7                 ORA     A
16B3 CA 55 16           JZ      STEP0           ;NO error condition
                     ;
                     ;
16B6
                                                ;Type 2 error
16B6 CD 12 18           CALL    BALIGN
16B9 B7                 ORA     A
16BA CA 55 16           JZ      STEP0           ;No error condition
                     ;
                     ;
                                                ;Type 1 Error condition
                     ;
                     ;
16BD 3A 02 70           LDA     PORTB
16C0 E6 0F              ANI     LSNMSK
16C2 32 02 70           STA     PORTB
16C5 CD A9 17           CALL    DEL30M
                     ;
                     ;
                     ;
                     ;
16C8 CD E7 17           CALL    DALIGN
16CB B7                 ORA     A
```

```
16CC C2 9A 16       JNZ      SEKP04
                   ;
                   ;
                   ;
                   ;  LDA      PORTB
                   ;  ANI      LSNMSK
                   ;  ORI      80H
                   ;  STA      PORTB
                   ;  CALL     DEL30M
16CF C3 55 16       JMP      STEP0
                   ;;
                   ;
                   ;
                   ;
16D2 1E 00         SEKP85:     MVI      E,00
16D4 CD 2A 19       CALL     PTNCHK
16D7 C2 3F 16       JNZ      SEKP00
16DA 1C             INR      E
16DB CD 2A 19       CALL     PTNCHK
16DE C2 3F 16       JNZ      SEKP00
                   ;;
                   ;
16E1 C1            SEKP05:     POP      B
16E2 3A 3A 74      SEKP06:     LDA      DGTPAT
16E5 F5             PUSH     PSW
16E6 0E 01          MVI      C,1                  ;
16E8 1E 00          MVI      E,00                 ;DIGIT MOTOR
16EA 21 03 08       LXI      H,803H               ;RE TRIES
16ED CD 03 14       CALL     MOVCLS               ;EXIT FROM LOCK TRY
16F0 3A 38 74       LDA      ERROR                ;
16F3 B7             ORA      A                    ;
16F4 C2 FB 16       JNZ      SEKP07
16F7 F1             POP      PSW
16F8 C3 E2 16       JMP      SEKP06               ;
                   ;
                   ;
                   ;
16FB F1            SEKP07:     POP      PSW
16FC CD 40 18       CALL     SELDRN
                   ;
16FF CD C5 18      SEKP19:     CALL     POHOME
                   ;
1702 C0             RNZ
1703               SEKP10:
1703 0E 01          MVI      C,01                 ;CLOCKWISE 1STEP
1705 1E 01          MVI      E,01
1707 21 03 08       LXI      H,803H               ;BANK MOTOR
170A CD 03 14       CALL     MOVCLS               ;BANK POSITION IDENTIFICATION
170D 3A 38 74       LDA      ERROR                ;
1710 B7             ORA      A                    ;
1711 CA 03 17       JZ       SEKP10               ;
                   ;
                   ;
1714 3A 39 74       LDA      BNKPAT
1717 2E 00          MVI      L,00H
1719 FE 01          CPI      01
171B CA 1F 17       JZ       SEKP12
171E 2C             INR      L
                   ;
                   ;
171F CD C5 18      SEKP12:     CALL     POHOME
1722 C0             RNZ
                   ;
                   ;
                   ;
1723 1E 01          MVI      E,01                 ;
1725 0E FC          MVI      C,-4H                ;
```

```
1727 21 03 00      LXI     H,803H                        ;BANK IS BEING POSITIONED TO EXTREME
172A CD 03 14      CALL    MOVCLS                        ;
172D CD B0 18      CALL    ERRHDR                        ;
1730 C0            RNZ                                   ;EXITS ON FATAL ERROR
                ;
                ;
1731 0E 05         MVI     C,5H                          ;
1733 C5         SEKP15:    PUSH    B                             ;INDEX STORAGE
1734 3A 3A 74   SEKP20:    LDA     DGTPAT
1737 F5            PUSH    PSW
1738 0E 01         MVI     C,1                           ;CLOCKWISE 1 STEP
173A 1E 00         MVI     E,00                          ;DIGIT MOTOR
173C 21 03 08      LXI     H,803H                        ;RETRIES
173F CD 03 14      CALL    MOVCLS                        ;MOVE DIGIT TO EXTREME..9
1742 3A 38 74      LDA     ERROR                         ;
1745 B7            ORA     A                             ;
1746 C2 4D 17      JNZ     SEKP21                        ;
1749 F1            POP     PSW
174A C3 34 17      JMP     SEKP20
                ;
                ;
                ;
174D F1         SEKP21:    POP     PSW
174E CD 40 18      CALL    SELDRN
1751 CD C5 18   SEKP23:    CALL    POHOME                        ;
                ;
1754 C2 B3 17      JNZ     SEEK26
1757 0E F7         MVI     C,-9H                         ;CLOCKWISE 9STEPS
1759 1E 00         MVI     E,00                          ;
175B 21 03 08      LXI     H,803H                        ;RE TRIES
175E CD 03 14      CALL    MOVCLS                        ;POSITION TO 0
1761 CD B0 18      CALL    ERRHDR                        ;
1764 C1            POP     B                             ;RESTORE STACK
1765 C0            RNZ                                   ;FATAL ERROR  EXIT
1766 00            NOP
1767 00            NOP
1768 00            NOP
1769 00            NOP
                ;
                ;
                ;
                ;
176A 0D         SEKP22:    DCR     C                             ;
176B CA 87 17      JZ      SEKP30                        ;
176E C5         SEKP25:    PUSH    B                             ;INDEX RESTORE
176F 0E 01         MVI     C,1                           ;CLOCWISE 1 STEP
1771 1E 01         MVI     E,01                          ;BANK MOTOR
1773 21 03 08      LXI     H,803H                        ;RETRIES
1776 CD 03 14      CALL    MOVCLS                        ;GO  TO NEXT BANK
1779 CD B0 18      CALL    ERRHDR                        ;
177C C1            POP     B                             ;
177D C0            RNZ                                   ;FATAL ERROR EXIT
                ;
177E 79            MOV     A,C                           ;
177F FE 03         CPI     03                            ;HOME?
1781 C2 33 17      JNZ     SEKP15                        ;
1784 C3 6A 17      JMP     SEKP22                        ;
                ;
                ;
                ;
1787 0E FE      SEKP30:    MVI     C,-2H                         ;COUNTER CLOCKWISE 2 STEPS
1789 1E 01         MVI     E,01                          ;BANK MOTOR
178B 21 03 08      LXI     H,803H                        ;
178E CD 03 14      CALL    MOVCLS                        ;MOVE BANK TO HOME
1791 CD B0 18      CALL    ERRHDR                        ;
1794 C0            RNZ                                   ;FATAL ERROR EXIT
                ;
```

```
                       ;
1795 0E FE             MVI      C,-2H              ;COUNTER CLOCKWISE 1 STEP
1797 1E 00             MVI      E,00               ;DIGIT MOTOR
1799 21 03 08          LXI      H,803H             ;
179C CD 03 14          CALL     MOVCLS             ;SET DIGIT IN TO LOCK
179F CD B0 18          CALL     ERRHDR             ;
17A2 C9                RET
                       ;
                       ;
17A3 C5        DEL6M:  PUSH     B
17A4 06 14             MVI      B,20D
17A6 C3 AC 17          JMP      DELM1
                       ;
                       ;
                       ;
17A9 C5        DEL30M: PUSH     B
17AA 06 64             MVI      B,100D
17AC CD 55 15  DELM1:  CALL     DEL300
17AF 05                DCR      B
17B0 C2 AC 17          JNZ      DELM1
17B3 C1        SEEK26: POP      B
17B4 C9                RET
                       ;
                       ;
                       ;
                       ;
17B5 01 DC 17  DPTSP:  LXI      B,BASEAD
17B8 21 02 70          LXI      H,PORTB
17BB 7B                MOV      A,E
17BC B7                ORA      A
17BD 7E                MOV      A,M
17BE CA D4 17          JZ       DPTS05
                       ;
                       ;
17C1 7E                MOV      A,M
17C2 E6 E0             ANI      0E0H
17C4 07                RLC
17C5 07                RLC
17C6 07                RLC
17C7 E5        DPTS10: PUSH     H
17C8 26 00             MVI      H,00H
17CA 6F                MOV      L,A
17CB 09                DAD      B
17CC 7E                MOV      A,M
17CD E1                POP      H
17CE A6                ANA      M
17CF 77                MOV      M,A
                       ; STA    PORTB
17D0 CD A9 17          CALL     DEL30M
17D3 C9                RET
                       ;
                       ;
                       ;
17D4 E6 03     DPTS05: ANI      03H
17D6 0F                RRC
17D7 C6 04             ADI      04
17D9 C3 C7 17          JMP      DPTS10
                       ;
                       ;
                       ;
                       ;
                       ;
17DC FF        BASEAD: DB       0FFH
17DD DF                DB       0DFH
17DE FF                DB       0FFH
17DF BF                DB       0BFH
17E0 EF                DB       0EFH
```

```
17E1 FD         DB       0FDH
17E2 7F         DB       7FH
17E3 FB         DB       0FBH
17E4 FE         DB       0FEH
17E5 FF         DB       0FFH
17E6 F7         DB       0F7H
           ;
           ;
           ;
           ;Procedure DALIGN
           ;Objective:        this segment makes an attempt to align the digit motors to
           ;                  a legitimate home position.
           ;
           ;Level.
           ;
           ;DALIGN:
           ;   MOTOR := DIGIT
           ;   PHASE := DPHASE1
           ;   DIRECTION := CW
           ;   Procedure DPHOME(:ERROR)
           ;   If ERROR = TRUE then
           ;                         MOTOR := DIGIT
           ;                         PHASE := DPHASE1
           ;                         DIRECTION := CCW
           ;                         Procedure DPHOME(:ERROR)
           ;                         If ERROR <>0 then ERROR := TYPE2ERROR
           ;                                           Procedure DPTSP(DIGIT)
           ;                                           end.
           ;                         else MOTOR := BANK
           ;                              Procedure PTNCHK(:ERROR)
           ;                              Procedure DPTSP(DIGIT)
           ;                              If ERROR <> 0 then ERROR := TYPE2ERROR
           ;                              end
           ;End.
           ;
           ;
           ;
17E7 2E 00     DALIGN:   MVI      L,00
17E9 16 33          MVI      D,33H
17EB 1E 00          MVI      E,00H
17ED CD 86 19       CALL     DPHOME
17F0 CA FF 17       JZ       SEKP11
           ;
           ;
           ;
           ;
           ;
17F3 2E 01     SEKP09:   MVI      L,01
17F5 16 33          MVI      D,33H
17F7 1E 00          MVI      E,00H
17F9 CD 86 19       CALL     DPHOME
17FC C2 0C 18       JNZ      ERSET
           ;
           ;
17FF 1E 01     SEKP11:   MVI      E,01H
1801 CD 2A 19       CALL     PTNCHK
1804 F5             PUSH     PSW
1805 1E 00          MVI      E,00
1807 CD B5 17       CALL     DPTSP
180A F1             POP      PSW
180B C8             RZ                    ;No Error condition
           ;        MVI      A,01
           ;        RET                   ;Type 1 Error set
180C CD B5 17  ERSET:    CALL     DPTSP
180F 3E 02          MVI      A,02         ;Type 2 error set
1811 C9             RET
           ;
```

```
                 ;
                 ;:
                 ;Procedure BALIGN
                 ;Objective:        this segment makes an attempt to align the bank motors to
                 ;           a legitimate home position.
                 ;
                 ;Level.
                 ;
                 ;BALIGN:
                 ;   MOTOR := BANK
                 ;   PHASE := DPHASE1
                 ;   DIRECTION := CW
                 ;   Procedure DPHOME(:ERROR)
                 ;   If ERROR = TRUE then
                 ;                        MOTOR := BANK
                 ;                        PHASE := DPHASE1
                 ;                        DIRECTION := CCW
                 ;                        Procedure DPHOME(:ERROR)
                 ;                        If ERROR <>0 then ERROR := TYPE2ERROR
                 ;                                          Procedure DPTSP(BANK)
                 ;                                          end.
                 ;                        else MOTOR := DIGIT
                 ;                             Procedure PTNCHK(:ERROR)
                 ;                             Procedure DPTSP(BANK)
                 ;                             If ERROR <> 0 then ERROR := TYPE2ERROR
                 ;                             end
                 ;End.
                 ;
                 ;
                 ;
                 ;
1812             BALIGN:
1812 2E 00           MVI     L,00
1814 16 33       SEKP17:     MVI     D,33H
1816 1E 01           MVI     E,01H
1818 CD 86 19        CALL    DPHOME
181B C2 31 18        JNZ     SEKP14
181E 1E 00       SEKP13:     MVI     E,00
1820 CD 2A 19        CALL    PTNCHK
1823 F5              PUSH    PSW
1824 1E 01           MVI     E,01
1826 CD B5 17        CALL    DPTSP
1829 F1              POP     PSW
182A C8              RZ                      ;No error condition
                 ;   MVI     A,01
                 ;   RET                     ;Type 1 error set
                 ;
                 ;
182B CD B5 17 BERSET:        CALL    DPTSP
182E 3E 02           MVI     A,02            ;       type 2 error set
1830 C9              RET
                 ;
                 ;
                 ;
                 ;
1831 2E 01       SEKP14:     MVI     L,01
1833 16 33           MVI     D,33H
1835 1E 01           MVI     E,01H
1837 CD 86 19        CALL    DPHOME
183A C2 2B 18        JNZ     BERSET
                 ;
                 ;
183D C3 1E 18        JMP     SEKP13
                 ;
                 ;
                 ;
                 ;
```

```
                ;
                ;
                ;
                ; Accumulator contains the last sucessfully attained
                ;digit sensor readings
                ;this sensor reading is compared with the new sensor readings to
                ;determine the direction of POHOME
                ;drive
                ;
                ;
1840 47         SELDRN:   MOV     B,A
1841 3A 00 68       LDA   PORT2A
1844 E6 03          ANI   DCTMSK
1846 2E 00          MVI   L,00
1848 A8             XRA   B              ;CLEARS CARRY
1849 1F             RAR
184A D2 4E 18       JNC   SEKP08
184D 2C             INR   L
184E C9         SEKP08:   RET
                ;
184F 16 88      MOPEN:    MVI     D,088H
1851 79         MOP05:    MOV     A,C
1852 B7             ORA   A
1853 7A             MOV   A,D
1854 FA 68 18       JM    MOP01
1857 07             RLC
1858 0D             DCR   C
1859 CA 6D 18       JZ    MOP10
185C 57         MOP02:    MOV     D,A
185D E6 0F          ANI   0FH
185F 32 02 70       STA   PORTB
1862 CD A3 17       CALL  DEL6M
1865 C3 51 18       JMP   MOP05
1868 0F         MOP01:    RRC
1869 0C             INR   C
186A C2 5C 18       JNZ   MOP02
186D CD A9 17   MOP10:    CALL    DEL30M
1870 C9             RET
                ;
                ;
                ;
                ;
1871 0E F4      SEKTRP:   MVI     C,-12D
1873 CD 4F 18       CALL  MOPEN
1876 0E 0C          MVI   C,12D
1878 CD 4F 18       CALL  MOPEN
187B C9             RET
                ;
187C
                ;         THIS SEGMENT CONTAINS THE PROCEDURES USED IN STEPPER MOTOR
                ;         CONTROL OF THE SELECTION AND TRIP MECHANISMS.
                ;
                ;
                ;         PROCEDURE MVTRIP
                ;
                ;
                ;         THIS PROCEDURE MOVES THE DIGIT MOTOR FROM THE LOCKED POSITION
                ;         TO THE TRIP POSITION OF THE TRIP SHAFT.
                ;         ON DETECTION OF AN ERROR IN THE PROCEDURE, A FATAL ERROR
                ;         ROUTINE IS INVOKED . UPON EXIT  FROM THE FATAL ERROR ROUTINE
                ;         THE ZERO FLAG OF THE PROCESSOR STATUS WORD IS RESET TO ZERO
                ;         IF A FATAL ERROR HAS OCCURED.THE ACCUMULATOR WILL HAVE THE ERRO;
                ;
                ;
187C CD 3F 15   MVTRIP:   CALL    LEDON
187F 21 03 10   MVTR05:   LXI     H,1003H          :# OF RE TRIES
1882 1E 00          MVI   E,00              ;DIGIT MOTOR SELECTED
```

```
1884 0E FE        MVI     C,-2                    ;COUNTER CLOCKWISE 2 STEPS
1886 CD 03 14     CALL    MOVCLS
1889 CD 4A 15     CALL    LEDOFF                  ;
188C CD BC 18     CALL    MODLN                   ;
188F CD B0 18     CALL    ERRHDR
1892 C4 B5 18     CNZ     EXTERR
1895 C9           RET                             ;
                ;
                ;
                ;
                ;
                ;************************************************************************
                ;
                ;
                ;   PROCEDURE MVLOCK
                ;
                ;
                ;   THIS PROCEDURE MOVES THE DIGIT MOTOR FROM THE TRIP POSITION TO THE
                ;   LOCK POSITION OF THE TRIP SHAFT. ON DETECTION OF AN ERROR ,THE FATAL E
                ;
1896 CD 3F 15 MVLOCK:     CALL    LEDON
1899 21 03 08 MVL005:     LXI     H,803H                  ;RE TRIES
189C 1E 00        MVI     E,00                    ;DIGIT MOTOR
189E 0E 02        MVI     C,2H                    ;CLOCKWISE 2 STEP
18A0 CD 03 14     CALL    MOVCLS                  ;
18A3 CD 4A 15     CALL    LEDOFF
18A6 CD BC 18     CALL    MODLN                   ;
18A9 CD B0 18     CALL    ERRHDR
18AC C4 B5 18     CNZ     EXTERR                  ;
18AF C9           RET
                                  ;
                ;
                ;
                ;
                ;************************************************************************
                ;
                                                  ;THIS PROCEDURE ASSUMES THAT THE
                ;
                ;
                ;
                ;************************************************************************
                ;
                ;
                ;           ERRHDR  ROUTINE
                ;           THIS ROUTINE IS CALLED ON DETECTION OF AN ERROR IN
                ;           THE MOTOR MOVE ROUTINES.THE ZERO FLAG AND THE
                ;           ACCUMULATOR RETURN THE FLAG INDICATION AND ERROR CODE
                ;
                ;
18B0            ERRHDR:
18B0 3A 38 74 ERRH05:     LDA     ERROR                   ;
18B3 B7           ORA     A                       ;SETTING FLAGS
18B4 C9           RET                             ;
                ;
                ;
                ;************************************************************************
                ;
                ;
                ;EXTERR ROUTINE
                ;   This segment creates  a BCD coded error code from the
                ;   error storage location .  Before converting to the BCD pattern
                ;   30D is added to the error value from motor move routines.
                ;   this routine is called upon only when an Error is detected by
                ;   the errhdr routine.
18B5            EXTERR:
18B5 3A 38 74     LDA     ERROR   ;
18B8 C6 1E        ADI     30D
```

```
18BA 27         DAA            ;
18BB C9         RET            ;
               ;
               ;
               ;
               ;***********************************************************************
               ;MODLN routine
               ;
               ;
               ;   This routine masks off the bank home position hold and provides
               ;the digit motor hold pattern to the interface for modulation purpose.
               ;
18BC           MODLN:
18BC 3A 02 70      LDA     PORTB
18BF E6 0F         ANI     0FH
18C1 32 02 70      STA     PORTB
18C4 C9            RET
               ;
               ;
               ;
               ;
               ;THIS ROUTINE PLACES THE MOTOR IN TO THE APPROPRIATE HOME
               ;POSITION WHEN AN ERROR OCCURS ON SEEK
               ;THIS ROUTINE MOVES THE MOTORS TWO STEPS AT A TIME
               ;DEPENDING ON THE SENSOR READINGS THE MOTOR MOVEMENT DIRECTION IS DETERM
               ;THIS ROUTINE TRANSFORMS THE THE LAST PATTERN OUTPUT FROM DMOVE ROUTINE
               ;BREGISTER WILL BE LOADED BY THE EXPECTED ENCODER COUNT
               ;C REGISTER WILL BE LOADED BY THE MOTOR STEP COUNT
               ;MOTOR STEP COUNT WILL BE DETERMINED BY THE ENCODER READINGS
               ;BEFORE REACHING THE ERROR CONDITION THE MOTOR WAS BEING DRIVEN IN
               ;THE CW DIRECTION
               ;
               ;
18C5           POHOME:
18C5 CD 79 19 PLHOME:    CALL    SENSIN
18C8 CA D4 18      JZ      PLH12          ;SENSOR (00)
18CB FE 03         CPI     03H
18CD CA D9 18      JZ      PLH14          ;SENSOR (00,11)
18D0 CD FD 18      CALL    PH0110         ;SENSOR (01,10)
18D3 C9            RET
               ;
               ;
18D4 16 11     PLH12:     MVI     D,11H
18D6 C3 DB 18      JMP     PLH10          ;check phases/
               ;
18D9 16 44     PLH14:     MVI     D,44H
18DB CD DF 18 PLH10:      CALL    PH0011         ;
18DE C9            RET                    ;
               ;
               ;
               ;Procedure PH0011
               ;Objective: This segments positions the motors to a legitimate home posi
               ;           when the sensor patterns are , to start with , at 00 or 11, (the
               ;           sensors are either both pen or closed)
               ;PH0011:DIRECTION := CW
               ;   MSTEP:=-4
               ;   ECOUNT := -1
               ;   Procedure ENDMOV(NEXTPTN,MOTOR,DIRECTION,MSTEP,ECOUNT:ERROR)
               ;   If ERROR <> 0  then NEXTPTN := RRC(NEXTPTN)
               ;                       NEXTPTN := RRC(NEXTPTN)
               ;                       DIRECTION := CCW
               ;                       MSTEP       :=2
               ;                       ECOUNT:=    1
               ;                       Procedure ENDMOV(NEXTPTN,MOTOR,DIRECTION,MSTEP,ECOUNT:ERROR)
               ;   Procedure PTNCHK(MOTOR:ERROR)
               ;   end
               ;End.
```

```
                         ;
                         ;
                         ;
18DF                     PH0011:
18DF 0E FC                  MVI      C,-4H              ;4STEPS CW
18E1 06 FF                  MVI      B,-1H
18E3 CD C8 15               CALL     ENDMOV             ;POSITION TO 2STEPS BEFORE HOME
                                                        ;1ENCODER STEP AWAY FROM HOME
18E6 3A 38 74               LDA      ERROR
18E9 FE 07                  CPI      07H
18EB CA F9 18               JZ       PH05               ;EXIT 1. ERROR FROM TRYING TO MOVE
                                                        ;TO MOVE CW (TOWARDS LOCK FROM A
                                                        ;SENSOR (00,11) AFTER IDENTIFYING
                                                        ;A BLOCK
18EE 7A                     MOV      A,D
18EF 0F                     RRC
18F0 0F                     RRC                         ;MOTOR PATTERN FOR
18F1 57                     MOV      D,A
18F2 0E 02                  MVI      C,02H
18F4 06 01                  MVI      B,01
18F6 CD C8 15               CALL     ENDMOV
                                                        ;TWO MSTEPS TOWARDS SENSORS (00,11)
                                                        ;IN CCW DIRECTION
18F9 CD 2A 19 PH05:                  CALL     PTNCHK
18FC C9                     RET
                         ;
                         ;
                         ;
                         ;Procedure PH0110
                         ;Objective :        This segment positions the motors to a legitimate home
                         ;              position wherein there is agreement between the phase applied
                         ;              to the motor and the sensor readings observed.  Four single
                         ;              step attempts will be made to position the motor to the
                         ;              home position.  If a home position is reached before all
                         ;              four attempts are completed, an exit will be done from this
                         ;              segment.  The error will be flagged by the pattern check segment.
                         ;
                         ;PH0110:       If DIRECTION = CW then
                         ;                                    NEXTPTN := RLC (NEXTPTN)
                         ;                                    NEXTPTN := RLC (NEXTPTN)
                         ;                                    MSTEP:= -1
                         ;                                    ECOUNT := -1
                         ;              else MSTEP:= 1
                         ;                   ECOUNT := 1
                         ;              For TRIES = 4 to 0 by 1 do
                         ;                      Procedure ENDMOV(NEXTPTN,MOTOR,DIRECTION,MSTEP,ECOUNT:ERROR)
                         ;                      Procedure PTNCHK(MOTOR:ERROR)
                         ;                      If ERROR = TRUE then TRIRES:= TRIES-1
                         ;                      else end
                         ;              End
                         ;End.
                         ;
                         ;
                         ;
                         ;
18FD                     PH0110:
                         ;
                         ;
18FD 7D                     MOV      A,L                ;SENSOR (01)
18FE FE 01                  CPI      01H
1900 C2 0D 19               JNZ      PLH57              ;DIRECTION(CW,CCW)
                         ;
                         ;
1903 7A                  PLH52:      MOV      A,D                ;DIGIT SEEKING 00----------
1904 07                     RLC
1905 07                     RLC
1906 0E FF                  MVI      C,-1H
```

```
1908 06 FF          MVI       B,-1H
190A C3 12 19       JMP       PLH65
                   ;
                   ;
190D 7A            PLH57:     MOV     A,D
190E 0E 01          MVI       C,01H
1910 06 01          MVI       B,01H
1912 57            PLH65:     MOV     D,A              ;PATTERN IN D REGISTER
1913 2E 04          MVI       L,04H
1915 C5            PLH66:     PUSH    B
1916 CD C8 15      PLH67:     CALL    ENDMOV
1919 C1            PLH68:     POP     B
191A CD 2A 19       CALL      PTNCHK
191D C8             RZ                          ;EXIT 4 .NORMAL EXIT
                                                ;STILL ERRORS COULD EXIST
                                                ;DUE TO PTNCHK RESULTS
191E 7A            PLH70:     MOV     A,D
191F 2D             DCR       L
1920 C2 15 19       JNZ       PLH66             ;2 + 2 MSTEPS OVER?
                                                ;AGAINST A STOP
1923 3E 09         PLH83:     MVI     A,09H
1925 32 38 74       STA       ERROR
1928 B7             ORA       A
1929 C9             RET                         ;EXIT 6. THERE IS NO 00/11
                                                ; IN THIE DIRECTION OF MOVEMENT
                   ;
                   ;
                   ;
                   ;
                   ;
                   ;
                   ;
                   ;
                   ;**********************************************************************
                   ;
                   ;
                   ;
                   ;PROCEDURE  PTNCHK( MOTOR:ERROR)
                   ;
                   ;Input (PORTB,MOTPTN)
                   ;    IF MOTOR = BANK then MOTPTN:=MOTPTN.MSNMSK
                   ;                         MOTPTN:= 4*RRC(MOTPTN)
                   ;
                   ;                              IF BNKPAT =( 01,02) THEN ERROR:=8; END.
                   ;                         IF BNKPAT = 00 AND MOTPTN = (08,05) THEN ERROR :=0
                   ;                                                                      END.
                   ;                         IF MOTPTN (02,06) THEN ERROR := 0
                   ;                                                ELSE ERROR:=8
                   ;                                                     END.
                   ;
                   ;
                   ;                         ENDIF
                   ;         ELSE        MOTPTN:= MOTPTN.LSNMSK
                   ;                 IF DGTPAT =(01,02)THEN ERROR:=8;    END.
                   ;            IF DGTPAT = 0 AND MOTPTN = (08,09) THEN ERROR := 0
                   ;                                                    END.
                   ;            IF MOTPATN =(02,06) THEN ERROR:=0       ;END.
                   ;END                                                    ELSE ERROR := 8
                   ;                                                    END
                   ;;
                   ;
                   ;
                   ;    E REGISTER  ......       MOTOR(BANK,DIGIT)
                   ;    ERROR   CODE.....        8       FAILURE TO  ARRIVE AT HOME
                   ;
192A 7B            PTNCHK:    MOV     A,E                        ;MOTOR (BANK,DIGIT)
192B B7             ORA       A                                  ;MOTOR
```

```
192C 3A 02 70        LDA     PORTB
192F CA 68 19        JZ      PTNC10
                ;
                ;
1932 E6 F0           ANI     0F0H
1934 0F              RRC
1935 0F              RRC
1936 0F              RRC
1937 0F              RRC
1938 F5              PUSH    PSW
1939 3A 39 74        LDA     BNKPAT
193C FE 01      PTNC15:      CPI     01
193E CA 71 19        JZ      PTNC20
                ;
                ;
                ;
1941 FE 02           CPI     02H
1943 CA 71 19        JZ      PTNC20
1946 B7              ORA     A
1947 CA 5A 19        JZ      PTNC30
                ;
                ;
                ;
194A F1              POP     PSW
194B FE 02           CPI     02H
194D CA 55 19        JZ      PTNC40
1950 FE 06           CPI     06H
1952 C2 72 19        JNZ     PTNC25
                ;
                ;
                ;
1955 AF         PTNC40:      XRA     A
1956 32 38 74        STA     ERROR
1959 C9              RET
                ;
                ;
                ;
195A F1         PTNC30:      POP     PSW
195B FE 08           CPI     08H
195D CA 55 19        JZ      PTNC40
1960 FE 09           CPI     09H
1962 CA 55 19        JZ      PTNC40
1965 C3 72 19        JMP     PTNC25
                ;
                ;
                ;
1968 E6 0F      PTNC10:      ANI     0FH
196A F5              PUSH    PSW
196B 3A 3A 74        LDA     DGTPAT
196E C3 3C 19        JMP     PTNC15
                ;
                ;
1971 F1         PTNC20:      POP     PSW
1972 3E 08      PTNC25:      MVI     A,08H                 ;ERROR :=8
1974 32 38 74        STA     ERROR
1977 B7              ORA     A                     ;NOT HOME ERROR
1978 C9              RET                           ;EXIT
                ;;
                ;
                ;
1979            SENSIN:
1979 7B              MOV     A,E           ;CHECK MOTOR BANK/DIGIT
197A B7              ORA     A
197B 3A 00 68        LDA     PORT2A
197E CA 83 19        JZ      PLH05         ;MOTOR (BANK,DIGIT)
1981 0F              RRC
1982 0F              RRC
```

```
1983 E6 03     PLH05:      ANI     DGTMSK
1985 C9            RET
               ;
               ;
               ;
1986 CD 79 19  DPHOME:     CALL    SENSIN
1989 CA 91 19      JZ      DPH1
198C FE 03         CPI     03H
198E C2 95 19      JNZ     DPH5
1991 CD DF 18  DPH1:       CALL    PH0011
1994 C9            RET
               ;
               ;
               ;
1995 CD FD 18  DPH5:       CALL    PH0110
1998 C9            RET
               ;
               ; (***************************************************************)
               ;
               ; PROCEDURE READ_ENCODERS;
               ;
               ;Objective: Read the encoder status and store the information in ram
               ;           storage and update the terminal count.  Flag errors of
               ;           1.  digit motor moved on a bank motor move
               ;           2.  digit motor moved too fast
               ;           3.  bank motor moved on a digit motor move
               ;           4.  bank motor moved too fast
               ;
               ;Initialisation requirements:
               ;           Initial patterns of bank and digit sensors be stored in the
               ;           respective locations before this module is invoked, during
               ;           power up activities.
               ;Level:
               ;           Calls ENCMOV, DEL300 and DEL75 modules.
               ;           Delay routines are used for adjusting the stepper motor rate.
               ;
               ;
               ;Procedure READENC(DGTPAT,BNKPAT,NUMREAD,MOTOR,ENCCOUNT: ENCCOUNT,ERROR)
               ;Do While (NUMREAD greater than 0 and ERROR  equal to 0
               ;   NUMREAD := NUMREAD - 1
               ;   Input (PORT.SENSOR,SENSPTN)
               ;   SENSPTN1 := SENSPTN
               ;   SENSPTN := SENSPTN.DSNSRMASK
               ;   SENSPTN1 := (SENSPTN.BSNSRMASK)/4
               ;   Case MOTOR = BANK
               ;           If SENSPTN = (DGTPAT) then
               ;                           Procedure ENCMOV(BNKPAT,SENSPTN1:COUNTINC)
               ;                           If COUNTINC = 2 then
               ;                                           ERROR:= 3
               ;                                           End Case
               ;                           If ENCCOUNT greater than 0 then
               ;                                           ENCCOUNT:= ENCCOUNT-COUNTINC
               ;                           else            ENCCOUNT:= ENCCOUNT+COUNTINC
               ;           else            ERROR:= 1       ;DIGIT ON BANK
               ;           End If
               ;
               ;       MOTOR = DIGIT
               ;           If SENSPTN1 = BNKPAT then
               ;                           Procedure ENCMOV(DGTPAT,SENSPTN:COUNTINC)
               ;                           If COUNTINC = 2 then
               ;                                           ERROR = 4
               ;                                           End Case
               ;                           If ENCCOUNT greater than 0 then
               ;                                           ENCCOUNT=ENCCOUNT-COUNTINC
               ;                           else            ENCCOUNT=ENCCOUNT+COUNTINC
               ;           else            ERROR:= 2
               ;           End If
```

```
                        ;       End Case
                        ;End Do
                        ;BNKPAT := SENSPTN1
                        ;DGTPAT := SENSPTN
                        ;End RENC.
                        ;
                        ;
                        ;
                        ; PARAM VAR (*C-REG*) COUNT : BYTE;
                        ;   (*E-REG*) MOTOR : MOTORS;
                        ;   (*L-REG*) NUM_READS : BYTE;
                        ;
                        ; VAR       (*A-REG*) COUNT_INC : BYTE;
                        ;   (*B-REG*) NEW_BANK_PAT : ENCODER_PATTERNS;
                        ;   (*D-REG*) NEW_DIGIT_PAT : ENCODER_PATTERNS;
                        ;
0001                    ERRR1       EQU     01H
0002                    ERROR2      EQU     02H
0003                    ERROR3      EQU     03H
0004                    ERROR4      EQU     04H
                        RENC:                       ; BEGIN
1999
1999 7D                 RENC05:     MOV     A,L     ; WHILE (NUM_READS > 0) AND (ERROR = NO_ERRORS) DO
199A B7                     ORA     A
199B C8                     RZ
199C 3A 38 74               LDA     ERROR
199F B7                     ORA     A
19A0 C0                     RNZ
                                            ;     BEGIN
19A1 2D                     DCR     L       ;     NUM_READS := NUM_READS - 1;
19A2 3A 00 68               LDA     PORT2AD ;     NEW_BANK_PAT := (PORTA AND 0CH) ROR 2;
19A5 E6 0C                  ANI     BNKMSK
19A7 0F                     RRC
19A8 0F                     RRC
19A9 47                     MOV     B,A
19AA 3A 00 68               LDA     PORT2AD ;     NEW_DIGIT_PAT := PORTA AND 03H;
19AD E6 03                  ANI     DGTMSK
19AF 57                     MOV     D,A
19B0 7B                     MOV     A,E     ;     CASE MOTOR OF
19B1 B7                     ORA     A
19B2 CA E6 19               JZ      RENC20
19B5 3A 3A 74               LDA     DGTPAT  ;        BANK:  IF NEW_DIGIT_PAT <> DIGIT_PAT THEN
19B8 BA                     CMP     D
19B9 CA C4 19               JZ      RENC10
19BC 3E 01                  MVI     A,ERRR1 ;                   ERROR := DIG_ON_BANK
19BE 32 38 74               STA     ERROR
19C1 C3 14 1A               JMP     RENC35
                        RENC10:                     ;           ELSE
                                            ;                   BEGIN
19C4 C5                     PUSH    B       ;                   COUNT_INC := ENCODER_
19C5 3A 39 74               LDA     BNKPAT  ;                       MOVE (NEW_BANK_PAT, BANK_PAT);
19C8 4F                     MOV     C,A
19C9 D5                     PUSH    D
19CA 58                     MOV     E,B
19CB E5                     PUSH    H
19CC CD AB 15               CALL    ENCMOV
19CF E1                     POP     H
19D0 D1                     POP     D
19D1 C1                     POP     B
19D2 FE 02                  CPI     2.      ;                   IF COUNT_INC = 2 THEN
19D4 C2 DF 19               JNZ     RENC15
19D7 3E 03                  MVI     A,ERROR3        ;                   ERROR := BANK_TOO_FAST
19D9 32 38 74               STA     ERROR
19DC C3 14 1A               JMP     RENC35
19DF 2F                 RENC15:     CMA             ;               ELSE COUNT := COUNT - COUNT_INC
19E0 3C                     INR     A
19E1 81                     ADD     C
```

```
19E2 4F             MOV     C,A
19E3 C3 14 1A       JMP     RENC35
                            ;                       END;
19E6 3A 39 74 RENC20:       LDA     BNKPAT  ;       DIGIT: IF NEW_BANK_PAT <> BANK_PAT THEN
19E9 B8             CMP     B
19EA CA F5 19       JZ      RENC25
19ED 3E 02          MVI     A,ERROR2        ;              ERROR := BANK_ON_DIG
                                            ;NOTE .ERROR CODE MASKED FOR DEMO.........
19EF 32 38 74       STA     ERROR
19F2 C3 14 1A       JMP     RENC35
 .                RENC25:                   ;              ELSE
                            ;                       BEGIN
19F5 C5             PUSH    B       ;               COUNT_INC := ENCODER_
19F6 3A 3A 74       LDA     DGTPAT  ;                   MOVE (NEW_DIGIT_PAT, DIGIT_PAT);
19F9 4F             MOV     C,A
19FA D5             PUSH    D
19FB 5A             MOV     E,D
19FC E5             PUSH    H
19FD CD AB 15       CALL    ENCMOV
1A00 E1             POP     H
1A01 D1             POP     D
1A02 C1             POP     B
1A03 FE 02          CPI     2.      ;               IF COUNT_INC = 2 THEN
1A05 C2 10 1A       JNZ     RENC30
1A08 3E 04          MVI     A,ERROR4;                   ERROR := DIG_TOO_FAST
1A0A 32 38 74       STA     ERROR
1A0D C3 14 1A       JMP     RENC35
1A10 2F           RENC30:   CMA             ;               ELSE COUNT := COUNT - COUNT_INC
1A11 3C             INR     A
1A12 81             ADD     C
1A13 4F             MOV     C,A
                            ;                       END;
                  RENC35:                   ;     END;
1A14 78             MOV     A,B     ;     BANK_PAT := NEW_BANK_PAT;
1A15 32 39 74       STA     BNKPAT
1A18 7A             MOV     A,D     ;     DIGIT_PAT := NEW_DIGIT_PAT;
1A19 32 3A 74       STA     DGTPAT
1A1C CD 55 15       CALL    DEL300  ;     DELAY (375)
1A1F CD 64 15       CALL    DEL75
1A22 C3 99 19       JMP     RENC05  ;     END
                            ; END;
                  ;
                  ; (*****************************************************************)
                  ;
                  ; PROCEDURE SET_CLOSED;
                  ;
                  ;
                  ; VAR       (*C-REG*) CUR_BANK_VAL : BYTE;
                  ;   (*E-REG*) INDEX : PRINT_BANKS;
                  ;
1A25              MVPOST:
1A25 CD 3F 15     SETCLS:     CALL    LEDON
1A28 CD 38 1A       CALL    CHPOST
1A2B CD 4A 15       CALL    LEDOFF
1A2E CD BC 18       CALL    MODLN
1A31 CD B0 18       CALL    ERRHDR
1A34 C4 B5 18       CNZ     EXTERR
1A37 C9             RET
                  ;
                  ;
                  ;Procedure MOVPOST
                  ;Objective
                  ;    sets the print wheels to a new postage value upon execution.
                  ;    updates the postage value upon a sucessfull completion of a
                  ;    new setting.
                  ;Level
                  ;  Calls GNIB, MOVCLS, ERRHDR
```

```
;Note:      What action is to be taken up on detection of an error is
;   determined solely by the invoking routine.
;
;INDEX1 := 0
;Do while INDEX1 <> 4
;   VALUE1 := GNIB(POSVAL,INDEX1:VALUE)
;   VALUE2 := GNIB(POSREQ,INDEX1:VALUE)
;   If VALUE1 = VALUE2 then INDEX1 := INDEX1+1; Continue Do
;   MOTOR := DIGIT
;   DIRECTION := CCW
;   RETRIES := 3
;   MCOUNT := 2
;   SPEED := 8 .................... CORRESPONDING TO 160 STEPS/SEC
;   Procedure MOVCLS( MOTOR,DIRECTION,MCOUNT,RETRIES,SPEED: ERROR)
;   Procedure ERRHDR( ERRORFLAG )
;   If ERRORFLAG = 0 then CURBNKVAL := 0
;                         BNKVAL(HOM) := 0
;                         INDEX := 0
;                         Do while INDEX <> 4
;                                 DELTA :=(GNIB (POSREQ,INDEX:VALUE)-
;                                        GNIB (POSVAL,INDEX:VALUE))
;                                 If DELTA <> 0 then
;                                     If INDEX >= 2 then
;                                         INDEX2:= INDEX - 1
;                                     else INDEX2:= INDEX-2
;                                     INDEX2 := COMPLMNT(INDEX2)
;                                     BNKVALINDEX := INDEX2 + 1
;                                     MOTOR := BANK
;                                     MCOUNT := BNKVALINDEX - CURBNKVAL
;                                     RETRIES := 3
;                                     SPEED := 08
;                                     Procedure MOVCLS(MOTOR,MCOUNT,-
;                                              -RETRIES,SPEED:ERROR)
;                                     Procedure ERRHDR(ERRFLAG)
;                                     If ERRFLAG = 0 then
;                                              MOTOR := DIGIT
;                                              RETRIES := 3
;                                              MCOUNT := DELTA
;                                              SPEED := 08
;                                              Procedure MOVCLS
;                                                     (MOTOR,RETRIES,
;                                                     MCOUNT,SPEED:ERROR)
;                                              ProcedureERRHDR(ERRFLAG))
;                                              If ERRFLAG<>0 then End
;                                              end if
;                                     end if
;                                 else INDEX := INDEX + 1
;
;                              End do
;                              MOTOR := BANK
;                              RETRIES := 3
;                              SPEED := 08
;                              MCOUNT := BNKVALHOM - CURMBNKVAL
;                              Procedure MOVCLS (MOTOR,SPEED,RETRIES,
;                                               MCOUNT:ERROR)
;                              Procedure ERRHDR(ERRFLAG)
;                              If ERRFLAG = 0 then
;                                        RETRIES := 3
;                                        MOTOR := DIGIT
;                                        MCOUNT := 2
;                                        SPEED := 08
;                                        Procedure MOVCLS(
;                                           MOTOR,MCOUNT,
;                                           SPEED,RETRIES:ERROR)
;                                        Procedure ERRHDR(EFLAG)
;                                        If ERRFLAG = 0 then
;                                                For Z=1 to 4 by 1
;
```

```
                 ;                                                        POSTVAL(Z)
                 ;                                                          := POSREQ(Z)
                 ;                                                        Z:= Z + 1
                 ;                                                     end for
                 ;                                               end if
                 ;                                  end
                 ;   end
                 ;End movpost
7421             PREG        EQU      7421H          ;POSTAGE VALUE LOCATION
7460             TWORK1      EQU      7460H          ;
7466             POSREQ      EQU      7466H          ;WORK1+((16-NBANKS)/2))
7421             POSVAL      EQU      PREG
                 ;
                 ;
                 ;
                 ;
                             ;
1A38 1E 00       CHPOST:     MVI      E,00.   ; IF POST_REQ = POST_VAL THEN RETURN;
1A3A 21 21 74    SETC05:     LXI      H,POSVAL
1A3D CD DB 1A       CALL     GNIB                ;
1A40 47             MOV      B,A                 ;
1A41 21 66 74       LXI      H,POSREQ            ;
1A44 CD DB 1A       CALL     GNIB                      ;
1A47 90             SUB      B                   ;
1A48 C2 54 1A       JNZ      SETC10              ;
1A4B 7B             MOV      A,E                 ;
1A4C 3C             INR      A                   ;
1A4D FE 04          CPI      04                  ;ALL BANKS CHECKED?
1A4F C8             RZ                           ;EXIT
1A50 5F             MOV      E,A                 ;
1A51 C3 3A 1A       JMP      SETC05              ;
                 ;
                 ;
1A54 0E 02       SETC10:     MVI      C,+2    ; MOVE_CLOSED (DIGIT_TRIES, DIGIT,
1A56 1E 00          MVI      E,00H   ;            DIGIT_VALUE (SET) - DIGIT_VALUE (LOCK));
1A58 21 03 08       LXI      H,803H
1A5B CD 03 14       CALL     MOVCLS
1A5E CD B0 18       CALL     ERRHDR          ;ERROR PROCESSING
1A61 C0             RNZ                      ;FATAL ERROR EXIT
1A62 4F             MOV      C,A     ; CUR_BANK_VAL := BANK_VALUE (HOME);
1A63 57             MOV      D,A     ; FOR INDEX := PENNIES TO TEN_DOLLARS DO
1A64 5F          SETC15:     MOV      E,A
1A65 21 21 74       LXI      H,POSVAL;    IF POST_REQ [INDEX] <> POST_VAL [INDEX] THEN
1A68 CD DB 1A       CALL     GNIB
1A6B 47             MOV      B,A
1A6C 21 66 74       LXI      H,POSREQ                  ;
1A6F CD DB 1A       CALL     GNIB                              ;
1A72 90             SUB      B
1A73 CA A5 1A       JZ       SETC25
1A76 F5             PUSH     PSW     ;         BEGIN
1A77 7B             MOV      A,E     ;         MOVE_CLOSED (BANK_TRIES, BANK,
1A78 FE 02          CPI      02H     ;                   BANK_VALUE (INDEX) - CUR_BANK_VAL;
1A7A D2 7E 1A       JNC      SETC20
1A7D 3D             DCR      A
1A7E 3D          SETC20:     DCR      A
                 ;  CMA
                 ;  INR      A
1A7F F5             PUSH     PSW
1A80 91             SUB      C
1A81 4F             MOV      C,A
1A82 D5             PUSH     D
1A83 1E 01          MVI      E,01H
1A85 21 03 08       LXI      H,803H
1A88 CD 03 14       CALL     MOVCLS
1A8B D1             POP      D
1A8C F1             POP      PSW     ;         CUR_BANK_VAL := BANK_VALUE (INDEX);
1A8D 4F             MOV      C,A
```

```
1A8E F1              POP     PSW
1A8F 6F              MOV     L,A
1A90 CD B0 18        CALL    ERRHDR        ;
1A93 C0              RNZ                   ;FATAL ERROR EXIT
1A94 C5              PUSH    B       ;       MOVE_CLOSED (DIGIT_TRIES, DIGIT,
1A95 4D              MOV     C,L     ;                POST_REQ [INDEX] - POST_VAL [INDEX];
1A96 D5              PUSH    D
1A97 1E 00           MVI     E,00H
1A99 21 03 08        LXI     H,803H
1A9C CD 03 14        CALL    MOVCLS
1A9F D1              POP     D
1AA0 C1              POP     B
1AA1 CD B0 18        CALL    ERRHDR        ;
1AA4 C0              RNZ                   ;FATAL ERROR EXIT
                                     ;       END;
1AA5 7B         SETC25:   MOV     A,E
1AA6 3C              INR     A
1AA7 FE 04           CPI     04H
1AA9 DA 64 1A        JC      SETC15
1AAC 79              MOV     A,C     ; MOVE_CLOSED (BANK_TRIES, BANK, BANK_VALUE (HOME)
1AAD 2F              CMA             ;              - CUR_BANK_VAL;
1AAE 3C              INR     A
1AAF 4F              MOV     C,A
1AB0 1E 01           MVI     E,01
1AB2 21 03 08        LXI     H,803H
1AB5 CD 03 14        CALL    MOVCLS
1AB8 CD B0 18        CALL    ERRHDR                       ;
1ABB C0              RNZ                                  ;FATAL ERROR EXIT
1ABC 0E FE           MVI     C,-2.   ; MOVE_CLOSED (DIGIT_TRIES, DIGIT, DIGIT_VALUE (LOCK)
1ABE 1E 00           MVI     E,00H   ;              - DIGIT_VALUE (SET));
1AC0 21 03 08        LXI     H,803H
1AC3 CD 03 14        CALL    MOVCLS
1AC6 CD B0 18        CALL    ERRHDR             ;
1AC9 C0              RNZ                   ;FATAL ERROR
1ACA 0E 02           MVI     C,2.    ; FOR INDEX := PENNIES TO TEN_DOLLARS DO
1ACC 11 66 74        LXI     D,POSREQ;     POST_VAL [INDEX] := POST_REQ [INDEX]
1ACF 21 21 74        LXI     H,POSVAL
1AD2 1A         SETC30:   LDAX    D
1AD3 77              MOV     M,A
1AD4 13              INX     D
1AD5 23              INX     H
1AD6 0D              DCR     C
1AD7 C2 D2 1A        JNZ     SETC30
1ADA C9              RET             ; END;
                ;
                ;
                ;
                ;
                ;
                ;GETNIB ROUTINE
                ;HLREGISTER HAS THE BASE ADDRESS:E REGISTER HAS THE BANK INDEX
                ;RETURNS THE INDEXED NIBBLE IN ACCUMULATOR
                ;
                ;
1ADB D5         GNIB:     PUSH    D               ;SAVE REGISTER DE
1ADC AF              XRA     A           ;SET CY = 0
1ADD 57              MOV     D,A                  ;SETTING FOR DAD OPERATION
1ADE 7B              MOV     A,E                  ;
1ADF 1F              RAR                          ;DIVIDE BY 2
1AE0 5F              MOV     E,A                  ;
1AE1 19              DAD     D                    ;ADDRESS GENERATION
1AE2 D1              POP     D                    ;
1AE3 7B              MOV     A,E                  ;MSB/LSB SELECTION
1AE4 E6 01           ANI     01H                  ;00,02,04ETC  &01,03,05....
1AE6 3E 0F           MVI     A,0FH                ;MASK FOR LSB
1AE8 C2 F3 1A        JNZ     GNI10                ;
                ;
```

```
                          ;
1AEB 3E F0            MVI    A,0F0H            ;MASK FOR MSB SELECTION
1AED A6               ANA    M                 ;
1AEE 0F               RRC                      ;
1AEF 0F               RRC                      ;
1AF0 0F               RRC                      ;
1AF1 0F               RRC                      ;
1AF2 C9               RET                      ;
                          ;
                          ;
1AF3 A6          GNI10:      ANA    M                 ;
1AF4 C9               RET                      ;
                          ;
                          ;
                          ;
1AF5
                          ;
1AF5                   END
M85 assembly errors =    0
```

CROSS REFERENCE

| LABEL | VALUE | REFERENCE | | | | | | | |
|---|---|---|---|---|---|---|---|---|---|
| ACCFMT | 008F | -375 | 7167 | | | | | | |
| ACCOD1 | 131B | -7105 | 7120 | | | | | | |
| ACCOD2 | 132A | 7110 | -7116 | | | | | | |
| ACCOD3 | 1330 | 7115 | -7121 | | | | | | |
| ACCOD4 | 1340 | 7132 | -7134 | | | | | | |
| ACCOD5 | 135A | 7160 | -7166 | | | | | | |
| ACCODE | 12EE | 3374 | -7042 | | | | | | |
| AMTBUF | 00E0 | -254 | 3107 | 4568 | 4756 | 4773 | 7274 | 7327 | 7401 |
| | | 7415 | 7435 | | | | | | |
| ASCCRC | 0040 | -101 | 2796 | 3845 | 4146 | | | | |
| ASCFMT | 0080 | -376 | 2605 | | | | | | |
| ASCREG | 0038 | -96 | 2451 | 2605 | 2778 | 2789 | 3839 | 4143 | |
| ASCSIZ | 0008 | -360 | 2451 | 2454 | 2473 | 2484 | 2484 | 2607 | 2775 |
| | | 2778 | 2789 | 3822 | 3839 | 4143 | | | |
| BADCRC | 0000 | -410 | 2427 | 4238 | 6754 | | | | |
| BADCYC | 0004 | -414 | 2881 | 2927 | 4292 | | | | |
| BADRAM | 000A | -421 | 1111 | | | | | | |
| BADSW | 0011 | -397 | | | | | | | |
| BALIGN | 1812 | 8312 | 8329 | -8651 | | | | | |
| BARF | 0017 | -399 | 3240 | | | | | | |
| BASES | 1673 | 8218 | -8231 | | | | | | |
| BASEAD | 17DC | 8510 | -8547 | | | | | | |
| BCDC | 000F | -7553 | 7578 | | | | | | |
| BCDS | 000C | -7552 | 7576 | | | | | | |
| BERSET | 182B | -8668 | 8679 | | | | | | |
| BINOC1 | 1364 | -7191 | 7206 | | | | | | |
| BINOC2 | 1366 | -7194 | 7202 | | | | | | |
| BINOCT | 135D | -7183 | | | | | | | |
| BKL50 | 1533 | 7790 | -7805 | | | | | | |
| BKLASH | 151B | 7721 | -7786 | | | | | | |
| BLKTMR | 0050 | -136 | 699 | | | | | | |
| BNKMSK | 000C | -7556 | 9193 | | | | | | |
| BNKPAT | 7439 | -210 | 7729 | 7885 | 8401 | 9036 | 9213 | 9233 | 9265 |
| BODC | 0003 | -7551 | 7574 | | | | | | |
| BODS | 0000 | -7550 | 7572 | | | | | | |
| BUFOVR | 0012 | -398 | 3685 | | | | | | |
| CDBUF | 0316 | -1435 | 1781 | 1839 | | | | | |
| CDBUF1 | 0320 | 1414 | -1443 | | | | | | |
| CDBUFC | 0306 | -1409 | 1777 | 1799 | 1870 | | | | |
| CDBUFD | 030F | -1424 | | | | | | | |
| CHPOST | 1A38 | 9284 | -9303 | | | | | | |
| CHRBKT | 0058 | -156 | 573 | 1553 | 5484 | | | | |

| | | | | | | | | | |
|---|---|---|---|---|---|---|---|---|---|
| CLKD01 | 0046 | 531 | -539 | | | | | | |
| CLKD02 | 0049 | 538 | -543 | | | | | | |
| CLKDEC | 0040 | -530 | 654 | | | | | | |
| CLKDST | 0043 | -537 | 634 | | | | | | |
| CLRBLK | 0E85 | 1234 | 3321 | 4081 | 4120 | 4660 | 4944 | 4973 | -5252 |
| | | 7045 | | | | | | | |
| CMDBUF | 00F0 | -259 | 3113 | 4538 | 7359 | | | | |
| CMDDSB | 05CD | -2272 | 3358 | | | | | | |
| CMDEND | 05F3 | -2317 | 3356 | | | | | | |
| CMPAR1 | 0E93 | -5283 | 5306 | | | | | | |
| CMPAR2 | 0EA9 | 5285 | 5298 | -5307 | | | | | |
| CMPARE | 0E8E | 3799 | 4189 | 4210 | 4678 | -5277 | | | |
| CONFIG | 062C | -2383 | 2583 | | | | | | |
| CONSU1 | 0647 | 2415 | -2425 | | | | | | |
| CONSU2 | 064C | 2424 | -2431 | | | | | | |
| CONSUM | 063A | -2410 | 2565 | 4164 | 7049 | | | | |
| CRC | 0EB1 | 1282 | 2487 | 2792 | 2815 | 3842 | 3850 | 4227 | -5334 |
| | | 7126 | 7236 | 7446 | | | | | |
| CRC1 | 0EB8 | -5341 | 5350 | | | | | | |
| CRCNI1 | 0ECD | -5379 | 5394 | | | | | | |
| CRCNI2 | 0ED6 | 5388 | -5390 | | | | | | |
| CRCNIB | 0EC6 | 5345 | -5367 | 6295 | 6737 | 6985 | | | |
| CSMFMT | 0080 | -377 | 2607 | | | | | | |
| CSTEP0 | 1660 | 8207 | -8213 | | | | | | |
| CTLBKT | 0056 | -151 | 574 | 1503 | 3543 | 5485 | | | |
| CTLCRC | 0010 | -31 | 2422 | 3837 | | | | | |
| CTLREG | 7000 | -324 | 899 | 961 | 1087 | | | | |
| CTLSU1 | 065B | 2462 | -2465 | | | | | | |
| CTLSUM | 064E | 2412 | -2449 | 3833 | | | | | |
| CURBKT | 005A | -161 | 1550 | 1967 | | | | | |
| DALIGN | 17E7 | 8296 | 8322 | 8345 | -8590 | | | | |
| DATA1 | 6300 | -325 | 330 | 4288 | | | | | |
| DBCTR | 005C | -166 | 565 | 1190 | | | | | |
| DBLAN1 | 0EEF | -5433 | 5462 | | | | | | |
| DBLAN2 | 0EEF | -5434 | 5438 | | | | | | |
| DBLANK | 0EDE | 1063 | 1494 | 1962 | 2922 | -5411 | 6147 | | |
| DBLH01 | 068D | -2531 | 3386 | | | | | | |
| DBLH02 | 06A6 | 2518 | -2551 | | | | | | |
| DBLH03 | 06C5 | 2564 | -2576 | | | | | | |
| DBLH04 | 06E2 | 2516 | -2598 | | | | | | |
| DBLH05 | 06E3 | 2521 | 2532 | 2537 | 2554 | 2559 | 2568 | 2578 | -2601 |
| DBLHDR | 0671 | -2512 | 3390 | | | | | | |
| DBOUN1 | 005D | 568 | -575 | | | | | | |
| DBOUNC | 004C | -562 | 733 | | | | | | |
| DBUF | 0080 | -219 | 1412 | 1439 | 1442 | 1653 | 1719 | 1803 | 1803 |
| | | 1879 | 1904 | 1910 | 1933 | 2050 | 2056 | 2168 | 2182 |
| | | 2186 | 2217 | 3642 | 5039 | 5050 | 5075 | 5087 | |
| DBVAL | 0002 | -342 | 580 | | | | | | |
| DECAD1 | 06FE | -2633 | 2654 | | | | | | |
| DECADD | 06FB | 2476 | -2624 | 2781 | 2829 | 7430 | | | |
| DECCOM | 070C | 2636 | -2675 | 2736 | | | | | |
| DECERR | 0720 | 2629 | -2704 | 2729 | | | | | |
| DECSU1 | 0731 | -2733 | 2757 | | | | | | |
| DECSUB | 072B | -2724 | 2804 | | | | | | |
| DEFDCM | 006C | -201 | 1164 | 3906 | | | | | |
| DEL1 | 1567 | -7855 | 7856 | | | | | | |
| DEL300 | 1555 | -7843 | 8500 | 9268 | | | | | |
| DEL30M | 17A9 | 7801 | 7804 | 7876 | 8201 | 8204 | 8310 | 8340 | -8498 |
| | | 8532 | 8726 | | | | | | |
| DEL6M | 17A3 | -8492 | 8721 | | | | | | |
| DEL75 | 1564 | 7845 | 7846 | 7847 | 7848 | -7853 | 7867 | 9269 | |
| DELM1 | 17AC | 8494 | -8500 | 8502 | | | | | |
| DFLUSH | 0EF6 | 737 | 5417 | -5454 | | | | | |
| DGTMSK | 0003 | -7555 | 7616 | 7870 | 7872 | 7879 | 7884 | 8700 | 9094 |
| | | 9198 | | | | | | | |
| DGTPAT | 743A | -211 | 7734 | 7880 | 8371 | 8423 | 9074 | 9203 | 9244 |
| | | 9267 | | | | | | | |

| | | | | | | | | | |
|---|---|---|---|---|---|---|---|---|---|
| DIAFMT | 005F | -378 | 2604 | | | | | | |
| DIEDCM | 006A | -196 | 1161 | 3910 | 4790 | 4867 | 4936 | 7326 | |
| DIMAGE | 0000 | -265 | 776 | 1462 | 1633 | 1649 | 1688 | 1847 | 1849 |
| | | 1850 | 2179 | 2243 | | | | | |
| DISAB1 | 05D5 | 2276 | -2282 | | | | | | |
| DISAB2 | 05EF | 2292 | -2300 | | | | | | |
| DISABL | 05D3 | -2278 | 4182 | | | | | | |
| DISP01 | 0072 | 607 | -609 | | | | | | |
| DISP02 | 0072 | 605 | -610 | | | | | | |
| DISP03 | 007D | -620 | 658 | | | | | | |
| DISP04 | 007F | -623 | 642 | | | | | | |
| DISPLY | 0062 | -596 | 738 | | | | | | |
| DOACCT | 0744 | 1018 | -2773 | 2964 | | | | | |
| DOSTAT | 0778 | -2850 | 3509 | | | | | | |
| DOTR01 | 07D9 | -2973 | 2983 | | | | | | |
| DOTR02 | 07ED | 2978 | -2994 | | | | | | |
| DOTR03 | 07F7 | -3008 | 3018 | | | | | | |
| DOTR04 | 080D | 3013 | -3030 | | | | | | |
| DOTR05 | 080F | 3026 | -3036 | | | | | | |
| DOTR06 | 0811 | -3040 | 3310 | | | | | | |
| DOTRIP | 07A5 | -2921 | 3220 | 3584 | | | | | |
| DPH1 | 1991 | 9100 | -9103 | | | | | | |
| DPH5 | 1995 | 9102 | -9108 | | | | | | |
| DPHOME | 1986 | 8593 | 8603 | 8655 | 8678 | -9099 | | | |
| DPTS05 | 17D4 | 8515 | -8537 | | | | | | |
| DPTS10 | 17C7 | -8523 | 8540 | | | | | | |
| DPTSP | 17B5 | -8510 | 8611 | 8616 | 8661 | 8668 | | | |
| DSBKBD | 0F02 | 3370 | -5476 | | | | | | |
| DSCCRC | 0036 | -91 | 1286 | 2819 | 3854 | 4156 | 7240 | 7450 | |
| DSCFMT | 0070 | -379 | 2606 | | | | | | |
| DSCRDG | 002F | -86 | 1274 | 2466 | 2471 | 2606 | 2801 | 2812 | 3847 |
| | | 4153 | 4206 | 7071 | 7231 | 7416 | 7434 | | |
| DSCSIZ | 0007 | -341 | 1274 | 2471 | 2473 | 2798 | 2801 | 2812 | 3822 |
| | | 3847 | 4089 | 4123 | 4153 | 4209 | 4556 | 7230 | 7416 |
| | | 7417 | 7417 | 7435 | 7436 | | | | |
| DSPCHR | 0008 | -349 | 1884 | 1891 | 2239 | | | | |
| DSPTMR | 0052 | -141 | 704 | 1515 | 1544 | 1853 | 2254 | | |
| DSPVAL | 0007 | -343 | 1543 | 1852 | 2253 | | | | |
| EJEC | 0000 | -473 | | | | | | | |
| ENABL1 | 05FC | 2321 | -2327 | | | | | | |
| ENABL2 | 0627 | 2355 | -2362 | | | | | | |
| ENABL3 | 0627 | 2342 | -2363 | | | | | | |
| ENABL4 | 0627 | 2337 | -2364 | | | | | | |
| ENABLE | 05F9 | -2323 | 4196 | | | | | | |
| ENAKBD | 0F14 | 3368 | -5500 | | | | | | |
| ENCMOV | 15AB | -7913 | 9218 | 9249 | | | | | |
| ENCT | 15BB | 7921 | -7925 | | | | | | |
| ENDENT | 0819 | -3062 | 3378 | | | | | | |
| ENDM05 | 15CC | -7971 | 8024 | | | | | | |
| ENDM20 | 15E0 | 7974 | -7987 | | | | | | |
| ENDM25 | 15EB | 7984 | -7995 | | | | | | |
| ENDM30 | 15F9 | 7999 | -8006 | | | | | | |
| ENDM35 | 15FB | 8003 | -8010 | | | | | | |
| ENDM40 | 160F | -8027 | | | | | | | |
| ENDMOV | 15C8 | -7969 | 8898 | 8912 | 8969 | | | | |
| ENTAMT | 082E | -3106 | 3464 | | | | | | |
| ENTCM1 | 0839 | 3110 | -3116 | | | | | | |
| ENTCMB | 0835 | -3112 | 3468 | | | | | | |
| ENTSER | 0848 | -3146 | 3360 | | | | | | |
| EREXIT | 165A | 8195 | -8208 | | | | | | |
| ERRCNT | 0016 | -51 | 3254 | 3831 | | | | | |
| ERRCOD | 0014 | -46 | 3246 | 3829 | | | | | |
| ERRH05 | 18B0 | -8808 | | | | | | | |
| ERRHDR | 18B0 | 8072 | 8417 | 8446 | 8464 | 8479 | 8487 | 8762 | 8785 |
| | | -8807 | 9287 | 9404 | 9436 | 9446 | 9460 | 9466 | |
| ERROR | 7438 | -209 | 7567 | 7591 | 7679 | 7723 | 7741 | 7748 | 7895 |
| | | 7970 | 8043 | 8209 | 8377 | 8396 | 8429 | 8808 | 8823 |

| | | | | | | | | | |
|---|---|---|---|---|---|---|---|---|---|
| | | 8900 | 8980 | 9058 | 9080 | 9187 | 9207 | 9225 | 9238 |
| | | 9256 | | | | | | | |
| ERROR2 | 0002 | -9179 | 9236 | | | | | | |
| ERROR3 | 0003 | -9180 | 9224 | | | | | | |
| ERROR4 | 0004 | -9181 | 9255 | | | | | | |
| ERROR5 | 0005 | -7562 | 7740 | | | | | | |
| ERROR6 | 0006 | -7563 | 7747 | | | | | | |
| ERRR1 | 0001 | -9178 | 9206 | | | | | | |
| ERRST | 0013 | -41 | 2604 | | | | | | |
| ERSET | 180C | 8604 | -8616 | | | | | | |
| EXTERR | 18B5 | 8073 | 8763 | 8786 | -8822 | 9288 | | | |
| EXTSER | 0852 | -3166 | 3362 | | | | | | |
| EXTTRP | 0860 | -3190 | 3364 | | | | | | |
| FATE01 | 089E | 3245 | -3260 | | | | | | |
| FATERR | 0880 | 1041 | 1220 | 1242 | 2706 | 2953 | 2988 | 3002 | -3241 |
| | | 3330 | 3603 | 3638 | 4707 | 6205 | | | |
| FATINT | 087E | 502 | 506 | -3237 | | | | | |
| FATRST | 0003 | -413 | 1270 | 7252 | | | | | |
| FILDI1 | 0327 | -1464 | 1463 | | | | | | |
| FILDIM | 0322 | 1145 | -1459 | 1672 | 1842 | 2159 | | | |
| FILN01 | 0F26 | 5258 | -5527 | | | | | | |
| FILN02 | 0F27 | -5531 | 5541 | | | | | | |
| FILN03 | 0F32 | 5533 | -5542 | | | | | | |
| FILNIB | 0F24 | 1140 | 1212 | 1229 | 1278 | 1326 | 3825 | 4224 | -5524 |
| | | 7232 | | | | | | | |
| FINTR1 | 08AA | -3287 | 3291 | | | | | | |
| FINTR2 | 08B3 | -3295 | 3306 | | | | | | |
| FINTR3 | 08BF | 3301 | -3309 | | | | | | |
| FINTR4 | 08D0 | 3022 | -3327 | | | | | | |
| FINTRP | 08A0 | 1026 | 2991 | -3276 | | | | | |
| FIXSED | 0000 | -21 | 351 | 1136 | 1136 | | | | |
| GETN01 | 0F3D | -5574 | | | | | | | |
| GETN02 | 0F45 | 5578 | -5584 | | | | | | |
| GETNIB | 0F35 | 1654 | 1806 | 1905 | 2169 | 2174 | 2223 | 2679 | 2689 |
| | | 3122 | 3661 | 3890 | 3899 | 4085 | 4651 | 4667 | 4757 |
| | | 4762 | 4806 | 4858 | 4917 | 4957 | 5288 | 5294 | 5342 |
| | | -5563 | 5816 | 6127 | 6931 | 7087 | 7106 | | |
| GNI10 | 1AF3 | 9499 | -9511 | | | | | | |
| GNIB | 1ADB | 9385 | 9388 | 9410 | 9413 | -9488 | | | |
| HACODE | 0090 | -486 | 7167 | | | | | | |
| HAREG | 0082 | -477 | 2605 | | | | | | |
| HCLRSV | 0047 | -436 | 3361 | | | | | | |
| HCONFG | 00AB | -487 | 2389 | | | | | | |
| HCSUM | 0084 | -479 | 2607 | | | | | | |
| HDIAGS | 008D | -484 | 2604 | | | | | | |
| HDISAB | 0042 | -433 | 1427 | 3357 | 3410 | | | | |
| HDISKB | 0063 | -439 | 3369 | | | | | | |
| HDLOCK | 008A | -481 | 2602 | | | | | | |
| HDREG | 0083 | -478 | 2606 | | | | | | |
| HDR001 | 091C | 3371 | -3393 | | | | | | |
| HDR002 | 091F | 3352 | -3398 | | | | | | |
| HDR003 | 092D | 3402 | -3407 | | | | | | |
| HDR004 | 093F | 3414 | -3420 | | | | | | |
| HDR005 | 093F | 3411 | -3421 | | | | | | |
| HDRONY | 08D5 | -3349 | 3635 | 5063 | | | | | |
| HDRP01 | 0954 | 3447 | -3452 | | | | | | |
| HDRP02 | 0954 | 3445 | -3453 | | | | | | |
| HDRP03 | 0979 | 3471 | -3485 | | | | | | |
| HDRP04 | 097C | 3460 | -3489 | | | | | | |
| HDRPLS | 0941 | -3439 | 3672 | 5051 | | | | | |
| HDSEEK | 163B | 8069 | -8191 | | | | | | |
| HENABL | 0041 | -432 | 2078 | 3355 | | | | | |
| HENAKB | 0062 | -438 | 3367 | | | | | | |
| HENDEN | 0043 | -434 | 1496 | 3377 | | | | | |
| HENTAM | 00C5 | -444 | 2018 | 3444 | 3463 | | | | |
| HENTCD | 00C6 | -445 | 2017 | 3446 | 3467 | | | | |
| HEXTRP | 004E | -437 | 3363 | | | | | | |

| | | | | | | | | | |
|---|---|---|---|---|---|---|---|---|---|
| HHSLIM | 008E | -485 | 2542 | | | | | | |
| HLOPOS | 008B | -482 | 2526 | | | | | | |
| HMIRNG | 008C | -483 | 2603 | | | | | | |
| HPCNT | 0085 | -480 | 2608 | | | | | | |
| HPHAM1 | 0044 | -8046 | 8199 | | | | | | |
| HPHASE | 0088 | -8047 | 8202 | | | | | | |
| HPSET | 0081 | -476 | 2077 | 2198 | 4511 | | | | |
| HREQAC | 0040 | -453 | 1723 | 3373 | | | | | |
| HREQAE | 0052 | -456 | 2032 | 2553 | 3546 | | | | |
| HREQCF | 005B | -460 | 2582 | | | | | | |
| HREQCS | 0054 | -458 | 2563 | | | | | | |
| HREQDL | 0052 | -467 | 2520 | | | | | | |
| HREQDR | 0053 | -457 | 2028 | 2558 | 3555 | | | | |
| HREQDS | 0055 | -470 | 2536 | | | | | | |
| HREQLP | 0053 | -468 | 2525 | | | | | | |
| HREQMN | 0054 | -469 | 2530 | | | | | | |
| HREQPC | 0055 | -459 | 2024 | 2577 | 3564 | | | | |
| HREQPO | 0051 | -455 | 1532 | 3381 | 3525 | 3639 | | | |
| HREQSL | 0056 | -471 | 2541 | | | | | | |
| HREQSN | 005C | -461 | 3385 | | | | | | |
| HREQST | 0050 | -454 | 3365 | | | | | | |
| HSETDA | 00C4 | -443 | 2016 | 2586 | 5044 | | | | |
| HSETMN | 00C0 | -441 | 3473 | | | | | | |
| HSETPO | 00C1 | -442 | 2064 | 3477 | | | | | |
| HSETSV | 0046 | -435 | 1757 | 3359 | | | | | |
| HSTAT | 0080 | -475 | 3991 | | | | | | |
| IDLE | 097E | 1191 | -3503 | 3506 | | | | | |
| IDLE01 | 09A4 | 3523 | -3529 | | | | | | |
| IDLE02 | 09D1 | 3538 | -3572 | | | | | | |
| IDLE03 | 09D1 | 3534 | -3573 | | | | | | |
| IDLE04 | 09E6 | 3580 | -3587 | | | | | | |
| INITSM | 156D | 1134 | -7865 | | | | | | |
| INT75 | 009D | 514 | -673 | | | | | | |
| KDCTRL | 004E | -131 | 598 | 723 | 1487 | 1510 | 1588 | 1621 | 1834 |
| | | 1838 | 2163 | 2210 | 3194 | 3581 | 4018 | 5479 | 5481 |
| | | 5506 | 5508 | | | | | | |
| KDIO | 00A7 | -697 | 1564 | | | | | | |
| KDIO01 | 00B7 | 706 | -708 | | | | | | |
| KDIO02 | 00B7 | 702 | -709 | | | | | | |
| KDIO03 | 00D0 | 721 | -731 | | | | | | |
| KDSKIP | 0002 | -344 | 1565 | | | | | | |
| KEYB01 | 034A | 1489 | 1493 | -1501 | | | | | |
| KEYB02 | 0370 | 1524 | -1530 | | | | | | |
| KEYB03 | 0375 | 1529 | -1536 | | | | | | |
| KEYB04 | 0375 | 1517 | -1537 | | | | | | |
| KEYB05 | 0375 | 1513 | -1538 | | | | | | |
| KEYB06 | 0378 | 1508 | -1540 | | | | | | |
| KEYB07 | 038C | 1547 | -1555 | | | | | | |
| KEYB08 | 038C | 1539 | -1556 | | | | | | |
| KEYB09 | 038C | 1500 | -1557 | | | | | | |
| KEYBKT | 0054 | -146 | 563 | 736 | 851 | 5504 | | | |
| KEYBRD | 032D | -1486 | 3588 | | | | | | |
| KEYINT | 4C96 | -345 | 1566 | | | | | | |
| KILCOD | 02BE | -326 | 1126 | 1168 | 6179 | 6186 | 6912 | | |
| LEDOFF | 154A | -7827 | 7886 | 8070 | 8760 | 8783 | 9285 | | |
| LEDON | 153F | -7815 | 7866 | 8068 | 8755 | 8778 | 9283 | | |
| LOKFMT | 0040 | -380 | 2602 | | | | | | |
| LOWWRN | 001C | -61 | 2526 | 4084 | 4556 | | | | |
| LSNMAS | 000F | -7961 | 7981 | 7987 | | | | | |
| LSNMSK | 000F | -7557 | 7571 | 7639 | 7643 | 7796 | 8215 | 8338 | |
| LSTAT1 | 0F63 | 5622 | -5625 | | | | | | |
| LSTATE | 0F4E | 1030 | 1153 | 1180 | 1315 | 1521 | 1627 | 1679 | 2339 |
| | | 2513 | 2873 | 3072 | 3531 | 3729 | 4528 | 4627 | -5610 |
| | | 6174 | 6422 | 6777 | 7242 | 7316 | 7391 | | |
| MANRST | 09E9 | 3093 | -3600 | | | | | | |
| MAXINT | 7FA1 | -346 | | | | | | | |
| MEMORY | M 0000 | 0 | | | | | | | |

```
MESAG1    0A17     3640 -3655
MESAG2    0A17     3638 -3656
MESAG3    0A1A     3632 -3658
MESAG4    0A2E     3669 -3676
MESAG5    0A31     3675 -3681
MESAG6    0A31     3657 -3682
MESAGE    09EE     3576 -3620
MODD01    03AD     1593 -1599
MODD02    03D8     1637 -1639
MODD03    03E3     1645 -1647
MODD04    03F5     1630 -1664
MODD05    03FC     1669 -1671
MODD06    03FF     1663 -1675
MODD07    03FF     1598 -1676
MODD08    0408     1682 -1684
MODD09    040E    -1690  1702
MODD10    0419     1693 -1699
MODDSP    03A0     1562 -1586
MODLN     18BC     8071  8761  8784 -8837  9286
MOP01     1868     8714 -8723
MOP02     185C    -8718  8725
MOP05     1851    -8711  8722
MOP10     186D     8717 -8726
MOPEN     184F    -8710  8734  8736
MOVB01    0F8A     5654  5672 -5705
MOVB02    0F9A     5716 -5719
MOVB03    0FAB     5726 -5732
MOVBIT    0F68    -5647  5965  7196
MOVC05    1426    -7585  7717
MOVC1     143D    -7599
MOVC10    145E    -7629
MOVC15    145F     7625 -7630  7631
MOVC20    1473     7634 -7643
MOVC25    147E     7642 -7651
MOVC30    148C     7655 -7660
MOVC35    148E     7659 -7664
MOVC4     1407    -7570
MOVC40    14A8     7678 -7682
MOVC42    14CF     7706 -7711
MOVC45    14BC     7694 -7697
MOVC50    14DB     7587  7590  7593 -7722
MOVC55    14ED     7731 -7734
MOVC6     144D     7610 -7616
MOVC60    14F9     7580  7733 -7740
MOVC65    14FF     7736  7738 -7744
MOVC7     1423     7573  7575  7577  7579 -7583
MOVC70    14D8    -7721
MOVC8     1456     7598  7618 -7620
MOVCLS    1403    -7565  8376  8395  8416  8426  8445  8463  8478
                   8486  8759  8782  9403  9430  9443  9459  9465
MRSTS1    0048     -116  1009  1020  1204  1307  1330  1602  2289
                   2343  2589  2965  3147  3167  3200  3535  3998
                   4102  4169  4236  4491  4640  5617  6502  6794
MRSTS2    004A     -121   354  2862  3242  5614
MSERN1    0A6D     3766 -3794
MSERNO    0A38     3474 -3713  4571
MSG2M1    0AC4     3904 -3907
MSG2M2    0AF2     3966 -3971
MSG2M3    0AF2     3939 -3972
MSG2M4    0AF2     3921 -3973
MSG2M5    0AF2     3912 -3974
MSG2MU    0AAA    -3878  4577  4636
MSNFMT    007F     -381  2603
MSNMAS    00F0    -7960  7977  7991
MSNMSK    00F0    -7558  7635  7647  7793
MTRCHR    0046     -111  1136  1159  2394
MTRSTS    0AF4     3520 -3990  4261
```

| | | | | | | | | | |
|---|---|---|---|---|---|---|---|---|---|
| MULKEY | 0080 | -347 | 855 | 5503 | | | | | |
| MVDD01 | 00F0 | -779 | 803 | | | | | | |
| MVDD02 | 00FA | 783 | -791 | | | | | | |
| MVDDAT | 00DE | 626 | 646 | -760 | | | | | |
| MVLN01 | 0FB4 | -5761 | | | | | | | |
| MVLNIB | 0FBE | 1913 | 3129 | 3647 | 3770 | 3783 | 4093 | 4127 | 4591 |
| | | 4716 | 4779 | 4853 | 5001 | 5079 | -5759 | 7063 | 7075 |
| | | 7437 | | | | | | | |
| MVLO05 | 1899 | -8779 | | | | | | | |
| MVLOCK | 1896 | 2997 | -8778 | | | | | | |
| MVPOST | 1A25 | 1215 | 1237 | 4700 | -9282 | | | | |
| MVRN01 | 0FC3 | 5773 | -5801 | 5929 | | | | | |
| MVRN02 | 0FC8 | -5812 | 5846 | | | | | | |
| MVRN03 | 0FDB | 5827 | -5832 | | | | | | |
| MVRN04 | 0FDB | 5823 | -5833 | | | | | | |
| MVRN05 | 0FE2 | 5836 | -5841 | | | | | | |
| MVRN06 | 0FE7 | 5814 | -5847 | | | | | | |
| MVRNIB | 0FC2 | 1938 | 2455 | 3930 | -5799 | | | | |
| MVTR05 | 187F | -8756 | | | | | | | |
| MVTRIP | 187C | 2948 | -8755 | | | | | | |
| NARG | 0000 | 0 | | | | | | | |
| NBANKS | 0004 | -362 | 383 | 1208 | 1208 | 1225 | 1322 | 2775 | 2778 |
| | | 2798 | 2801 | 4123 | 4126 | 4188 | 4562 | 4587 | 4588 |
| | | 4635 | 4674 | 4674 | 4677 | 4712 | 4715 | | |
| NDISP | 0002 | -348 | 349 | 773 | 1461 | 1462 | 1649 | 1687 | 1688 |
| | | 2179 | 2243 | | | | | | |
| NINCYC | 0018 | -400 | 2987 | | | | | | |
| NORFLG | 004C | -126 | 1490 | 1558 | 1761 | 2089 | 2285 | 2331 | 3063 |
| | | 3117 | 3399 | 3442 | 3516 | 4320 | 4487 | 4691 | 5092 |
| | | 5127 | 6486 | | | | | | |
| NORSIZ | 0022 | -354 | 6689 | | | | | | |
| NORSTR | 0028 | -352 | 353 | 354 | 6690 | | | | |
| NPAUS1 | 0B1B | -4045 | 4047 | | | | | | |
| NPAUSE | 0B19 | 1367 | 2980 | 3015 | 3288 | 3303 | -4042 | 6041 | 6345 |
| | | 6892 | | | | | | | |
| NUMRD1 | 0014 | -7962 | 8015 | | | | | | |
| NVM30P | 1031 | 1391 | -6029 | 6201 | 6335 | 6671 | 7020 | | |
| NVM30G | 103E | -6040 | 6044 | | | | | | |
| NVM30T | 1047 | 1361 | -6063 | 6187 | 6330 | 6652 | 6821 | 6850 | 6963 |
| NVMBAD | 0001 | -411 | 1378 | 6378 | 6452 | 6917 | | | |
| NVMBYT | 1058 | -6088 | 6305 | 6461 | 6748 | | | | |
| NVMCH1 | 1077 | 6137 | -6140 | | | | | | |
| NVMCHG | 1068 | 2707 | 3511 | -6124 | | | | | |
| NVMCTL | 0066 | -186 | 2335 | 6126 | 6402 | 6493 | 6574 | 6691 | 6717 |
| | | 6960 | 7016 | | | | | | |
| NVMDE1 | 1099 | 1266 | -6191 | 6922 | | | | | |
| NVMDE2 | 10A0 | 6182 | -6200 | | | | | | |
| NVMDED | 1085 | 1117 | 1361 | 2428 | 2885 | 2931 | 4239 | 4293 | -6176 |
| | | 6312 | 6379 | 6409 | 6455 | 6755 | 6928 | 7253 | |
| NVMDXB | 10A9 | -6222 | 6667 | 6824 | 6852 | | | | |
| NVMER | 10B1 | -6243 | 6648 | 6785 | 6807 | | | | |
| NVMER1 | 10D1 | -6288 | 6302 | | | | | | |
| NVMER2 | 10DF | 6290 | -6303 | | | | | | |
| NVMER3 | 10EB | 6309 | -6315 | | | | | | |
| NVMER4 | 10EB | 6282 | -6316 | | | | | | |
| NVMER5 | 10FE | 6326 | -6329 | | | | | | |
| NVMER6 | 1101 | -6331 | 6375 | | | | | | |
| NVMER7 | 110B | -6344 | 6348 | | | | | | |
| NVMER8 | 111A | 6355 | -6358 | | | | | | |
| NVMERS | 4000 | -329 | 1363 | 6319 | | | | | |
| NVMFN1 | 114E | 6425 | -6434 | | | | | | |
| NVMFN2 | 114E | -6435 | 6465 | | | | | | |
| NVMFND | 112F | -6401 | 6496 | 6510 | 6568 | | | | |
| NVMLOD | 116B | 1151 | -6485 | | | | | | |
| NVMMAP | 1191 | 6226 | 6269 | 6442 | -6537 | 6718 | 6965 | | |
| NVMNB1 | 11B9 | 6579 | 6588 | -6599 | | | | | |
| NVMNBK | 119F | 6250 | -6565 | 6656 | 6815 | 6841 | | | |

```
NVMNXT   11BB   6097  6299  6360  6369 -6617  6742  6994  7008
NVMOPN   11C4   1300  6156 -6639
NVMPRP   11DF   6263 -6688  6713  6952
NVMRD    11EE   6500  6514 -6711
NVMRD1   11FD  -6726  6745
NVMRD2   120F   6728 -6746
NVMRED   4400   -328  1126  1168  1336  1373  1375  6179  6274
                6447  6722  6884  6912
NVMRET   0002   -412  6311
NVMST1   1221   6780 -6783
NVMST2   1232   6796 -6799
NVMSTO   1219   1356  3858 -6776
NVMWN    1261   1398  6188  6231 -6875  6970  6989  7005  7012
NVMWN1   1274  -6891  6895
NVMWN2   1287   6904 -6908
NVMWN3   129A   6910 -6931
NVMWN4   129A   6907 -6932
NVMWR    129E   1065  1351  3810  6150  6831 -6950
NVMWR1   12B9  -6975  6997
NVMWR2   12CD   6977 -6998
NVMWR3   12E6   6962 -7021
NVMWRT   4800   -327  6880
OLDSWT   0068   -191
PAUTHK   041F  -1717  2002
PCEFMT   007F   -382  2608
PCEREG   0028    -81   352  2608  2826  3822
PCESIZ   0007   -363  2823  2826  3822
PCLRK    0447  -1776  1993
PDCMK    0450  -1796  1996
PDCMK1   0461   1810 -1316
PERDSP   0464  -1831  3259  4269
PFLAG0   0000  -7554  7583
PH0011   18DF   8871 -8895  9103
PH0110   18FD   8863 -8947  9108
PH05     18F9   8902 -8915
PHASE1   0011  -7559  7619
PHASE2   0044  -7560  7617
PLH05    1983   9091 -9094
PLH10    18DB   8868 -8871
PLH12    18D4   8860 -8867
PLH14    18D9   8862 -8870
PLH52    1903  -8955
PLH57    190D   8952 -8963
PLH65    1912   8960 -8966
PLH66    1915  -8968  8977
PLH67    1916  -8969
PLH68    1919  -8970
PLH70    191E  -8975
PLH83    1923  -8979
PLHOME   18C5  -8859
PNUMK    048A  -1868  1988
PNUMK1   04A5   1895 -1899
POHOME   18C5   8388  8408  8439 -8858
PORT2A   6800   -330  7570  7609  7868  7877  8214  8699  9090
                9192  9197
PORTA    7001   -331   612   840  1062  1092  1186  2959  3042
                3278  4452  5455  6033  6035  6066  6068  7816
                7818  7828  7830
PORTB    7002   -332   712   908   963  1060  7638  7646  7651
                7791  7800  7803  7875  7980  7990  7995  8200
                8203  8309  8337  8339  8511  8720  8838  8840
                9026
PORTBI   006E   -206   209   210   211   711   907   964
PORTC    7003   -333   847  4459
POSFMT   0040   -383  4511
POSREG   0042   -106  1225  1322  2778  2801  4123  4185  4511
                4712
```

| | | | | | | | | | |
|---|---|---|---|---|---|---|---|---|---|
| POSREQ | 7466 | -9376 | 9387 | 9412 | 9469 | | | | |
| POSUP1 | 0B85 | 4111 | 4138 | -4205 | | | | | |
| POSUP2 | 0B92 | 4147 | 4157 | -4226 | | | | | |
| POSUPD | 0B23 | 3510 | -4074 | | | | | | |
| POSVAL | 7421 | -9377 | 9384 | 9409 | 9470 | | | | |
| PRES | 7421 | -9374 | 9377 | | | | | | |
| PROERR | 0BA1 | 494 | 496 | 498 | 500 | 504 | 508 | 512 | 1736 |
| | | 1745 | 2547 | 2587 | 3069 | 3192 | 3482 | 3678 | 3715 |
| | | -4260 | 4494 | 4533 | 4542 | 4551 | 4582 | 4625 | 4753 |
| | | 5008 | 7054 | 7297 | 7311 | 7321 | 7371 | 7396 | 7405 |
| | | 7429 | | | | | | | |
| PROKE1 | 04DB | -1974 | 1978 | | | | | | |
| PROKE2 | 04E3 | 1976 | -1979 | | | | | | |
| PROKE3 | 0502 | 1982 | -2012 | | | | | | |
| PROKEY | 04CE | 1554 | -1961 | | | | | | |
| PSETK | 0516 | 1999 | -2048 | | | | | | |
| PSETK1 | 052F | 2052 | -2075 | | | | | | |
| PSETK2 | 0536 | 2054 | -2097 | | | | | | |
| PTNC10 | 1968 | 9027 | -9072 | | | | | | |
| PTNC15 | 1970 | -9037 | 9075 | | | | | | |
| PTNC20 | 1971 | 9038 | 9043 | -9078 | | | | | |
| PTNC25 | 1972 | 9053 | 9068 | -9079 | | | | | |
| PTNC30 | 195A | 9045 | -9063 | | | | | | |
| PTNC40 | 1955 | 9051 | -9057 | 9065 | 9067 | | | | |
| PTNCHK | 192A | 8362 | 8365 | 8608 | 8659 | 8915 | 8971 | -9024 | |
| PTR | 0010 | -18 | 21 | -23 | 23 | 26 | -28 | 28 | 31 |
| | | -33 | 33 | 36 | -38 | 38 | 41 | -43 | 43 |
| | | 46 | -48 | 48 | 51 | -53 | 53 | 56 | -58 |
| | | 58 | 61 | -63 | 63 | 66 | -68 | 68 | 71 |
| | | -73 | 73 | 76 | -78 | 78 | 81 | -83 | 83 |
| | | 86 | -88 | 88 | 91 | -93 | 93 | 96 | -98 |
| | | 98 | 101 | -103 | 103 | 106 | -108 | 108 | 111 |
| | | -113 | 113 | 116 | -118 | 118 | 121 | -123 | 123 |
| | | 126 | -128 | 128 | 131 | -133 | 133 | 136 | -138 |
| | | 138 | 141 | -143 | 143 | 146 | -148 | 148 | 151 |
| | | -153 | 153 | 156 | -158 | 158 | 161 | -163 | 163 |
| | | 166 | -168 | 168 | 171 | -173 | 173 | 176 | -178 |
| | | 178 | 181 | -183 | 183 | 186 | -188 | 188 | 191 |
| | | -193 | 193 | 196 | -198 | 198 | 201 | -203 | 203 |
| | | 206 | -208 | 208 | 214 | -216 | 216 | 216 | 219 |
| | | -221 | 221 | 224 | -226 | 226 | 229 | -231 | 231 |
| | | 234 | -236 | 236 | 239 | -241 | 241 | 241 | 244 |
| | | -246 | 246 | 249 | -251 | 251 | 254 | -256 | 256 |
| | | 259 | -261 | 261 | -262 | 265 | -267 | 267 | |
| PUTN01 | 1007 | 5886 | -5896 | | | | | | |
| PUTNIB | 0FEE | 1813 | 1928 | 2650 | 2753 | 4670 | 4815 | 4831 | 4987 |
| | | 4992 | 5535 | 5819 | -5868 | 6733 | 7096 | 7112 | 7328 |
| PWRAB1 | 01A7 | 1014 | -1025 | | | | | | |

What is claimed is:

1. Apparatus for controlling the firmware branch points in an electronic postage meter comprising:

ROM means for storing a program for the electronic postage meter, said program including at least one firmware branch point wherein a different part of the program for meter operation is accessed in accordance with each branch from the branch point;

non-volatile memory means having addresses therein for storage of information;

said non-volatile memory means having at least one specified address wherein for storing a selectable data bit;

said data bit corresponding to selection of a particular active branch of the program at said firmware branch point; and means interconnecting said ROM means and said non-volatile memory means for providing communication therebetween to control the firmware branch point to cause access to the branch of the program selected in accordance with the data bit present in said non-volatile memory means.

2. The apparatus in claim 1 wherein said interconnecting means includes a system bus and a microprocessor.

3. The apparatus of claim 1 wherein there are a plurality of data bits stored in said non-volatile memory means, each data bit being operative for controlling branching at an associated firmware branch point of the program, said data bits thereby providing a selected configuration of active branches of the program.

4. The apparatus of claim 1 wherein the presence of said data bit controls the branching at a firmware branch point to select a branch which includes remote tripping of the postage meter.

5. The apparatus of claim 1 wherein the presence of said data bit controls the branching at a firmware point to select a branch which includes resetting of the postage meter.

6. The apparatus of claim 1 wherein the presence of said data bit controls the branching at a firmware branch point to select a branch which includes presetting of the postage meter.

7. The apparatus of claim 1 wherein the presence of said data bit controls the branching at a firmware branch point to select a branch which includes locking out the ascending register.

8. Apparatus for controlling the firmware branch points in an electronic postage meter, comprising:

ROM means for storing a program for the electronic postage meter, said program including a plurality of firmware branch points wherein a different part of the meter operating program is accessed in accordance with each branch from the branch points;

a non-volatile memory having addresses therein for storage of information;

said non-volatile memory including a selected plurality of data bits stored in specified addresses of said non-volatile memory;

each of said data bits respectively corresponding to a particular branch of the program desired to be active; and interconnecting means including a microprocessor and a system bus for interconnecting said ROM means and said non-volatile memory for providing communication therebetween to control the firmware branch points of the program in accordance with the selected data bits present in said non-volatile memory.

9. A method of controlling the firmware branch points in an electronic postage meter comprising the steps of:

storing a program for operation of the electronic postage meter in at least one ROM, said program including at least one firmware branch point wherein a different part of the program for meter operation is accessed in accordance with each branch from the branch point;

selectively storing at least one data bit within a non-volatile memory of the postage meter; and selecting a predetermined branch of the program for use in operation of the meter whenever said data bit is stored within the non-volatile memory, whereby the firmware branch point is controlled by the presence of the data bit stored in non-volatile memory.

* * * * *